US012590736B2

(12) United States Patent

Lakic

(10) Patent No.: US 12,590,736 B2

(45) Date of Patent: ***Mar. 31, 2026

(54) SYSTEM FOR RESTORATION OF A SALTY BODY OF WATER THAT HARNESSES HYDRO, SOLAR, AND GEOTHERMAL ENERGY, TO BE USED IN REMOTE LOCATIONS AND DIFFERENT APPLICATIONS INCLUDING THE PRODUCTION OF DISTILLED WATER FROM A SALTY BODY OF WATER

(71) Applicant: Nikola Lakic, Indio, CA (US)

(72) Inventor: Nikola Lakic, Indio, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/743,980

(22) Filed: Jun. 14, 2024

(65) Prior Publication Data

US 2024/0410624 A1 Dec. 12, 2024

Related U.S. Application Data

(63) Continuation-in-part of application No. 18/045,691, filed on Oct. 11, 2022, now Pat. No. 12,013,155,
(Continued)

(51) Int. Cl.
*F24T 50/00* (2018.01)
*C02F 1/14* (2023.01)
(Continued)

(52) U.S. Cl.
CPC ................ *F24T 50/00* (2018.05); *F03G 7/04* (2013.01); *F04B 47/00* (2013.01); *F24S 90/00* (2018.05);
(Continued)

(58) Field of Classification Search
CPC . F24T 50/00; F24T 10/17; F24T 10/30; F24T 2010/53; F03G 7/04; F04B 47/00;
(Continued)

(56) References Cited

U.S. PATENT DOCUMENTS

| | | | |
|---|---|---|---|
| 1,213,941 A | 1/1917 | Patrick | |
| 1,812,943 A | 7/1931 | Granger | |

(Continued)

FOREIGN PATENT DOCUMENTS

| | | |
|---|---|---|
| DE | 2321817 | 11/1973 |
| DE | 3144207 | 5/1983 |

(Continued)

OTHER PUBLICATIONS

Salton Sea Authority, Note for Salton Sea Authority Board of Directors Meeting, Oct. 22, 2015.

(Continued)

*Primary Examiner* — Hoang M Nguyen

(74) *Attorney, Agent, or Firm* — Schmeiser, Olsen & Watts LLP

(57) ABSTRACT

Provided here is a system for restoration of a salty terminal lake, such as the Salton Sea, an area of prevalent geothermal sources. It includes division of the Lake into three sections, to accommodate for less inflow from a river, such as the Colorado River, and preventing pollution of the central section of the Lake from nearby farmlands and importing seawater in central section with pipeline system; providing condition for tourism, and wildlife sanctuary; generating electricity by harnessing hydro, solar, and geothermal energy; and producing potable water and lithium as byproducts. Also includes a system and method for harnessing geothermal energy for generation of electricity by using complete closed loop heat exchange systems combined with onboard drilling apparatus. The system includes several (Continued)

devices operating separately in many different applications in energy sectors, Also, included is an alternative use for the In-Line-Pump for marine crafts propulsion.

17 Claims, 143 Drawing Sheets

Related U.S. Application Data which is a continuation-in-part of application No. 17/445,677, filed on Aug. 23, 2021, now abandoned, which is a continuation of application No. 15/940, 732, filed on Mar. 29, 2018, now Pat. No. 11,098,926, which is a continuation-in-part of application No. 14/581,670, filed on Dec. 23, 2014, now Pat. No. 9,995,286, which is a continuation-in-part of application No. 14/154,767, filed on Jan. 14, 2014, now Pat. No. 9,978,466, which is a continuation-in-part of application No. 13/655,272, filed on Oct. 18, 2012, now Pat. No. 9,909,782, which is a continuation-in-part of application No. 13/053,029, filed on Mar. 21, 2011, now Pat. No. 8,713,940, which is a continuation-in-part of application No. 12/197,073, filed on Aug. 22, 2008, now Pat. No. 8,281,591, which is a continuation-in-part of application No. 11/770,543, filed on Jun. 28, 2007, now Pat. No. 7,849,690, said application No. 15/940,732 is a continuation-in-part of application No. 14/961,435, filed on Dec. 7, 2015, now Pat. No. 9,982,513.

(51) Int. Cl.

| | |
|---|---|
| *C02F 1/16* | (2023.01) |
| *C02F 103/08* | (2006.01) |
| *F03G 7/04* | (2006.01) |
| *F04B 47/00* | (2006.01) |
| *F24S 90/00* | (2018.01) |
| *F24T 10/00* | (2018.01) |
| *F24T 10/17* | (2018.01) |
| *F24T 10/30* | (2018.01) |
| *F24V 50/00* | (2018.01) |
| *F28B 1/02* | (2006.01) |
| *F28D 15/00* | (2006.01) |
| *F28D 21/00* | (2006.01) |

(52) U.S. Cl.
CPC ............. *F24T 10/17* (2018.05); *F24T 10/30* (2018.05); *F24V 50/00* (2018.05); *F28B 1/02* (2013.01); *F28D 15/00* (2013.01); *F28D 21/001* (2013.01); *C02F 1/14* (2013.01); *C02F 1/16* (2013.01); *C02F 2103/08* (2013.01); *F24T 2010/53* (2018.05); *Y02E 10/10* (2013.01)

(58) Field of Classification Search
CPC .. F24S 90/00; F24V 50/00; F28B 1/02; F28D 15/00; F28D 21/001; C02F 1/14; C02F 1/16; C02F 2103/08; Y02E 10/10
See application file for complete search history.

(56) References Cited

U.S. PATENT DOCUMENTS

| | | | |
|---|---|---|---|
| 2,716,293 A | 8/1955 | Rath | |
| 2,717,767 A | 9/1955 | Carmen et al. | |
| 3,170,250 A | 2/1965 | Scholl | |
| 3,180,039 A | 4/1965 | Burns, Jr. | |
| 3,416,618 A | 12/1968 | Kunnemann | |
| 3,789,919 A | 2/1974 | Huber | |
| 3,824,156 A | 7/1974 | Griffin | |
| 3,824,793 A | 7/1974 | Matthews | |
| 3,939,356 A | 2/1976 | Loane | |
| 3,948,330 A | 4/1976 | Langford, Jr. | |
| 3,953,966 A | 5/1976 | Martz et al. | |
| 3,986,362 A | 10/1976 | Baciu | |
| 4,006,777 A | 2/1977 | LaBauve | |
| 4,059,959 A | 11/1977 | Matthews | |
| 4,099,381 A | 7/1978 | Rappoport | |
| 4,183,156 A | 1/1980 | Rudy | |
| 4,210,820 A | 7/1980 | Wittig | |
| 4,219,945 A | 9/1980 | Rudy | |
| 4,227,583 A | 10/1980 | Benjamin | |
| 4,271,606 A | 6/1981 | Rudy | |
| 4,340,626 A | 7/1982 | Rudy | |
| 4,343,999 A | 8/1982 | Wolf | |
| 4,368,787 A | 1/1983 | Messenger | |
| 4,407,126 A | 10/1983 | Aplenc | |
| 4,448,022 A | 5/1984 | Aplenc | |
| 4,576,006 A | 3/1986 | Yamaoka | |
| 4,641,498 A | 2/1987 | Markovitch et al. | |
| 4,696,718 A | 9/1987 | Lasater | |
| 4,730,403 A | 3/1988 | Walkhoff | |
| 4,776,169 A | 10/1988 | Coles, Jr. | |
| 4,817,304 A | 4/1989 | Parker et al. | |
| 4,819,746 A | 4/1989 | Brown et al. | |
| 4,864,737 A | 9/1989 | Marrello | |
| 4,999,931 A | 3/1991 | Vermeulen | |
| 5,025,575 A | 6/1991 | Lakic | |
| 5,033,545 A | 7/1991 | Sudol | |
| 5,058,386 A | 10/1991 | Senanayake | |
| 5,117,566 A | 6/1992 | Lloyd et al. | |
| 5,165,235 A | 11/1992 | Nitschke | |
| 5,287,638 A | 2/1994 | Preston | |
| 5,625,964 A | 5/1997 | Lyden et al. | |
| 5,665,242 A | 9/1997 | Gallup | |
| 5,706,888 A | 1/1998 | Ambs et al. | |
| 5,753,061 A | 5/1998 | Rudy | |
| 5,832,630 A | 11/1998 | Potter | |
| 5,846,063 A | 12/1998 | Lakic | |
| 5,894,687 A | 4/1999 | Lin | |
| 5,996,254 A | 12/1999 | Goven | |
| 6,073,448 A | 6/2000 | Lozada | |
| 6,092,310 A | 7/2000 | Schoesler | |
| 6,095,261 A | 8/2000 | Trevino, Jr. | |
| 6,149,855 A | 11/2000 | Watson | |
| 6,158,149 A | 12/2000 | Rudy | |
| 6,178,663 B1 | 1/2001 | Schoesler | |
| 6,247,313 B1 | 6/2001 | Moe et al. | |
| 6,259,165 B1 | 7/2001 | Brewington | |
| 6,510,624 B1 | 1/2003 | Lakic | |
| 6,705,085 B1 | 3/2004 | Braithwaite et al. | |
| 6,708,494 B1 | 3/2004 | Hamann | |
| 6,892,829 B2 | 5/2005 | Livingstone | |
| 7,013,645 B2 | 3/2006 | Brewington | |
| 7,017,285 B2 | 3/2006 | Lakic | |
| 7,055,627 B2 | 6/2006 | Fontana et al. | |
| 7,134,512 B2 | 11/2006 | Head | |
| 7,152,700 B2 | 12/2006 | Church et al. | |
| 7,185,493 B1 | 3/2007 | Connelly | |
| 7,251,938 B1 | 8/2007 | Bond | |
| 7,451,555 B1 | 11/2008 | Lakic | |
| 7,469,747 B1 | 12/2008 | Blanchard, Jr. et al. | |
| 7,472,549 B2 | 1/2009 | Brewington | |
| 7,806,203 B2 | 10/2010 | Krueger et al. | |
| 7,810,583 B2 | 10/2010 | Ruggier et al. | |
| 7,849,690 B1 | 12/2010 | Lakic | |
| 8,011,450 B2 | 9/2011 | Krueger et al. | |
| 8,132,630 B2 | 3/2012 | Krueger et al. | |
| 9,206,650 B2 | 12/2015 | Lakic | |
| 10,020,772 B1 * | 7/2018 | Puri | H02S 10/40 |
| 11,098,926 B2 | 8/2021 | Lakic | |
| 12,013,155 B2 * | 6/2024 | Lakic | F03G 4/037 |
| 2001/0042321 A1 | 11/2001 | Tawney et al. | |
| 2003/0029169 A1 | 2/2003 | Hanna et al. | |
| 2003/0141111 A1 | 7/2003 | Pia | |
| 2004/0104030 A1 | 6/2004 | Livingstone | |
| 2004/0216460 A1 | 11/2004 | Ruggieri et al. | |

(56)                References Cited

U.S. PATENT DOCUMENTS

| | | | | |
|---|---|---|---|---|
| 2006/0137349 | A1 | 6/2006 | Pflanz | |
| 2007/0007771 | A1 | 1/2007 | Biddle et al. | |
| 2007/0137202 | A1 | 6/2007 | Hines | |
| 2007/0289303 | A1 | 12/2007 | Prueitt | |
| 2007/0295477 | A1 | 12/2007 | Mueller et al. | |
| 2008/0277492 | A1 | 11/2008 | Cannon | |
| 2009/0120091 | A1 | 5/2009 | DuBois | |
| 2010/0071366 | A1 | 3/2010 | Klemencic | |
| 2010/0263859 | A1 | 10/2010 | Kriesels | |
| 2010/0284829 | A1 | 11/2010 | Sloteman et al. | |
| 2010/0300092 | A1 | 12/2010 | Eli et al. | |
| 2011/0048703 | A1 | 3/2011 | Farshchian et al. | |
| 2011/0100003 | A1 | 5/2011 | McLeod et al. | |
| 2011/0138809 | A1 | 6/2011 | Ramaswamy et al. | |
| 2011/0171051 | A1 | 7/2011 | Pekrul | |
| 2012/0174581 | A1 | 7/2012 | Vaughan et al. | |
| 2012/0267232 | A1* | 10/2012 | Riley | B01D 3/30 202/175 |
| 2012/0292112 | A1 | 11/2012 | Lakic | |
| 2014/0007528 | A1* | 1/2014 | Keller | H02S 20/22 52/173.3 |
| 2015/0043200 | A1* | 2/2015 | Wilson | F21S 9/043 362/145 |
| 2015/0159467 | A1 | 6/2015 | Hartman et al. | |
| 2015/0336807 | A1* | 11/2015 | Alhazmy | C02F 1/14 202/167 |
| 2016/0168916 | A1 | 6/2016 | Lakic | |
| 2018/0366980 | A1* | 12/2018 | Castor | H02J 50/10 |

FOREIGN PATENT DOCUMENTS

| | | |
|---|---|---|
| GB | 357391 | 9/1931 |
| GB | 2189679 | 11/1987 |
| JP | 6189806 | 8/2017 |

OTHER PUBLICATIONS

Salton Sea Authority, Note for Salton Sea Authority Board of Directors Meeting, Dec. 10, 2015.
Salton Sea Authority, Note for Salton Sea Authority Board of Directors Meeting, Apr. 28, 2016.
Salton Sea Authority, Note for Salton Sea Authority Board of Directors Meeting, Jun. 30, 2016.
Salton Sea Authority, Note for Salton Sea Authority Board of Directors Meeting, Jul. 28, 2016.
Nikola Lakic, Email: (IV) Request for Termination of the MOU, recently signed on Aug. 31, 2016, dated Sep. 12, 2016.
Salton Sea Authority, Note for Salton Sea Authority Board of Directors Meeting, Sep. 22, 2016.
Salton Sea Authority, Note for Salton Sea Authority Board of Directors Meeting, May 18, 2017.
Nikola Lakic, Email: Important information regarding the Salton Sea's situation, Environment and Energy, dated Jun. 6, 2017.
Salton Sea Authority, Note for Salton Sea Authority Board of Directors Meeting, Sep. 28, 2017.
Salton Sea Authority, Note for Salton Sea Authority Board of Directors Meeting, Apr. 12, 2018.
Salton Sea Authority, Note for Salton Sea Authority Board of Directors Meeting, Jun. 28, 2018.
Nikola Lakic, Email: Respond to Assistant Secretary Mr. Bruce Wilcox's rejection of the proposal for theRequest for Information (RFI) for the Salton Sea Water Importation Projects, dated Oct. 12, 2018.
Nikola Lakic, Email: Infringement, dated Oct. 29, 2018.
Salton Sea Authority, Note for Salton Sea Authority Board of Directors Meeting, May 23, 2019.
Salton Sea Authority, Note for Salton Sea Authority Board of Directors Meeting, Dec. 19, 2019.
Nikola Lakic, Email: 2020 Triennial Review Proposal, dated May 26, 2020.
Nikola Lakic, Email: Public Comment in response to "Community Input Sought for Salton Sea Management Program (SSMP) Projects"—from Nikola Lakic, Architect, dated May 26, 2020, dated Sep. 29, 2020.
Nikola Lakic, Email: 2020 Triennial Review Public Comment—from Nikola Lakic, Architect, dated Oct. 21, 2020.
Nikola Lakic, Letter to President Joseph R. Biden: Request for NOT to assist the IID in fast-tracking the federal permitting process for the geothermal lithium project in Hell's Kitchen, Salton Sea, Ca, dated Oct. 1, 2021.
Nikola Lakic, Letter to California Energy Commission: Comment following the virtual Lithium Valley Commission Meeting conducted on Thursday Dec. 16, 2021—Nikola Lakic, dated Dec. 19, 2021.
Nikola Lakic, Letter to Azucena Beltran: Response to the Panel's decision regarding two Fatal Flaws, dated Jun. 30, 2022.
Nikola Lakic, Email: My comment following the Independent Review Panel on Water Importation Meeting on Jul. 20, 2022, dated Jul. 22, 2022.
Nikola Lakic, Email: Important legal information about the scam that is in process regarding the restoration of the Salton Sea, dated Aug. 18, 2022.
Nikola Lakic, Email: My Public Comment following three virtual community meetings facilitated by the U.S. Army Corps of Engineers, the Salton Sea Management Program (SSMP), and the NAPE on Jul. 7, 2022 (2 meetings) and Jul. 12, 2022.—Nikola Lakic, dated Sep. 23, 2022.
Lakic, Self Contained In-Ground Geothermal Generator, U.S. Appl. No. 11/770,543, filed Jun. 28, 2007, Office Action Summary, dated Jun. 8, 2010.
Lakic, Self Contained In-Ground Geothermal Generator, U.S. Appl. No. 11/770,543, filed Jun. 28, 2007, Amendment, dated Sep. 8, 2010.
Lakic, Self Contained In-Ground Geothermal Generator, International Application No. PCT/US2009/054656, Priority date Aug. 22, 2008, Written Opinion of the International Searching Authority, dated Oct. 8, 2009.
Lunis, Geothermal Direct Use Program Opportunity notice Lessons Learned, Final Report 1978-1986 [online], Dec. 1987 [retrieved on Jun. 12, 2012 (Jun. 6, 2012)). Retrieved from the Internet:<URL: http://www.osti.gov/geothermal/servlets/purf/894094-iXTQhu/894094. pdf> pp. 8-4, 12-9 and 16-23.

\* cited by examiner

SYSTEM FOR RESTORATION OF A SALTY BODY OF WATER THAT HARNESSES HYDRO, SOLAR, AND GEOTHERMAL ENERGY, TO BE USED IN REMOTE LOCATIONS AND DIFFERENT APPLICATIONS INCLUDING THE PRODUCTION OF DISTILLED WATER FROM A SALTY BODY OF WATER

CROSS-REFERENCE TO RELATED APPLICATIONS

This application is a continuation-in-part of U.S. patent application Ser. No. 18/045,691, filed on Oct. 11, 2022, which is a continuation-in-part of U.S. patent application Ser. No. 17/445,677, filed on Aug. 23, 2021, which is a continuation of U.S. patent application Ser. No. 15/940,732, filed on Mar. 29, 2018, now U.S. Pat. No. 11,098,926, issued Aug. 24, 2021, which is a continuation-in-part of U.S. patent application Ser. No. 14/581,670, filed on Dec. 23, 2014, now U.S. Pat. No. 9,995,286, issued Jun. 12, 2018, which is a continuation-in-part of U.S. patent application Ser. No. 14/154,767, filed on Jan. 14, 2014, now U.S. Pat. No. 9,978,466, issued on May 22, 2018, which is a continuation-in-part of U.S. patent application Ser. No. 13/655,272, filed on Oct. 18, 2012, now U.S. Pat. No. 9,909,782, issued Mar. 6, 2018, which is a continuation-in-part of U.S. patent application Ser. No. 13/053,029, filed on Mar. 21, 2011, now U.S. Pat. No. 8,713,940, issued May 6, 2014; which is a continuation-in-part of U.S. patent application Ser. No. 12/197,073, filed on Aug. 22, 2008, now U.S. Pat. No. 8,281,591, issued Oct. 9, 2012; which is a continuation-in-part of patent application Ser. No. 11/770,543, filed Jun. 28, 2007, now U.S. Pat. No. 7,849,690, issued Dec. 14, 2010 the disclosures of which are hereby incorporated entirely herein by reference. Additionally, U.S. patent application Ser. No. 15/940,732, filed on Mar. 29, 2018, now U.S. Pat. No. 11,098,926, issued Aug. 24, 2021, is also a continuation-in-part of U.S. patent application Ser. No. 14/961,435, filed Dec. 7, 2015, now U.S. Pat. No. 9,982,513 issued on May 29, 2018, the disclosure of which is incorporated by reference.

BACKGROUND OF THE INVENTION

Technical Field

This invention relates generally to a self-contained in-ground geothermal generator and heat exchanger for the generation of electricity from a geothermal source. This invention also relates to the effective method of use of a heat source such as oil well flare stacks and lava for the production of electricity. This invention also relates to an effective method for desalinization of water from a large body of salty water by using heat from geothermal and solar sources. This invention also relates to an in-line pump for fluid circulation, which can be used for cross-country pipelines. Also, a slightly modified in-line pump can be used in different applications for the propulsion of amphibian airplanes, ships, and another watercraft. Also, the presented invention relates to a new system for harnessing solar energy which can be used independently or in combination with the pipeline for importing seawater. Also, this invention relates to a proposal for the restoration of the Salton Sea-a terminal lake in California-which includes an architectural plan (the solution) that incorporates several technologies into the self-sustainable functional organism.

State of the Art

Geothermal is a renewable energy source made possible by the same tectonic activity that causes local earthquakes and rising mountains. Geothermal is an endless supply of energy from which we can generate power. The earth's rigged outer shell, the lithosphere, consisting of the crust and upper mantle, rests upon the hotter and more plastic region of the upper mantle, below the crust, called the asthenosphere. The thickness of the Earth's crust varies from a few miles to perhaps hundred fifty miles. Rock heated by magma deep below the surface boils water trapped in underground reservoirs-sometimes as hot as 700° F. Some of this hot geothermal water travels back up through faults and cracks and reaches the earth's surface as hot springs or geysers, but most of it stays deep underground, trapped in cracks and porous rock. This natural collection of hot water is called a geothermal reservoir. We already enjoy some of this activity via natural hot springs.

Presently, wells are drilled into geothermal reservoirs to bring the hot water to the surface. At geothermal power plants, this hot water is piped to the surface. Then, after removing silica, steam is created and used to spin turbines creating mechanical energy. The shaft from the turbines to the generator converts mechanical energy to electrical energy. The used geothermal water is then returned down an injection well into the reservoir to be reheated, to maintain pressure, and to sustain the reservoir.

There are three kinds of geothermal power plants. The kind we build depends on the temperatures and pressures of a reservoir.

1. A "dry" steam reservoir produces steam but very little water. The steam is piped directly into a "dry" steam power plant to provide the force to spin the turbine generator. The largest dry steam field in the world is about 90 miles north of San Francisco. Production of electricity started at The Geysers in 1960, at what has become the most successful alternative energy project in history.

2. A geothermal reservoir that produces mostly hot water is called a "hot water reservoir" and is used in a "flash" power plant. Water ranging in temperature from 300-700° F. is brought up to the surface through the production well where, upon being released from the pressure of the deep reservoir, some of the water flashes into steam after removing silica in a 'separator.' Steam then powers the turbines.

3. A reservoir with temperatures between 250-360° F. is not hot enough to flush enough steam but can still be used to produce electricity in a "binary" power plant. In a binary system, the geothermal water is passed through a heat exchanger, where its heat is transferred into a second (binary) liquid, such as isopentane, that boils at a lower temperature than water. When heated, the binary liquid flashes to vapor, which, like steam, expands across and spins the turbine blades. The vapor is then condensed to a liquid and is reused repeatedly. In this closed-loop cycle, there are no emissions into the air.

It's also a proven, relatively clean energy source. More than 30 nations sitting in the earthquake and volcanic zones have extensively used geothermal power for decades.

The existing use of geothermal energy is limited by location. Geothermal resources are limited to the "shallow" hydrothermal reservoirs at the crustal plate boundaries. Much of the world is underlain (3-6 miles down), by hot dry rock-no water, but lots of heat.

Presently, across the globe, many countries are looking to the heat of hot rocks for future energy needs. In areas of the world where steam is not as close to the surface as it is at the geysers, engineers are experimenting with a process called "hot dry rock technology" or "Enhance Geothermal System" (EGS).

In hot dry rock geothermal technology, there is no steam lock up in the hot rocks that exist down under the crust so scientists in the U.S.A., Japan, England, France, Germany, Belgium, and Australia, have experimented with piping water into this deep hot rock to create more hydrothermal resources for use in geothermal power plants. The simplest hot dry rock power plant comprises one injection well and two production wells.

What they try to do is drill down an injection well into the rock and then inject down into the well, under pressure, whatever water source they happen to have on the surface, hoping that it will travel through cracks and fissures as an underground heat exchanger in the hot granite and provide underground reservoir and then drill more production wells around the perimeter and try to recover that water and steam and pump it back to surface and then use it in a conventional or in a "binary" power plant.

The invention of the coal-burning steam engine revolutionized industrial production in the 18$^{th}$ c. and opened the way to the development of mechanized transport by rail and sea. The modern steam engine, using high-pressure super-heated steam, remains a major source of electrical power and means of marine propulsion, though oil has replaced coil as the fuel in many installations and the reciprocating engine has given way to the steam turbines.

Modern wells, mostly used in the oil industry and geo-thermal plants, drilled using rotary drills, can achieve lengths of over 38,000 feet (12 000 meters). The well is created by drilling a hole 5 to 30 inches (13-76 cm) in diameter into the earth. Drilling technology is improving every day.

A gas flare, alternatively known as a flare stack, is a gas combustion device used in industrial plants such as petroleum refineries, chemical plants, natural gas processing plants as well as at oil or gas production sites having oil wells, gas wells, offshore oil and gas rigs and landfills. Whenever industrial plant equipment items are over-pressured, the pressure relief valve provided as an essential safety device on the equipment automatically releases gases which are ignited and burned. The heat from the flame on top of flare stacks dissipates in air and has not been harnessed efficiently.

In several decades, had been mentioned proposals by many people about importing seawater from the Ocean into the Salton Sea—but they all failed to address the following:

1. How to prevent pollution of the lake. Just importing seawater wouldn't stop pollution; (Nearby farmlands runoff water contains fertilizers and pesticides enter the lake.)

2. Desalination of the lake-They were proposing processes such as reverse osmosis and distillers which require a substantial amount of electricity, maintenance of filters, etc.;

3. The practicality of the projects-They were proposing canals and/or tunnels, dozens of pipes, an expensive pumping station, and extreme costs which could not be repaid to investors.

4

Solar Systems

There are several solar systems used today. A thermal solar system using mirror panels focusing on a central pipeline. The parabolic mirrors are shaped like quarter-pipes. The sun shines onto the panels made of glass, which are 94% reflective, unlike a typical mirror, which is only 70% reflective. The mirrors automatically track the sun throughout the day. The greatest source of mirror breakage is wind, with 3,000 mirrors typically replaced each year. Operators can turn the mirrors to protect them during intense windstorms. An automated washing mechanism is used to periodically clean the parabolic reflective panels. The term "field area" is assessed as the actual collector area.

Heat transfer—The sunlight bounces off the mirrors and is directed to a central tube filled with synthetic oil, which heats to over 400° C. (750° F.). The reflected light focused at the central tube is 71 to 80 times more intense than ordinary sunlight. The synthetic oil transfers its heat to water, which boils and drives the cycle steam turbine, thereby generating electricity. Synthetic oil is used to carry [the] heat (instead of water) to keep the pressure within manageable parameters.

In the solar power industry, there are solar power plant having mirrors focused on central tower where heat is transferred, and electricity generated by binary power unit.

There are solar power plants with photo voltaic PV panels with or without sun-tracking mechanisms which generate electricity directly from sunlight, but there are not very efficient systems.

In the hydropower industry, there are water pumping systems using pumping stations and axial turbine generators.

In the watercraft industry, there are propulsion devices for amphibian airplanes, ships, and other watercraft using propellers attached to a solid shaft.

Accordingly, there is a need in the field of geothermal energy for an apparatus and method for efficiently using the enormous heat resources of the Earth's crust that are accessible by using current drilling technology and a universal portable heat exchange system for harnessing heat from sources such as lava and flare stacks which otherwise is dissipating in the air. There is also a need in the field of solar energy for an apparatus and method for efficiently using solar energy. There is also a need for efficiently importing and using seawater for the generation of electricity, potable water, and salty brine that can be used to produce Lithium. There is a need in the field of propulsion of watercraft for more efficient propulsion devices.

SUMMARY OF THE INVENTION

The present invention is a new method of using an inexhaustible supply of geothermal energy effectively. The present invention relates to a self-contained, in-ground geo-thermal generator, which continuously produces electric energy from renewable geothermal resources. Specifically, this innovative method uses heat from dry hot rocks, thus overcoming serious limitations and obstacles associated with using hydrothermal reservoirs, as is the case in conventional geothermal technology, or in experimental Enhanced Geothermal Systems (EGS). The generator is not limited to the relatively "shallow" hydrothermal reservoirs as is the case in conventional geothermal power plants.

By lowering the unit with cables into the pre-drilled well to the desired level and temperature, geothermal energy becomes controllable, and the production of electric energy becomes available. Electricity is produced by a generator at the in-ground unit and is then transmitted up to the ground surface by electric cable.

Here is also introduce a new technology for drilling deeper and wider well bores which eliminates limitations, well known in contemporary drilling technologies, relevant to depth and diameter which will drastically reduce drilling cost, as disclosed in U.S. Provisional Application No. 61/276,967, filed Sep. 19, 2009, and Provisional Application No. 61/395,235, filed May 10, 2010—Title: APPARATUS FOR DRILLING FASTER, DEEPER AND WIDER WELL BORE; U.S. Provisional Application No. 61/397,109, filed: Jun. 7, 2010—Title: PROPOSAL FOR CONTROLLING DYSFUNCTIONAL BLOW OUT PREVENTER; International Application Number: PCT/US10/49532—Filed on Sep. 20, 2010, (after holyday)—Title: APPARATUS FOR DRILLING FASTER, DEEPER AND WIDER WELL BORE; application Ser. No. 13/424,184, filed Mar. 19, 2012—now U.S. Pat. No. 9,206,650 issued Dec. 8, 2015— Title: APPARATUS FOR DRILLING FASTER, DEEPER AND WIDER WELL BORE; Pending application Ser. No. 14/961,435, filed Dec. 7, 2015, the disclosures of which are incorporated by reference. Additionally, Applicant disclosed embodiments of the present invention in a presentation, including presentation material, at the National Association of Environmental Professionals ("NAEP") meetings held in Durham, North Carolina on Mar. 30, 2017, the disclosure of which is incorporated entirely herein by reference. Further, embodiments of this present invention were submitted in a request for information for Salton Sea Water Importation Projects by the California Natural Resources Agency on Mar. 12, 2018, the disclosure of which is incorporated entirely herein by reference.

Relatively cheap and clean electric energy continuously produced from geothermal renewable sources, besides common use in homes and businesses, can be used to produce hydrogen which can be used as a clean source of energy in many applications including the auto industry, or can be used to recharge electric car batteries, and can eventually replace depleting, expensive and polluting oil, coal and other fossil fuels, which are used to create electricity. Nuclear power plants with very toxic waste material can also be replaced.

The self-contained in-ground geothermal generator comprises a slim cylindrical shape, which, positioned vertically, can be lowered with a system of cables deep into the ground in a pre-drilled well. The self-contained generator includes a boiler with water or working fluid, turbines, a gearbox, an electric generator, a condenser distributor, a condenser with a system of tubes for returning water back into the boiler, an electric cable for transporting electric energy up to the ground surface and a cooling system which comprises a separate system of close loop thermally insulated tubes, which are connected with a heat exchanger on the ground surface.

The self-contained in-ground geothermal generator also contains an internal and external structural cylinder. The space formed between external and internal cylinders and a plurality of tubes within is part of the condenser which cools and converts exhausted steam back into a liquid state and returns it back as feed water into the boiler for reheating.

In this method of using the geothermal generator, water or working fluid contained within the boiler is converted to high-pressure, superheated steam due to heat from hot rocks contained within a pre-drilled well below the Earth's surface. Steam is used to produce electric energy which is transmitted up to the ground surface by the electric cable.

The cooling system is a closed loop tube that cools the condenser by circulating water through the peripheral chamber of the condenser, formed between external and internal cylinders, and then transfers the heat up on the ground surface through thermally insulated pipes. The heat on the ground surface is then used to produce additional electricity in a "binary" power plant through a system of several heat exchangers. The peripheral chamber of the condenser surrounds and cools the turbine and electric generator departments.

The cooling system for the self-contained geothermal generator is an independent close-loop tube system, which, as an alternative system, can be modified to operate independently as a heat exchanger. Namely, instead of circulating water through a condenser formed between external and internal cylinders, it can circulate water through a coiled pipe, which functions as a heat exchanger, deep in the ground, and then exchange heat up on the ground surface through a system of heat exchangers. Both two close loop systems, (a cooling system for a self-contained in-ground geothermal generator and an independent in-ground heat exchanger) have thermally insulated pipes to prevent heat loss between heat exchangers and have at least one water pump to provide liquid circulation through the pipeline and to reduce hydrostatic pressure at the lower part of the close loop system.

There are many areas in many countries with earthquake and volcanic zones where hot rocks can be reached at a relatively short distance from the ground surface.

The self-contained geothermal generator is lowered deep in the ground to the hot rocks. The bottom part of the boiler may have several vertical indents (groves) to increase its conductive surface thereby increasing the conductivity of heat from hot rocks to the water inside the boiler, which produces high-pressure superheated steam, which then turns the turbines.

The axle of the turbine is a solid shaft and is connected to the axle of the rotor of the electric generator, which is a cylindrical shaft that rotates within a generator and generates electricity. The cylindrical shape of the rotor shaft allows for steam to pass through to the condenser's distributor. The cylindrical shaft of the rotor also functions as a secondary turbine. It has a secondary set of small blades attached to the inside wall and positioned to increase the rotation of the rotor. Exhausted steam then reaches the condenser through a system of tubes where the steam condenses and returns to the boiler as feed water through a feed water tank. This process is repetitive and is regulated with two sets of steam control valves and boiler feed water pumps, which can be activated automatically by pressure or heat or electronically by sensors and a computer in a control room on the ground surface.

The purpose of the gearbox, or converter, which is located between the turbines and the generator, is to neutralize momentum produced by the spinning turbines by changing the direction of the rotor of the generator. Thus, the rotor of the generator spins in the opposite direction than the main turbines.

The boiler of the self-contained in-ground geothermal generator is filled with water after all assembly is lowered to the bottom of the well through a separate set of tubes to reduce the weight of the whole assembly during the lowering process. The same tubes are also used to supply, maintain and regulate the necessary level of water in the boiler.

The condenser which surrounds and cools the turbine and electromagnetic generator, but not the boiler, is insulated from the external heat of hot rocks with a layer of heat-resistant insulation. An additional peripheral layer of insulation can be aluminum foil. The whole assembly of the self-contained in-ground geothermal generator can be treated with a special coat of rust-resistant material, for example, porcelain treated.

The boiler of the assembly can be filled, besides water, also with liquid, such as isopentane, that boils at a lower temperature than water to make the unit functional at less dept or a lower temperature.

Also, coolant for a condenser can be filled, besides the water, with other liquid with a higher boiling point than water.

The step-up transformer can be added on top of the unit or can be separated from the assembly and carried with a separate cable to reduce the weight of the assembly. If needed, several transformers can be added and spaced at the necessary distance (levels). (Transformer is not illustrated in the drawings). Within the transformer, the voltage is increased before the power is sent to the surface and power lines carry electricity to homes and businesses.

In the boiler, there is a safety check valve to release steam, if needed, in an emergency such as if control valves malfunction.

All segments can be welded or bolted on the surface during the lowering process.

All carrying cables, supply tubes, coolant tubes, control cables, a lubrication line, and electric cables are at appropriate lengths segmented to be easily attached and reattached.

After the well is drilled the portable or permanent tower can be built with a system of ratchets for lowering or lifting the assembly. The well can be filled with water and controlled buoyancy of the apparatus used for lifting and lowering the assembly.

The potential for geothermal energy is huge. The Earth has an inexhaustible supply of energy. The question was, until now, how to use that heat efficiently. With the invention presented here, SELF-CONTAINED IN-GROUND GEO-THERMAL GENERATOR (SCI-GGG) and HEAT EXCHANGER (SCI-GHE) with IN-LINE PUMP used in SEVERAL ALTERNATIVE APPLICATIONS including the RESTORATION OF THE SALTON SEA we will be able to tap the true potential of the enormous heat resources of the earth's crust and other heat sources.

One embodiment of this invention is a method to provide affordable and clean electric energy continuously produced from a geothermal renewable source—not limited to the "shallow" hydrothermal reservoirs. Besides common use in homes and businesses, it can be used for the production of hydrogen which can be used as a clean source of energy in many applications including the auto industry, and eventually replaced depleting, expensive, and polluting oil, coal and other fossil fuels which are used to create electricity. Nuclear power plants with very toxic waste material can also be replaced.

Another embodiment of the SCI-GHE system is to be used in reverse order to heat (warm) the ground adjacent to solidified oil formations in order to liquefy it for easier extraction to the ground surface.

A further embodiment of this invention is to provide a geothermal generator assembled in a vertical position, containing a boiler with water, turbines, an electric generator, condenser with a system of pipes returning feed water back to the boiler.

A still further embodiment of this invention is to provide a gearbox (converter) located between turbines and generator to neutralize momentum produced by spinning turbines, by changing the direction of the rotor of the generator to spin in the opposite direction of the main turbines.

Another embodiment of this invention is that the cooling system is an independent closed-loop tube that has at least two heat exchangers; the first one down in the well and the second one on the ground surface. The first one absorbs heat from the condenser by circulating cool water through the peripheral chamber of the condenser, formed between external and internal cylinders, and then transfers the heat up on the ground surface where heat is exchanged through the second heat exchanger, which is a coiled pipe coupled into the binary power unit, and then cooled water returned to the condenser again.

A further embodiment of this invention is that an independent close-loop tube has at least one pump to circulate water through the system, and to reduce hydrostatic pressure.

A further embodiment of this invention is that an alternative independent close loop tube system that has at least two heat exchangers; the first one which is a coiled pipe (tube) down in the well and second one which is also a coiled pipe (tube) on the ground surface. The first one absorbs heat from surrounding hot rocks by circulating cool water through heat exchanger (coiled pipe) and then transfers the heat up on ground surface through thermally insulated pipe where heat is exchanged through second heat exchanger (also a coiled pipe).

A further embodiment of this invention is that independent close loop tube has at least one pump to circulate water through the system, and to reduce hydrostatic pressure. (The ratio of the speed and pressure inside the closed loop line are constant. P (pressure)×V (speed)=constant. More speed=less pressure.)

A further embodiment of this invention is that each of those two close loop systems, whether the cooling system for a self-contained in-ground geothermal generator or an independent in-ground heat exchanger provides a slim cylindrical design which is suitable to functions in a single well with a set of powerful in-line pumps to provide substantial fluid flow.

Another embodiment of this invention is that the necessary level of water inside the boiler of the self-contained in-ground geothermal generator can be supplied and regulated from control room on ground surface.

A further embodiment of this invention is that condenser which surrounds and cools the whole unit, except the boiler, is insulated from the external heat of hot rocks with a layer of heat resistant insulation.

A further embodiment of this invention is that electricity is produced by a generator at the in-ground unit and transmitted to the ground surface by electric cable.

A further embodiment of this invention is that method of producing electricity with the self-contained in-ground geothermal generator can be applied on other planets and moons with geothermal potential and where sunlight is insufficient.

It is also an embodiment of this invention that self-contained heat exchanger as an universal portable exchange system can be used in many applications for harnessing heat from sources such as lava and flare stacks which otherwise is dissipating in air.

It is also an embodiment of this invention that self-contained heat exchanger can be used for the desalinization of large body of salty water.

A further embodiment of this invention is that In-Line Pump used for fluid circulation in closed loop systems can be also used in cross-country pipelines as generator in downhill route and as electromotor in uphill routes.

A further embodiment of this invention is a proposal for restoration of the Salton Sea (a terminal lake in California)

which consist of an architectural plan which incorporates several technologies modified to accommodate local conditions of the Salton Sea area into self-sustain functional organism; and transform the situation of liability into situation of assets.

A further embodiment of this invention is a proposal for restoration of the Salton Sea which include several options based on the same concept: 1) Dividing Lake into three sections; 2) Importing seawater from the Ocean; and 3) Harnessing prevalent geothermal energy.

It is also an embodiment of this invention that power plant is based on array of multi power units of medium or smaller sizes which can extract heat from underground heat source more efficiently and with less limitations than in conventional systems where one big power unit is used and supplied with fluids from natural or manmade hydrothermal reservoir.

Another embodiment of this invention is that high salinity brine from bottom of the lake and bottom of the filtration ponds and bottom of the boilers of the power units stored into wellbore to function as medium for heat conduction from hot rocks to first heat exchanger of the heat exchange system and later used as a source for extraction of lithium.

Another embodiment of this invention is that gravity is used to separate higher salinity water and extract it from bottom of body of water.

Another embodiment of this invention is that higher salinity water is used in boilers of Power plants.

Another embodiment of this invention is that heat extracted from geothermal sources by heat exchange system is used for generation of electricity.

Another embodiment of this invention is that heat from geothermal sources is used for desalinization of the salty water.

Another embodiment of this invention is that heat from geothermal sources is used to produce distilled water.

Another embodiment of this invention is that heat from geothermal sources is used for the production of high salinity brine which is used as a source for the extraction of lithium and other elements and minerals.

Another embodiment of this invention is that pipeline uphill suction has multi branches with a slower fluid speed in it to accommodate the same volume of fluid in downhill pipeline section having higher fluid speed.

Another embodiment of this invention is that the intake section of the pipeline has multi branches to accommodate the necessary fluid volume of the pipeline with slower suction speed for the safety of marine life.

Another embodiment of this invention is that outline (Delta) section of the pipeline has multi branches with a gradually smaller diameter and corresponding in-line-generators to maximize the extraction of energy with gradually lesser fluid speed and to accommodate the necessary fluid volume of the pipeline.

Another embodiment of this invention is that the same pumping system for importing seawater can be used, with minor adjustments, for exporting high salinity water (concentrated salty water at the bottom of the lake) from the Salton Sea into the Ocean by switching the direction of rotation of the In-Line-Pump/Generator.

Another embodiment of this invention is that the In-Line Pump can be used for cross-country pipelines.

Another embodiment of this invention is that the In-Line Pump can be used in different applications for the propulsion of amphibian airplanes, ships, and other watercraft including surfboards.

Another embodiment of this invention is that the pipeline is used as a foundation for solar panels which are repetitive units of the "pipeline solar power plant".

Another embodiment of this invention is that Thermo-Optic Solar System (TOSS) is compact encapsulating the heat exchanger and can be produced in the shape of conventional PV solar panels, dishes, or any other convenient shape.

Another embodiment of this invention is a proposal for the restoration of the Salton Sea-a terminal lake in California-which has an architectural plan that incorporates several cooperating technologies into a self-sustaining functional and profitable project.

Another embodiment of this invention is that the presented irrigation system for nearby farmland provides the conditions for building several recreational parks with relatively smaller circulating lakes and nearby fish farming facilities using water from nearby canals before entering the main irrigation pipelines.

Another embodiment of this invention is that power plants produce salty concentrated brine as a free by-product from the salty water of the Lake, during the desalinization of the Lake and generation of electricity, that can be used for extraction of Lithium and hydrogen in nearby the mineral extraction facility in addition to extraction of Lithium from the brine of known geothermal reservoirs.

Another embodiment of this invention is that the presented concept connects two main highways which are positioned on each side of the lake (State Highway 86 on the west side of the lake and State Highway 111 on the east side of the lake) by using dikes for dividing the lake into three sections as at least two-line roads with several piers and restaurants alongside.

BRIEF DESCRIPTION OF THE INVENTION

The presented proposal for the restoration of the Salton Sea includes an architectural plan which harmoniously incorporates several patented technologies into a self-sustaining organism.

In the presented proposal are included several options based on the same concept: 1) Dividing the lake into three sections; 2) Importing seawater from the Ocean; and 3) Harnessing prevalent geothermal and solar energy.

The presented Proposal for the Restoration of the Salton Sea consists of several phases which can be built at the same time and be completed in a period of 4-5 years. Proposal includes: Dividing lake into three sections (big central section and two smaller northern and southern sections); Importing seawater from the Ocean into central section of the lake; Diverting flow of New River and Alamo Rivers back to Mexico; Implementing pipeline and sprinkler system for farmland to conserve limited source of water from Colorado River (canal); Implementing new system for harnessing solar energy in combination with pipeline system; Implementing new system for harnessing prevalent geothermal energy which is accessible in the Salton Sea area by using completely closed loop system for generation of electricity, desalinization of the lake and production of the potable water as a free byproduct; Providing source for extraction of lithium; Providing vast wildlife sanctuary; Providing condition for tourism (exclusive real-estate, beaches, resorts, hotels, etc.).

Presented proposal transforms the situation of the Salton Sea from the liability which would exceed $70 billion (environmental disaster-toxic dust storms, health issues, and economic fold)—to the tremendous assets (clean environment and hundreds billion dollars in revenue)—costing only about $15 billion.

Overview of the Salton Sea Situation:

a) The Salton Sea is California's largest lake and is presently 50% saltier than the Ocean. The Salton Sea is a "terminal lake," meaning that it has no outlets. Water flows into it from several limited sources, but the only way water leaves the sea is by evaporation.

b) The lake is shrinking exposing the lakebed and precipitating higher salinity levels and environmental issues as well as a serious threat to its multi-billion-dollar tourist trade.

c) Under the terms of the Quantification Settlement Agreement (QSA) the lake's decline is set to accelerate starting in 2018. About the ⅓ of inflow water from the canal will be diverted to San Diego and Coachella Valley.

d) Runoff water from nearby agricultural fields which contains fertilizers, pesticides and other pollutants from Mexicali contaminates the Salton Sea and makes it an undesirable tourist destination, especially for beachgoers.

e) The lake is 35 miles long, 15 miles wide, and is located south of Palm Springs in a depression of 270 feet with the original water level settled on 220 feet below sea level (1950s and 60s).

f) The Earth's crust at the southern part of the Salton Sea is relatively thin. The temperature in the Salton Sea Geothermal Field can reach 680° F. (360° C.) less than a mile below the surface.

g) There have been many studies and complaints about the consequences for the nearby community if a solution for the Salton Sea is not found.

h) There have been several proposals involving importing ocean water, but they failed to address the salt balance and feasibility of the project. It was wishful thinking-canals, tunnels, pipelines without addressing the practicality of its implementation and with difficulties attracting investors for a such project that cannot generate revenue to pay off initial investment.

Summary of the Proposal for the Restoration of the Salton Sea:

The proposal for the restoration of the Salton Sea consists of six phases:

Phase I—Connecting the Salton Sea with the Ocean with a pipeline 48″ (5 pipelines on the uphill route and 1 pipeline on the downhill route) for importing seawater into the central section of the Lake (several options for pipeline corridors are provided);

Phase II—Dividing the lake into three sections by building two main dikes (two-lane roads) strategically positioned at the edge of the farmland-One in the northern and one in the southern part of the Salton Sea—to prevent pollution of the central section of the Lake.

Phase III—Building irrigation pipeline system for farmlands located Southern and Northern of the Lake with control valves for controlling the inflow of the water into the South Lake and North Lake.

Phase IV—Building one power plant using the "Scientific Geothermal Technology" using a completely closed loop heat exchange system (SCI-GHE system) at one of the selected sector.

Phase V—Building several more power plants using (SCI-GHE) system-one in each additional selected sector; and Phase VI—A continuing buildup of many additional power plants using (SCI-GHE) system at each selected sector;

The presented proposal for the restoration of the Salton Sea includes an architectural plan which harmoniously incorporates several patented technologies into a self-sustaining and profitable organism (project).

The Key Elements of the Presented Proposal are:

1) Dividing the Salton Sea into three sections with two main dikes (two-lane roads) at strategic locations at the edge of farmland to prevent pollution of the larger central section of the lake which will provide the condition for tourism and wildlife sanctuary in smaller northern and southern sections.

2) Negotiating treaty with Mexico's officials about diverting the flow of the New River and Alamo River back in Mexico and getting corridor for importing seawater from the Gulf of California.

3) Importing seawater from the Ocean in the central section of the lake by using In-line-Pump/Generator system which generates electricity in downhill routes which can be used as a supplement to the energy needed for horizontal and uphill routes;

4) Diverting flow of New River and Alamo Rivers back to Mexico for treating (including sewer from Mexicali) and using it for refilling Laguna Salada or for farmland; (Tips for negotiations with Mexico's officials are included—we have leverage because Mexico needs that water)

5) Optionally, we can treat water from New River and Alamo River and use it for farmland;

6) Implementing pipeline and sprinkler system for farmland to conserve limited source of water from Colorado River (canals);

7) Generation of the electricity by harnessing prevalent geothermal sources with a new Scientific Geothermal Technology using completely closed-loop system that is not limited to a known geothermal reservoir;

8) Generation of the electricity by using the pipeline as a foundation for solar panels assembly and sharing the pipeline's "Right of Way".

9) Desalinization of the lake and production of the potable water as a free byproduct;

10) Providing a source for extraction of lithium;

11) Providing vast wildlife sanctuary; and

12) Providing condition for tourism (exclusive real-estate, beaches, resorts, hotels, etc.).

The high salinity water has higher density and tends to accumulate at the bottom of the lake and can be used for operation of a new design of the geothermal power plants. During the production of electricity process distilled water is produced as a byproduct. Also, additional salty water is produced in a boiler as a byproduct and frequently injected into a wellbore to be used as a medium for heat conduction from hot rocks to the first heat exchanger inside the wellbore. Periodically, the brine in the wellbore especially at the bottom will reach supersaturated state and needs to be excavated through excavation line to the processing building and used as an inexpensive source for the extraction of the lithium. The injection well of nearby conventional geothermal power plants can be used for depositing waste material from new power plant into depleting geothermal reservoir. If needed, the waste material from new power plant can be diluted with water from bottom of the lake before being injected into depleting geothermal reservoirs.

Alternatively, after extraction of lithium and other minerals the waste material can be deposited in selected and prepared pits throughout the desert and covered with dirt as it is done at properly managed trash dumping sites.

TECHNOLOGY SUMMARY

There is an infinite source of energy under our feet, whether it is a few miles underground or on the ground surface in locations such as Hawaii. The question was, until now, how to harness it expediently and efficiently without polluting the environment. The presented methodology capitalizes on our planet's natural internal heat. The essence of "Scientific Geothermal Technology" is transferring heat from heat sources to the power units with completely closed-loop system.

The "Self-Contained In-Ground Geothermal Generator" (SCI-GGG) system uses several completely closed loop systems and generates electricity down at the heat source and transmits it up to the ground level by means of electrical cables.

The SCI-GGG apparatus consists of: a boiler; a turbine; a converter; a generator; a condenser distributor; and a condenser that is arranged to function in confined spaces such as in a well bore. The SCI-GGGG absorbs heat from the source of heat (hot rocks and/or geothermal reservoir) and generates electricity at the heat source which is transmitted by cable to the ground surface to electrical grids for use in houses and industry.

In the process of cooling the engine compartments with a separate closed loop system which is the "Self-Contained In-Ground Heat Exchanger" (SCI-GHE system) additional electricity is generated on the ground surface.

The "Self-Contained In-Ground Heat Exchanger" (SCI-GHE) system is an integral part of the SCI-GGG system and can function independently. The system consists of a closed loop thermally insulated line with 2 coiled pipes (heat exchangers) and a few in-line-pumps. The first heat exchanger is lowered to the bottom of the wellbore at the heat source and the second heat exchanger is coupled into a binary power unit on the ground surface which produces electricity by using the Organic Rankine Cycle (ORC). Electricity is then transmitted through an electric grid.

Although the (SCI-GHES) system has a higher production capacity for this project at this early-stage priority is given to the SCI-GHE system because of its less expensive production and easier maintenance.

The presented proposal also includes a method for harnessing geothermal energy for generation of electricity by using complete closed-loop heat exchange systems combined with onboard drilling apparatus.

The In-Line-Pump is an integral part of both SCI-GGG and SCI-GHE systems, circulating fluids through closed-loop systems.

The In-Line-Pump is an electromotor cylindrical shape and is inserted as a repetitive segment in the pipeline. It has a hollow cylinder as a shaft of the rotor with continuous spiral blades inside the hollow shaft. It yields a maximum flow rate with a limited diameter.

Alternatively, the In-Line-Pump can be inserted as a repetitive segment of a riser pipe for pumping fluids up to the ground surface from reservoirs in which geo-pressure is low. Also, the In-Line-Pump can be used as a repetitive segment in cross-country pipelines for transporting oil, water, etc. In the downhill route, it functions as a generator and generates electricity, which can be used to supplement energy for the in-line-pumps in horizontal and uphill routes.

The in-line-pump/Generator can be used as a "hydro jet propulsion electric motor with continuous spiral blades" to be used as an attached propulsion element to amphibian airplanes, ships, and other watercraft. Ships are propelled forward by an engine with a propeller. A propeller has blades attached to a shaft that is rotated by a piston engine, turbines or electric motor. There are ships with electric motors and propellers that can steer by rotating propellers with electro-motor assembly around a vertical axis.

Methodology for Drilling Faster, Deeper, and Wider Wellbore

Contemporary drilling system has limitations on how wide and deep wellbore can be drilled. Mud is injected through the pipe and through several orifices at the drill bit. Mud circulates up between pipe and wall of the wellbore providing a necessary stream for cutting to be excavated. By increasing the size of the drill bit (wellbore) and/or by increasing the depth of the wellbore it requires a substantial increase of pressure inside the pipe to form a corresponding stream between the pipe and the wall of the wellbore for the excavation of cuttings.

The presented system for drilling faster, deeper and wider wellbore consists of a motorized drill head; separate excavation line; separate fluid delivery line; and separate closed loop cooling line engaged with Binary Power Unit on the ground surface.

The Binary Power Unit consists of a Boiler; Turbine/Pistons; a Condenser; and a Generator.

The boiler is coupled with the coil (Heat Exchanger) from a separate closed loop engine cooling line circulating fluid from motorized drill head. A generator of the binary unit generates electricity to supplement power for the motorized drill head. The presented drilling apparatus has retractable bits on the motorized drill head. Also, the casing of the wellbore can be built during the drilling process.

The diameter of the excavation line and rate of flow of mud and cuttings through it and the diameter of the fluid delivery line and rate of fluid flow through it are in balance requiring only a limited fluid column at the bottom of the wellbore.

A fluid column may exist through the whole wellbore to sustain the wellbore during the drilling process, but not for excavation purposes. The excavation process continues regardless of the diameter of the drill head (wellbore); therefore, this method eliminates well-known drilling limitations relative to the depth and diameter of the wellbore.

The Photo-Voltaic (PV) Panel Assembly System for Pipelines:

Here the Photo-Voltaic (PV) panel assembly system uses the pipeline as a foundation to assemble on and to share proportionally expenses for the "Right of Way" and the profit.

The Photo-Voltaic (PV) panel assembly uses conventional PV panels with a special fastening device for the assembly to be attached to the segments of the pipeline. It also has a sun-tracking mechanism.

Although PV solar panels are not very efficient energy suppliers the pipeline provides a substantial surface that otherwise would need to be selected, leased, or purchased.

The Thermo-Solar System (TSS):

The Thermo-Solar System (TSS) presented here uses the pipeline as a foundation and shares proportionally expenses for the "Right of Way" and the profit.

The Thermo-Optical Solar System (TOSS):

The Thermo-Optical Solar System (TOSS) presented here uses the pipeline as a foundation and to share proportionally expenses for the "Right of Way" and the profit-consists of a panel or dish with the special configuration; evaporator with working fluid; power unit and condenser. The dish has a parabolic cavity with a reflective surface to reflect sunrays into the focus of the parabolic cavity where part of the evaporator is positioned. This system also uses lenses to focus sunrays in an additional part of the evaporator. The Synthetic oil circulates through the heat exchanger which is connected to the evaporator in the power unit which generates electricity. In this presentation, the Thermo-Optical solar system is engaged with the pipeline system by sharing the "right of way" of the pipeline and using the colder temperature of the pipeline for cooling the condensers.

The presented Thermo-Optic Solar System is a compact encapsulating row of mirrors and heat exchangers, that can be produced in the shape of conventional PV solar panels, dishes, or any other convenient shape which makes it very efficient way of harnessing solar energy. The presented thermo-optical-solar panels and/or thermo-solar panels can be installed on facades of the building's so-called "curtain facades" to generate electricity.

The presented "thermo-optical solar system" has not been tested yet, but it is realistic to expect that it can generate multi-fold electricity per unit surface than the photovoltaic system because power density is substantially higher.

Desalinization System

Desalinization system consists of the "Self-Contained In-Ground Heat Exchanger" (SCI-GHE) system; distiller/evaporator; and a desalination building. The first heat exchanger the coil of the SCI-GHE) system is placed at the source of heat and the second heat exchanger coil is coupled into distiller for heating it, and wherein the distiller (boiler) is filled with salty water and used steam for operating a power unit (turbine and/or pistons) for generation of electricity.

Exhausted steam is condensed and collected as distilled water. The remaining salty water from the distiller is transported through a piping system into a mineral extraction facility (desalination building) and into containers for heating and evaporation. Containers with salty water are heated with a piping system from the first closed-loop system of the SCI-GHE system and partially from heat from the condenser. The desalination building is a closed structure with a greenhouse effect and comprises containers with salty water and its delivery system; a heating system positioned under containers; a condenser positioned on the upper portion of the building with its cooling system; a collection of freshwater and its distribution out of the building; and collection and distribution of collected salt. The desalination building can be used for the extraction of minerals and lithium.

Transformational Merit:

Regarding Geothermal Power Plants:

Presently, wells are drilled into geothermal reservoirs to bring the hot water to the surface. At geothermal power plants, this hot water is piped to the surface. Then, after removing silica steam is used to spin turbines creating mechanical energy. The shaft from the turbines to the generator converts mechanical energy into electrical energy. The used geothermal water is then returned down through an injection well into the geothermal reservoir to be reheated, to maintain pressure, and sustain the reservoir.

There are three kinds of geothermal power plants. The kind that is built depends on the temperatures and pressures of a reservoir.

There is also an experimental Enhanced Geothermal System. In order to function properly Enhanced Geothermal Systems (EGS) needs three crucial factors: Horizontal rock formation, Permeability of the rocks, Heat and a substantial amount of Water. Those are serious limitations. The EGS is based on exploring certain locations (nests) and injecting water in those locations until the heat from hot rocks is depleted (about 4-5 years) and then moving to another (preferably nearby) location and then repeating the process and after 3-5 years returning to the previous location which would by that time replenish the heat generated from radioactive decay and internal heat. I call it a "horizontal approach" since geothermal water between the injection well and the production well travels typically horizontally.

The presented proposal implements "Scientific Geothermal Technology". Embodiments of the system of the present invention promote a progressive "vertical approach" to reach and utilize heat from hot rocks or another heated surrounding environment rather than the horizontal approach used in Enhanced Geothermal System ("EGS").

Because the "Self-Contained In-Ground Geothermal Generator" (SCI-GGG system) and "Self-Contained In-Ground Heat Exchanger" (SCI-GHE system) use a completely closed loop system, the permeability of the rocks, horizontal rock formations and substantial amount of underground water is of lesser importance because the systems operate in a "vertical approach" and the heat exchanging surface of the wellbore can be increased by drilling a deeper wellbore. When cooling of surrounding rocks eventually occurs, it would only be necessary to circulate the geothermal fluid in a wellbore around the first heat exchanger with an in-line pump secured below the first heat exchanger. Having an additional dept of the wellbore, let's say a half mile below the heat exchanger, with a diameter of 5'-6' the heat exchanging surface of the wellbore will be sufficient and heat flux should not be an issue especially if a temperature of the surrounding rocks is over 200° C.

If cooling of the rocks becomes an issue again, we can turn on the drilling apparatus, which is a permanent part of the heat exchange apparatus, and drill an additional distance, let's say, a few hundred yards, to reach hot rocks and lower the apparatus at the new depth. The extended depth will result in hotter rock formations and higher heat flux. Eventually, a point will be reached where heat extraction from rocks and heat replenishment to the rocks from the heat generated by radioactive decay and internal heat will be in balance (equilibrium).

The power plant comprising an array of wellbores having an extendable length for periodically extending the length of each wellbore; multiple power units corresponding to each wellbore, wherein each power unit includes a heat exchanger, each heat exchanger located within one wellbore of the array of wellbores, wherein the power generated corresponds to the number of wellbores and heat exchangers. The system of power units is a modular system capable of easy adjustments and reproduction.

Regarding Source for Lithium Production:

Lithium-a soft silver-white element that is the lightest metal known—is in high demand because is used to produce batteries, ceramic, aluminum, and alloys.

In Chile and Bolivia, the brines that are used to produce lithium (and other alkali metals) are supersaturated and sit on the surface in playas (salt pans). That makes them much more economical than saline groundwater. Bolivia has huge reserves that the government is planning to put into production in cooperation with foreign companies.

Seawater is a very poor source because the lithium concentration of seawater is about 0.2 parts per million (e.g., recovery of 1 ton of lithium requires treating 5 million tons of water).

There are several known methods to produce lithium. The SRI International company is tasked with a two-year mission by the Energy Department's Geothermal Technologies Office—focusing on advances in lithium recovery from geothermal brines using ion-imprinted polymers. To support this goal, SRI's immediate technical objective is to further advance the performance and efficiency of ion-imprinted polymers to achieve optimal lithium separation rates exceeding 95%.

Earlier tests have already demonstrated that the polymer-based approach can yield a retrievable rate of more than 90%, so the Energy Department is confident that SRI can further refine the process and push that rate over 95%. Curtsey to the article at the link below.

http://www.desertsun.com/story/tech/science/energy/2017/02/10/salton-sea-geothermal-plant-would-use-lithium-tech-caught-teslas-eye/97743092/.

The lithium can be produced from saturated brine, but the processes of reaching saturated brine require extra effort, processes, and energy which increases production cost.

Presented proposal for the restoration of the Salton Sea, which can be implemented with minor modifications in many similar locations worldwide provide an inexpensive and renewable source of the saturated brine for whichever process for extraction of lithium and other alkaline metals and minerals are going to be used.

In the presented proposal a distiller/boiler is filled with salty water from the nearby sources. After at least half of salty water from a boiler evaporates and after passing through turbine/pistons of the power unit (plant) as exhausted steam, it is condensed as distilled water. The remaining, now higher salinity brine, from the boiler, is deposited (stored) into the wellbore to provide a medium for heat conduction from hot rocks to the first heat exchanger in the wellbore. After a certain period at the bottom of the wellbore will be accumulated highly saturated brine which frequently needs to be pumped out through the excavation line to the processing building for extraction of lithium and other alkaline metals and minerals.

The processing building for extraction of lithium and other alkaline metals and minerals is designed so to induce evaporation and collect potable water without using additional electricity which also contributes to lower production cost.

Regarding Drilling System:

Contemporary drilling system has serious limitations on how wide and deep wellbore can be drilled. Mud is injected through the pipe and through several orifices at drill bit and circulates up between pipe and wall of the wellbore providing a necessary stream for cutting to be excavated. By increasing the size of the drill bit (wellbore) and/or by increasing the depth of the wellbore it requires a tremendous increase of pressure inside the pipe to form a corresponding stream up for cuttings to be excavated. Also, wellbore has gradually smaller diameter with each subsequent section because of the casing.

The presented proposal provides a solution for drilling deeper and wider wellbores with a constant diameter. The presented system for drilling faster, deeper and wider wellbore consist of motorized drill head; separate excavation line; separate fluid delivery line; and separate closed loop cooling line engaged with Binary Power Unit on the ground surface. The presented drilling apparatus has retractable bits on the motorized drill head. Also, the casing of the wellbore can be built during the drilling process. The apparatus consists of the elevator sliding over the drilling/excavation/heat exchange apparatus delivering and installing casing sheets and concrete.

Regarding Pumping Stations:

Contemporary pumping stations and hydroelectric power plants are expensive and have restrictions on location, capacity, and access.

The presented proposal provides a solution for an efficient water transfer.

Downhill routes of the pipeline can be built using several cascades with "split and join" hydropower plants to avoid buildup of extreme pressure in the pipeline especially in the last section of the final downhill route. By using several cascades with several "split and join" hydropower stations this system will harness kinetic energy and minimize losses. Also, the final downhill route of the pipeline has "delta" system hydropower plant to increase efficiency in harnessing kinetic energy by splitting the flow of water after primary in-line-generators. The main in-line-generators are the first generators after the cascade drop with less exposed spiral blades inside the shaft/pipe harnessing energy and allowing fluid flow to continue to the subsequent smaller pipes with slightly lesser speed. After exiting the main in-line-generators the flow is split into two subsequent smaller branches with smaller in-line-generators which have more exposed spiral blades inside shaft/pipe. By splitting fluid flow into smaller branches with lesser fluid flow speed in each subsequent branch, therefore, increasing efficiency of harnessing kinetic energy and at the same time allowing the same mass of water to leave pipeline and enter the lake as the amount of water entering pipeline from the Ocean. The presented solution increased efficiency of harnessing kinetic energy and minimizes loss of energy that would occur due to resistance in the pipeline during 80 miles long downhill route.

In order to accommodate the same amount of water exiting downhill pipeline the same amount of water needs to enter the pipeline at the uphill route. That is achieved by having several pipelines comprising the uphill route with lesser fluid speed through them.

Regarding Hydropower:

Conventional hydropower plants are limited to locations which require substantial reservoirs, expensive dams and power facility with turbines. Water exiting turbines of conventional hydropower plants have substantial mass and speed. Currently, that energy is not harnessed—it is lost.

Presented the In-Line-Pump/Generator system can harness kinetic energy, after water exit turbine of conventional hydropower plants.

Also, presented the In-Line-Pump/Generator system can harness kinetic energy at downhill aqueducts (pipeline) such as near Los Angeles which currently is not harnessed—that energy is lost.

Regarding Propulsion:

As an alternative application, the in-line-pump/Generator can be used as a "hydro jet propulsion electric motor with continuous spiral blades" to be used as an attached propulsion element to amphibian airplanes, ships, and other watercrafts. There are ships with electric motors and propellers that can steer the ship by rotating electromotor assembly around vertical axis.

Currently, ships are propelled forward by an engine with a propeller. A propeller has blades attached to a solid shaft which is rotated by a piston engine, or an electric motor. The shaft is an obstacle and reduces fluid flow.

Importing Seawater:

In several decades been mentioned several proposals by different authors about importing water from the Ocean but they all failed to address: the salinity balance of the lake-proposing expensive processes such as reverse osmosis and distillers which require a substantial amount of electricity, maintenance of filters, etc.; not addressing continuation of pollution from nearby farmland; practicality of the projects-implementing canals, tunnels, etc.; and extreme cost which could not be repaid.

The presented proposal is quite different—it incorporates in the final comprehensive design several patented technologies—that have not been accessible to the authors of previous proposals. The presented proposal has an architectural plan which harmoniously incorporates several patented technologies in a functional self-sustaining organism (project).

Alternatively—If forever reason construction of the pipeline for importing seawater into the Salton Sea is delayed, production of the Power Plants can continue with minor modifications in design. For example, the boiler of power units can operate with working fluids such as isobutene, isopentane, etc., instead of salty water from the lake. In such case, the power plant would produce electricity, but would not produce as a byproduct potable water and would not produce saturated brine for the production of lithium. Later on, as the pipeline is completed the power plants could be modified to use seawater as originally designed.

In the meantime, during the construction of the pipeline, as an alternative, the power plant could continue its operation using salty water from the bottom of the lake to generate electricity and saturated brine to produce lithium. Produced distilled water can be bottled or returned into the lake to sustain depleted lake and to reduce its salinity.

Since importing seawater from the Ocean, especially route over the mountain, require a substantial amount of electric power, alternatively, one or two power plants, out of many proposed, can be designated for production of electricity to be used for importing seawater from the Ocean. Cooperation of the pipeline system with the solar panel system will generate enough energy for operation of the pipeline and for selling rest to the grid.

Importing seawater from the Ocean is a fundamental phase of this comprehensive project on which other phases depend. There are several possible routes for importing seawater from the Ocean to the Salton Sea.

Solar Systems:

There are several solar systems used today. A thermal solar system using mirror panels focusing on the central pipeline. The parabolic mirrors are shaped like quarter-pipes. The sun shines onto the panels made of glass. The greatest source of mirror breakage is wind, with 3,000 mirrors typically replaced each year. This system requires a substantial footprint to operate on a commercial scale. Location needs to be selected, leased, or purchased.

There are solar power plants having rows of mirrors focused on the central tower where heat is transferred, and electricity generated by binary power unit. Those systems require a substantial footprint to operate on commercial scale. Location needs to be selected, leased, or purchased. Those conventional solar systems are large, cumbersome, and bulky. Those systems are open systems that require frequent maintenance.

There are solar power plants with photo voltaic PV panels with or without sun-tracking mechanisms which generate electricity directly from sunlight. The PV system is not a very efficient system for harnessing solar energy.

The Thermo-Optic Solar system is compact system encapsulating rows of lenses, mirrors and the heat exchangers and can be produced in shape of conventional PV solar panels, dish or any other convenient shape.

Presented the "Thermo-Optic Solar" system is compact and more efficient solar system. Also, it can use pipelines, existing or new, as its foundation so search for location, and lease or purchase of lend is not needed-only a deal with pipeline owner.

The foregoing and other features and advantages of the present invention will be apparent from the following more detailed description of the particular embodiments of the invention, as illustrated in the accompanying drawings.

BRIEF DESCRIPTION OF THE DRAWINGS

The invention will be described with reference to the figures of which:

FIG. 120 illustrates a cross-sectional view of one float of the amphibian plane taken along line 120'-120" of FIG. 118, in accordance with the invention.

FIG. 121 illustrates a cross-sectional view of one float of the amphibian plane taken along line 121'-121" of FIG. 118, in accordance with the invention.

FIG. 122 illustrates a side view of a ship using in-line pumps illustrated in FIG. 117 for propulsion and stirring in accordance with the invention.

FIG. 123 illustrates a rear view of a ship illustrated in FIG. 122 using in-line pumps for propulsion and stirring in accordance with the invention.

FIG. 124 illustrates a plain view of an electric surfboard incorporating a solar panel, battery pack, and two electric hydro jet motors (in-line-pumps).

FIG. 125 illustrates a cross-sectional side view of the electric surfboard illustrated in FIG. 124.

FIG. 126 illustrates a cross-sectional view of the electric surfboard taken along line 126-126' of FIG. 125, in accordance with the invention.

FIG. 127 illustrates a cross-sectional view of the electric surfboard taken along line 127-127' of FIG. 125, in accordance with the invention.

FIG. 128 illustrates a cross-sectional view of the electric surfboard taken along line 128-128' of FIG. 125, in accordance with the invention.

FIG. 129 illustrates a cross-sectional explosive (disassembled) view of the electric surfboard shown in FIGS. 124 and 125, in accordance with the invention.

FIG. 130 illustrates a cross-sectional explosive (disassembled) view of a sealing detail between lower and upper part of the electric surfboard shown in FIGS. 124 and 125.

FIG. 131 illustrates a cross-sectional view of a sealing detail between the lower and upper part of the electric surfboard shown in FIGS. 124 and 125.

Figure 124:
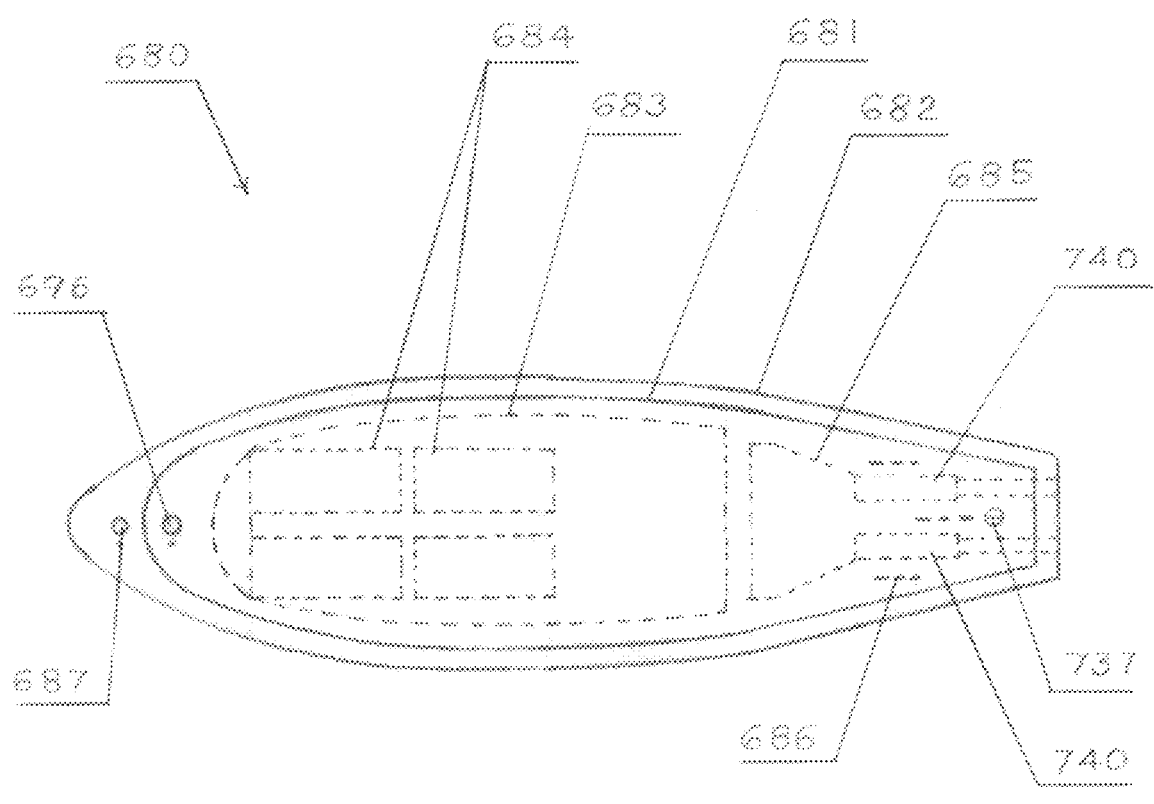
Figure 132:
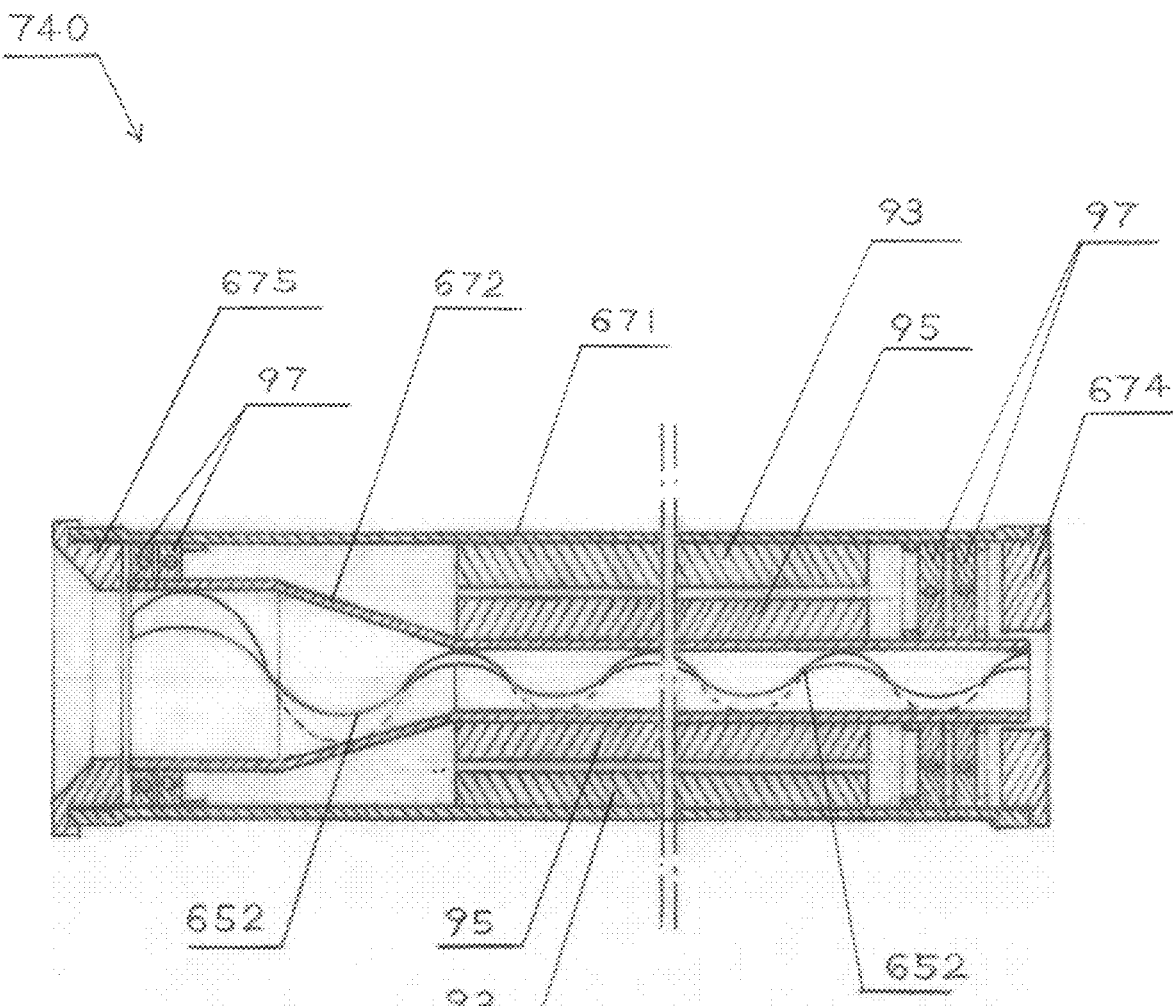

FIG. 132 illustrates a cross-sectional view of an electric in-line-pump (hydro jet motor) used in surfboard shown in FIG. 124, and can be used in many different applications in accordance with the invention.

Figure 122:
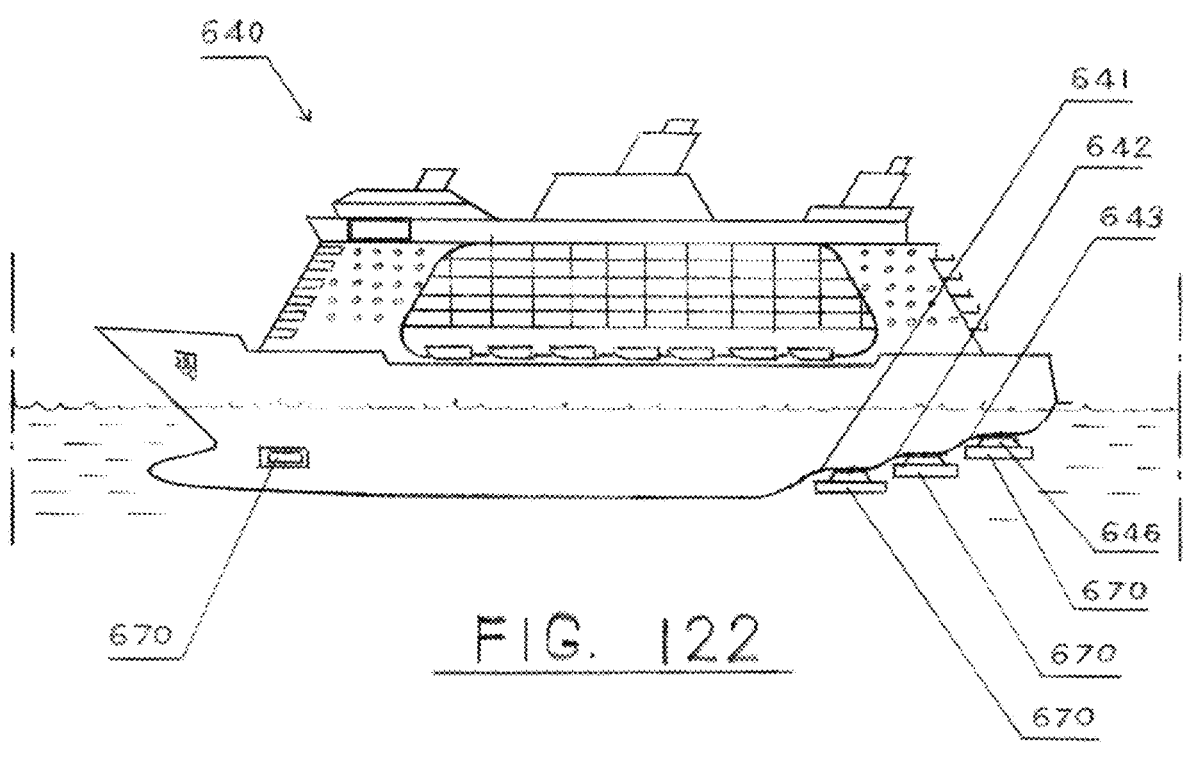
Figure 133:
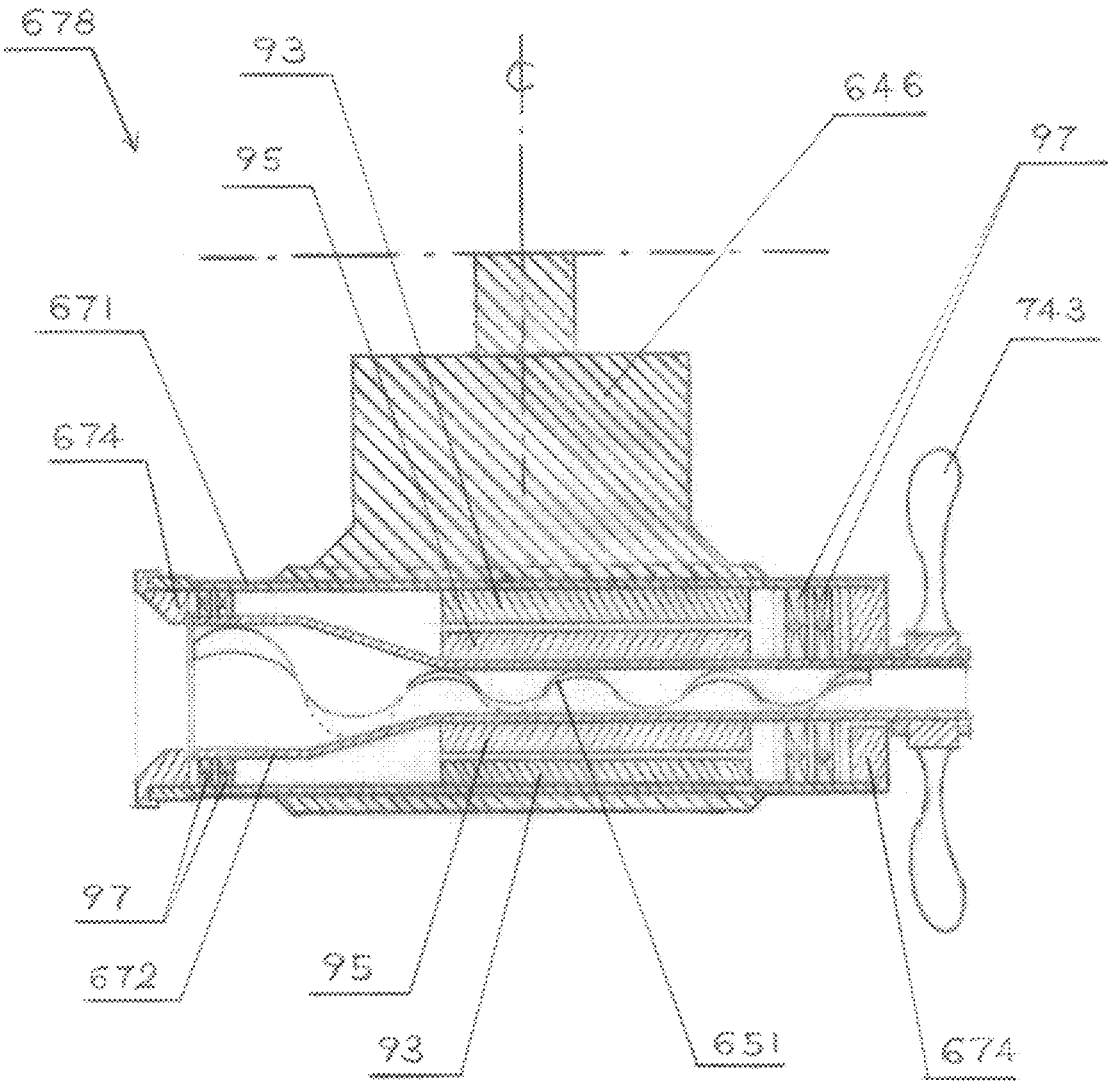

FIG. 133 illustrates a cross-sectional view of an alternative electric in-line-pump (hydro jet motor) and a propeller used in ship illustrated in FIG. 122 using for propulsion and stirring.

Figure 134:
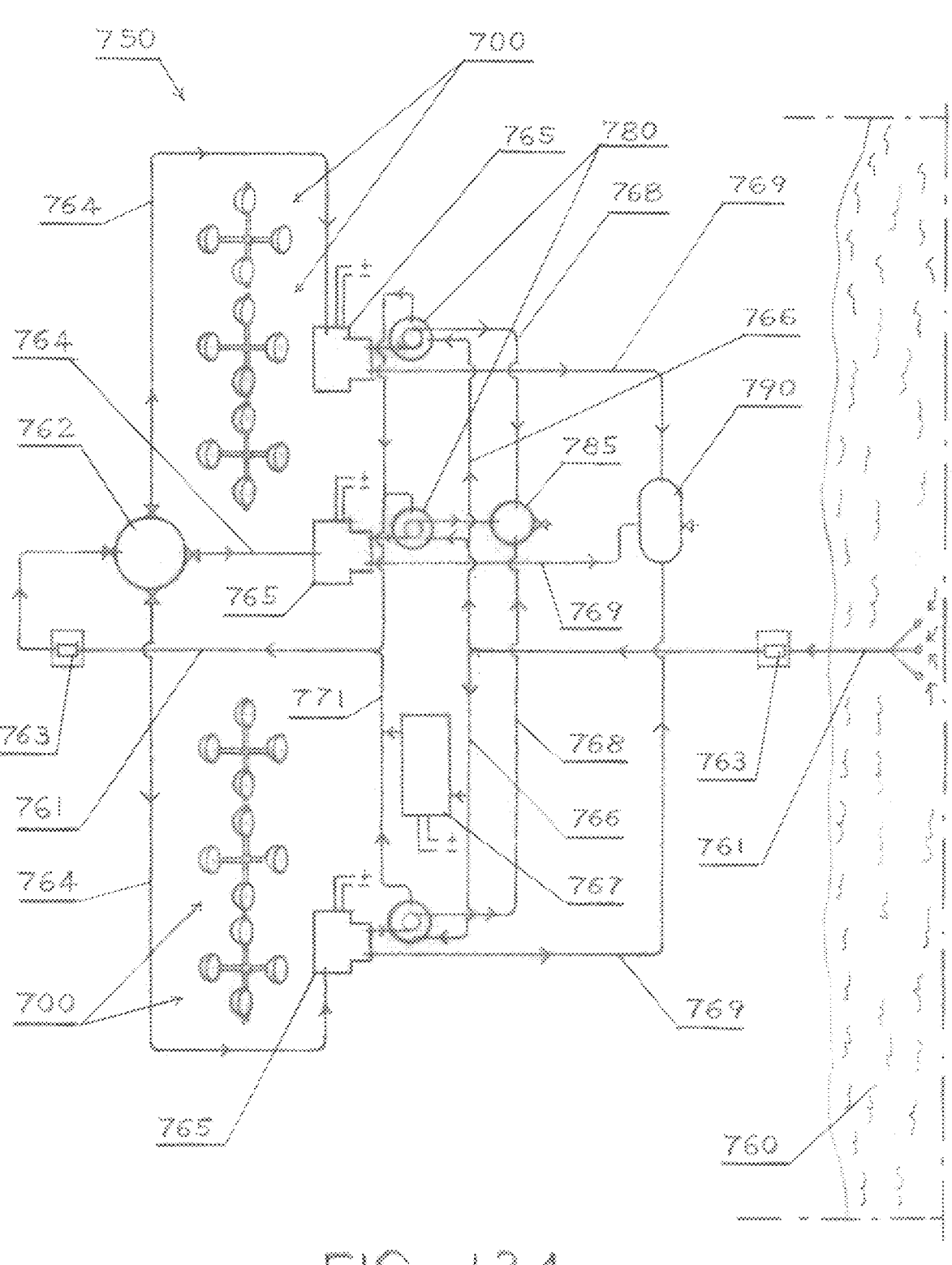

FIG. 134 illustrates a plain view of a Modular Segment of the System for harnessing Solar Energy.

Figure 135:
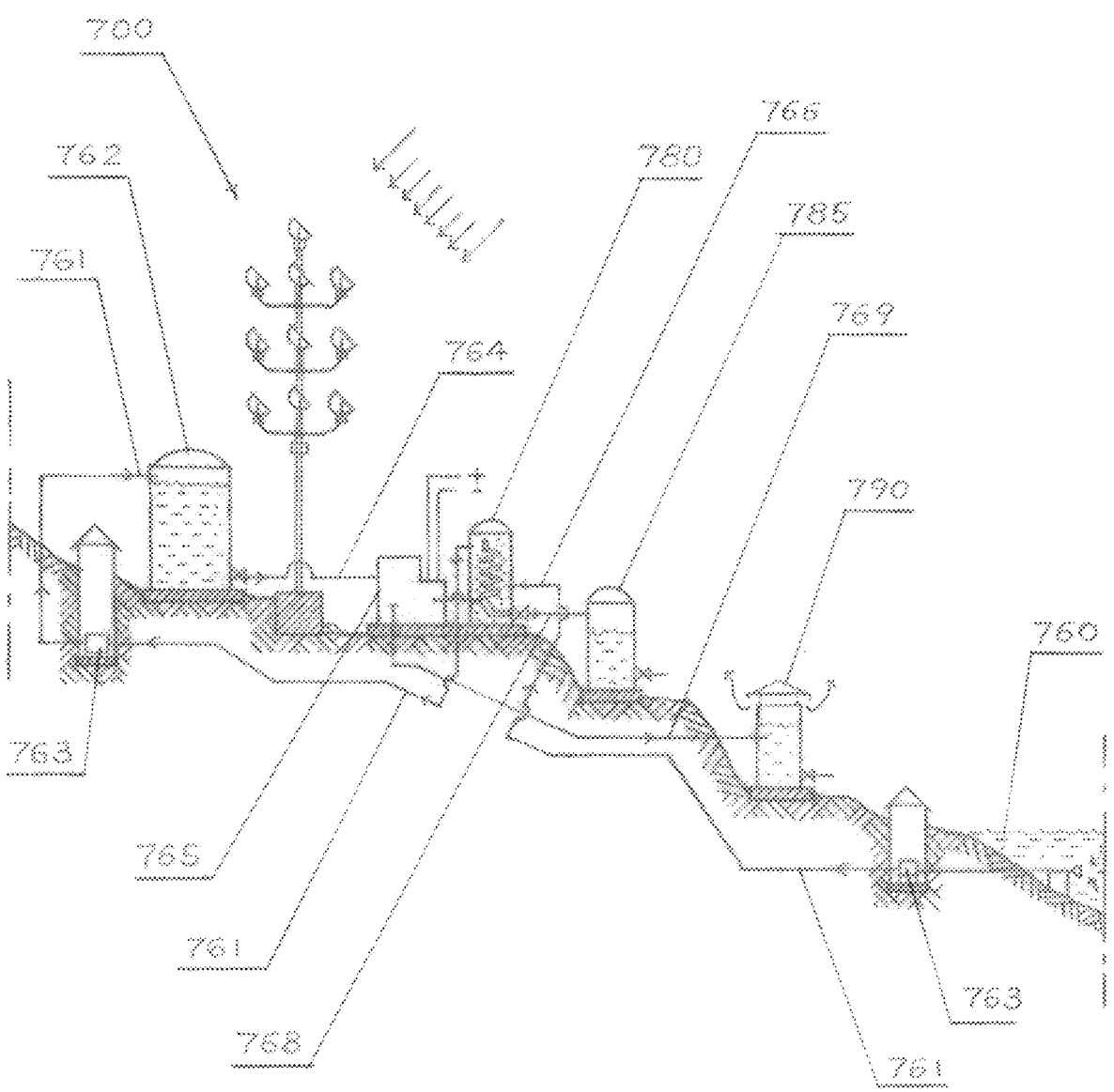

FIG. 135 illustrates a cross-sectional view of the Modular Segment of the System for harnessing Solar Energy shown in FIG. 134.

Figure 136:
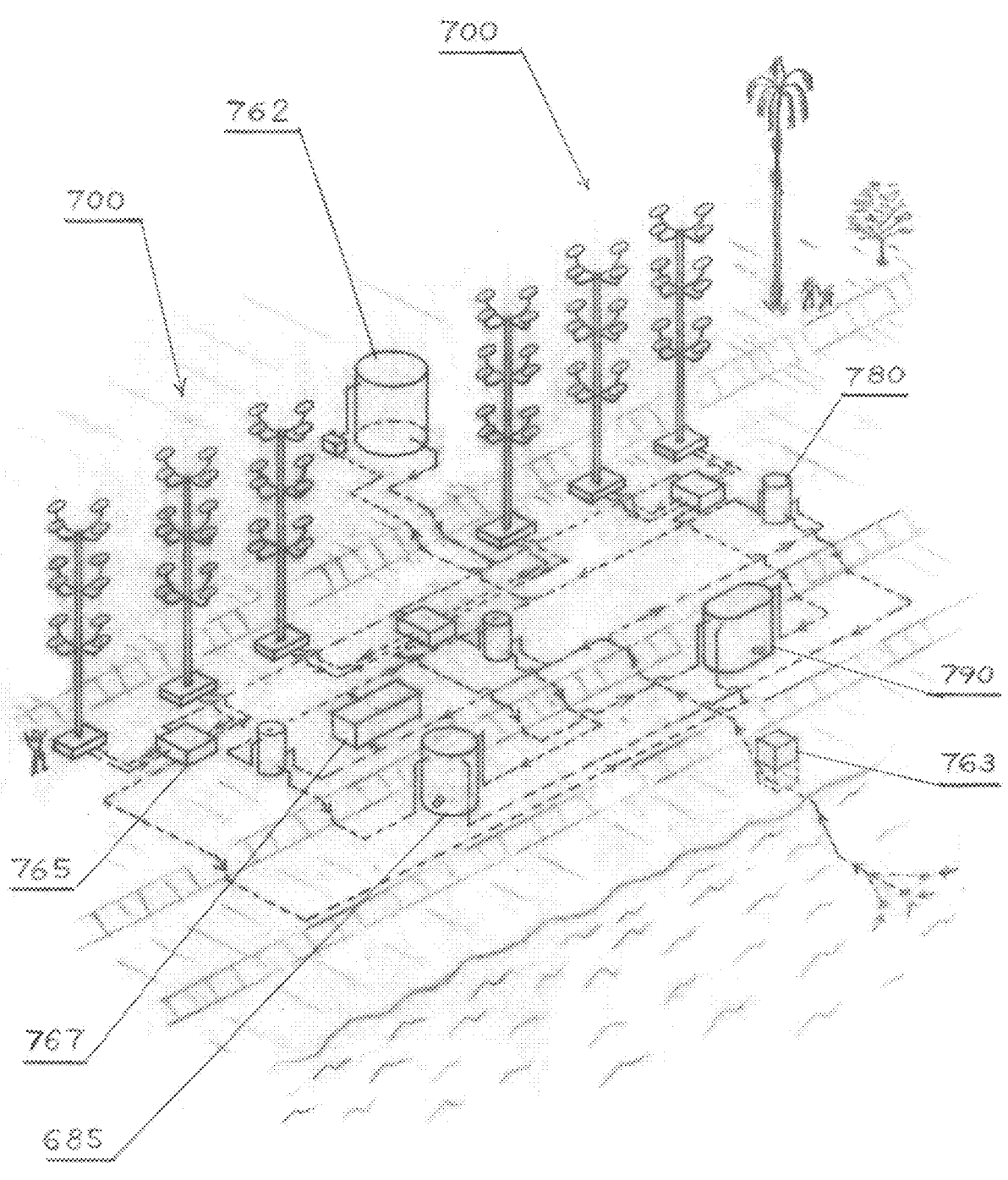

FIG. 136 illustrates a perspective view of the Modular Segment of the System for harnessing Solar Energy shown in FIGS. 134 and 135.

Figure 137:
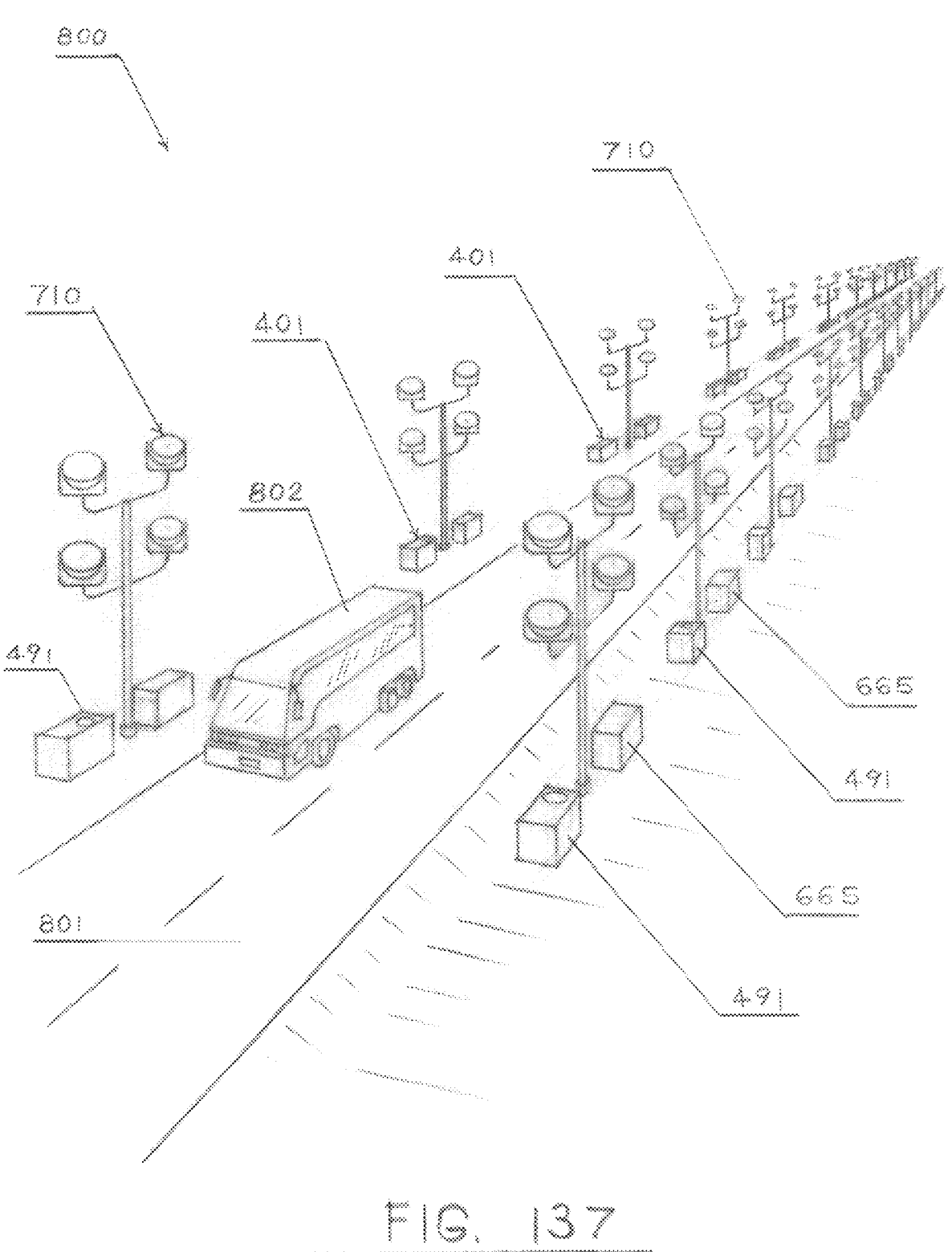

FIG. 137 illustrates a perspective view of the Modular Segment of the System for harnessing Solar Energy assembled alongside a road.

Figure 138:
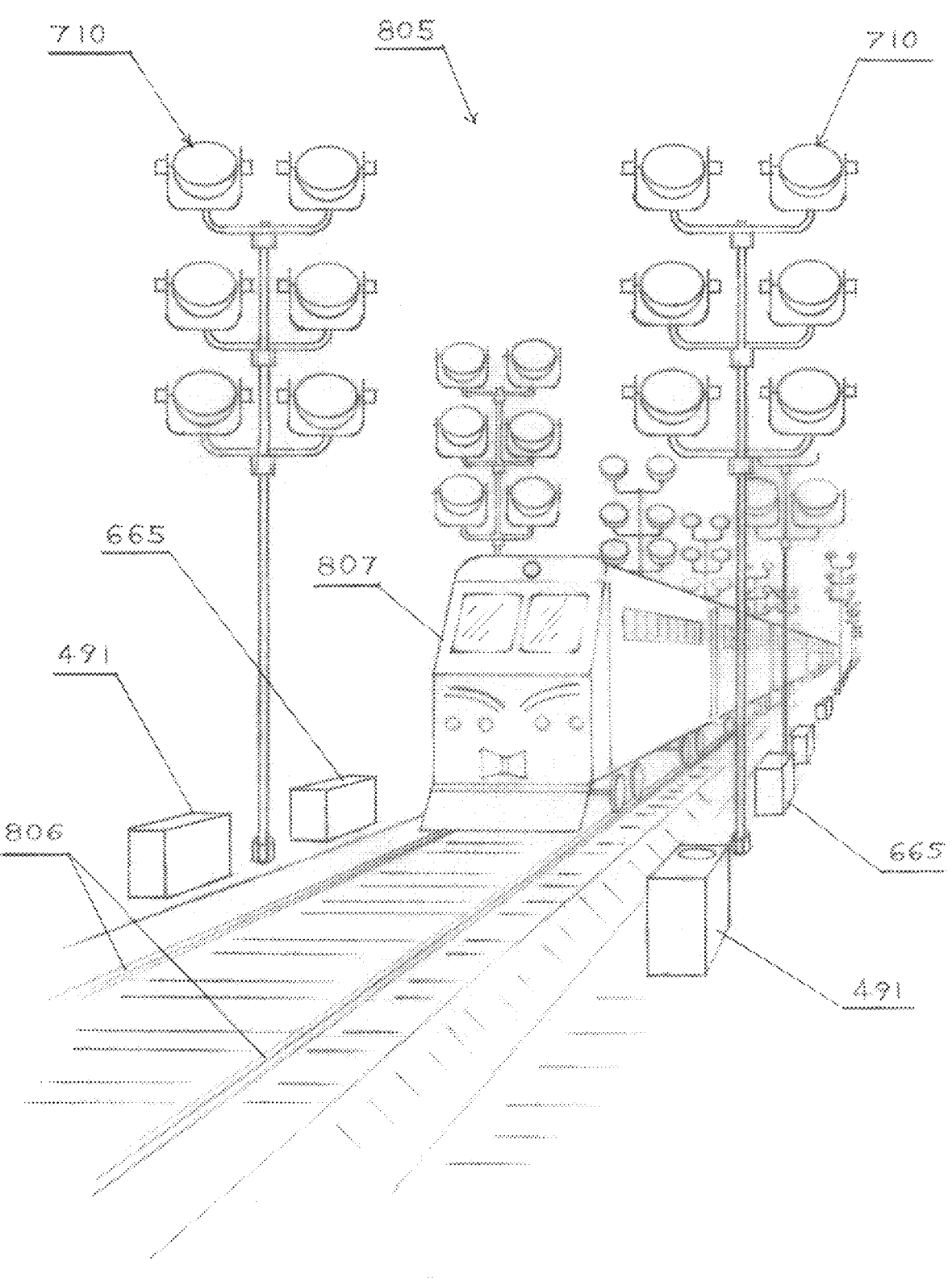

FIG. 138 illustrates a perspective view of the Modular Segment of the System for Harnessing Solar Energy assembled alongside a railroad.

Figure 139:
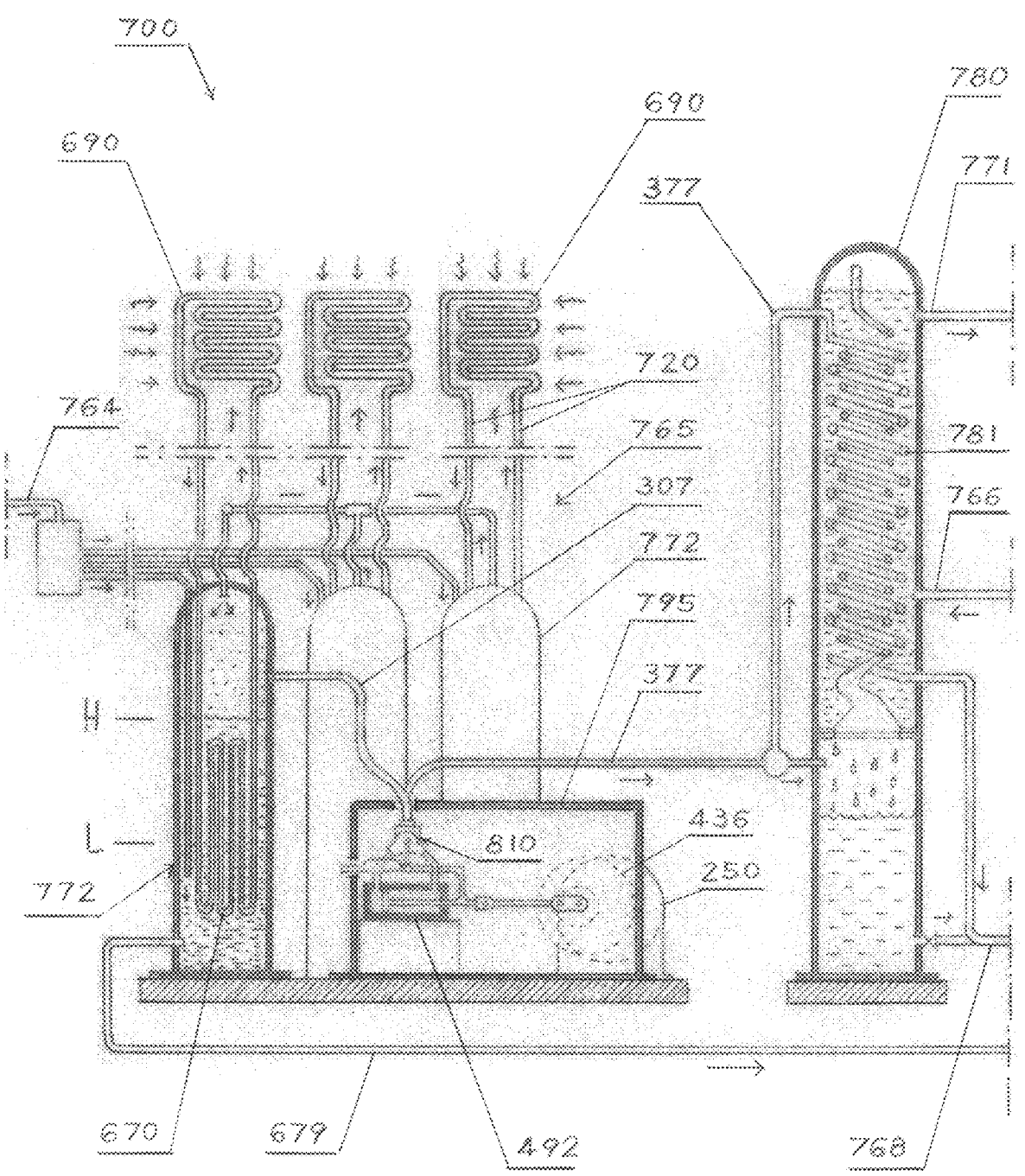

FIG. 139 illustrates a schematic cross-sectional side view of the Thermo-optical Solar System (TOSS).

Figure 140:
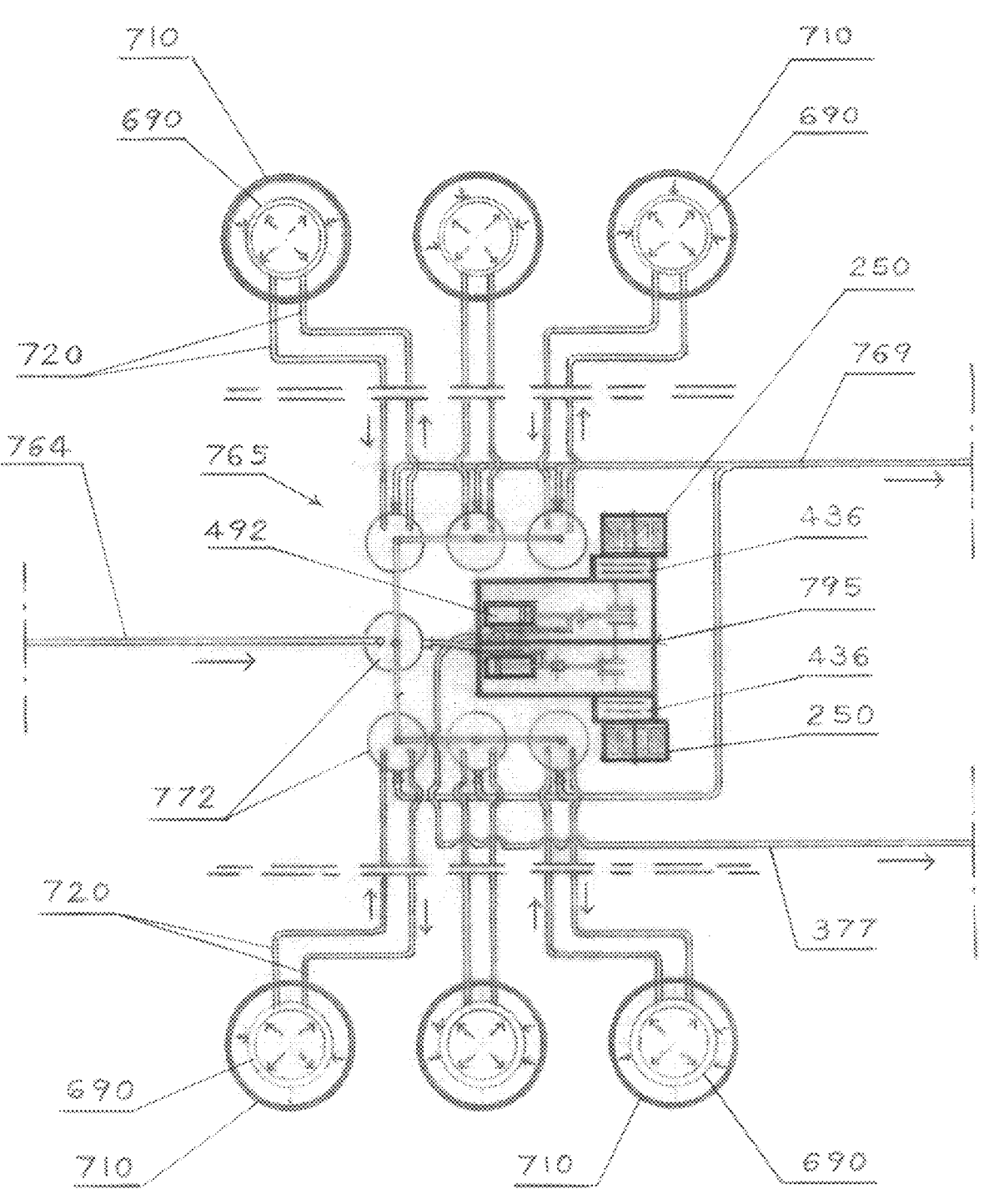

FIG. 140 illustrates a schematic cross-sectional plain view of the Thermo-optical Solar System (TOSS).

Figure 141:
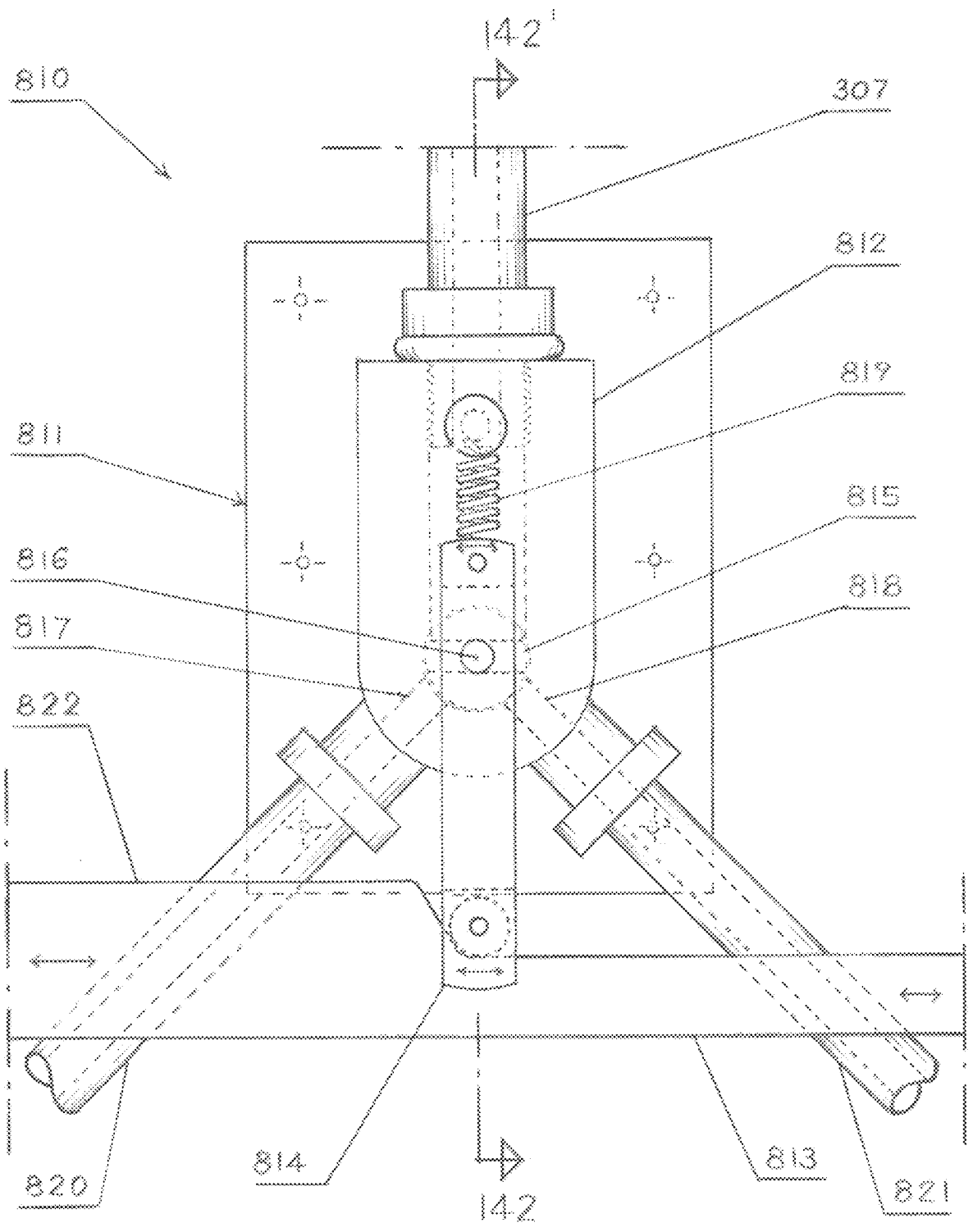

FIG. 141 illustrates a frontal view of a two-port switch valve used in power unit of the Thermo-optical Solar System (TOSS) shown in FIG. 139 in accordance with the invention.

Figure 142:
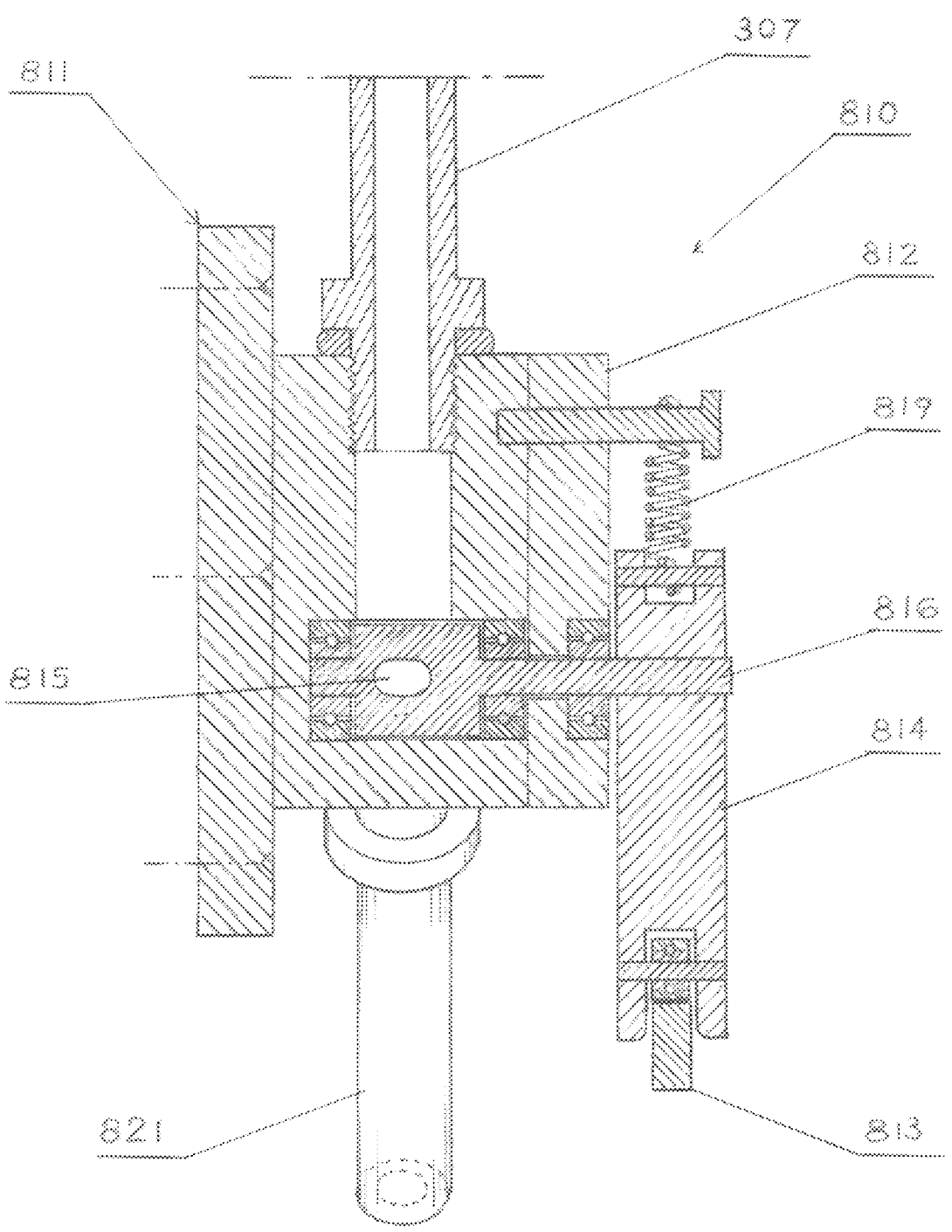

FIG. 142 illustrates a cross-sectional view of the two-port switch valve taken along line 142-142' of FIG. 139, used in power unit of the Thermo-optical Solar System (TOSS) in accordance with the invention.

Figure 143:
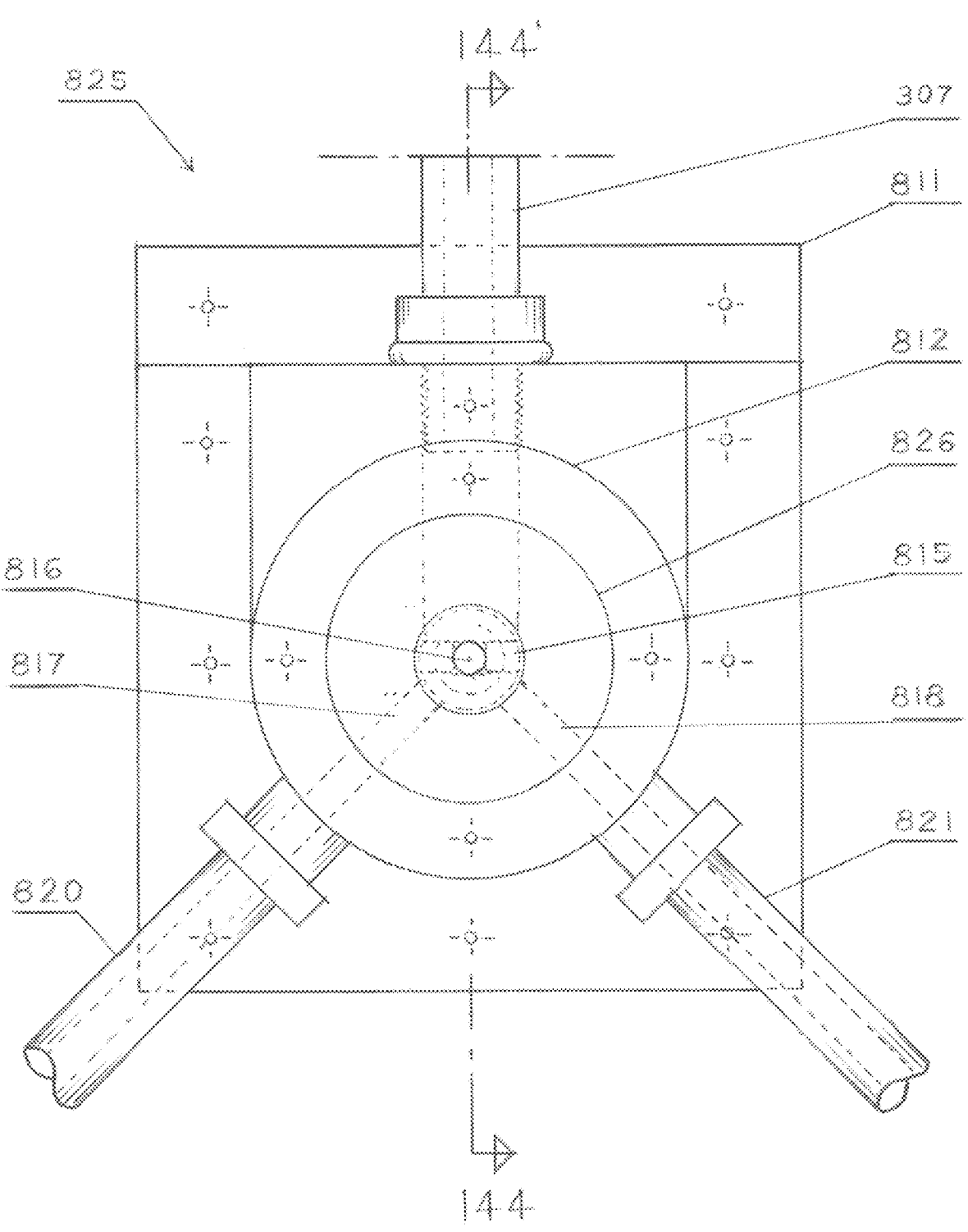

FIG. 143 illustrates a frontal view of an alternative design of the two-port switch valve used in power unit of the Thermo-optical Solar System (TOSS) shown in FIG. 139 in accordance with the invention.

Figure 144:
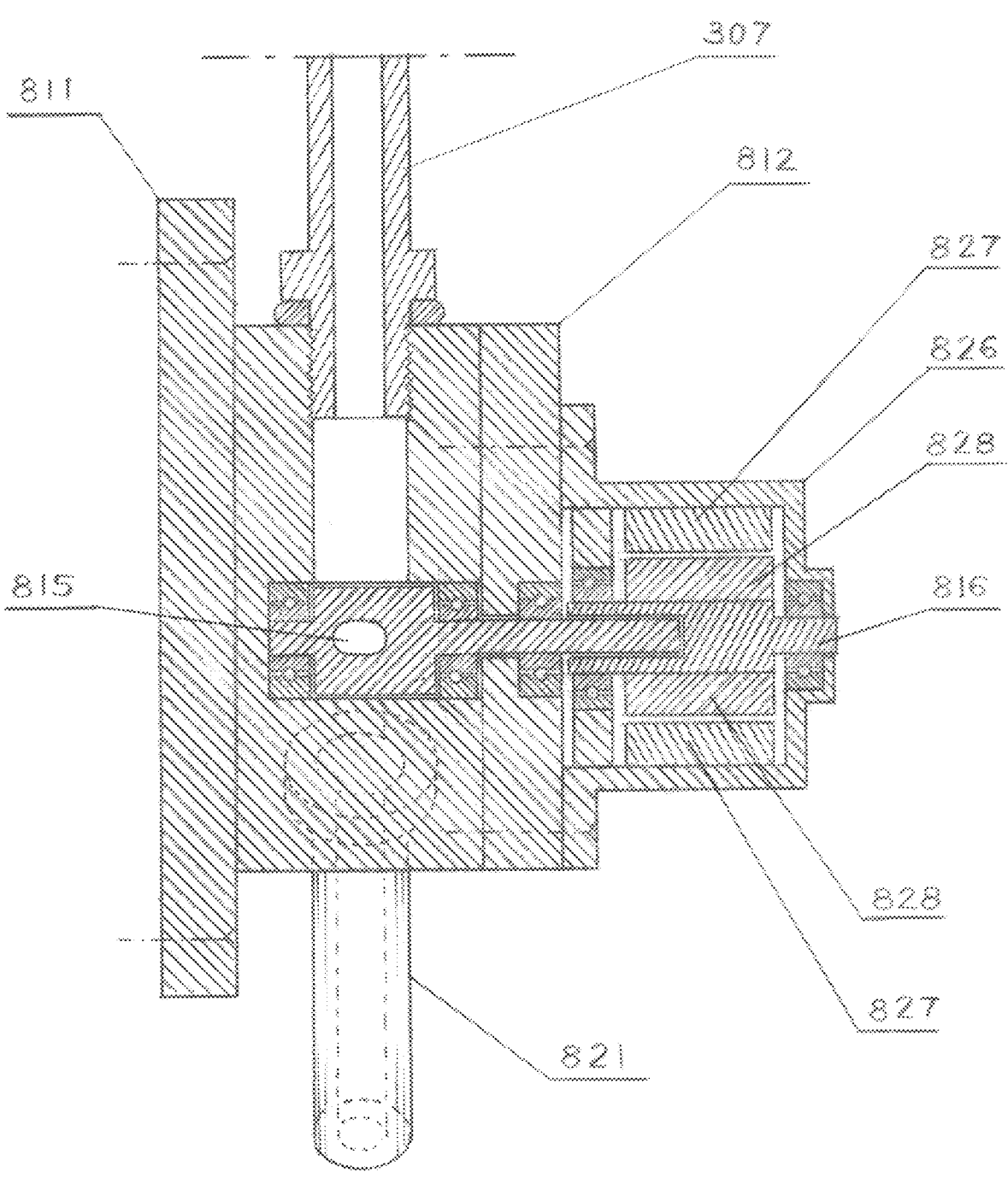

FIG. 144 illustrates a cross-sectional view of the alternative design of the two-port switch valve taken along line 144-144 of FIG. 143.

Figure 145:
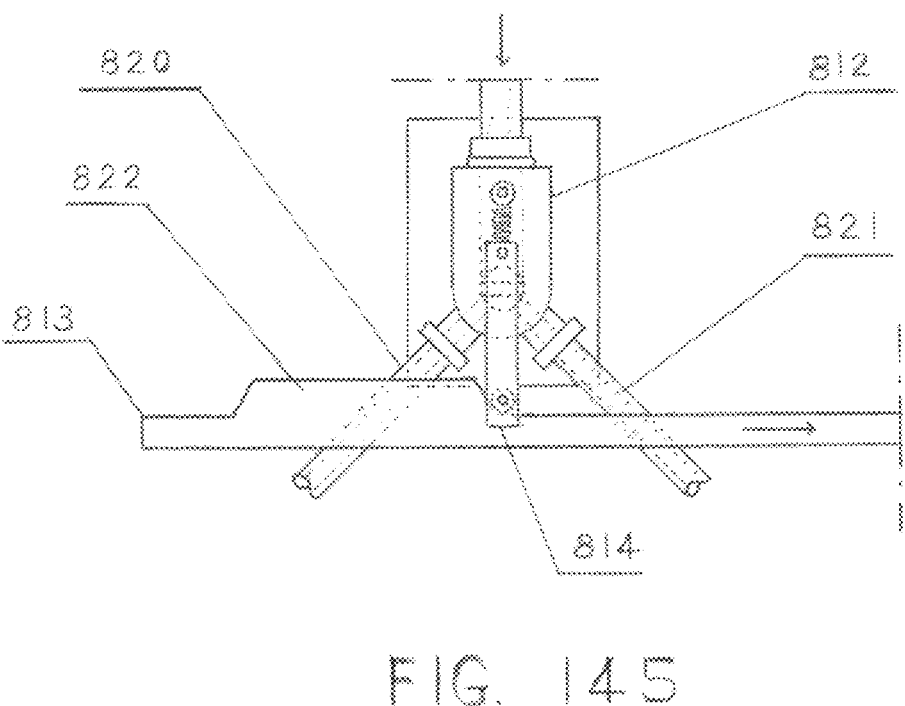

FIG. 145 illustrates frontal view of the two-port switch valve in neutral position.

Figure 146:
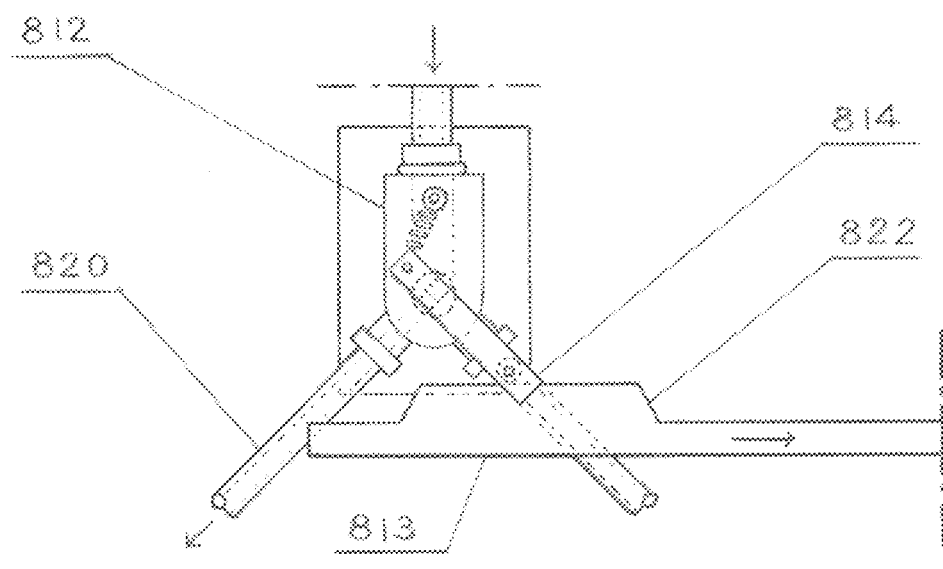

FIG. 146 illustrates frontal view of the two-port switch valve in first port opening position.

Figure 147:
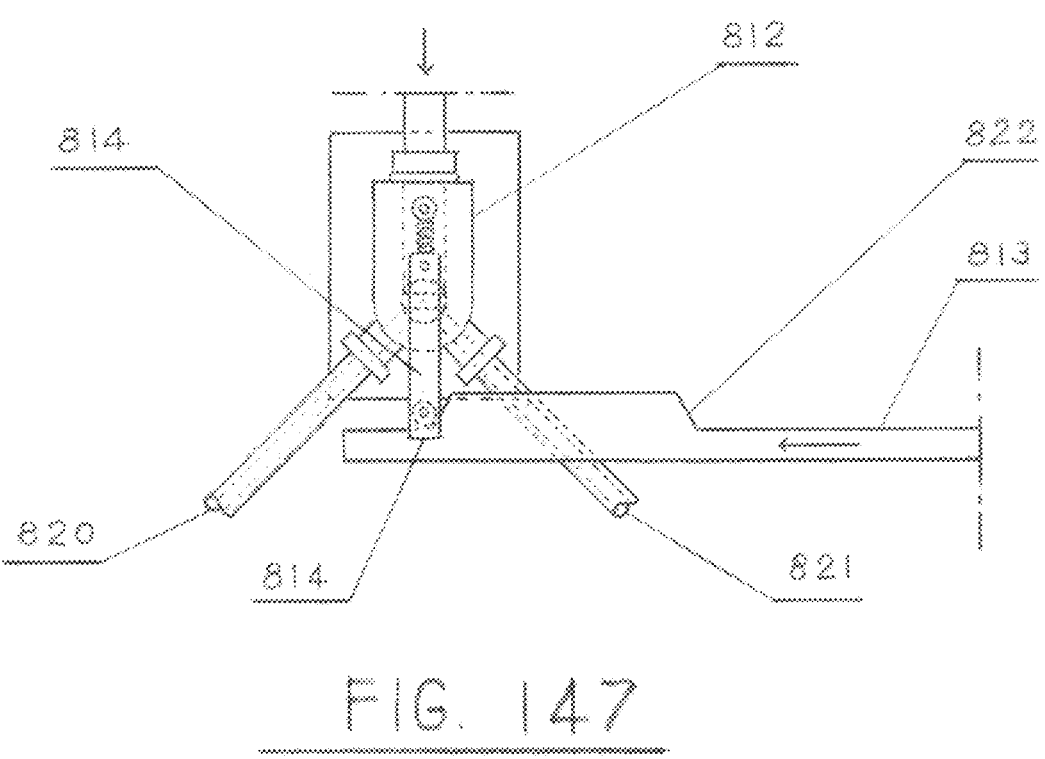

FIG. 147 illustrates frontal view of the two-port switch valve in neutral position.

Figure 148:
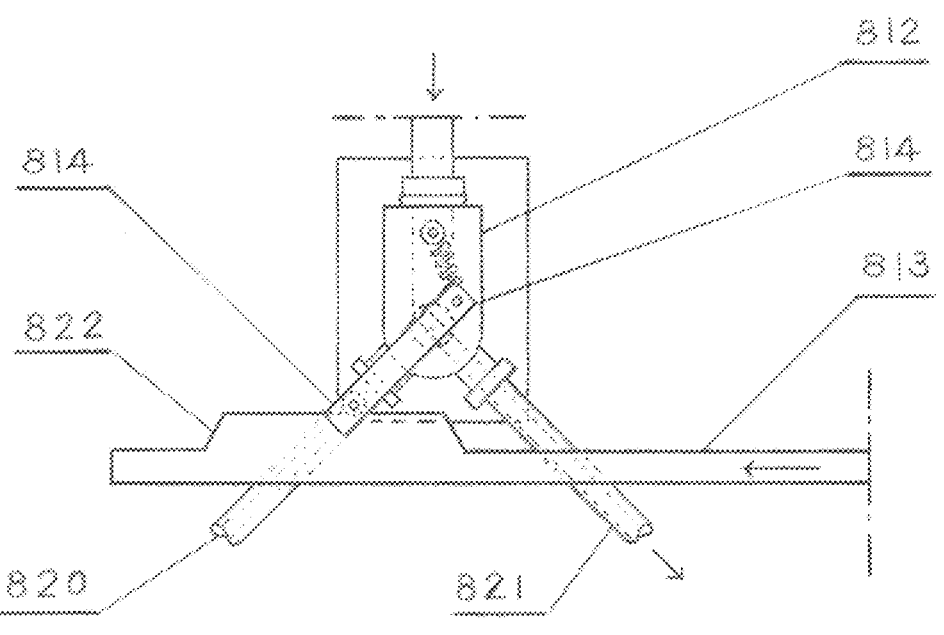

FIG. 148 illustrates frontal view of the two-port switch valve in second port opening position.

Figure 149:
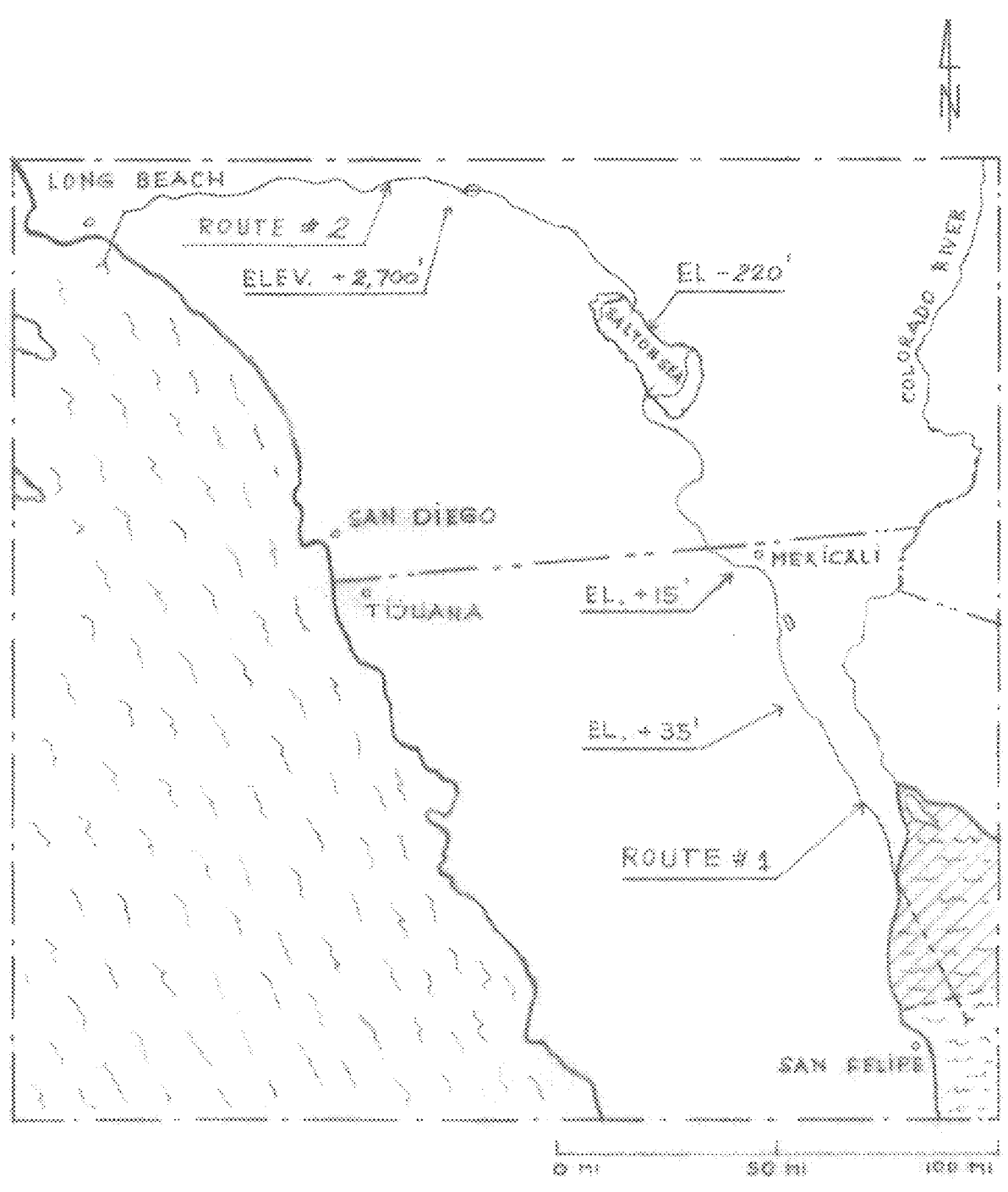

FIG. 149 is a map of the pipeline Route #1—from San Felipe to the Salton Sea and Route #2—from Long Beach to the Salton Sea.

Figure 150:
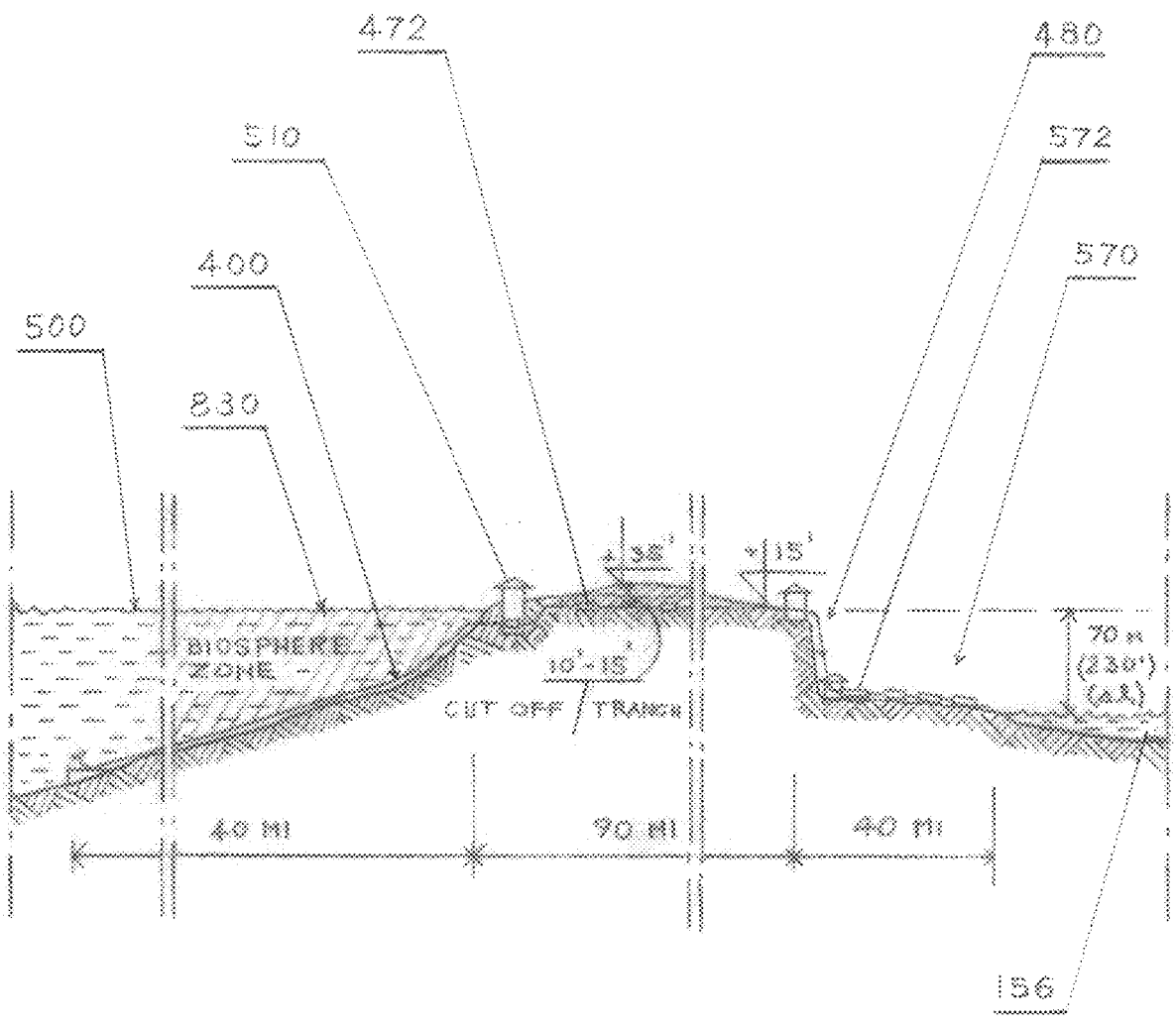

FIG. 150 illustrates a cross-sectional view if the pipeline Route #1—from San Felipe to the Salton Sea.

Figure 151:
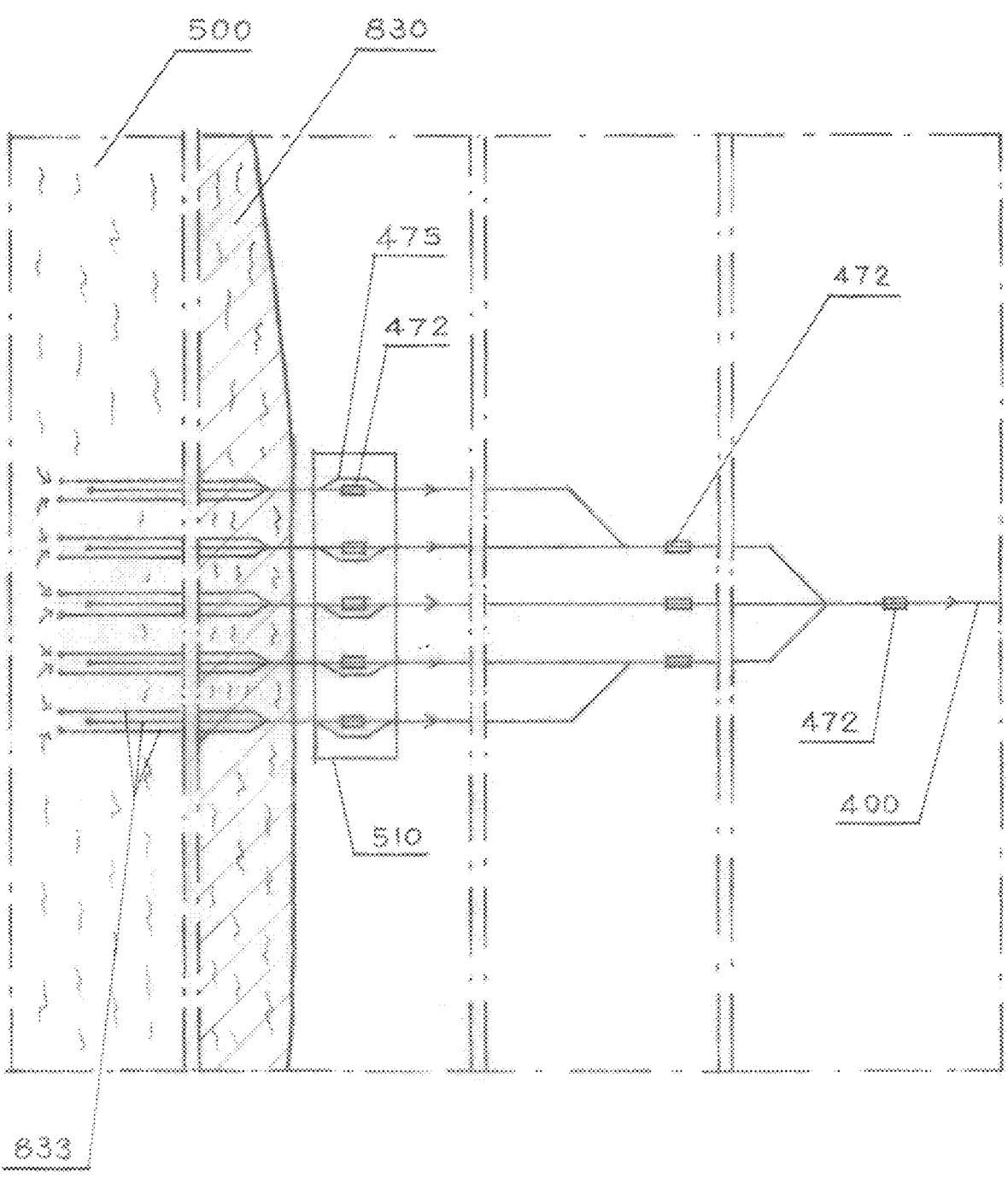

FIG. 151 illustrates Plain View, the first segment of the pipeline Route #1.

Figure 152:
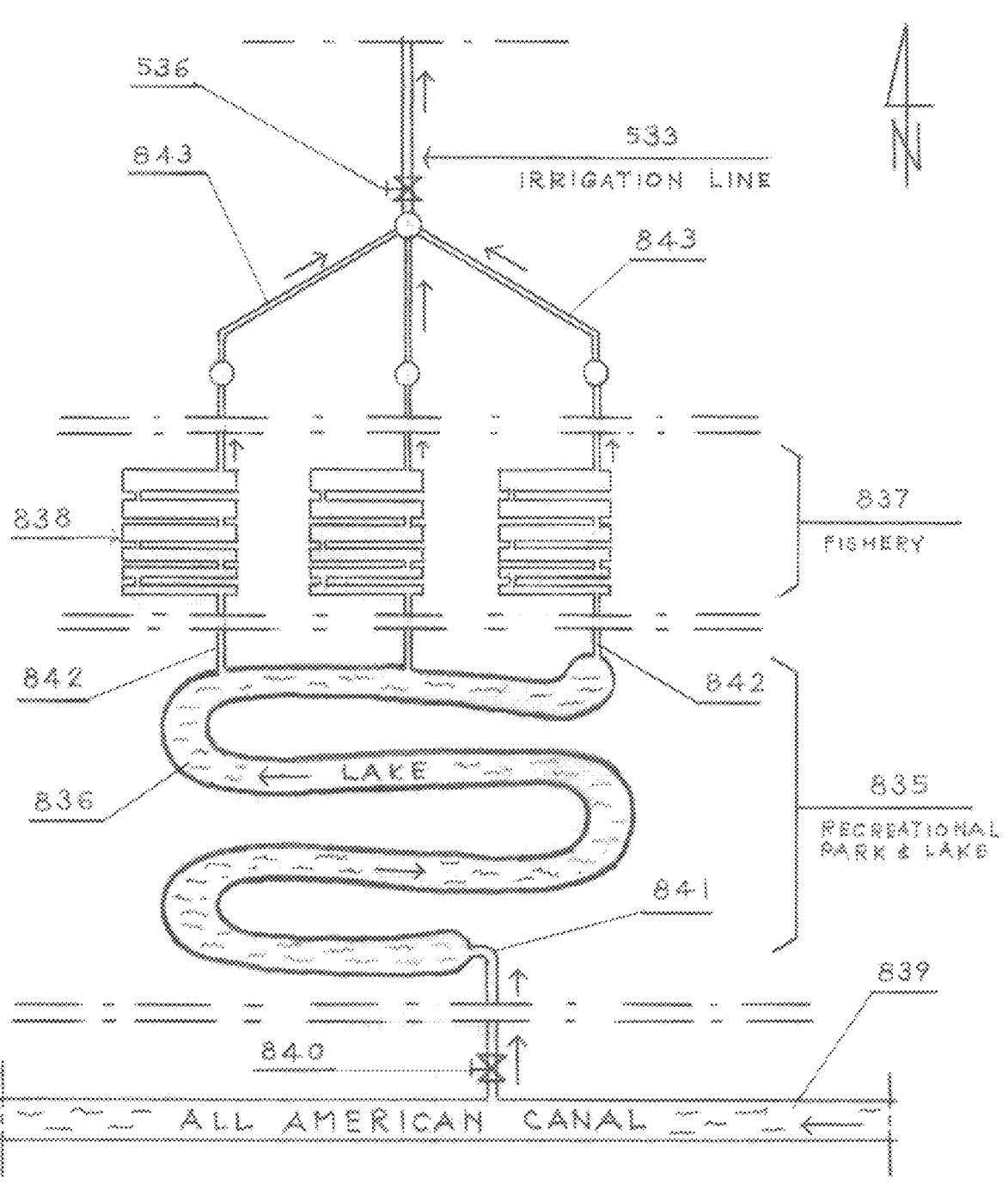

FIG. 152 illustrates schematic Plain View of a Recreational Park with a Lake and nearby Fishery.

Figure 153:
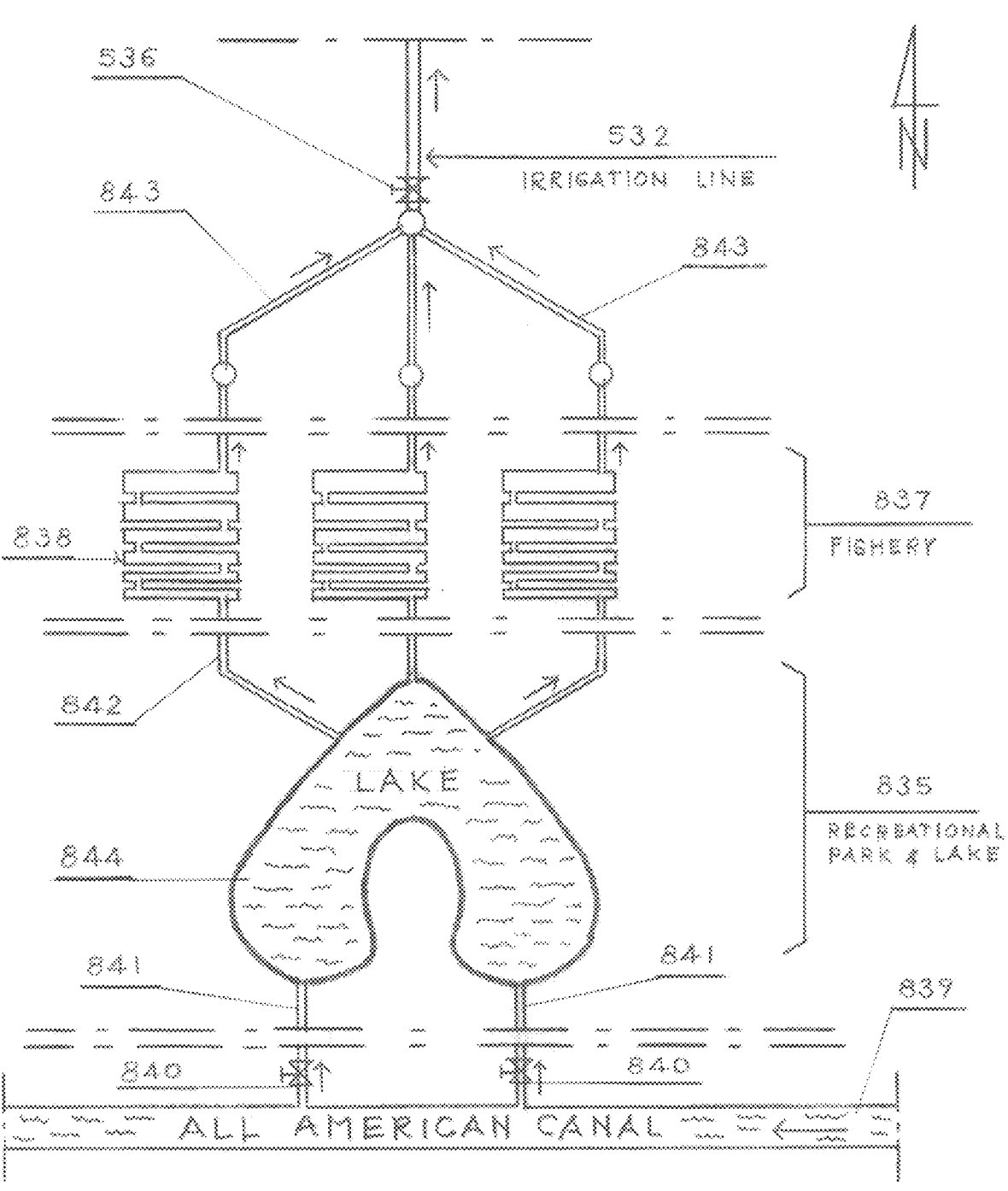

FIG. 153 illustrates a schematic Plain View of an additional design of Recreational Park with a Lake and nearby Fishery.

Figure 154:
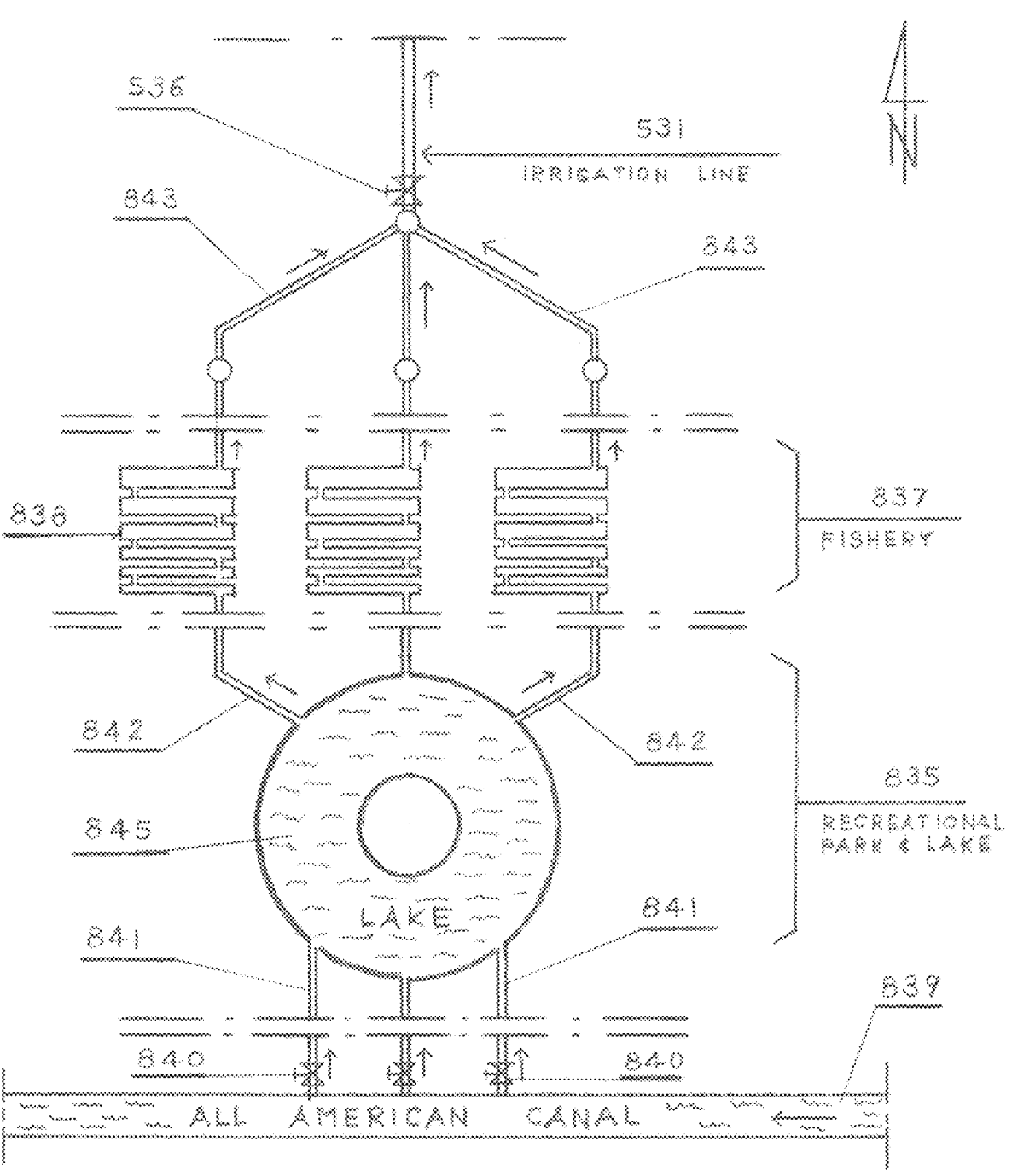

FIG. 154 illustrates a schematic Plain View of an additional design of a Recreational Park with a Lake and nearby Fishery.

Figure 155:
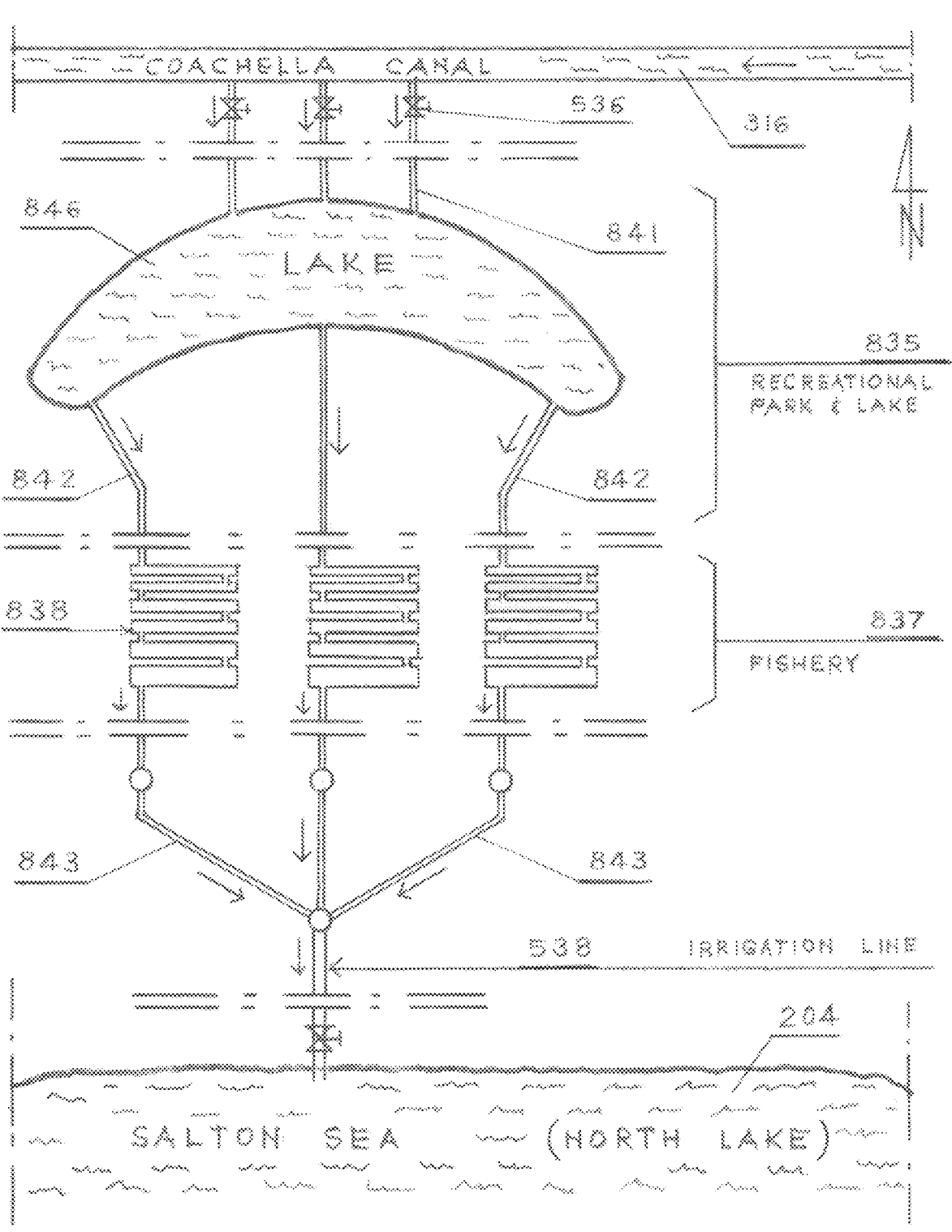

FIG. 155 illustrates a schematic Plain View of an additional design of a Recreational Park with a Lake and nearby Fishery.

Figure 156:
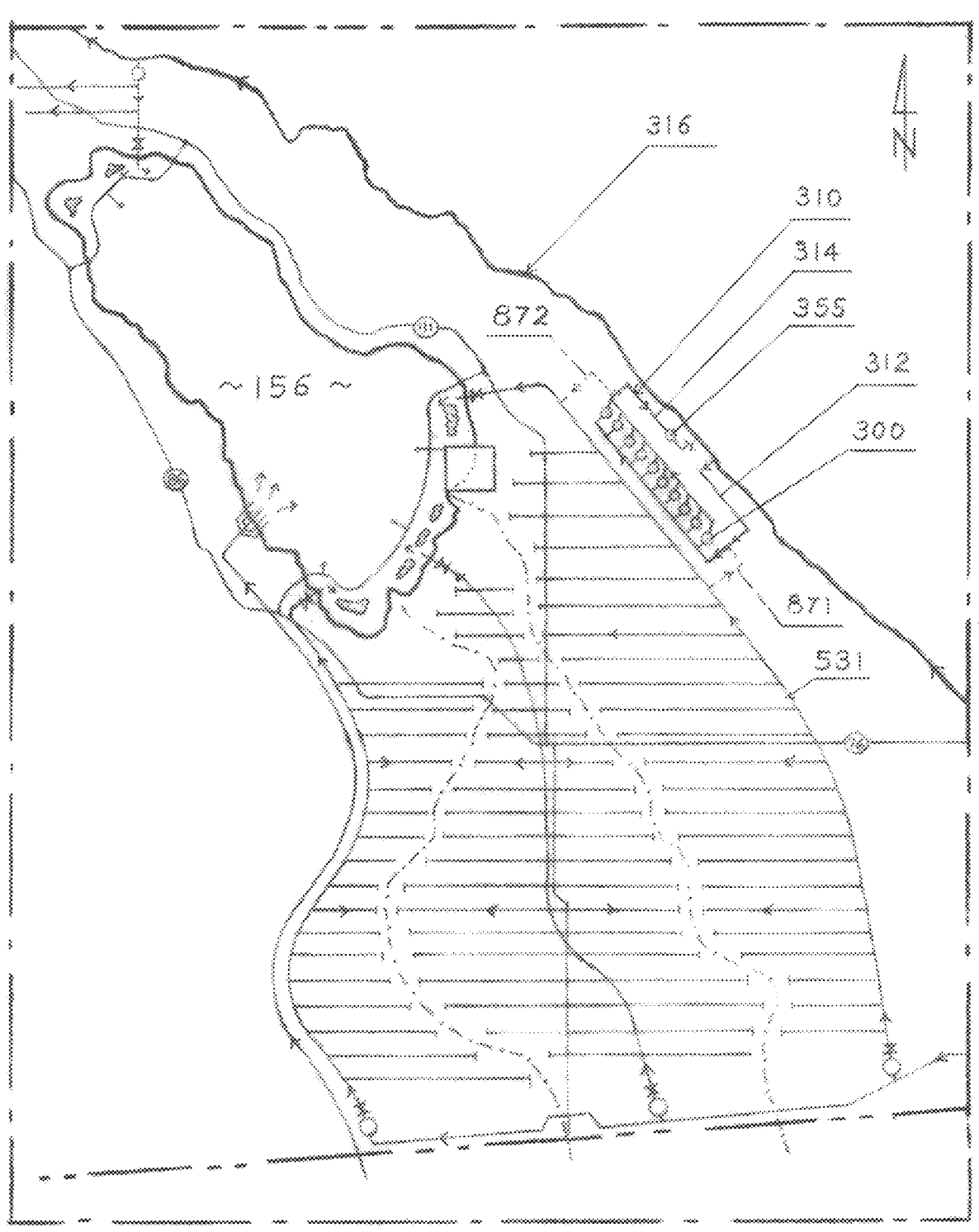

FIG. 156 illustrates a map-a schematic Plain View of a closed-loop system transferring the coolness of the nearby source of running water into the condenser of the geothermal power plant.

Figure 157:
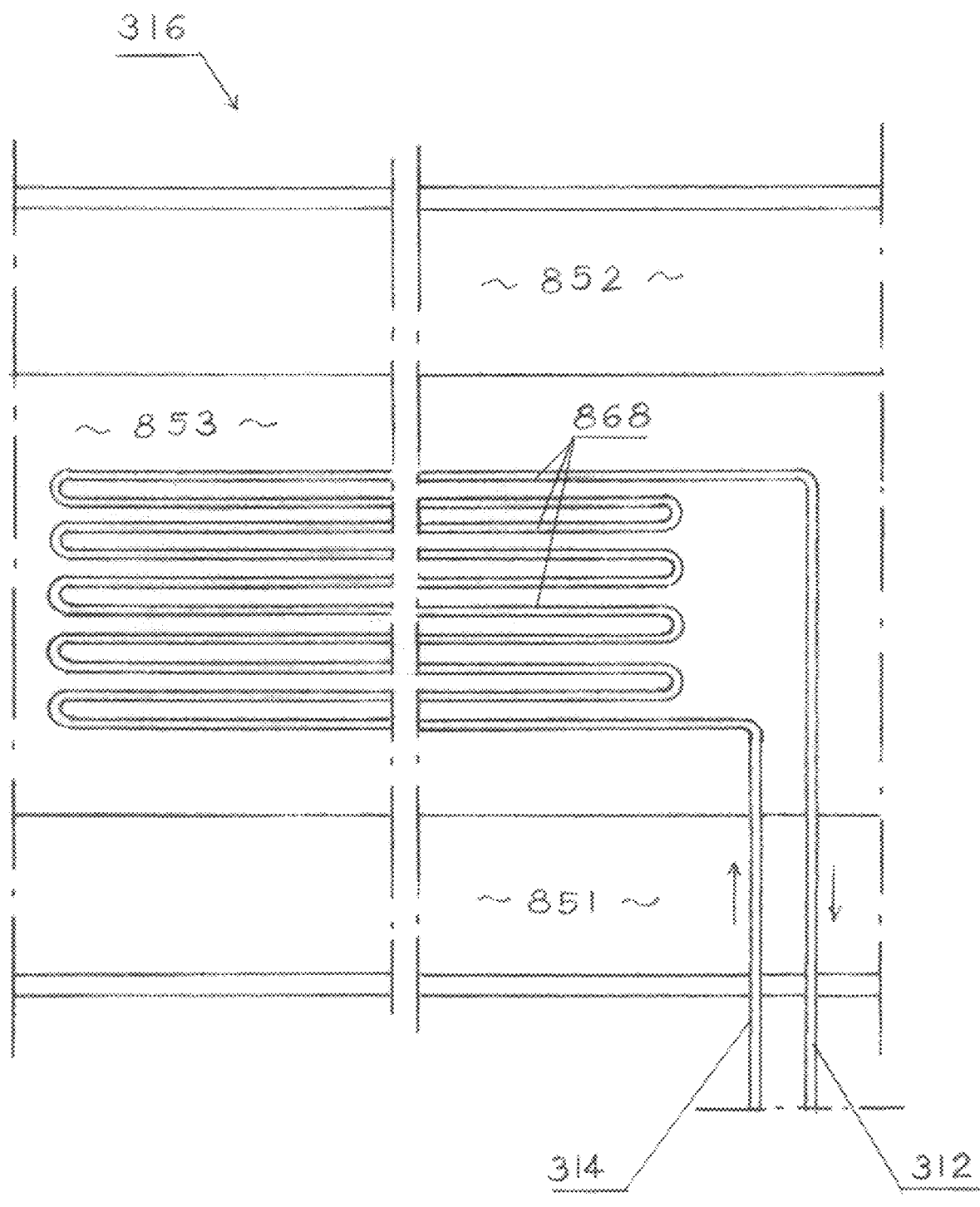

FIG. 157 illustrates a schematic plain view of the first heat exchanger with inflow line and outflow line on the bottom of the Coachella Canal.

Figure 158:
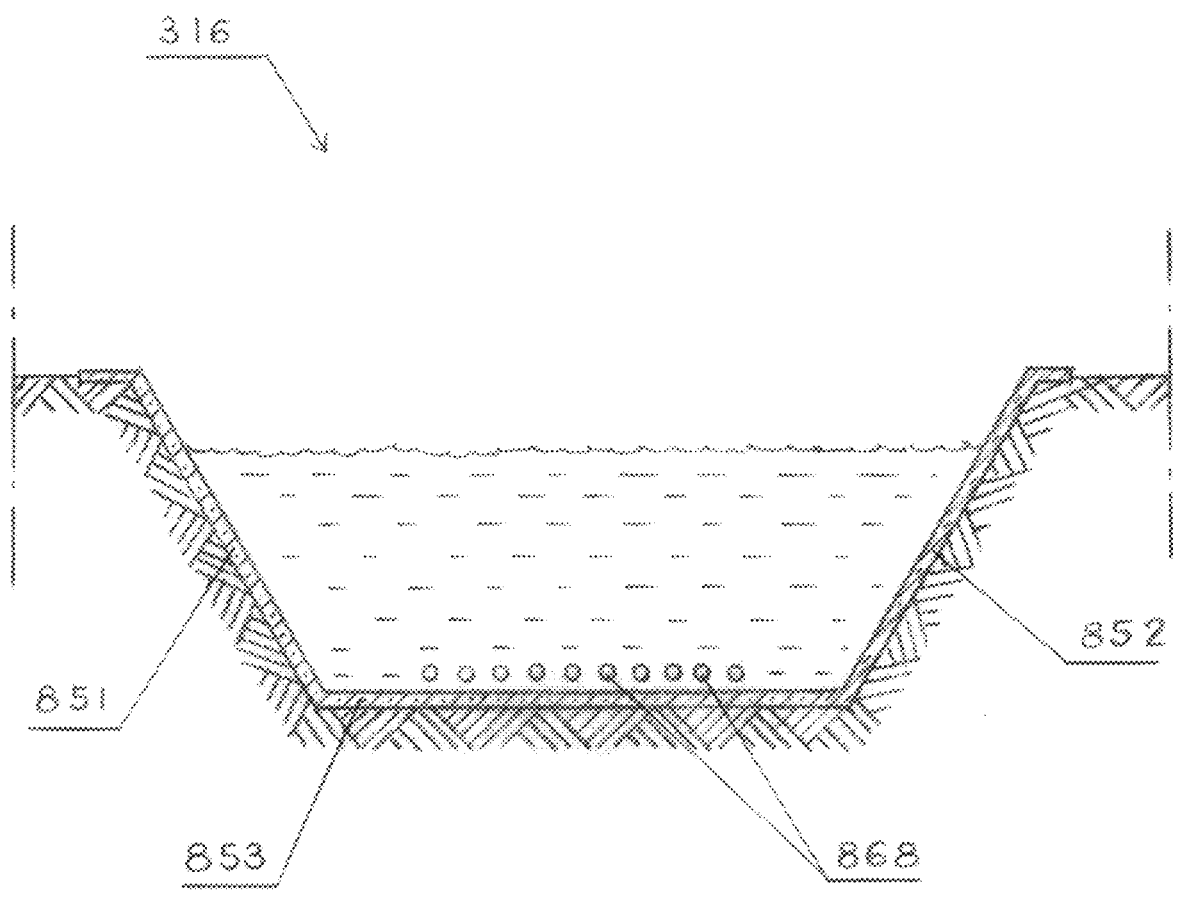

FIG. 158 illustrates a cross-sectional view of the Coachella Canal with the first heat exchanger at the bottom.

Figure 159:
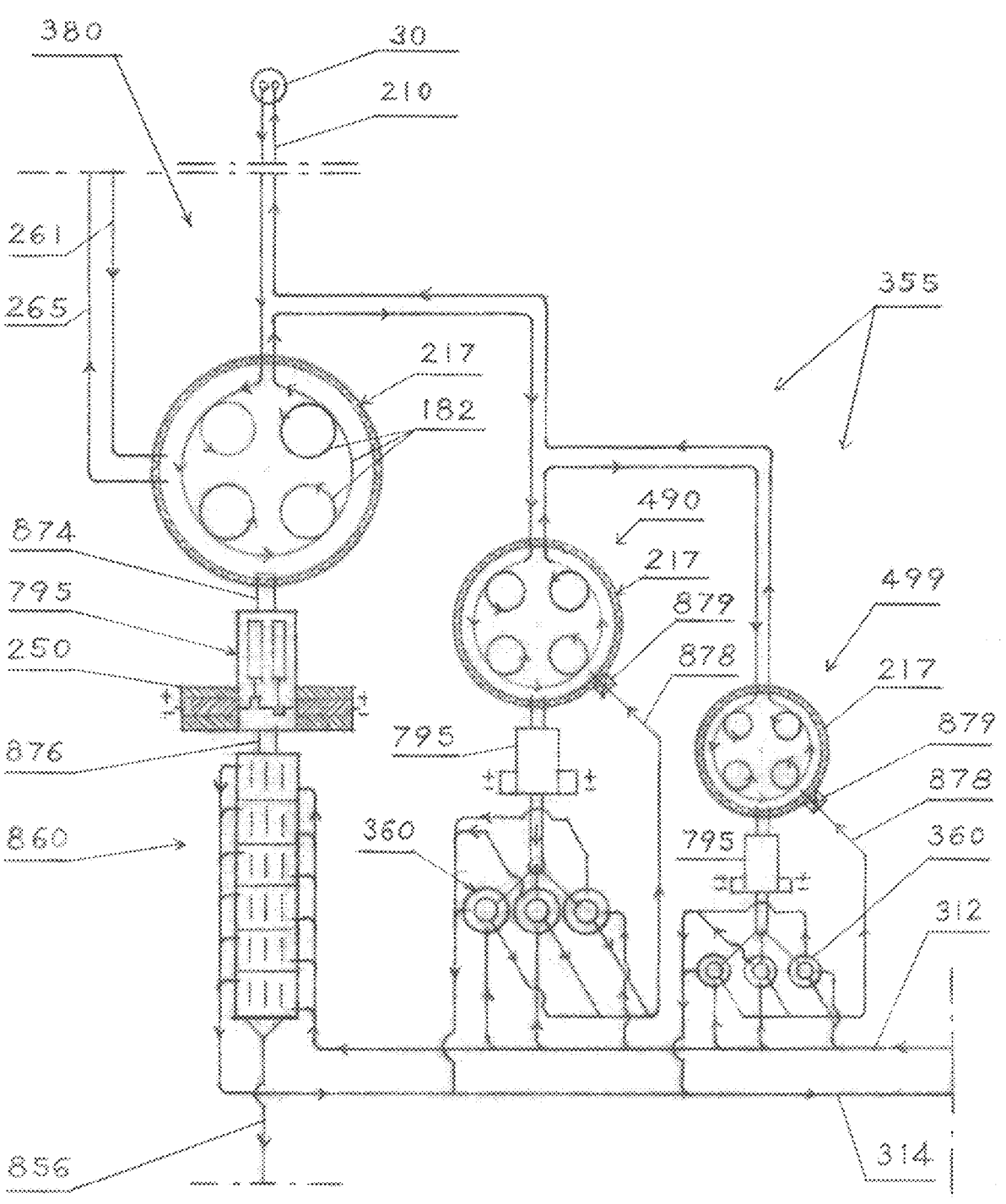

FIG. 159 illustrates a schematic diagram of a Power Unit with a set of supplemental binary power units in accordance with the presented invention.

Figure 160:
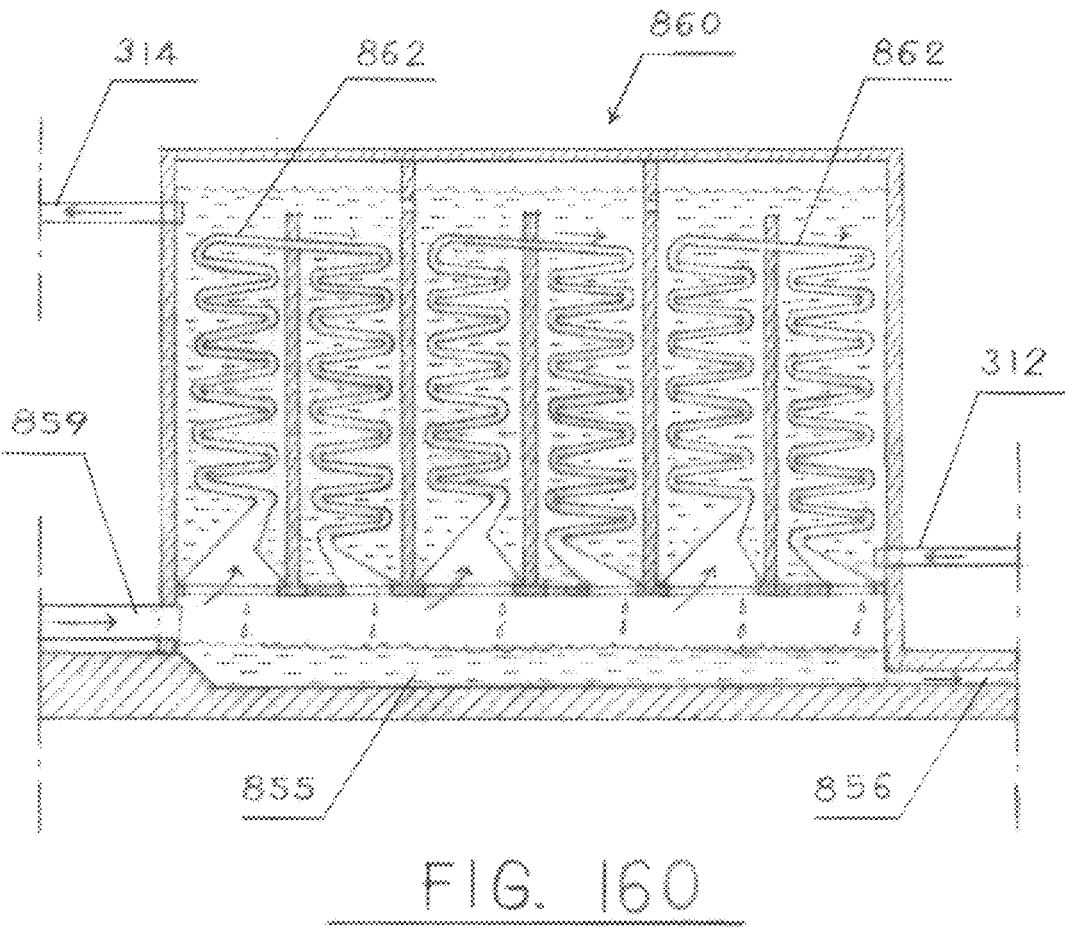

FIG. 160 illustrates a schematic cross-sectional view of the condenser in accordance with the presented invention.

Figure 161:
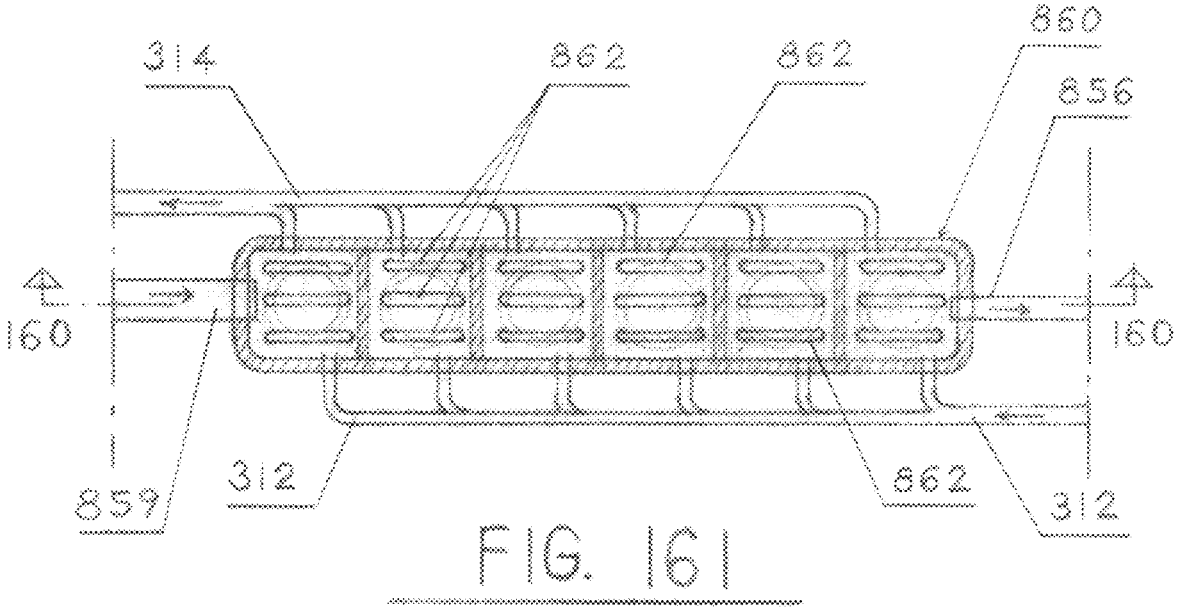

FIG. 161 illustrates a schematic cross-sectional plain view of the condenser in accordance with the presented concept.

Figure 162:
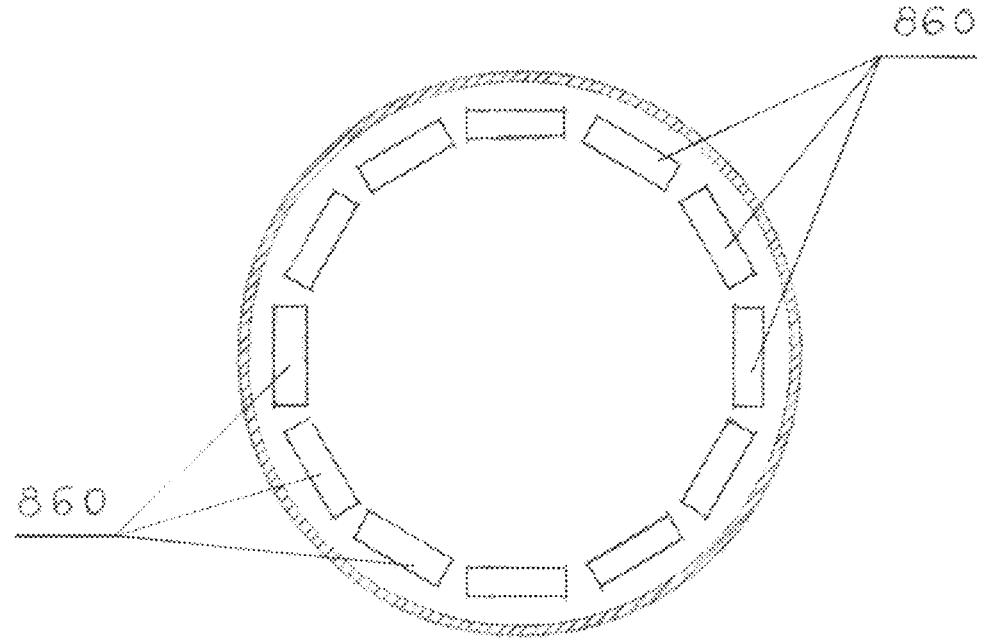

FIG. 162 illustrates a schematic plain view of an array of condensers in accordance with the invention.

Figure 163:
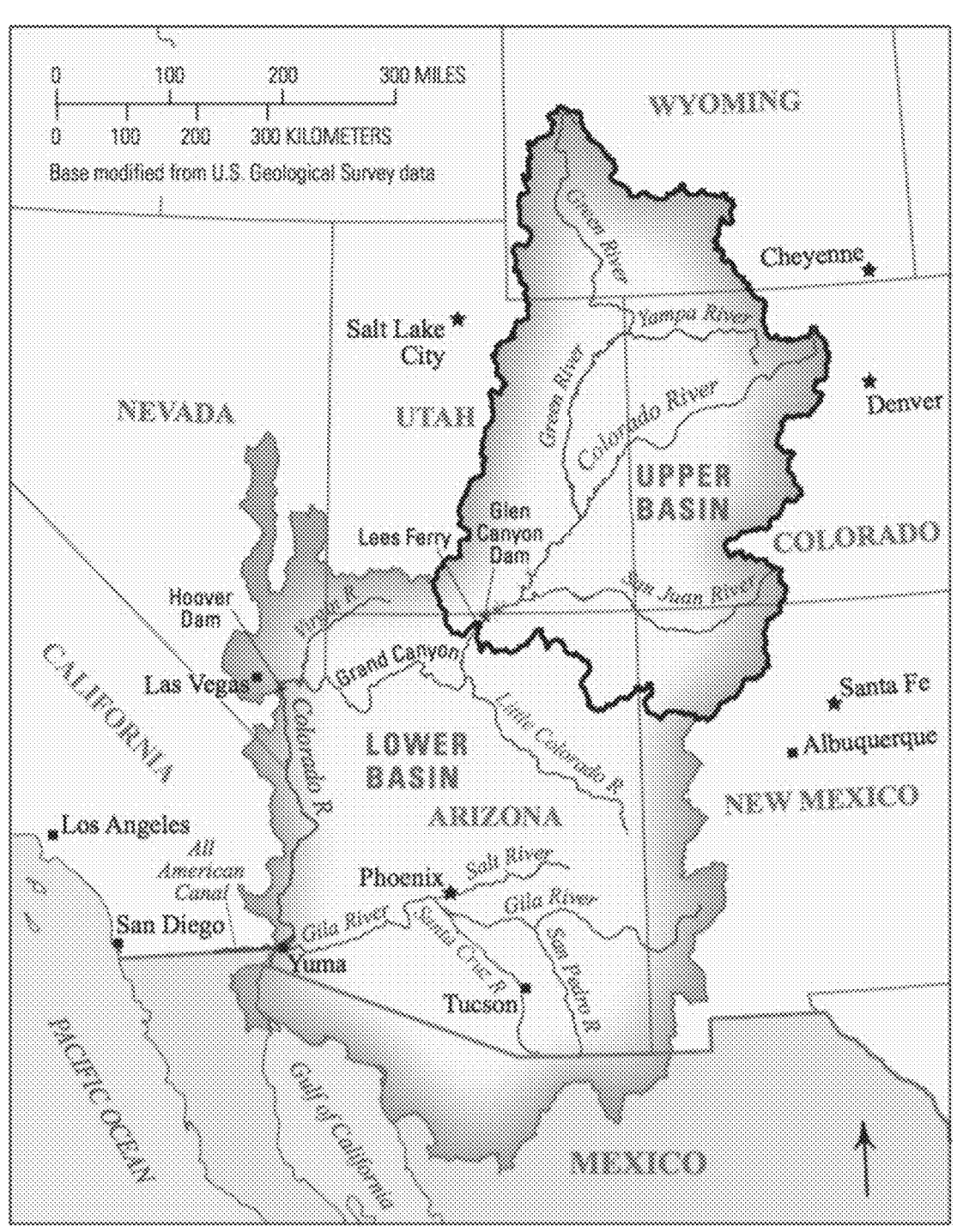

FIG. 163 illustrates a map (1-1) from the Bureau of Reclamation report—SEIS—Oct. 12, 2023, showing the 'Upper and Lower Division States of the Colorado River'.

Figure 164:
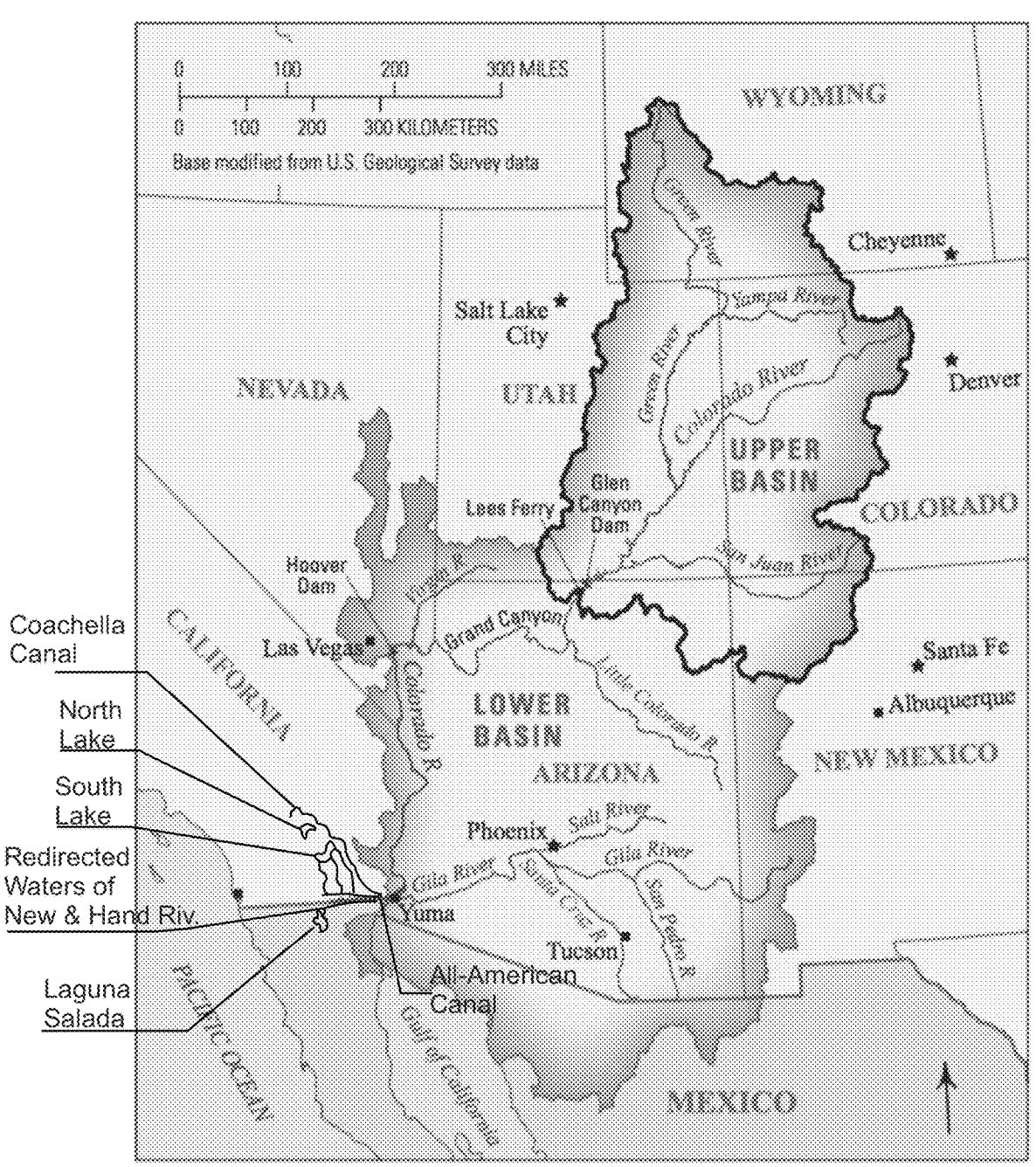

FIG. 164 illustrates a map (8.1.1—modified) showing the distribution of water from the Colorado River through the All-American Canal and Coachella Canal to the South Lake and North Lake of the Salton Sea with lesser water supply from the Colorado River in accordance with the presented concept.

Figure 165:
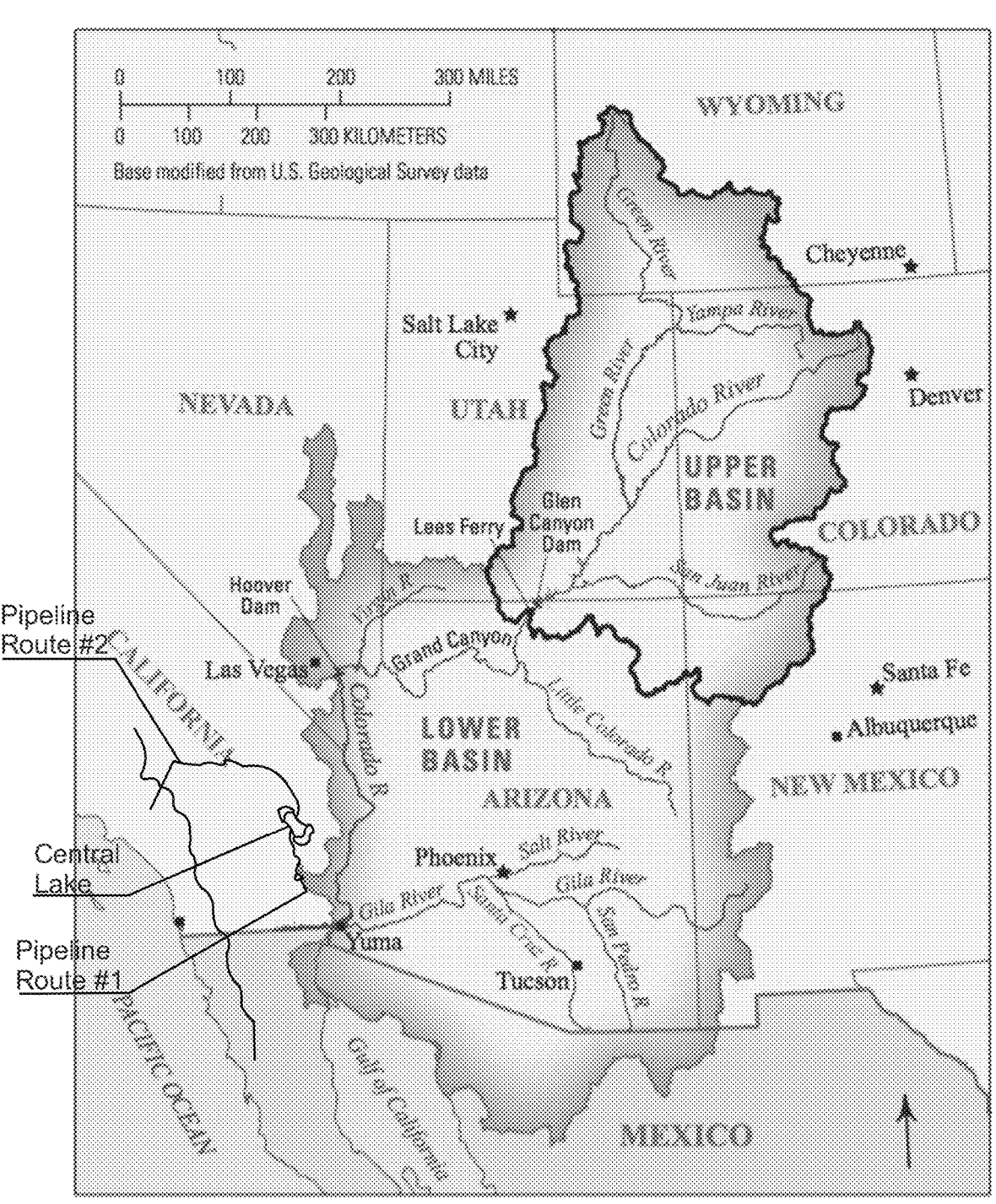

FIG. 165 illustrates a map (8.1.2—modified) showing the importation of seawater through pipeline Route #1 from the San Felipe area of the Gulf of California (Sea of Cortez) to the Central Section) of the Salton Sea, and another pipeline Route #2 from the Long Beach area to the Central Section of the Salton Sea.

DETAILED DESCRIPTION OF THE INVENTION

Figure 1:
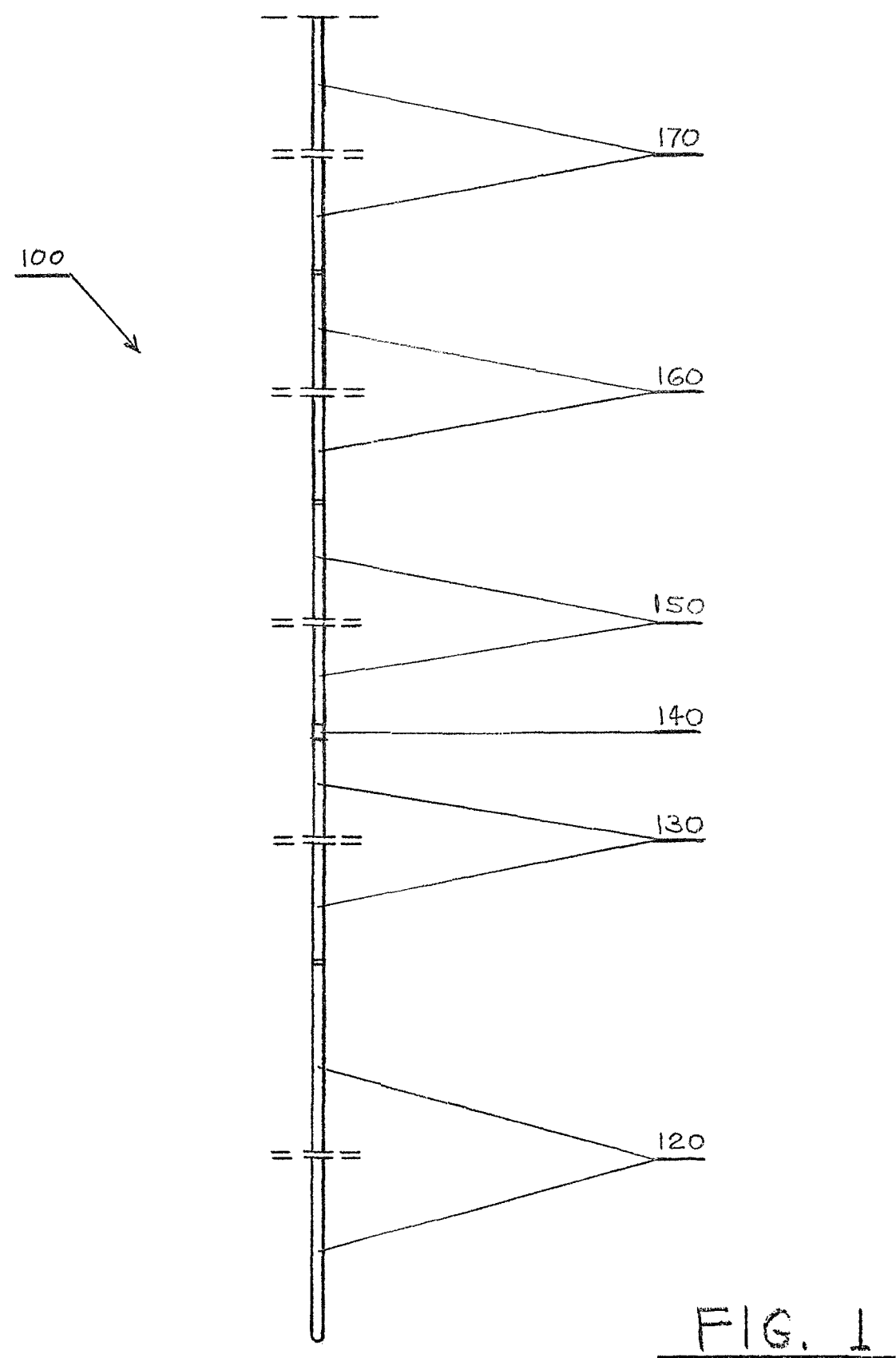
FIG. 1 is a cross sectional view of a self-contained in-ground geothermal generator, with main segments in accordance with the invention.

Referring now to FIG. 1, the self-contained in-ground geothermal generator comprises a slim cylindrical shape, which, positioned vertically, can be lowered with a system of cables deep into the ground in a pre-drilled well. The self-contained in-ground geothermal generator 100 of the invention is shown in cross-sectional view, with main segments. The main elements of the assembly 100 are: the boiler 120, the turbine compartment 130, the gearbox, or converter 140, the electric generator 150, the condenser/distributor 160, and system of cables and tubes 170 which includes electric cable for transporting electric energy up to the ground surface.

Figure 2:
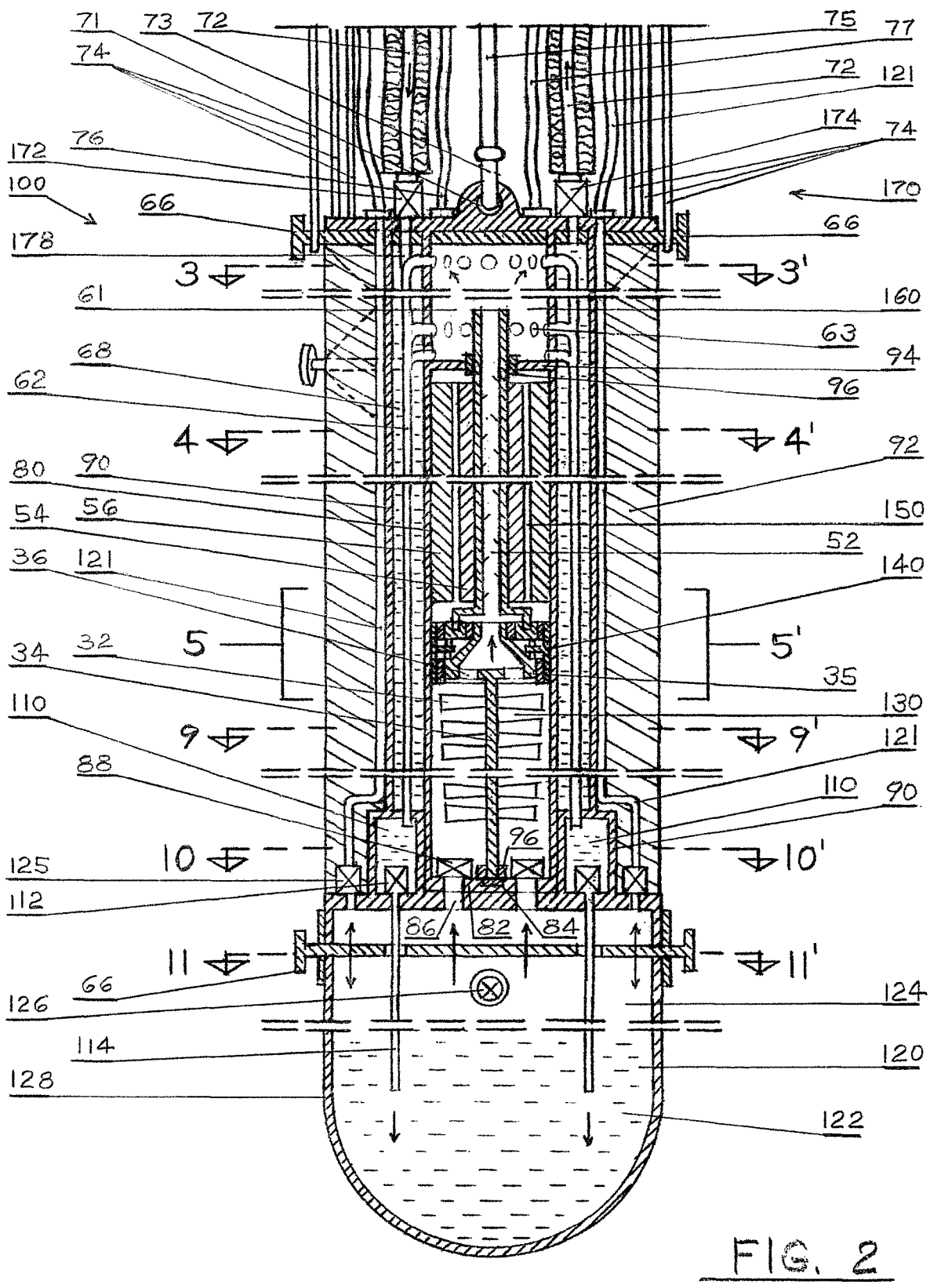
FIG. 2 is a cross sectional view taken along line 1-1' of FIG. 3 of a self-contained in-ground geothermal generator, in accordance with the invention.
Figures 3, 4:
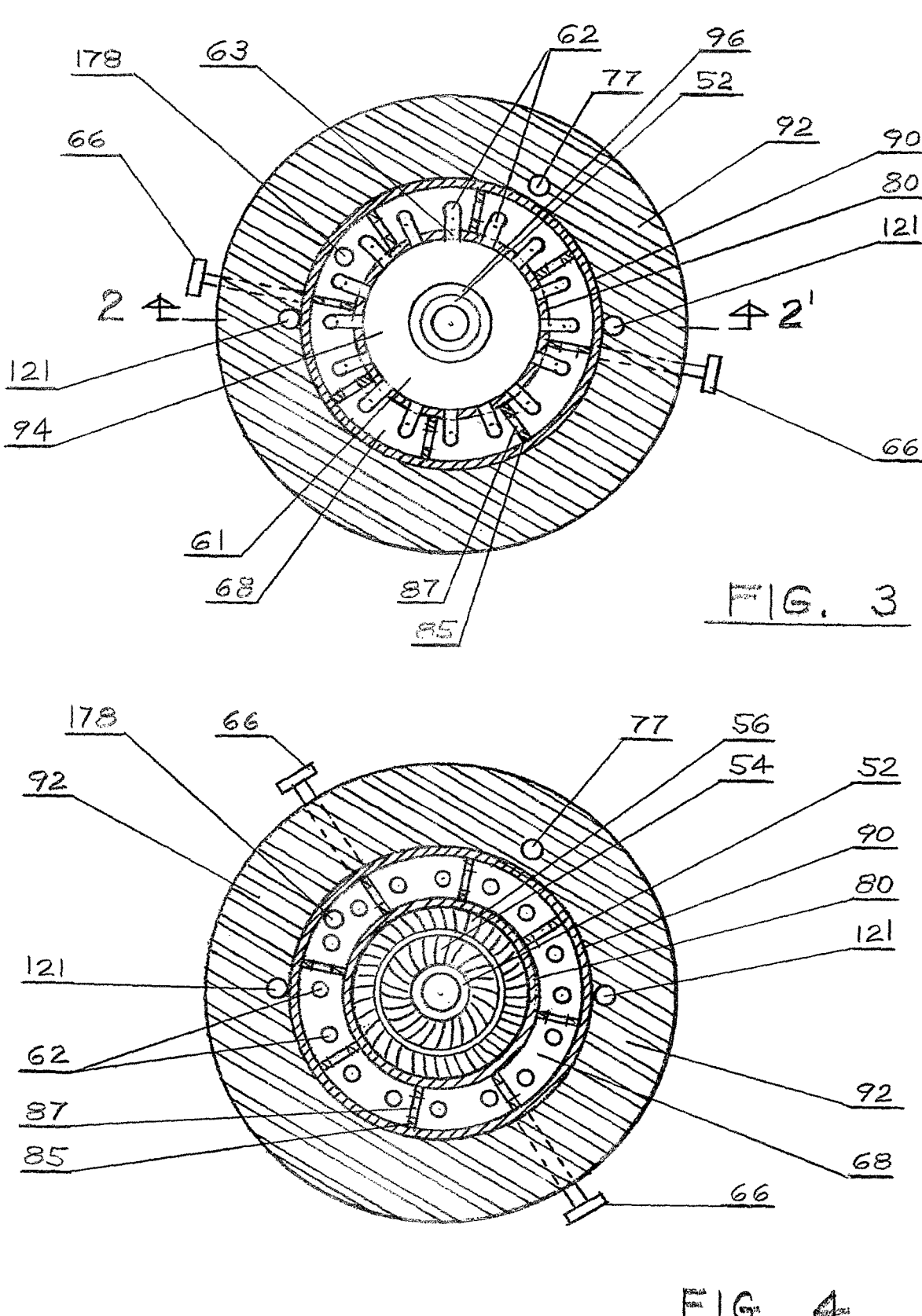
FIG. 3 is a cross-sectional view of the condenser distributor along line 3-3' of FIG. 2, in accordance with the invention.
FIG. 4 is a cross-sectional view of the condenser and generator along line 4-4' of FIG. 2, in accordance with the invention.
Figure 5:
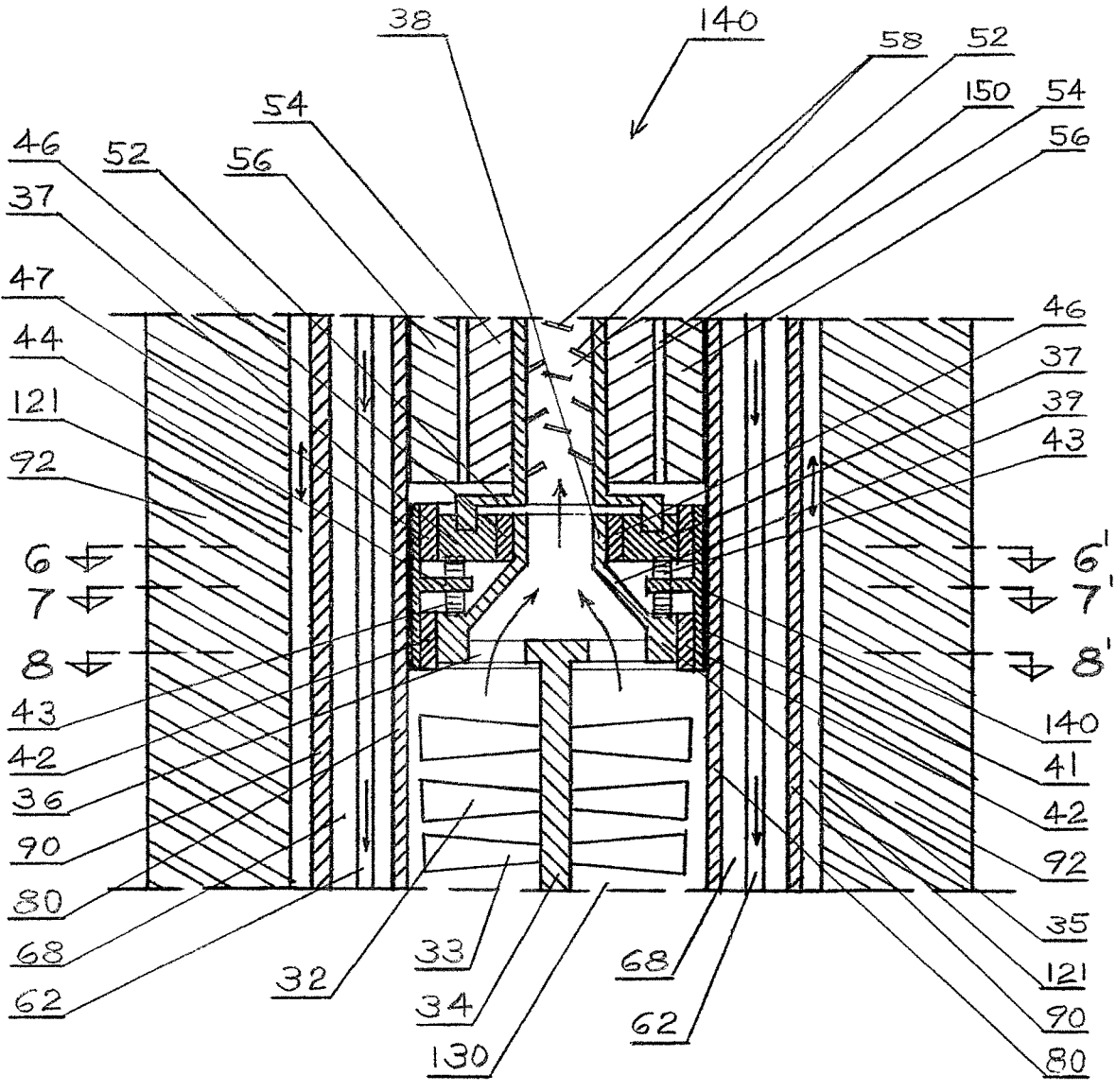
FIG. 5 is an enlarged cross-sectional view along line 5-5' of FIG. 2 illustrating the condenser and the gearbox, in accordance with the invention.
Figures 6, 7:
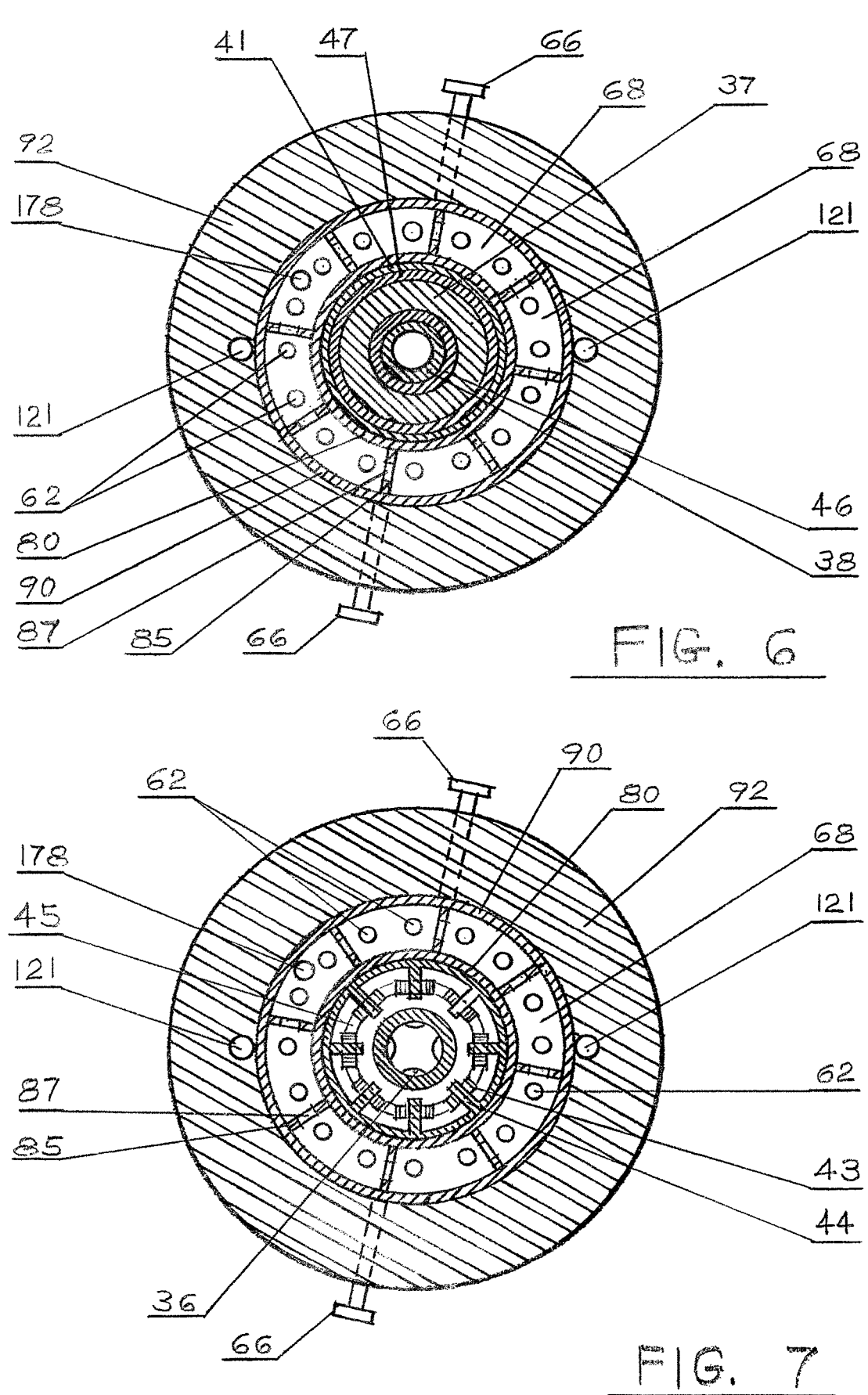
FIG. 6 is a cross-sectional view along line 6-6' of FIG. 5, in accordance with the invention.
FIG. 7 is a cross-sectional view along line 7-7' of FIG. 5, in accordance with the invention.
Figure 8:
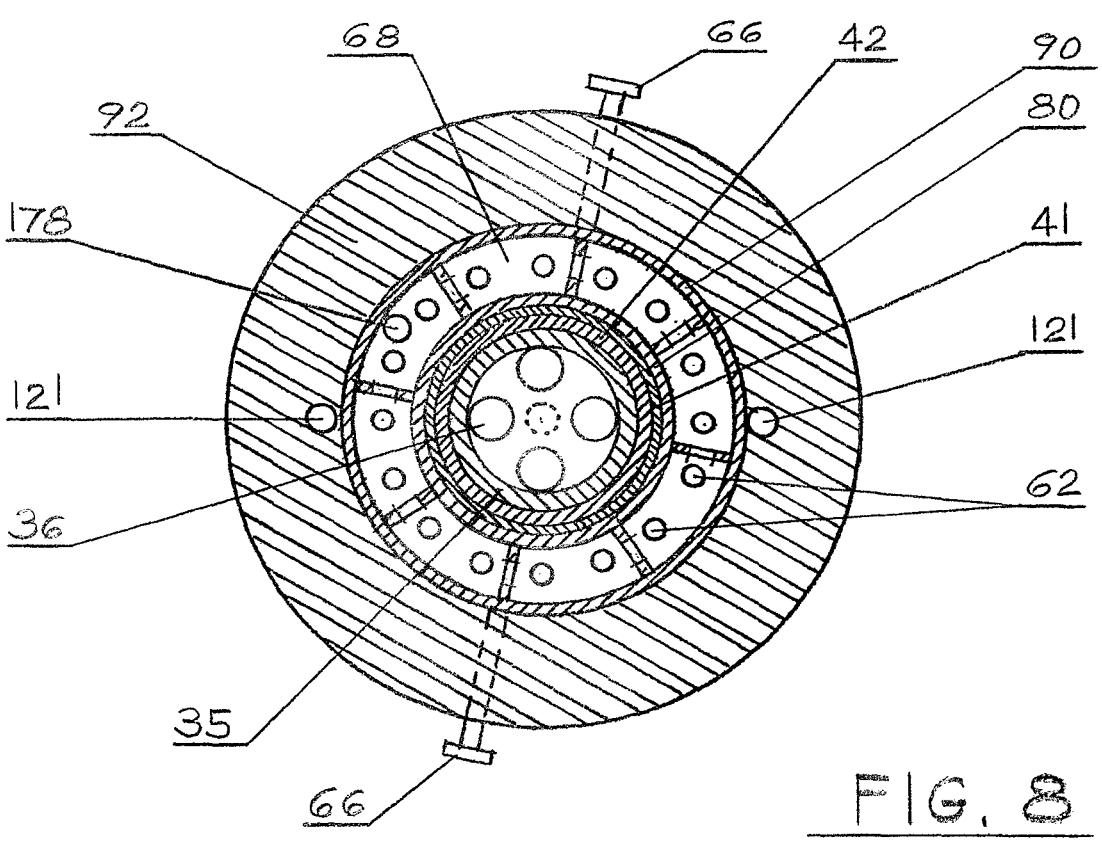
FIG. 8 is a cross-sectional view along line 8-8' of FIG. 5, in accordance with the invention.

Referring now to FIG. 2, enlarged cross sectional view of the self-contain in-ground geothermal generator 100 shown in FIG. 1, taken along line 2-2' of FIG. 3. The main elements of the assembly 100 are: the boiler 120, the turbine compartment 130, the gear box, or converter 140, the electric generator 150, the condenser 160 with distributor chamber 61 and peripheral chamber 68 with system of tubes 62 for returning exhausted condensed steam as a feed water back into the boiler, and system of cables and tubes 170.

The System of cables and tubes 170 includes peripheral caring cables 74, main caring cable 75, control cable 76, boiler supply tubes 121, cooling system tubes 72, and main electric cable 77, for transporting electric energy up to the ground surface.

The boiler 120 includes the lower part having a water tank area 122 and upper part having a steam area 124. The assembly 100 has a hook eye 71 and can be attached by hook 73 and cable 75 or with system of pulleys and cables and then lowered into pre-drilled well deep in the ground to the level where rocks heated by magma deep below the Earth's surface boils the water in the water tank area 122 of the lower part of the boiler 120. The steam in steam area 124 of the upper part of the boiler 120 is also heated by surrounding hot rocks producing superheated steam. High-pressured superheated steam passes through a set of steam control valve 88 into a turbines compartment 130, which has a set of blades 32 which are attached to a solid shaft 34 and spins it. The solid shaft 34 of the turbines is connected to a cylindrical shaft 52 of the electric generator 150 through a gear box or converter 140. Steam from the turbine compartment is stirred through a set of openings 36 and through the cylindrical shaft 52 of the generator 150 into the distributor chamber 61 of the condenser 160. Exhausted steam then starts condensing and is stirred through the set of openings 63 into a plurality of tubes 62 and back into the feed water tank 110 and then pumped into boiler 120 through boiler feed pump 112 and boiler feed pipe 114.

Here are also illustrated a structural external cylinder 90 and structural internal cylinder 80. The peripheral chamber 68 of the condenser 160 is formed in space between external cylinder 90 and internal cylinder 80. Peripheral chamber 68 has plurality of tubes 62 within, as explained above. There are structural ribs 85 between internal and external cylinders to improve structural integrity of the assembly in high pressure environment. The ribs 85 have holes 87 for water circulation. (For clarity and simplicity of the illustration the ribs 85 are not shown in FIGS. 1 and 2).

The cooling system is an independent close loop tube which has at least two heat exchangers; first one down in the well and second one on the ground surface. First one which absorbs heat from condenser by circulating cool water through the peripheral chamber of the condenser, formed between external and internal cylinders, and then transfers the heat up on ground surface through thermally insulated closed loop pipes where heat is exchanged through second heat exchanger, which is a coiled pipe, and then cooled water returned to the condenser again.

Figure 12:
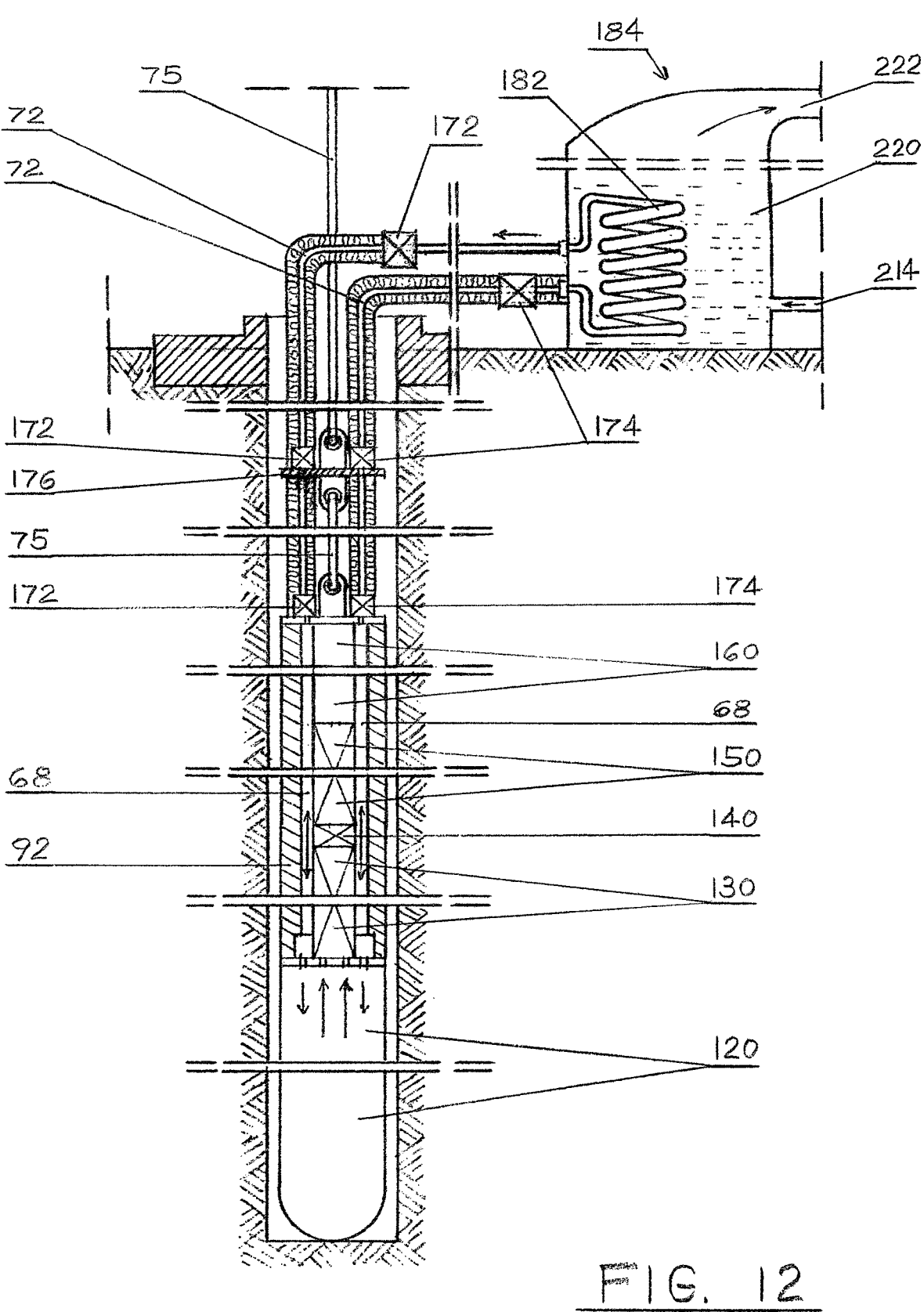
FIG. 12 is a schematic diagram of a cross-sectional view of the self-contained in-ground geothermal generator, with main segments including a heat exchanger on the ground surface, in accordance with the invention.

The cooling system consists of a close loop thermally insulated tube 72, one heat exchanger deep underground, which is peripheral chamber 68 of the condenser 160 and second one the coiled pipe 182 on the ground surface. (The coiled pipe 182 on the ground surface is shown in FIG. 12).

The close loop tube 72 is attached to the peripheral chamber 68 of the condenser 160 through cooling water pumps 172 and 174. The cooling water pump 172 injects cooled water through pipe 178 to the bottom of the peripheral chamber 68. Water cools condenser by circulating through the peripheral chamber 68 of the condenser 160. The hot water, which naturally rises to the upper part of the peripheral chamber 68, is then injected through water pump 174 into other end of the tube 72 and taken up to the ground surface where heat is exchanged through coil tube 182, which is part of heat exchanger 184, and then returns cooled water to peripheral chamber 68 of the condenser 160. The heat on ground surface is then used to produce additional electricity in a "binary" power plant through system of several heat exchangers (Explained in FIG. 12-19).

The peripheral chamber 68, which is part of the condenser 160, is strategically positioned so that besides cooling condenser 160, also surrounds, cools and prevents from overheating turbines 130, gear box/converter 140, and electromagnetic generator 150.

The close loop tube 72 has at least one water pump 172 in line (preferably several) to provide water circulation through the thermally insulated tube line and to reduce hydrostatic pressure at the lower part of the close loop system. If necessary, several close loop tube 72 can be installed on unite to speed up cooling and heat exchange process. The ratio of speed and pressure inside the closed-loop line is constant. P (pressure)×V (speed)=constant. More speed=less pressure.

Figure 13:
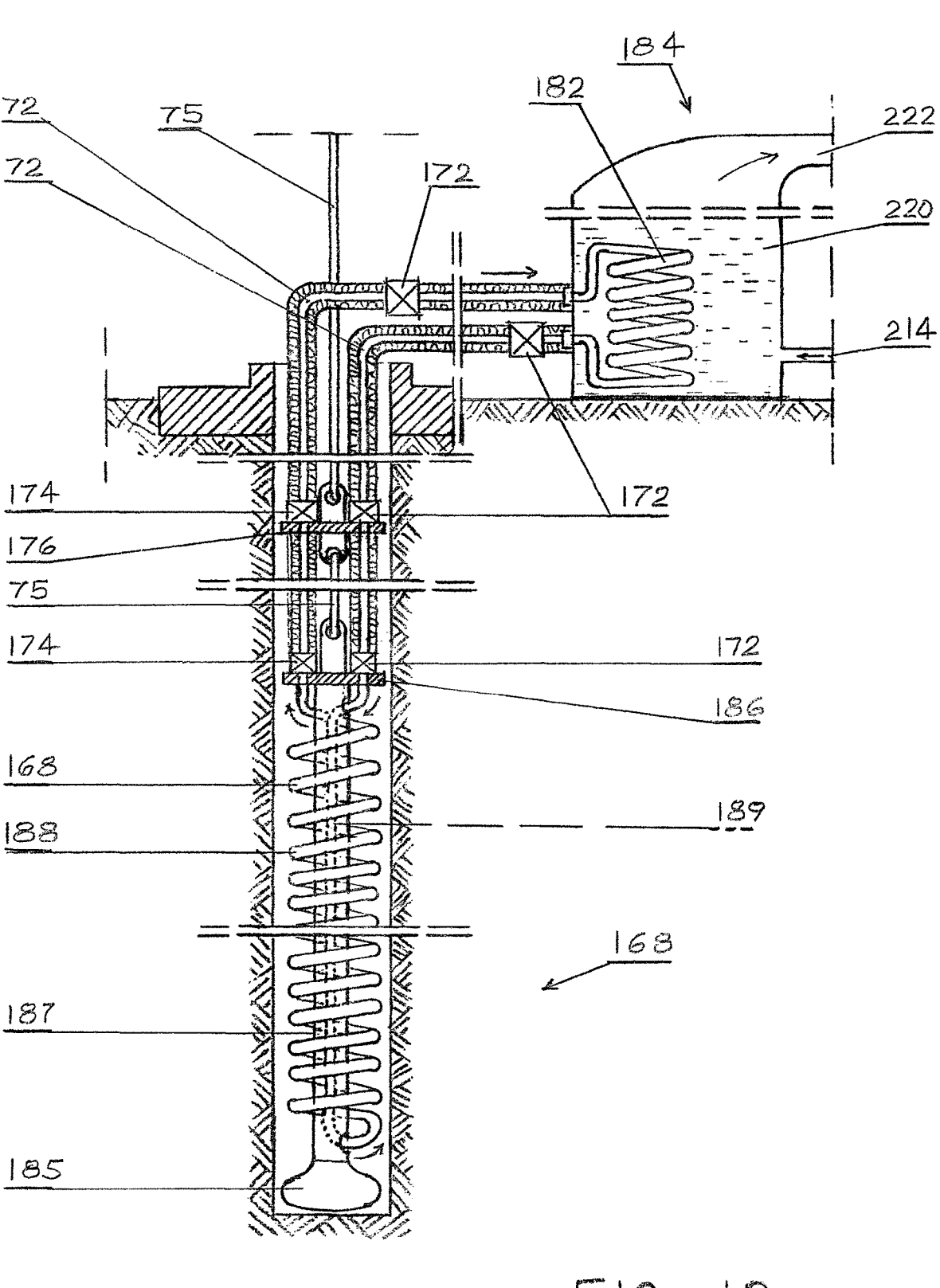
FIG. 13 is a schematic diagram of a cross-sectional view of an alternative independent heat exchange system, with main segments including a close loop line, one heat exchanger deep in the ground and one on the ground surface, in accordance with the invention.

As an alternative solution; peripheral chamber 68 of the condenser 160 can be supplied and cooled with an additional independent coiled metal pipe (heat exchanger) and close loop system similar to one shown in FIG. 13.

The peripheral wall of boiler 120 can have indentations to increase conductive surface and to increase conductivity of heat to the water inside boiler (For simplicity not shown).

The boiler 120 is filled with water, after whole assembly of the self-contained in-ground geothermal generator 100 is lowered to the bottom of the well, through set of tubes 121, to reduce weight of assembly during lowering process. Illustrated are two tubes 121 attached to the unit-one to supply water into boiler 120 and other to let air escape during filling process. Also, important purpose of the tubes 121 is to supply, maintain and regulate necessary level of water in boiler 120.

All main elements of the assembly 100; the boiler 120, the turbine compartment 130, the gear box, or converter 140, the electric generator 150, and the condenser/distributor 160, can be assembled during lowering process by fusing multi sections of same kind to the desired length and capacity. The fusing process can be bolting or welding.

There is a set of protruded holding pins 66 on each assembly segment so it can be carried with set of separate peripheral cables 74 to reduce tension on main cable 75 during lowering or lifting the assembly.

The condenser 68, which is formed between structural external 90 and structural internal 80 cylinders, which surrounds and cools whole unit, except boiler 120, is insulated from external heat of hot rocks with layer of heat resistant insulation 92.

The boiler 120 has a safety check valve 126 to release steam, if needed, in emergency such as if control valves malfunction, etc.

The purpose of gear box or converter 140, which is located between turbines 130 and the electric generator 150, is to neutralize momentum produced by the spinning turbines 33 by changing the direction of the rotor 54 of the generator 150. Thus the rotor 54 of the generator 150 spins in the opposite direction than the main turbines 33. If needed, several gear boxes or converters 140 can be installed into generator compartment to neutralize or balance momentum produced by the spinning turbines and generators.

Referring now to FIG. 5-8, the upper end of turbines shaft 34 is solidly connected with disk/platform 35 which extends to the peripheral cylinder 41 of the gear box 140, with which is secured and engage with system of bearings 42 and gears wheels 43. Gear box is secured to the main structural cylinder 80. Disk/platform 35 has several openings 36 for steam to leave turbines compartment. Disk/platform 35 also extends upwardly in shape of funnel 39 for steam to be funneled into cylindrical shaft 52 of the electric generator 150. The cylindrical shaft 52 of rotor 54 also functions as a secondary turbine. It has a secondary set of small blades 58 attached to the inside wall and positioned so to increase rotation of the rotor when steam passes through.

Disk/platform 35 is engaged with upper disc/platform 37 through set of gear wheels 43, which are secured with peripheral cylinder 41 of the gear box 140 with their axles/pins 44. The upper disk/platform 37 is also engaged with upper part 38 of the funnel 39 through bearing 46 and with peripheral cylinder 41 of the gear box 140 through bearing 47 and is also solidly connected to cylindrical shaft 52 of the generator 150. Disk/platform 35 and disk/platform 37 have carved grooves 45 which engage and correspond with gear wheels 43.

FIG. 3, is a cross sectional view of condenser/distributor 160 along line 3-3' of FIG. 2. FIG. 3 illustrates the main structural internal cylinder 80, the external structural cylinder 90, the condenser/distributor 61, and the peripheral chamber 68 of the condenser 160 which surrounds the condenser/distributor 61. Here are also shown tubes 62 spread around peripheral chamber 68. Exhausted steam passes through openings 63 which lead to tubes 62 which then return condensed water to the boiler 120. Here is also shown solid disk/platform 94 which separates generator 150 from condenser 160. The upper end of cylindrical shaft 52 is secured and engaged to the disk/platform 94 through bearing 96.

Here is also shown pipe 178 which brings cooled water at the bottom of the peripheral chamber 68. Also shown here are boiler supply tubes 121 for filling boiler with water after assembly is lowered down into well. Also shown here are structural ribs 85 between internal and external cylinders to improve structural integrity of the assembly in high pressure environment. Here are also shown protruded holding pins 66 for caring each segment of the assembly with set of peripheral cables 74 to reduce tension on main cable 75 during lowering or lifting the assembly. (Caring cables not shown).

Here is also shown electrical conduit 77 which transport electricity from generator 150 up to the ground surface and further to the power lines. Also shown here is heat resistant insulation 92 which surrounds the whole assembly except boiler 120.

FIG. 4, is a cross sectional view of the electric generator 150 along line 4-4' of FIG. 2. FIG. 4 also illustrate main structural internal cylinder 80, external structural cylinder 90, the peripheral chamber 68 of the condenser 160 with tubes 62 spread around the peripheral chamber 68. Here is also illustrated cylindrical shaft 52, rotor 54 of the electric generator 150 which is fix to the shaft 52, and stator 56 of the electric generator 150 which is fix to the main internal structural cylinder 80. Here are also shown protruded holding pins 66 for caring each segment but offset relative to adjacent segment so that peripheral cables 74 can be spread all around periphery of the assembly. Also shown here are structural ribs 85 with perforations 87, the electrical conduit 77, boiler supply tubes 121, the pipe 178 and insulation 92.

Figure 9:
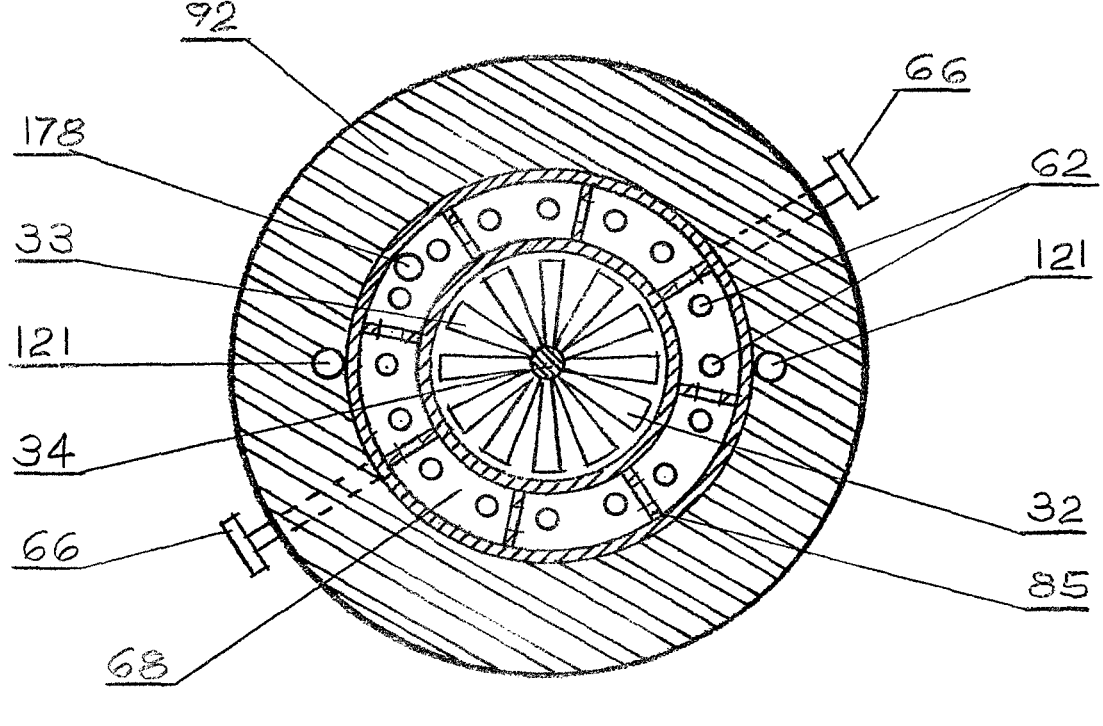
FIG. 9 is a cross-sectional view of the condenser and the turbines along line 9-9' of FIG. 2, in accordance with the invention.

FIG. 9 is cross sectional view of the condenser and the turbines along line 9-9' of FIG. 2.

FIG. 9 also illustrates the main structural internal cylinder 80, external structural cylinder 90, the peripheral chamber 68 of the condenser 160 with tubes 62 spread around the peripheral chamber 68. Also shown here are structural ribs 85 with perforations 87.

Here are also illustrated solid turbines shaft 34 with blades 32, boiler supply tubes 121, the pipe 178, and insulation 92. Here are also shown protruded holding pins 66 for caring each segment but offset relative to adjacent segment.

Figure 10:
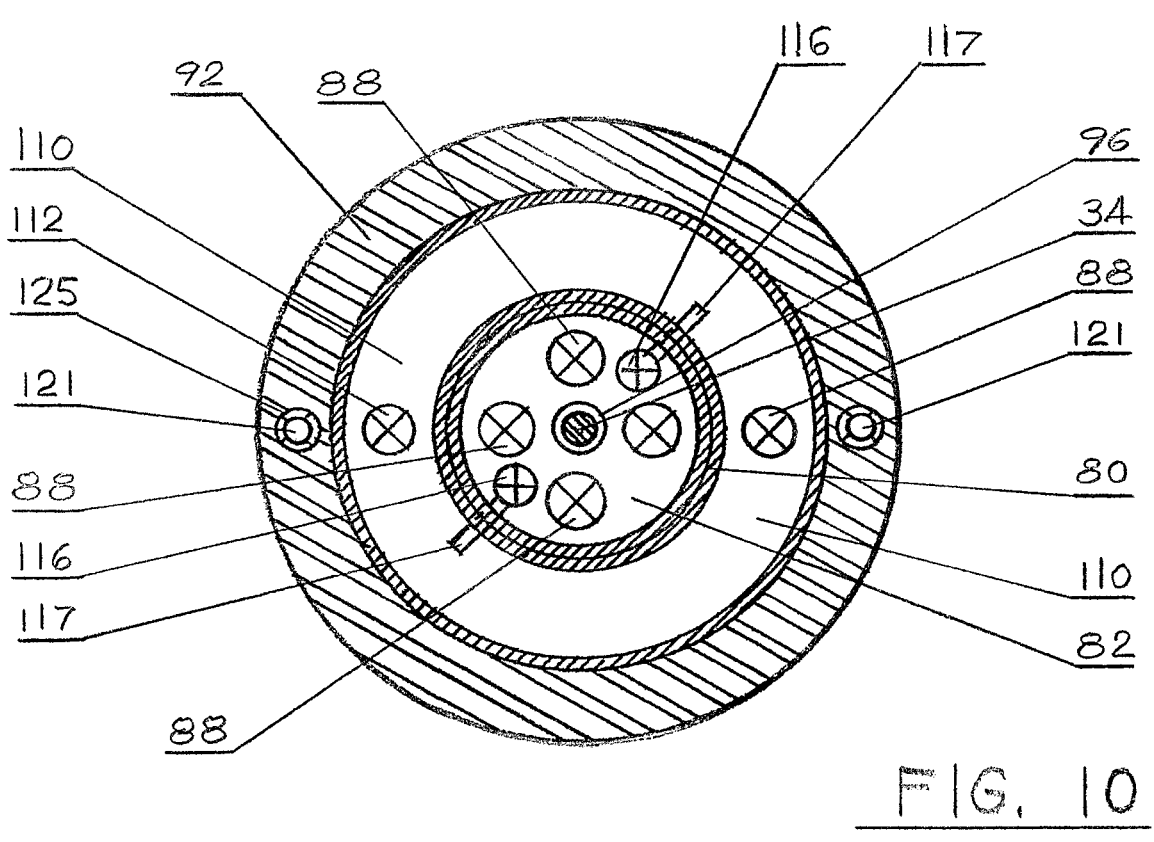
FIG. 10 is a cross-sectional view of the feed water storage tank and turbines along line 10-10' of FIG. 2, in accordance with the invention.

FIG. 10 is cross sectional view of the feed water storage tank and turbines along line 10-10' of FIG. 2. FIG. 10 also illustrates the main structural internal cylinder 80 and extended external structural cylinder 90 which, at this location, form the feed water storage tank 110. Here are also shown the boiler feed pumps 112 located in the feed water storage tank 110 which inject feed water into boiler 120. Also shown here are steam control valves 88 which control flow of steam into turbines 33. Here are also shown water pumps 116 located on the disc/platform 82 at the bottom of the turbines compartment 130. The purpose of water pumps 116 is to remove excess water, if accumulated at the bottom of turbines compartment 130, and to eject it into feed water storage tank 110 through pipes 117. (For clarity and simplicity, the pumps 116 are not shown in FIG. 2). Also shown here are water pumps/valves 125 and tube 121 which supply, maintain and regulate necessary levels of water in boiler 120. Here is also shown the solid shaft 34 of the turbines 33 with set of bearings 84 and 96 on which the shaft 34 sits and is secured on the disc/platform 82. Also shown is the insulation 92.

Figure 11:
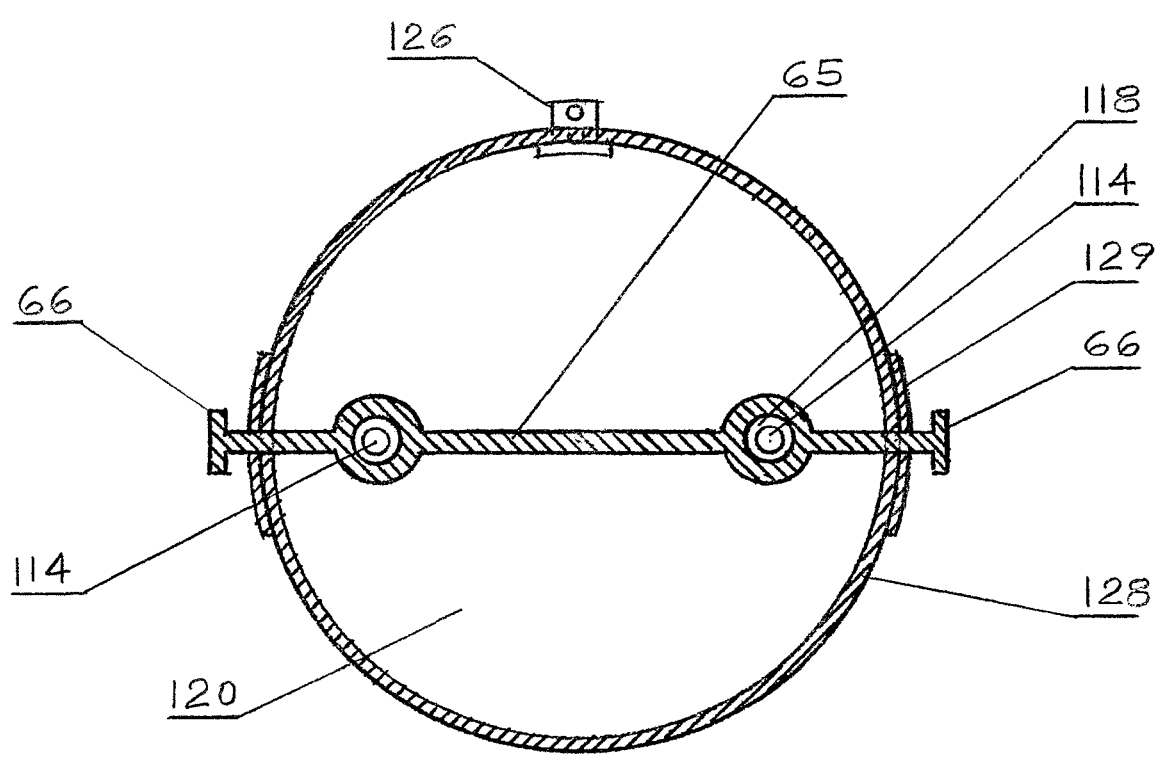
FIG. 11 is a cross-sectional view of the boiler along line 11-11' of FIG. 2, in accordance with the invention.

FIG. 11 is cross sectional view of the boiler 120 along line 11-11' of FIG. 2. Here is illustrated peripheral wall/cylinder 128 of the boiler 120. Also shown here are protruded holding pins 66 for caring each segment of the assembly with set of peripheral cables as explained earlier. Here holding pins 66 are shown as extensions of the rod 65. Rod 65 has openings 118 for guiding feed pipe 114 to the lower part 122 of the boiler 120.

Also here is shown safety release valve 126 and reinforcing plates 129.

FIG. 12 is a schematic diagram of cross-sectional view of the self-contained in-ground geothermal generator, with main segments including heat exchanger on the ground surface. The self-contained in-ground geothermal generator (SCI-GGG) uses three closed loop systems. The first closed loop system circulates working fluid through boiler, turbine, generator, condenser and back through boiler. The second closed loop system (self-contained heat exchanger) circulates fluid through condenser, thermally insulated pipes and coil coupled to binary power unit on the ground surface. The self-contained heat exchanger (SCHE) is an integral part of the SCI-GGG apparatus and can be used separately as an independent hat exchanger. The third closed loop system circulates working fluid through binary power unit on the ground surface and produces additional electricity. FIG. 12 illustrates the boiler 120, the turbines 130, the gear box 140, the electric generator 150, and the condenser 160. Here is also shown peripheral chamber 68 of the condenser 160 which function as a heat exchanger by cooling tubes 62 which are spread within. (For simplicity and clarity tubes 62 are not shown here). Here is also shown coil tube 182 which exchanges heat in a heat exchanger 184 up on the ground surface, which is part of the binary geothermal power plant 180, which is explained in FIG. 14. The peripheral chamber 68 of the condenser 160, which function as a heat exchanger down in the unite and coiled pipe 182, which exchanges heat in a heat exchanger 184 up on the ground surface are connected with close loop flexible tubes 72 which are thermally insolated to prevent lousing heat during fluid transport between heat exchangers. Here are also illustrated several water pumps 172 and 174 which circulate water through close loop system. An alternative in-line pump is later explained and illustrated in FIGS. 22 and 23. Also here is shown cable connector platform 176 which connects segments of tubes and cables. Also here is shown main cable 75, and insulation layer 92.

FIG. 13 is a schematic diagram of cross-sectional view of an alternative, independent, self-contained heat exchange system. The self-contained heat exchanger (SCHE) apparatus is integral part of the self-contained in-ground geothermal generator (SCI-GGG) apparatus (illustrated in FIG. 12) and is used separately as an independent heat exchanger. Here in FIG. 13 is illustrated the self-contained heat exchanger (SCHE) apparatus with two closed loop systems. The main segments of first closed loop system include; a close loop tube, first heat exchanger 168 deep in the ground at heat source and second heat exchanger 182 up on the ground surface which is part of the second closed loop system which is binary power unit 184. The second closed loop system circulates working fluid through binary power unit on the ground surface and produces additional electricity. The main segments of second closed loop system include; a boiler, a turbine, a generator and condenser (illustrated in FIG. 14). Here in FIG. 13 are illustrated the same elements of the cooling system shown in FIG. 12, namely; one heat exchanger deep in the ground at heat source and one up on the ground surface and one close loop thermally insulated tube with several in-line water pumps which circulates water through close loop system.

In this embodiment, instead of peripheral chamber 68 which functions as a heat exchanger, a coiled pipe 188 is used which functions as a first heat exchanger 168. The heat exchanger 168 consists of; the strait pipe 189, the coiled pipe 188, the structural pipe 187 and the platform 186. The structural pipe 187 which provide strength to the unit is attached to the platform 186. The structural pipe 187 has one opening at the bottom for strait pipe 189 to exit and one opening at top for strait tube 189 to enter. The structural pipe 187, which prevent coiled pipe 188 from collapsing from its weight, may have more perforations if necessary to reduce its weight and to provide more heat to the strait pipe 189. The spacers which keep distances between coils in coiled pipe 188 and structural pipe 187 are not illustrated. Here is also shown base 185 of structural pipe 187 on which whole assembly rest. Alternatively, structural pipe 187 can be adapted to perform the function of the strait pipe 189.

The coiled pipe 188 which functions as first heat exchanger 168 down in the ground and coiled pipe 182 which functions as second heat exchanger 184 up on the ground surface are connected with close loop tube 72. Here are also illustrated several in-line water pumps 172 and 174 which circulate water through close loop system. The heat from hot rocks deep in the well is absorbed through first heat exchanger 168 and transported with thermally insulated pipe 72 up to the ground surface to the second heat exchanger 184 where its heat is transferred into a binary power unit which uses working fluids, such as isopentane, that boils at a lower temperature than water. The heat exchanger 184 is part of the binary geothermal power plant 180, which is explained in FIG. 14.

Also, here is shown cable connector platform 176 which connects segments of tubes 72 and cable 75. Connector platform 176 or a plurality of platforms 176 may also function as a barrier(s) or a plug(s) to reduce the amount of heat escaping from the well bore.

The heat exchange system explained here in FIG. 13. is an alternative cooling system for a self-contained in-ground geothermal generator can also function as an alternative, independent, heat exchange system, which would be substantial improvement to experimental process so called "hot dry rock technology".

The simplest "hot dry rock technology" power plant comprises one injection well and two production wells. Scientist are trying to drill down injection well into the rocks and then inject down into well, under pressure, whatever water source they have happen to have on the surface hoping that water will travel through cracks and fissures of the hot rocks and form underground reservoir, and then they intend to drill production wells around perimeter and try to recover that water and steam by pumping it back to surface and then use it in a conventional or in a "binary" power plant.

Binary plants use lower-temperature, but much more common, hot water resources (100° F.-300° F.). The hot water is passed through a heat exchanger in conjunction with a secondary (hence, "binary plant") fluid with a lower boiling point (usually a hydrocarbon such as isobutane or isopentane). The secondary fluid vaporizes, which turns the turbines, which drive the generators. The remaining secondary fluid is simply recycled through the heat exchanger. The geothermal fluid is condensed and returned to the reservoir.

It remains to be seen if presently experimental "hot dry rock technology" can function as expected and answer special challenges:

1. It requires a huge amount of water to form, deep down, man made, hydrothermal reservoir in a place where water has not been naturally accumulated.
2. Would a huge amount of water be lost, absorbed into rocks in different directions?
3. How much of water, if any, could reach production well through cracks and fissures in the hot rocks?
4. How much water, if any can be recovered and pumped back on ground surface to be used in a conventional or in a "binary" power plant?
5. Also, during pumping up water to the surface through production well water will pass through layers of gradually less hot rocks and eventually through cold rocks close to the surface-how much of the heat will be lost and how much of water will be lost-absorbed into rocks during trip up?
6. There is strong indications that experimental Enhanced Geothermal System (EGS) can induce seismicity because injected water can find underground pockets (caves) and with high pressure and temperature can induce explosion.

The heat exchange system explained here in FIG. 13 is a simple system which uses the same amount of water all the time because it is literally close loop system, not just binary part on the ground surface but also part down in the ground. It doesn't deal with removing silica and minerals in a separator from the geothermal fluid.

It doesn't lose water into cracks and fissures of the hot rocks because water circulates through coiled pipe and houses. The loss of heat on the trip up is limited because pipes are thermally insolated. It doesn't require several wells to function (injection well and several production wells) it rather uses single well for each unit. The heat exchange system explained herein in FIG. 13 as well the apparatus explained in FIG. 12 can operate, not just in dry hot rocks areas but also, in areas with hydrothermal reservoirs and many other applications including cooling dysfunctional nuclear reactors or in reverse process warming surroundings if needed.

Figures 14, 15:
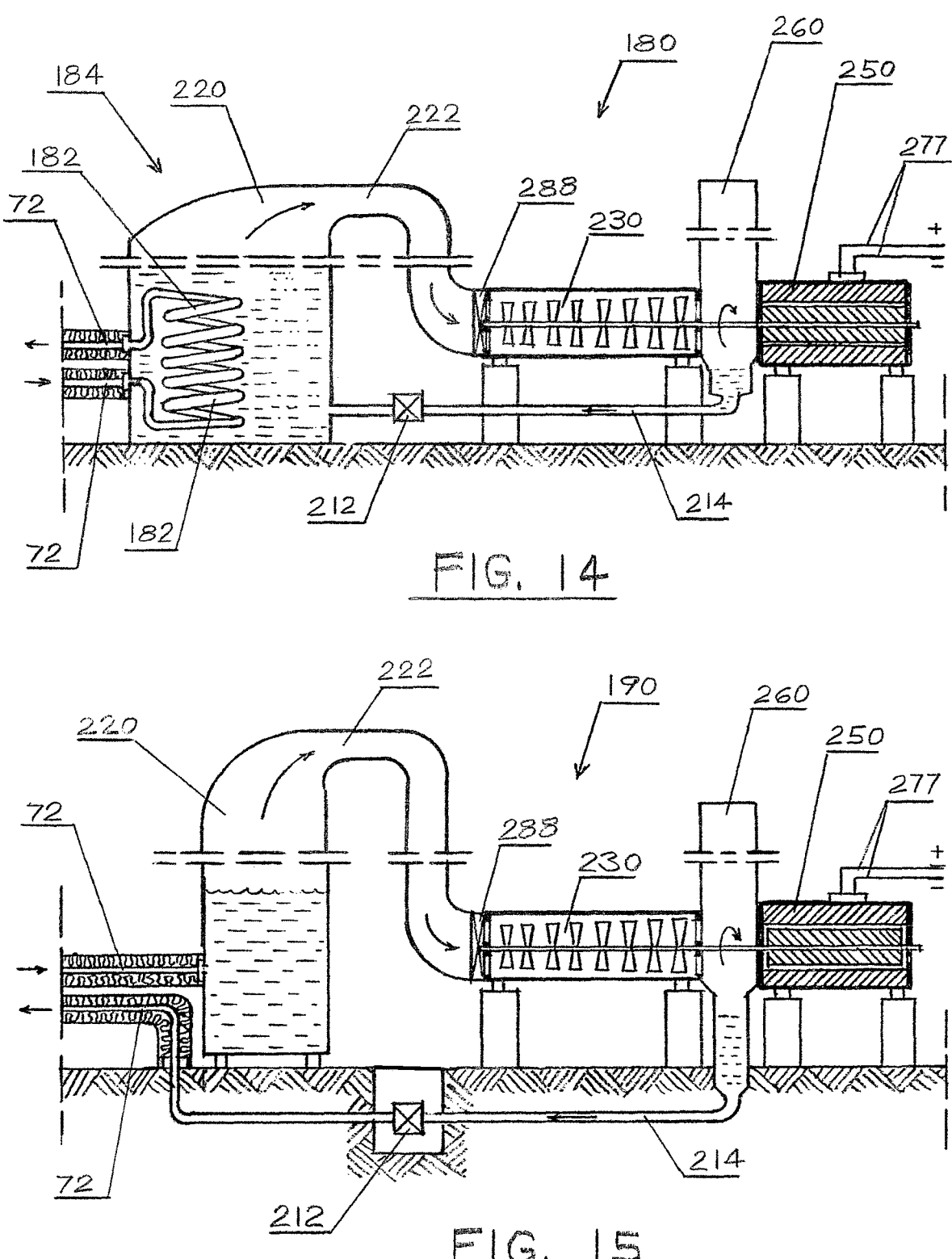
FIG. 14 is a schematic diagram of a cross-sectional view of the binary geothermal power plant on the ground surface, in accordance with the invention.
FIG. 15 is a schematic diagram of a cross-sectional view of an alternative geothermal power plant on the ground surface, in accordance with the invention.

FIG. 14 is a schematic diagram of cross sectional view of the binary geothermal power plant 180. Here are illustrated; the heat exchanger 184, the turbines 230, the condenser 260 and electric generator 250. Hot water from deep underground passes through close loop flexible tube 72 into coil 182 inside heat exchanger 184 where its heat is transferred into a second (binary) liquid, such as isopentane, that boils at a lower temperature than water. When heated, the binary liquid flashes to vapor, which, like steam, expands across, passes through steam pipe 222 and control valve 288 and then spins the turbine 230. Exhausted vapor is then condensed to a liquid in the condenser 260 and then is pumped back into boiler 220 through feed pipe 214 and boiler feed pump 212. In this closed loop cycle, vapor is reused repeatedly and there are no emissions to the air. The shaft of the turbines 230 is connected with shaft of the electric generator 250 which spins and produces electricity, which is then transported through electric cable 277 to transformer and grid line to the users. (Transformer and grid line are not illustrated). The binary power unit 180 can be produced as portable unit on wheels (on chase of truck 18 wheeler). The condenser 260 is elongated to reduce back pressure which exists after steam passes through turbine compartment 230. The length of the condenser 260 can be increased if needed.

FIG. 15 is a schematic diagram of cross sectional view of a geothermal power plant 190 (not a binary power plant), as an alternative solution for cases where water coming from tube 72 is hot enough to produce steam. (It may be applicable in an alternative, independent, heat exchange system shown in FIG. 13). Here are illustrated; the boiler 220, the turbines 230, the condenser 260 and electric generator 250. Hot water from deep underground passes through close loop tube 72 into boiler 220 where evaporates. The steam then passes through steam pipe 222 and control valve 288 and then spins the turbine 230. Exhausted vapor is then condensed to a liquid in the condenser 260, which can be air or water cooled, and then is pumped back into close loop tube 72 which leads into well as explain earlier. Here is also shown feed pipe 214 and water pump 212 which are part of close loop system. Here is also shown shaft of the turbines 230 which is connected with shaft of the electric generator

250 which spins and produces electricity. Electricity is then transported through electric cable 277 to transformer and grid line to the users. (Transformer and grid line are not illustrated).

Figure 16:
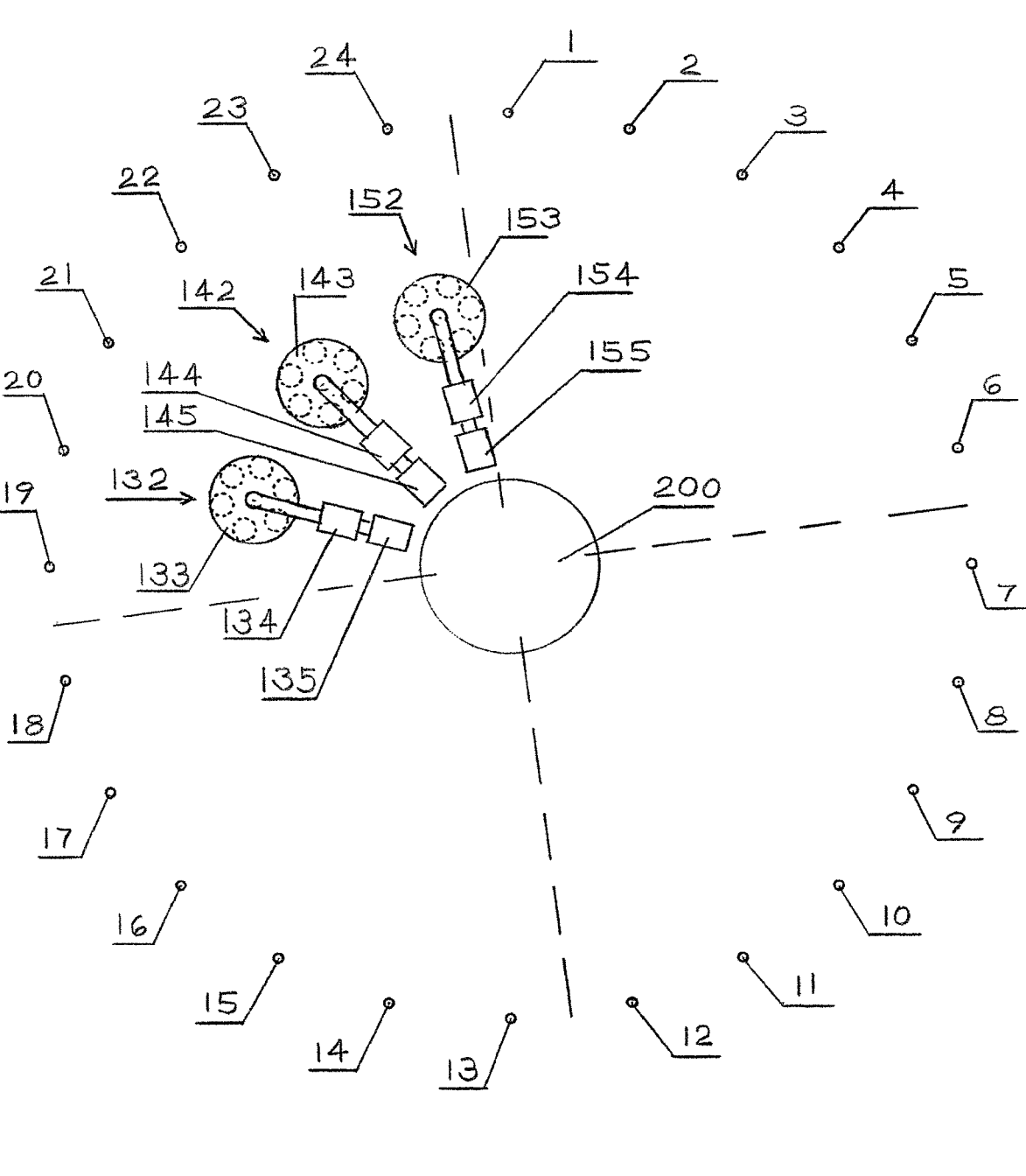
FIG. 16 is a plain view of the geothermal power plant with 24 wells and control center. For clarity and simplicity, is shown schematic diagram only of one quarter of the plant (6 wells), in accordance with the invention.
Figure 17:
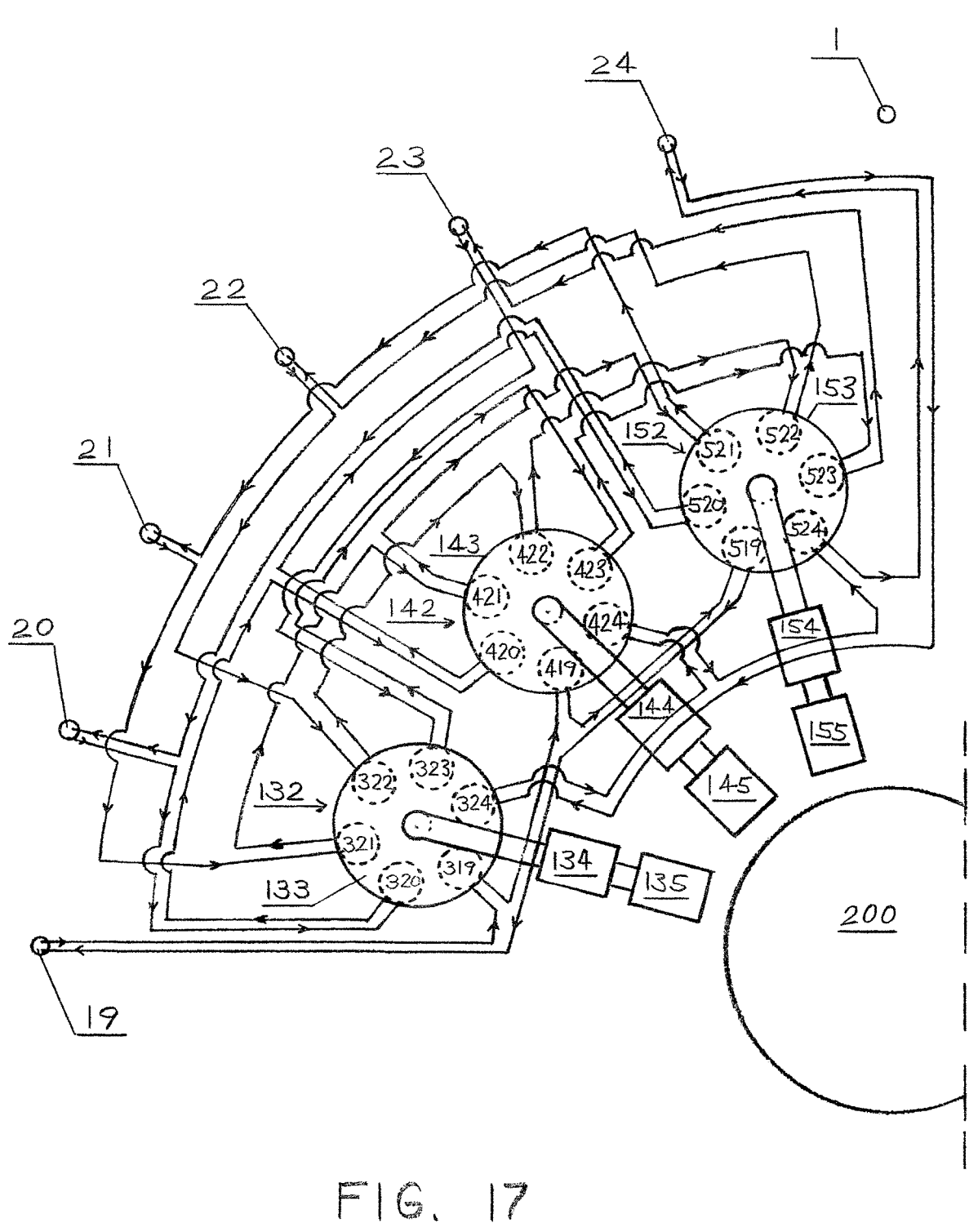
FIG. 17 is enlarged schematic diagram of the one section of the geothermal power plant shown in FIG. 16 in accordance with the invention.

FIGS. 16 and 17 illustrate plain view of the geothermal power plant 300 with 24 wells and control center 200 in accordance with the invention. For clarity and simplicity, here is shown schematic diagram only of one quarter of the plant, 6 wells 19-24, and three binary power units 132, 142 and 152. The other three quarters of the power plant are identical.

As explained earlier the cooling system of the self-contained in-ground geothermal generator 100, is a close loop tube system which cools condenser by circulating water through the peripheral chamber 68 of the condenser 160, formed between external and internal cylinders 90 and 80, and then transfers the heat up on ground surface. The heat on the ground surface is then used to produce additional electricity in a "binary" power plant through system of several heat exchangers and then returned as cooled water to the relevant peripheral chamber 68 of the condenser 160.

Here are illustrated three "binary" power units 132, 142 and 152 which are connected with six self-contained in-ground geothermal generators inside wells 19-24.

Each of those three binary power units 132, 142 and 152 consist of: the boilers 133, 143 and 153, the turbines 134, 144 and 154 and the electric generators 135, 145 and 155.

The boiler 133 of the binary production unit 132 has six heat exchange coils 319, 320, 321, 322, 323 and 324, which are connected to the condensers 160 of the relevant self-contained in-ground geothermal generators, inside wells 19, 20, 21, 22, 23 and 24 with one end of the tube of close loop system.

Before other end of the tube of close loop system reaches the condensers 160 of the relevant self-contained in-ground geothermal generators inside wells 19, 20, 21, 22, 23 and 24 and complete close loop cycle, it also passes through boilers 143 and 153 of the binary production units 142 and 152. The purpose of it is to exchange heat and use it on the ground surface in the binary production units as much as possible and to send back cooled water to the condensers 160. For clarity and simplicity, any radiant tubing is not shown and directions of the flow through line are marked with arrow sign.

The boiler 143 of the binary production unit 142 has also six heat exchange coils 419, 420, 421, 422, 423 and 424.

The boiler 153 of the binary production unit 152 has also six heat exchange coils 519, 520, 521, 522, 523 and 524.

The boiler 133 of the binary production unit 132 produces the hottest steam because it is the first station where heat is exchanged through coils 319, 320, 321, 322, 323 and 324.

The boiler 143 of the binary production unit 142 is the second station where heat is exchanged through coils 419, 420, 421, 422, 423 and 424, and steam temperature is lesser than in boiler 133.

The boiler 153 of the binary production unit 152 is the third station where heat is exchanged through coils 519, 520, 521, 522, 523 and 524, and steam temperature is lesser than in boiler 143.

The binary power units 132, 142 and 152 are designed to operate at different steam temperature and presser.

As an alternative solution; the steam from boilers 133, 143 and 153, which deal with different temperature and pressure, can be funneled to a single binary power unit with single turbine and generator.

As an alternative solution; after leaving coils 519, 520, 521, 522, 523 and 524 of the binary production unit 152, if water is still hot, the tube 72 can be cooled with running water, if available, or can be used for heating building.

FIG. 17 is enlarged schematic diagram of the one section of the geothermal power plant 300 shown in FIG. 16.

Figures 18, 19:
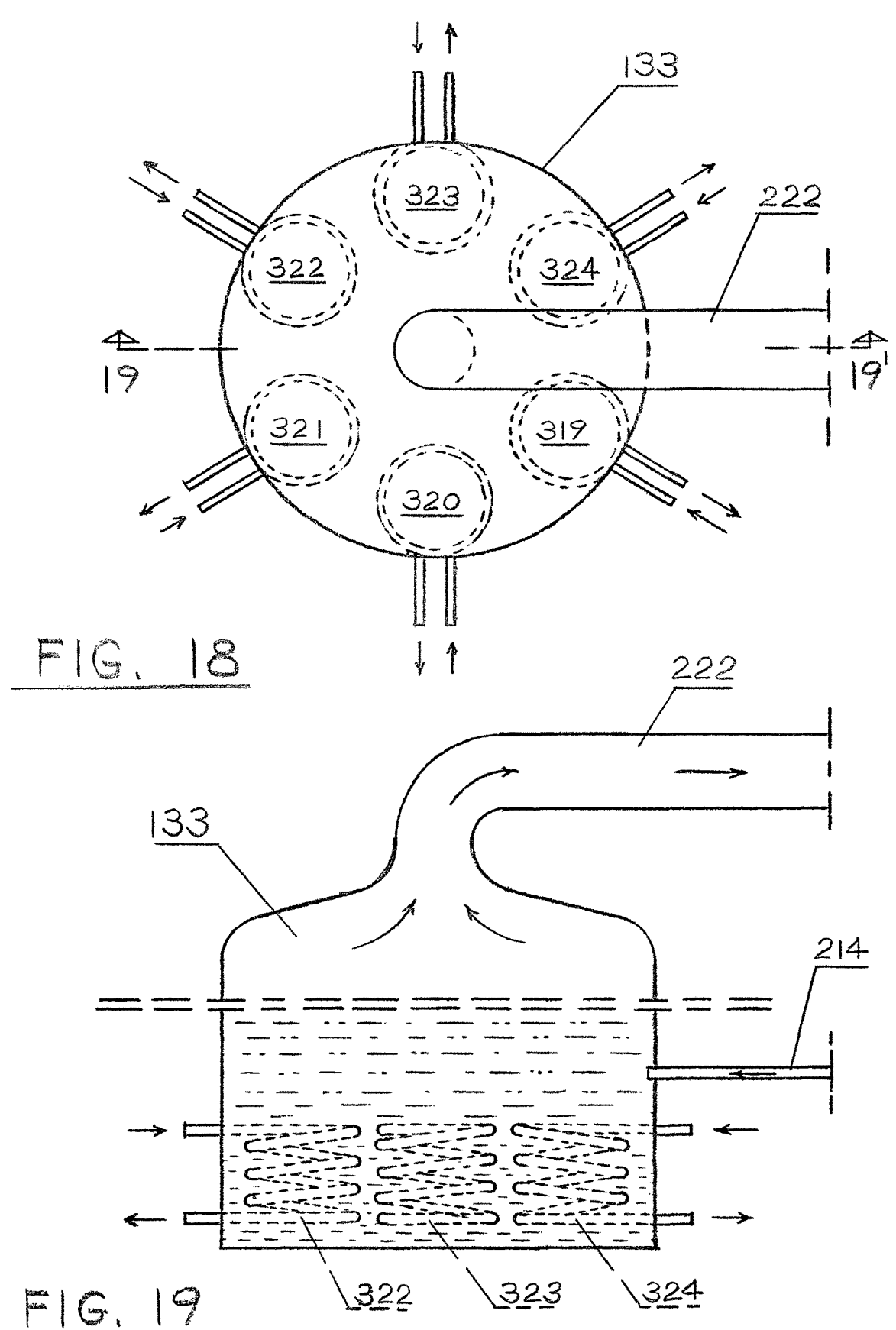
FIG. 18 is an enlarged plain view of one heat exchanger tank illustrated in FIGS. 16 and 17, in accordance with the invention.
FIG. 19 is an enlarged cross-sectional view of the heat exchanger tank taken along line 19-19' of FIG. 18, in accordance with the invention.

FIG. 18 is enlarged plain view of the boiler 133 of the binary production unit 132 illustrated in FIGS. 16 and 17. Here are shown heat exchange coils 319, 320, 321, 322, 323, 324 and main steam pipe 222.

FIG. 19 is an enlarged cross sectional view of the boiler 133 of the binary production unit 132 taken along line 19-19' of FIG. 18. Here are also shown heat exchange coils 322, 323, and 324 from which its heat is transferred into a second (binary) liquid, such as isopentane, that boils at a lower temperature than water. When heated, the binary liquid flashes to vapor, which, like steam, expands across, passes through steam pipe 222. (The process is explained in binary power plant earlier in FIG. 14). Here is also shown feed pipe 214 through which exhausted vapor are returned into boiler 133 for reheating.

Figure 20:
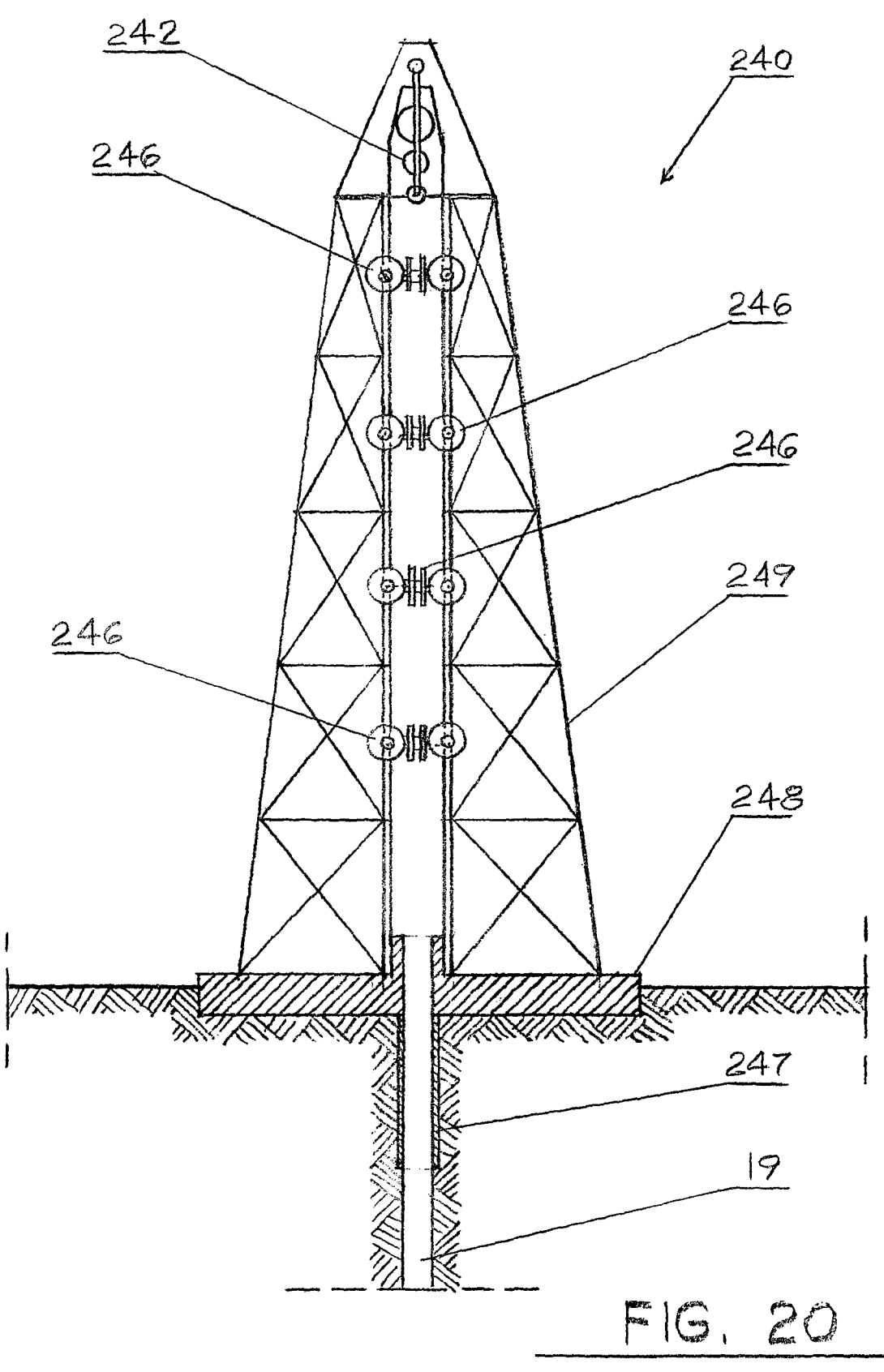
FIG. 20 illustrates a cross-sectional view of an alternative tower for assembling, lowering or lifting the self-contained in-ground geothermal generator, in accordance with the invention.

FIG. 20 illustrate a cross sectional view of an alternative tower 240 for assembling, lowering or lifting the self-contained in-ground geothermal generator 100. Here are shown structural frame 249 of the tower 240. Also shown here are well 19, lining of the well 247, foundation platform 248, and system of ratchets 242 and 246 for main cable 75 and peripheral cables 74. (Cables are not shown).

Figure 21:
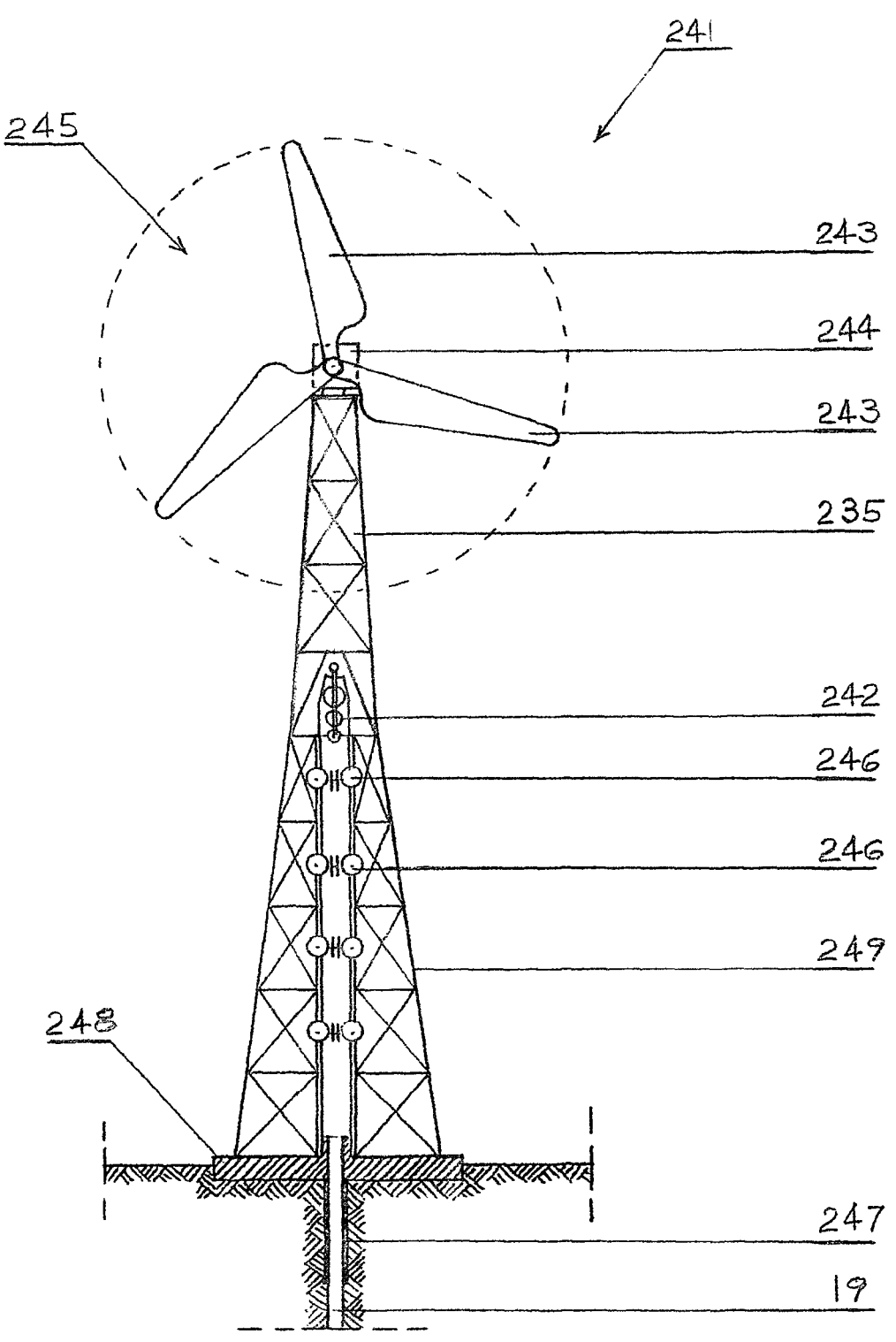
FIG. 21 illustrates a cross-sectional view of an alternative tower for assembling, lowering or lifting the self-contained in-ground geothermal generator, with windmill installed on it, in accordance with the invention.

FIG. 21 illustrate a cross sectional view of an alternative tower 241 for assembling, lowering or lifting the self-contained in-ground geothermal generator 100, with wind mill 245 installed on it, as an additional source of energy if geothermal power plant is located in windy area. The tower 241 is similar as tower 240 illustrated in FIG. 20 with addition of extension element 235. Here are also shown structural frame 249, well 19, lining of the well 247, foundation platform 248, and system of ratchets 242 and 246 for main cable 75 and peripheral cables 74. (Cables are not shown). Also illustrated here are conventional generator with gear box 244 and blades 243. The objective of this addition is to use assembling tower also as a platform for wind mill. It will be understood that the tower 241 may be permanent or temporary.

Figure 22:
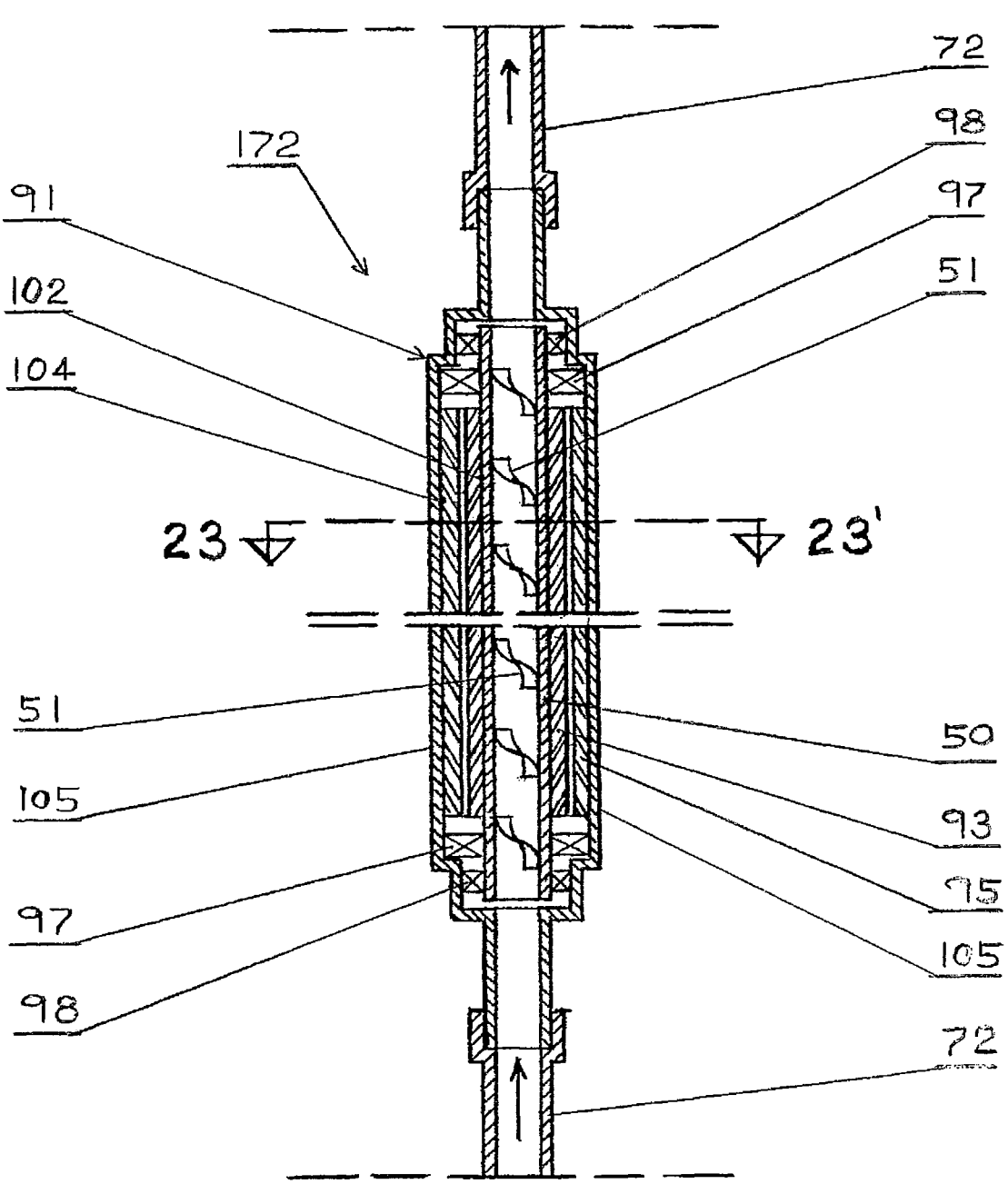
FIG. 22 is a cross sectional view taken along line 22-22' of FIG. 23 of an in-line pump in accordance with the invention.
Figure 23:
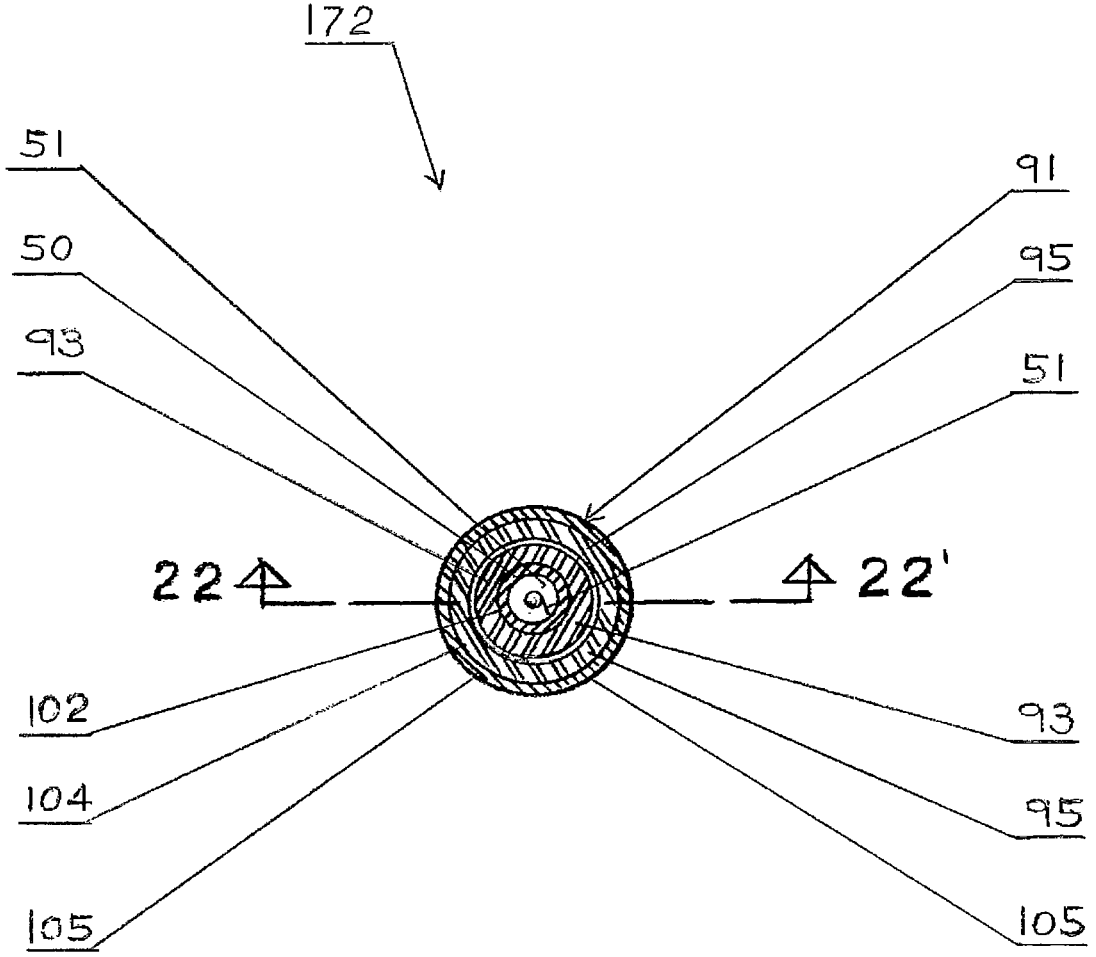
FIG. 23 is a cross-sectional view taken along line 23-23' of FIG. 22 of an in-line pump in accordance with the invention.

FIGS. 22 and 23 show an in-line pump 172 which is part of the heat exchange systems of the apparatuses illustrated in FIGS. 12 and 13. The in-line pump 172 also illustrated (numbered) as 174 is a replaceable segment in closed loop line 72 of the heat exchange system of the apparatuses illustrated in FIGS. 12 and 13. In-line pump 172 is an electric motor 91 consisting of a rotor 102 and a stator 104. The rotor 102 consists of a hollow shaft 50 which is fixedly surrounded with an electromagnetic coil 93. The stator 104 consists of a cylinder 105 which is housing of the motor 91 and is fixedly engaged with electromagnetic coil 95. Stator 104 and rotor 102 are engaged through two sets of ball bearings 97 and additional set of sealant bearings 98. The cylinder 105 of the motor 91 has diameter reduction on each end and is coupled with the connector platform 176 which connects segments of the closed loop line 72. The hollow shaft 50 has continuous spiral blades 51 formed on the inner side of the hollow shaft 50. When electro motor 91 is activated the hollow shaft 50 which is central element of the rotor 102 rotates with the continuous spiral blades 51 which is coupled within the hollow central shaft 50 of the rotor 102 creating a force to move fluid through the closed loop line 72. The spiral blade(s) 51 can also be fixed within the hollow central shaft 50. The shape of the inline pump 172 is cylindrical and slim, thus suitable to fit in limited spaces such as well bore. The slim cylindrical shape of the inline pump 172 has no limitation on length therefore power of the electromotor can be increased to provided substantial pumping force as needed for fluid to circulate at certain speed.

The in-line pump 172 can be used in many applications wherever substantial pumping force is needed. For example with minor additions (not shown) like forming extra space by adding an additional peripheral cylinder filled with oil to provide buoyancy to this in-line pump 172 can be used in deep water drilling as a segment of raiser pipe. Further, the closed loop line 72 may be, but is not limited to, a closed loop system line. Alternatively, the in-line pump 172 can be used for pumping up fluid from a reservoir in which underground pressure is low (geo-pressure). For example the in-line pump 172 can be used for pumping up oil from oil wells (reservoirs) in which underground pressure (geo-pressure) is low, or any other type of fluid from a reservoir, such as, but not limited to, water or natural gas. The in-line pump 172 can be inserted as a repetitive segment of the raiser pipe through which oil is pumped up to the ground surface. The in-line pump can be programmed or equipped with sensors so the pump can be activated when submerged or filled with fluid. The hollow shaft 50 with continuous spiral blades 51 formed on the inner side of the hollow shaft can be produced by aligning and welding pre-machined two halves. Alternatively, the shaft can be produced by aligning and welding prefabricated several segments of spiral blade with section of the wall of the hollow shaft (cylinder). Alternatively, the hollow shaft with continuous spiral blades can be produced by 3D printing technology.

The in-line pump 172 is an electromotor cylindrical shape and can be inserted as a repetitive segment in line and has no limitation on length therefore the power of the electromotor can be increased to impart needed pumping force for fluid to circulate at desired speed. For example the in-line pump 172 can be used in cross country pipe line for oil, gas, water, etc. as a repetitive segment. In downhill route it can function as a generator and produce electricity which can be used to power electromotor In-Line Pump in horizontal and uphill route. At the exit end of the in-line pump 172 can be attached a flapper or ball check valve as short segment to prevent fluid surging backward at vertical and uphill routes when pump stop pumping.

Figure 24:
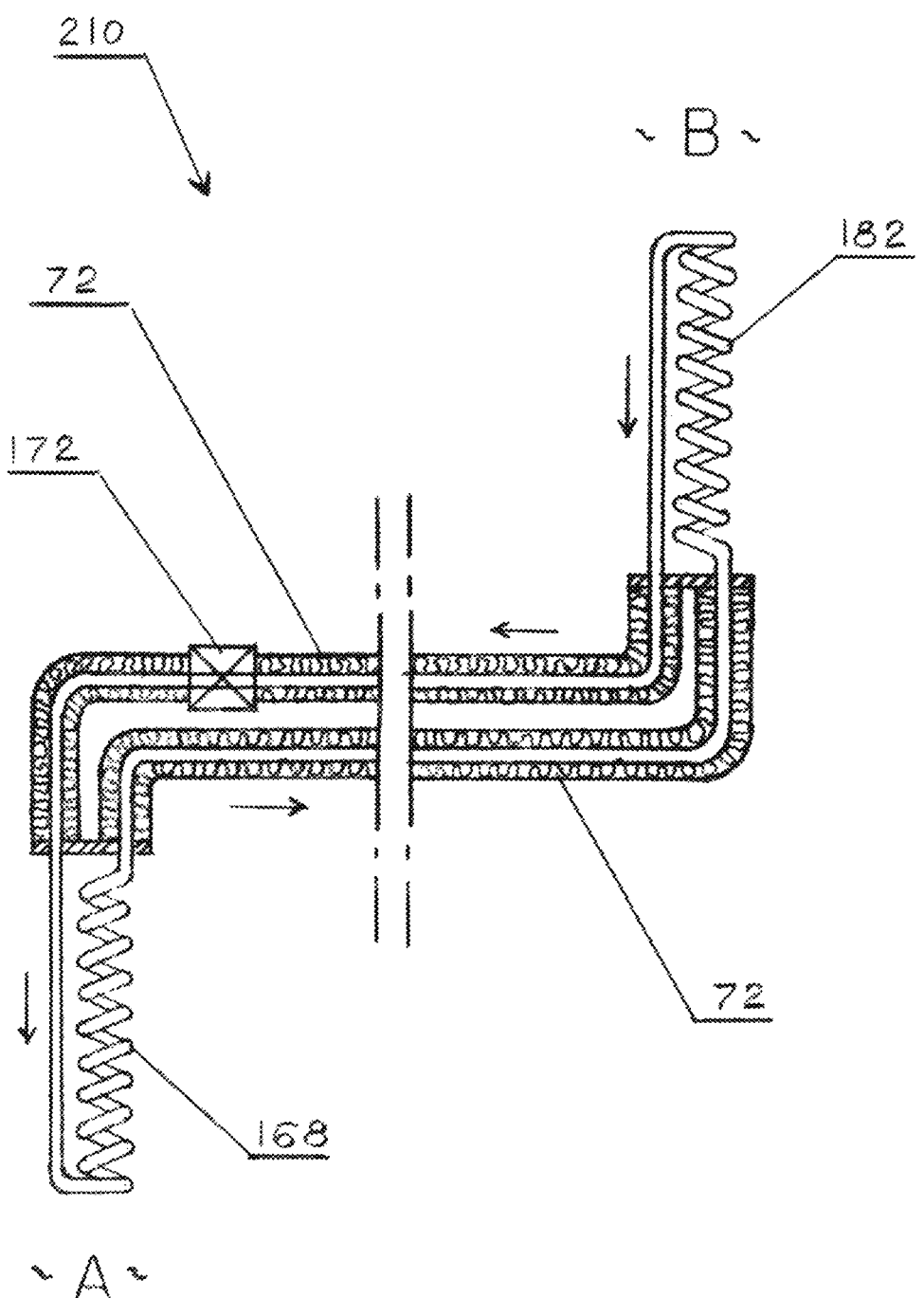
FIG. 24 illustrate an alternative schematic cross-sectional diagram of the heat exchange system shown in FIG. 13, with main segments including a thermally insulated close loop line, one heat exchanger in heat source environment and one in preferred environment, in accordance with the invention.

FIG. 24 illustrate an alternative schematic cross sectional diagram of an universal heat exchange system 210 shown in FIG. 13, with main segments including a thermally insulated close loop line 72 with an in-line pump 172, first heat exchanger 168 positioned in heat source environment "A" and the second heat exchanger 182 positioned in preferred environment "B". By circulating heat exchanging fluid through closed loop system heat is extracted from heat source through the first heat exchanger 168 and transferred through thermally insulated line 72 to the second heat exchanger 182 for external use including production of electricity. The heat exchange system 210 is portable and can be used in many applications. This illustration is only a schematic diagram of the heat exchange system so details such as fluid expansion reservoir and safety valves are not illustrated. The universal heat exchange system 210 can be used in any situation where source of heat is difficult to access or is not suitable for relatively heavy equipment of a power plant or power unit. It is easy to assembly and disassembly. The universal heat exchange system 210 will be shown in several applications in several following illustrations.

The heat exchange system explained here in and FIG. 24 and FIG. 13 is a simple system that can be used for cooling nuclear power plants instead using and circulating water from nearby ponds.

Figure 25:
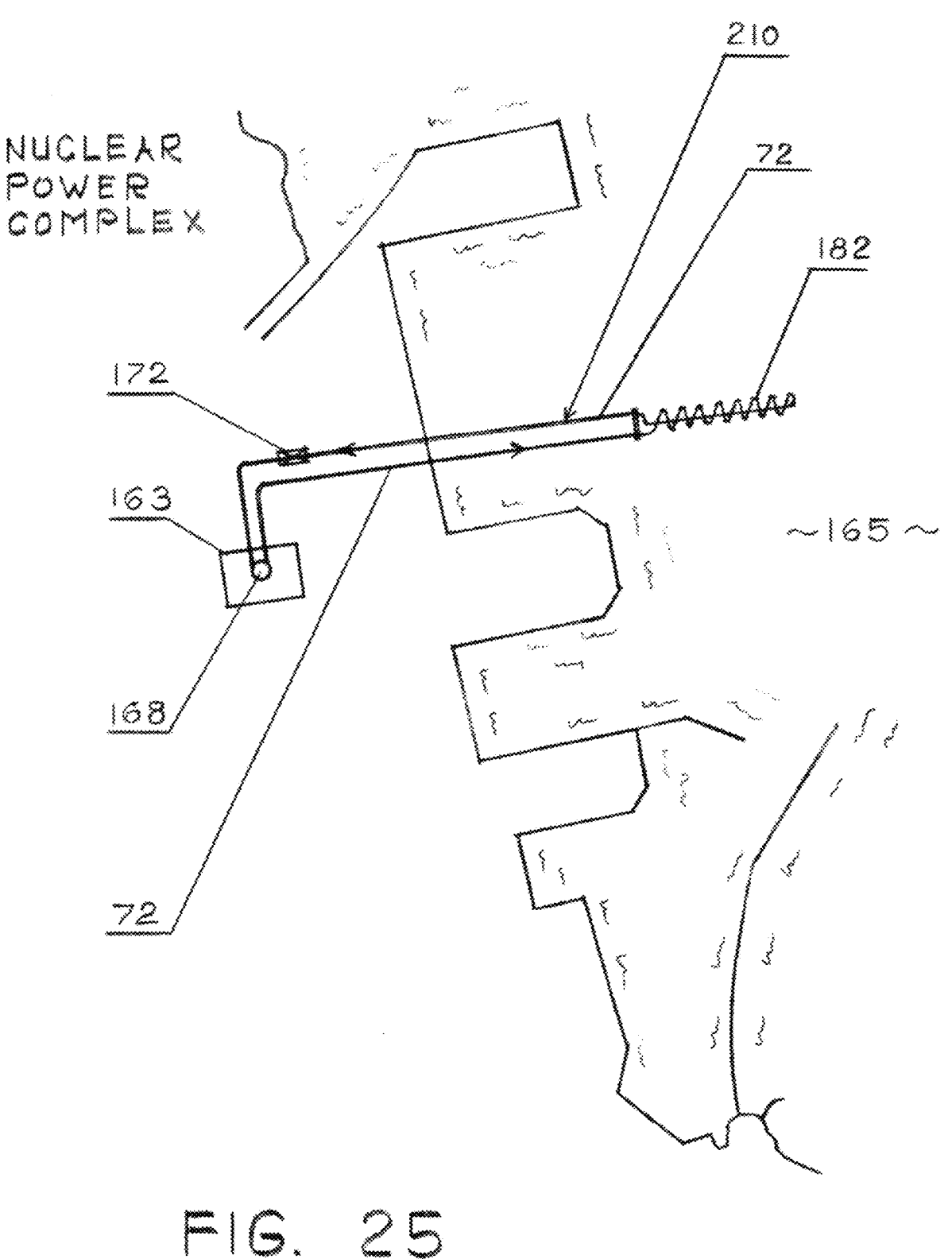
FIG. 25 illustrates a schematic plain view diagram of the heat exchange system shown in FIG. 24 to be used in dysfunctional nuclear power complex in accordance with the invention.
Figure 26:
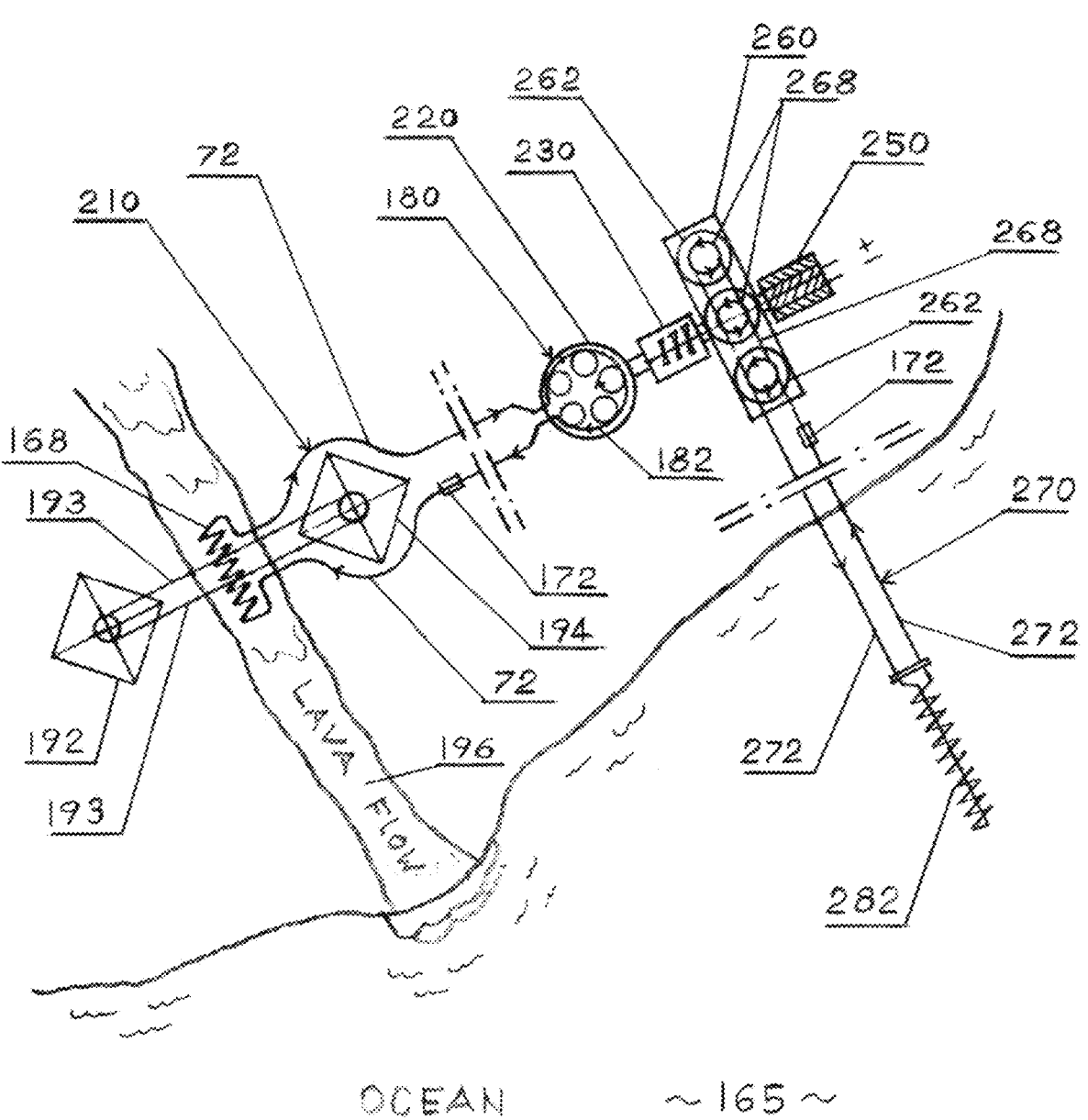
FIG. 26 illustrates a schematic diagram of the heat exchange system shown in FIG. 24 to be used for production of electricity in a location where lava is accessible in accordance with the invention.

FIG. 25 illustrates a schematic plain view diagram of the heat exchange system 210 shown in FIG. 24 to be used in dysfunctional nuclear power complex, such as, but not limited to Fukushima Daiichi Nuclear Power Complex, to improve issues with heat transfer and Ocean contamination. It has been reported these days that dysfunctional nuclear reactor is cooled by pouring salty water from the Ocean over it and then collecting that contaminated radioactive water into reservoirs and repeating the process. Leakage of radioactive water has been detected on the ground and in the Ocean. Here in FIG. 25 is illustrated dysfunctional nuclear reactor 163, Ocean 165 and closed loop heat exchanger system 210. The first heat exchanger 168 is lowered into dysfunctional nuclear reactor 163 and the second heat exchanger 182 is lowered into nearby Ocean 165. By circulating heat exchanging fluid through closed loop system 210 heat is extracted from dysfunctional nuclear reactor 163 and transferred through the first heat exchanger 168 and through thermally insulated line 72, which is formed from repetitive segments, to the second heat exchanger 182 and dispersed safely into the Ocean 165. Multiple units of the closed loop system 210 can be deployed with additional insulations if needed. Heat exchange fluid in closed loop system 210 is not in direct contact with radioactive material in dysfunctional nuclear reactor 163 or the Ocean 165. Although here in FIG. 25 is shown method how to extract heat from dysfunctional reactor(s) and disperse it safely into the Ocean, as a first task to improve desperate emergency situation, if needed, additional elements such as mobile power units can be implemented nearby to produce needed electricity in the process as shown in FIG. 26 and others illustrations of this invention. Here in FIG. 25 is shown portable closed loop heat exchanger system 210 used for cooling dysfunctional nuclear reactor at Fukushima Daiichi Nuclear Power Complex. This closed loop heat exchanger system 210 can be also used for cooling reactors in conventional nuclear power plants rather than using open ponds, pools, lakes, etc. The current broken loop system used in Nuclear power plants in the U.S. and worldwide is not suitable with all the risk and the hazardous waste they produce.

FIG. 26 illustrates a schematic diagram of the heat exchange system 210 shown in FIG. 24 to be used for production of electricity in location where lava is accessible, such as, but not limited to Hawaii. The State of Hawaii is spending about $1 billion dollars per year for purchasing oil for production of electricity. The big island Hawaii has slow moving lava dropping into Ocean usually through established lava (tube) flow. Heat from lava, which at this time is dispersing in air, can be effectively harnessed for production of electricity.

Proposed solution consists of:
1. Selecting location with established lava (tube) flow.
2. Erecting two towers on either side of a lava flow (tube) flow with cable suspended between them.
3. Lowering first heat exchanger at safe distance close to lava flow and the second heat exchanger coupled into boiler/evaporator of the Binary Power Unit nearby at safe distance.
4. First and second heat exchangers are connected with thermally insulated closed loop system with in-line pump circulating heat exchange fluid through it.

5. Power unit consist of a boiler; a turbine; a generator; and a condenser. Binary power unit can be mobile (on wheels—for example 3 trucks) at safe distance nearby. If lava changes its flow movable (on wheels) binary power unit can be relocated out of zone on time. In such case lost could be first heat exchanger and/or towers which are replaceable and not very expensive structure.

6. Cooling system for the condenser consist of additional closed loop system with one heat exchanger submerged into Ocean.

Many such modular power units can be installed in suitable locations.

Our system is perfectly suited for Hawaiians alike situations where volcanoes behavior is not explosive nature but rather seeping relatively slow moving basalt lava. Our system doesn't require geothermal drilling, controversial fracking, hydrothermal reservoirs, permeability of the rocks, and substantial amount of water which is the case with conventional geothermal systems. Our system doesn't pollute environment or interfere with lava flow. It only absorbs heat from above lava which is dissipating in air anyway.

Here in FIG. 26 are illustrated two posts/towers 192 and 194 erected on either side of a lava flow/tube 196 with cable 193 suspended between them. The first heat exchanger 168 is lowered at safe distance closed to lava flow 196 and the second heat exchanger 182 is coupled into boiler/evaporator 220 of the binary power unit 180 which is explained in FIGS. 14 and 15. Here are also illustrated turbines 230, generator 250 and condenser 260. Here is also illustrated cooling system for the condenser 260 consisting of additional closed loop system 270 which consist of several interconnected back pressure reducing cylinders 262, with coiled heat exchangers 268 inside, thermally insulating lines 272 and heat exchanger 282 submerged into Ocean 165. There is also an in-line pump 172 to circulate heat exchanging fluid through closed loop system 270. The condenser 260 is elongated with back pressure reducing cylinders 262 to reduce back pressure which exists after steam passes through turbine compartment 230. By implementing this methodology, for example, the State Hawaii could save around one billion dollars which they are spending yearly for purchase of oil for production of electricity. This portable system can be used in many locations with minor adjustments. For example, on Erta Ale volcano, supporting towers 192 and 194 can be erected on top of sides of crater with cable 193 suspended between towers. The first heat exchanger 168 can be lowered close to lava lake which is visible several hundred feet below top of crater. Mobile binary power unit 180 can be assembled at safe distance nearby.

Figure 27:
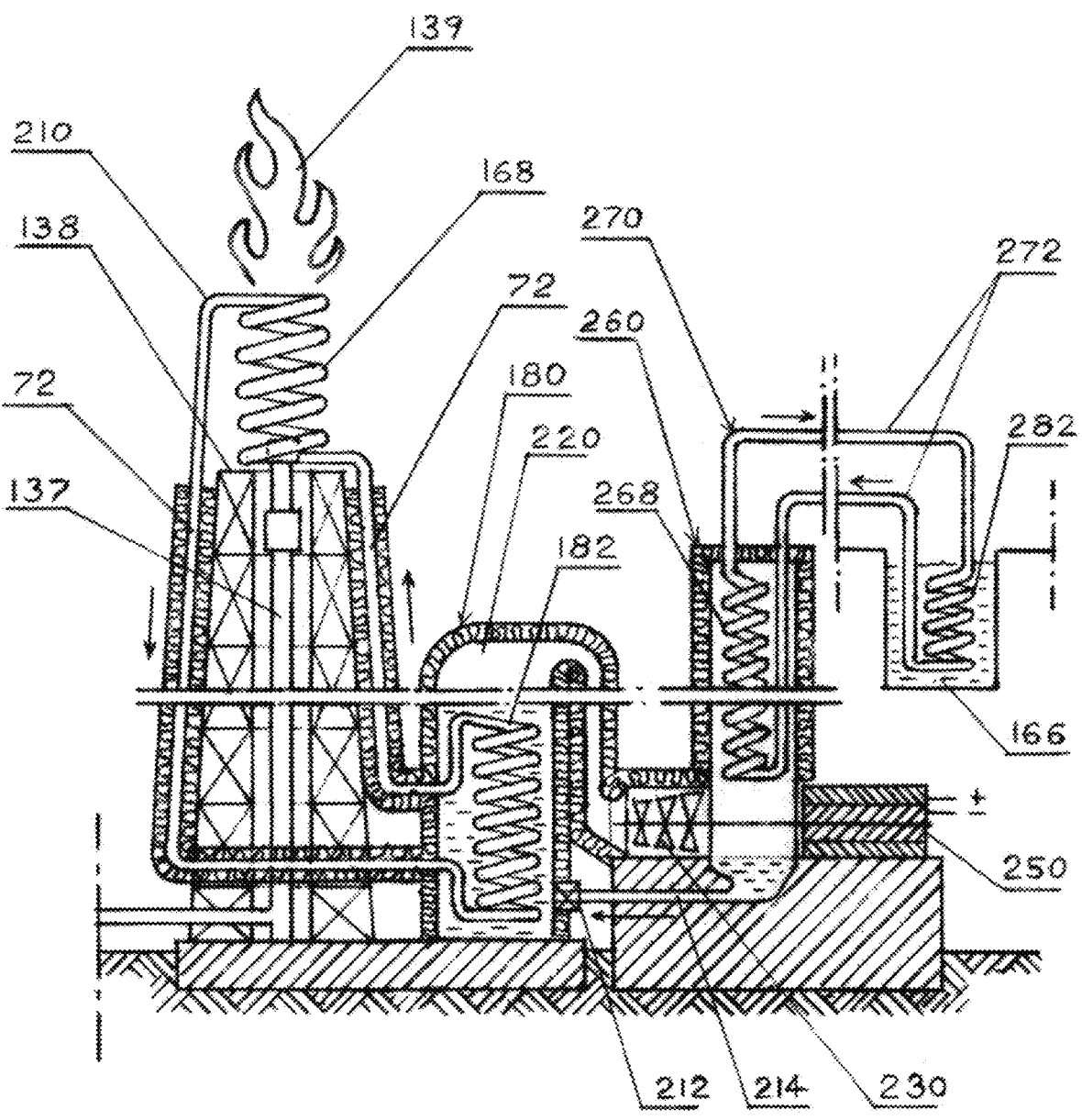
FIG. 27 illustrates a schematic cross-sectional diagram of the heat exchange system shown in FIG. 24 to be used for the production of electricity from heat sources such as oil well flare stacks in accordance with the invention.
Figure 37:
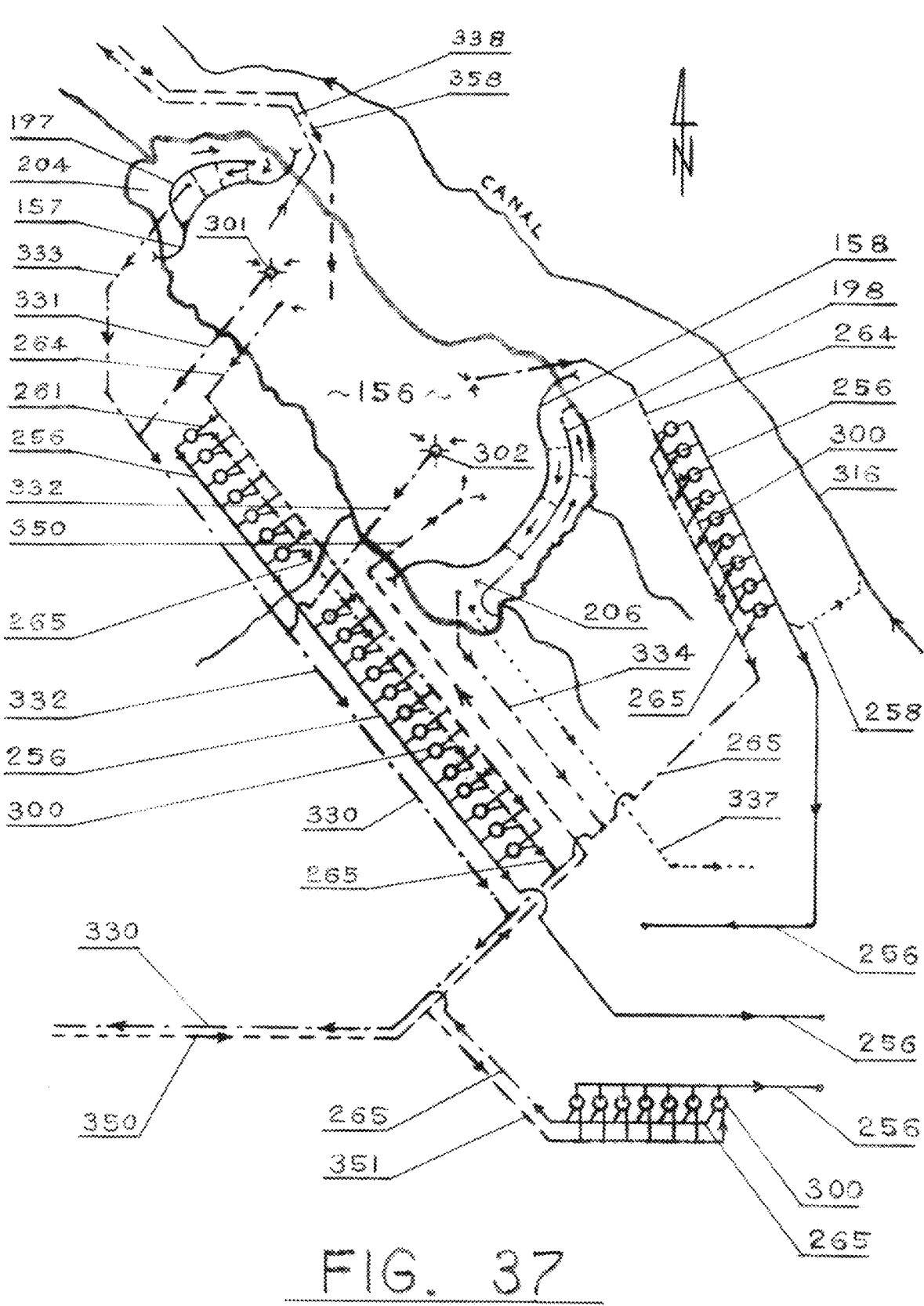
FIG. 37 is a plain view of a large salty body of water and schematic diagram of pipeline systems associated with restoration of the Salton Sea.

FIG. 27 illustrate a schematic cross sectional diagram of the heat exchange system 210 shown in FIG. 24 to be used for production of electricity from heat source such as oil well flare stacks. A gas flare, alternatively known as a flare stack, is a gas combustion device used in industrial plants such as petroleum refineries, chemical plants, and natural gas processing plants as well as at oil or gas production sites having oil wells, gas wells, offshore oil and gas rigs and landfills. Whenever industrial plant equipment items are over-pressured, the pressure relief valve provided as essential safety device on the equipment automatically release gases which are ignited and burned. Here in FIG. 27 are illustrated oil well flare stack 137, support structure 138, the heat exchange system 210 with first heat exchanger 168 positioned on top of supporting structure 138 and second heat exchanger 182 coupled into boiler/evaporator 220 of the binary power unit 180. By circulating heat exchanging fluid through closed loop system 210 heat from flame 139 is extracted through the first heat exchanger 168 and transferred through thermally insulated line 72 to the second heat exchanger 182 which heats working fluid or water, depending on size and temperature, in the boiler/evaporator 220 of the binary power unit 180. Here are also illustrated main elements of the binary power unit 180, turbines 230, generator 250 and condenser 260. In this illustration the condenser 260 is cooled with additional closed loop system 270 consisting of the first heat exchanger 268, closed loop line 272 and the second heat exchanger 282 which can be submerged into nearby source of cold water 166 such as pool, lake, river, etc. Alternatively, an adjustable perforated shield can be installed on top of flare stack covering one side of the first heat exchanger 168 and rotating, as needed, to prevent flame to be blown away from heat exchanger by wind. Contemporary believes that harnessing flare on top of stack is not feasible because it is difficult to envision a power plant on top of a flare stack. That contemporary believe is debunked by this invention by transferring heat from flame on top of flare stack 137 trough heat exchange system 210 to the power unit 180 on the ground. For clarity and simplicity, here in FIG. 37 is illustrated first heat exchanger 168 positioned on top of supporting structure 138. Alternatively the first heat exchanger 168 can be installed inside any chimney through which passes hot air, smoke, or steam and used that secondary heat source before it dissipate into atmosphere. The universal heat exchange system 210 can be used in any situation where source of heat is difficult to access or is not suitable for relatively heavy equipment of a power plant or power unit. By implementing this methodology worldwide in industrial plants a lot of electricity can be produced from sources considered at this time as a waste.

Figure 28:
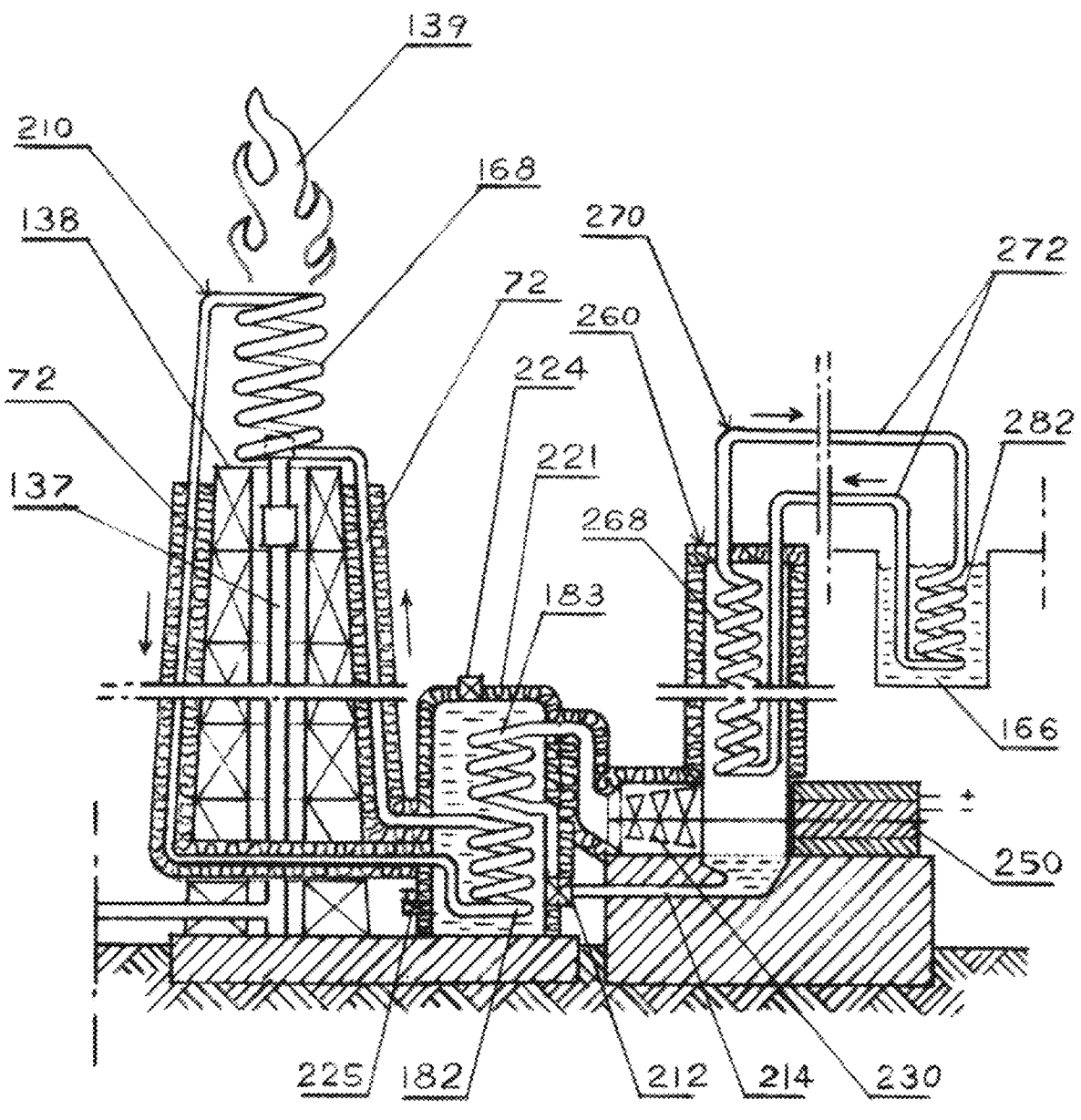
FIG. 28 illustrates a schematic cross-sectional diagram of an alternative heat exchange system shown in FIG. 27.

FIG. 28 illustrates a schematic cross sectional diagram of an alternative heat exchange system to one shown and explained in FIG. 27. The assembly illustrated in FIG. 28 is essentially the same as assembly illustrated in FIG. 27; only difference is that instead of boiler 220 in FIG. 27 there is heat exchanger unit 221 which contains two heat exchangers 182 and 183. The heat exchanger unit 221 is filled with heat exchange medium fluid. There is also relief valve 224 and valve 225 for controlling the heat exchange medium fluid.

Figure 29:
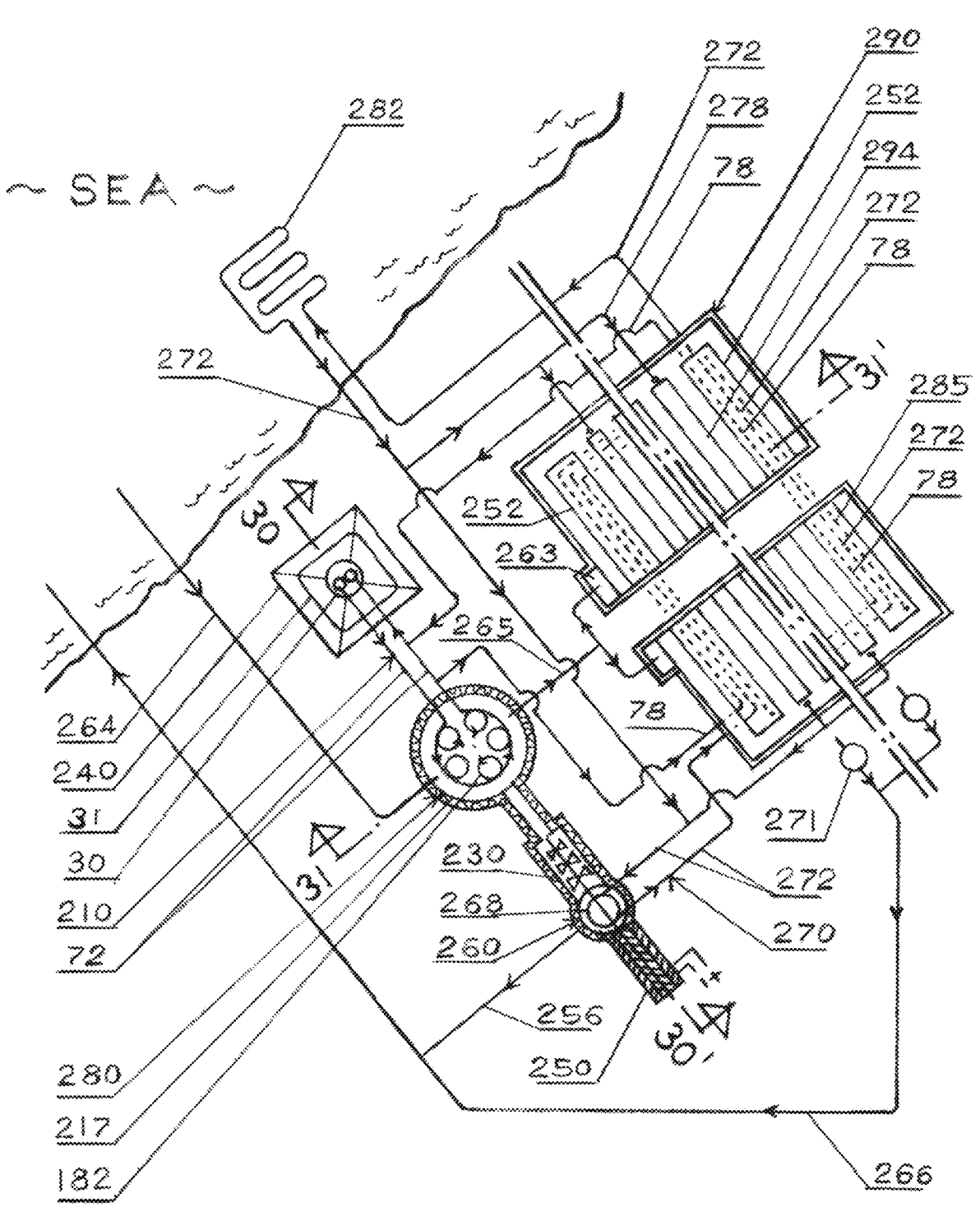
FIG. 29 is a plain view of the heat exchange system shown in FIG. 24 to be used for production of electricity from geothermal source and desalinization of salty body of water in accordance with the invention.

FIG. 29 illustrates a plain view of the geothermal facility using the heat exchange system 210 shown in FIG. 24 for production of electricity and desalinization of water from a salty body of water. By way of example only, a salty body of water may include the Salton Sea in California. The following example using the Salton Sea as the salty body of water is for illustration purposes and it is understood that this invention is not limited to only functioning with regard to the Salton Sea, but rather the same principles are applicable to any salty body of water with similar conditions. The Salton Sea is California's largest lake and is presently 25 percent saltier than the ocean. The Salton Sea is a "terminal lake," meaning that it has no outlets. Water flows into it from several limited sources but the only way water leaves the sea is by evaporation. The Salton Sea Geothermal Field (SSGF) is a high salinity and high-temperature resource. The earth crust at south end of the Salton Sea is relatively thin. Temperatures in the Salton Sea Geothermal Field can reach 680 degrees less than a mile below the surface. There are already several conventional geothermal power plants in the area. The lake is shrinking exposing lake bed and salinity level is increasing which is pending environmental disaster and a serious threat to multi-billion-dollar tourism.

In this application the heat exchange system 210 extracts heat from geothermal sources; transfers that heat up to the ground surface; produces electricity for commercial use; and at same time, desalinize salty water and returns produced freshwater into Salton Sea; and in process produces salt which has commercial value.

Here is illustrated the heat exchange system 210 with first heat exchanger 168 lowered into well-bore 30 at source of heat (see FIG. 30), thermally insulated line 72, and second heat exchanger 182 coupled into boiler/evaporator 217 of the power unit 280. By circulating heat exchanging fluid through closed loop system 210 heat from hot rocks or hydrothermal reservoir is extracted through the first heat exchanger 168 and transferred through thermally insulated line 72 to the second heat exchanger 182 which is coupled into boiler/evaporator/distiller 217 of the power unit 280. Salty water from Salton Sea is injected into boiler/evaporator 217 through pipe line 264 and valve 267 to the level "H" (see FIGS. 30 and 31). The second heat exchanger 182 which is coupled into boiler/evaporator 217 heats salty water and steam is produced which turns turbine 230 which is connected to and spins generator 250 which produces electricity which is then transmitted though electric grid. The power unit 280 has the condenser 260 which is cooled with additional closed loop system 270 consisting of the first heat exchanger 268, closed loop line 272 and the second heat exchanger 282 which is submerged into Salton Sea for cooling or if necessary nearby pool build for that purpose. Condensed steam from condenser 260 exits power plant 280 through pipe 256 to join pipe line 266 returning fresh water into Salton Sea. Alternatively, fresh water can be collected into big thanks (not illustrated) for use when needed in nearby agricultural fields. The pipeline 272 exiting condenser 260 enters heat exchanger containers 254 which are positioned underneath removable pans 252 located in nearby desalinization processing building 290 (see FIG. 31) which is closed and incites a greenhouse effect.

Alternatively, if situation regarding desalinization of the Salton Sea changes, the boiler/evaporator 217 and cooling system of the condenser 260 of the power unit 280 can be modified to function solely as binary power unit to produce only electricity.

Figure 31:
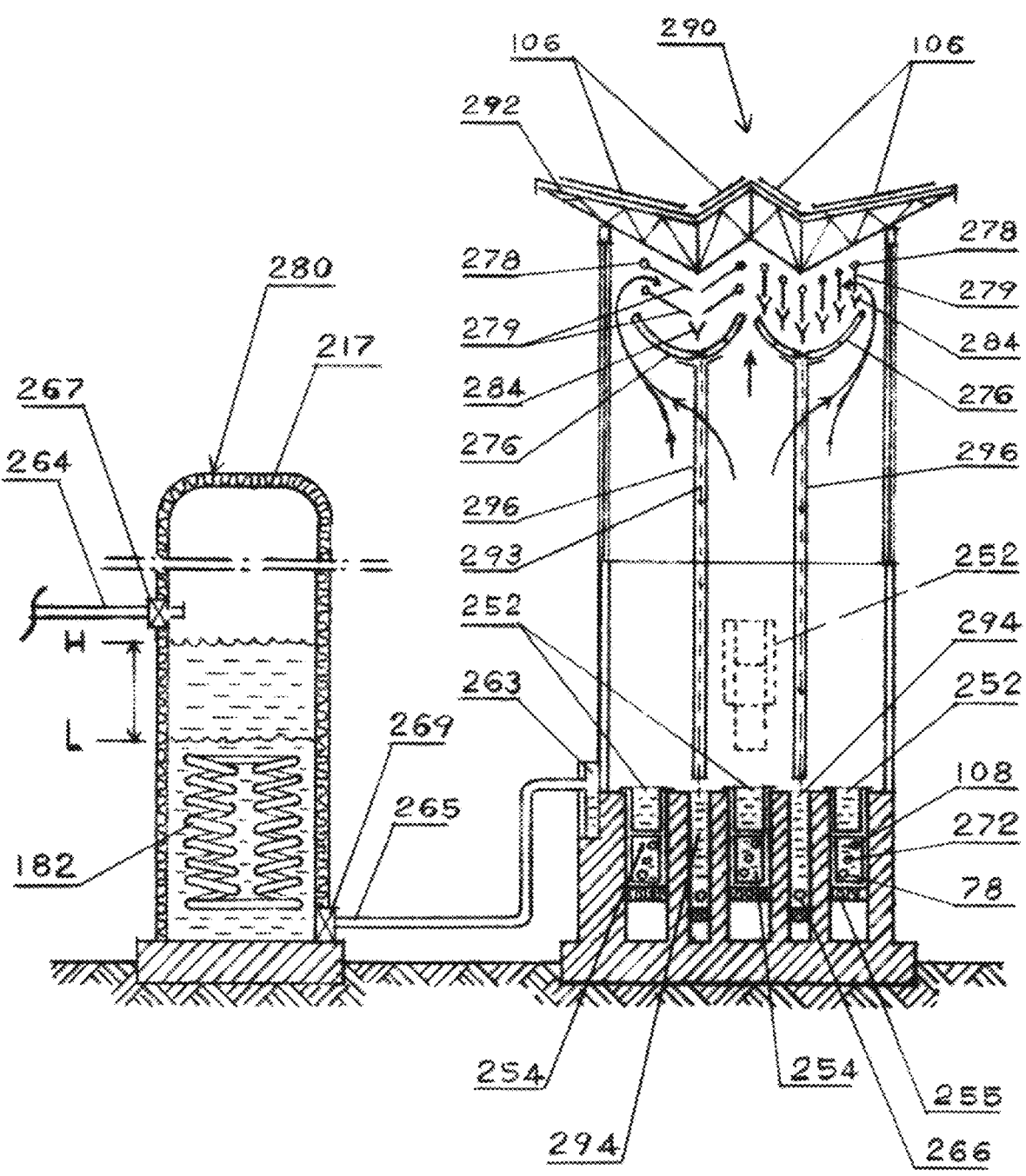
FIG. 31 is a cross sectional view taken along line 31-31' of FIG. 29, in accordance with the invention.

The pipe line 72 after exiting boiler/evaporator 217 branches into pipe line 78 which also enters the heat exchanger containers 254 which are positioned underneath removable pans 252 located in nearby desalinization processing building 290 (see FIG. 31).

When salty water in boiler 217 reaches level "L" the salinity level is high and is released through valve 269 and pipe line 265 into collector pools 263 at nearby desalinization processing building 290 in which salt and clean water is produced.

Salty water from collector pools 263 is distributed into removable pans 252 which sit on the heat exchanger containers 254 which are filled with heat exchange fluid and accommodates three pipe lines, 78, 272 and 108 which heats heat exchange fluid in containers 254 and indirectly heats salty water in pans 252. Salty water evaporates from heated pans 252 and condenses around condensers panels 289 which are positioned under roof structure 292 of the desalinization processing building 290. The pipe line 278 after branching from pipe line 272 enters roof section 292 of the desalinization processing building 290 and function as a condenser. Condensed fresh water 293 drops, as a rain, into channels 294 from which is then collected into containers 271 and returned into depleting Salton Sea through pipe line 266 and in process improve salinity balance of the lake (see FIGS. 31 and 32). Alternatively, condensed fresh water 293 can be bottled for drinking or used in nearby farmland. After heated water evaporates from pans 252 layer of salt will form on the bottom of the pans 252. The pans 252 with salt in it can be raised with cable and ratchets or hydraulic system so that one end of the pans 252 is higher than other (illustrated with dash line in FIG. 31) and then slightly jerked and unloaded salt on vehicle or platform for transport. The profile of the removable pan 252 on lower end is slightly larger for smoother unload and can have closing and opening mechanism (not shown at this illustration). Here is also illustrated a well 30 with Blow Out Preventer 31 and derrick 240 above it.

Here are also illustrated two sections of the desalinization processing building 290. The building can have many such sections to allow continues process of loading and unloading in harmony.

Figure 30:
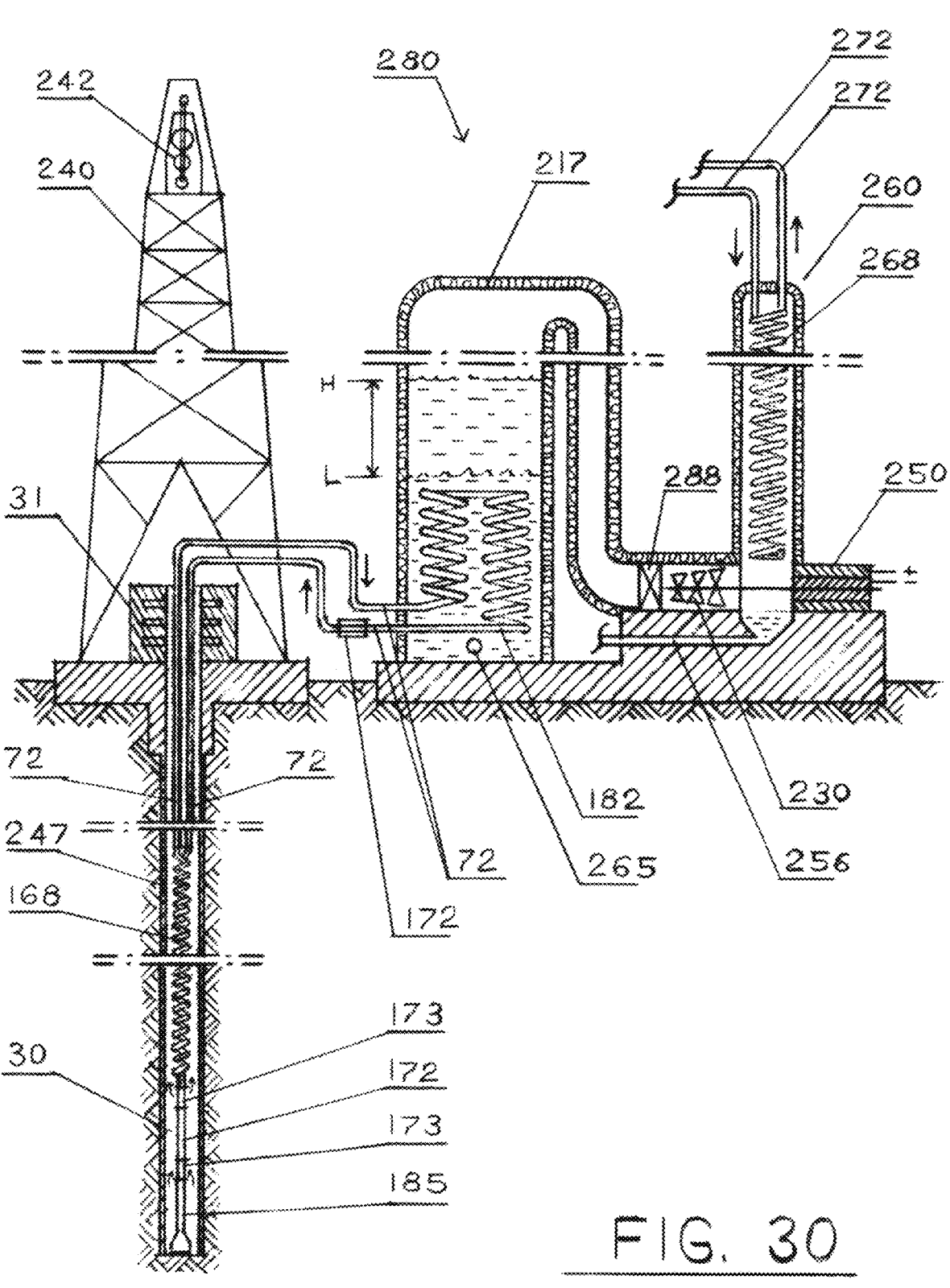
FIG. 30 is a cross-sectional view taken along line 30-30' of FIG. 29, in accordance with the invention.

FIG. 30 is a cross sectional view taken along line 30-30' of FIG. 29. Beside already explained elements and its functions in FIG. 29 here are better illustrated well-bore 30 with casing 247 and the first heat exchanger 168 in it, and rest of elements of the power plant 280. Here is also illustrated, as an alternative option, at the bottom of the well-bore 30, an in-line pump 172 which can be attached, if needed, to the first heat exchanger 168 to circulate geothermal fluids upward and around first heat exchanger 168 for more efficient heat exchange. Here is illustrated an in-line pump 172 having two fluid stirring elements 173 on each end. The fluid stirring elements 173 are simple structural pipe sections with openings on side wall preferably in an angel (not illustrated). The purpose of the fluid stirring elements 173 on the lower end of the in-line pump 172 is to direct surrounding geothermal fluid into in-line pump 172 and purpose of the fluid stirring elements 173 on the upper end of the in-line pump 172 is to direct geothermal fluid from the in-line pump up and around first heat exchanger 168. Here is also illustrated base of structural pipe 185.

FIG. 31 is a cross sectional view taken along line 31-31' of FIG. 29. In this illustration are shown removable pans 252 which sits on the heat exchanger containers 254 which are filled with heat exchange fluid and accommodates three pipe lines, 78, 272 and 108 which heats heat exchange fluid in containers 254 and indirectly heats salty water in pans 252. Here is also shown thermal insulator and supporting structure 255 under containers 254.

In this illustration, there are also shown roof structures 292 of the closed desalinization processing building 290 with pipe lines 278 which supply cold water to the condenser panels 279. Condenser panels are illustrated in two alternative positions on left and right side of the building 290. Here are also shown collecting pans 284 positioned underneath condenser panels 279 (illustrated in FIG. 32). Here are also illustrated plastic curtains 276 with vertical tubes 296, which collect and funnel condensed droplets 293 into provided channels 294. The plastic curtains 276 are preferably inflatable to provide thermal insulation between warm lower section and cold upper section of the building 290. If necessary upper section can be additionally cooled with air-condition system. Here is also shown raised removable pans 252 (in dash line). Here are also shown thermo-solar panel 106 on the roof of the desalinization processing building 290 and corresponding heat exchange line 108 inside the heat exchanger containers 254 which is illustrated and explained in FIG. 32.

Figure 32:
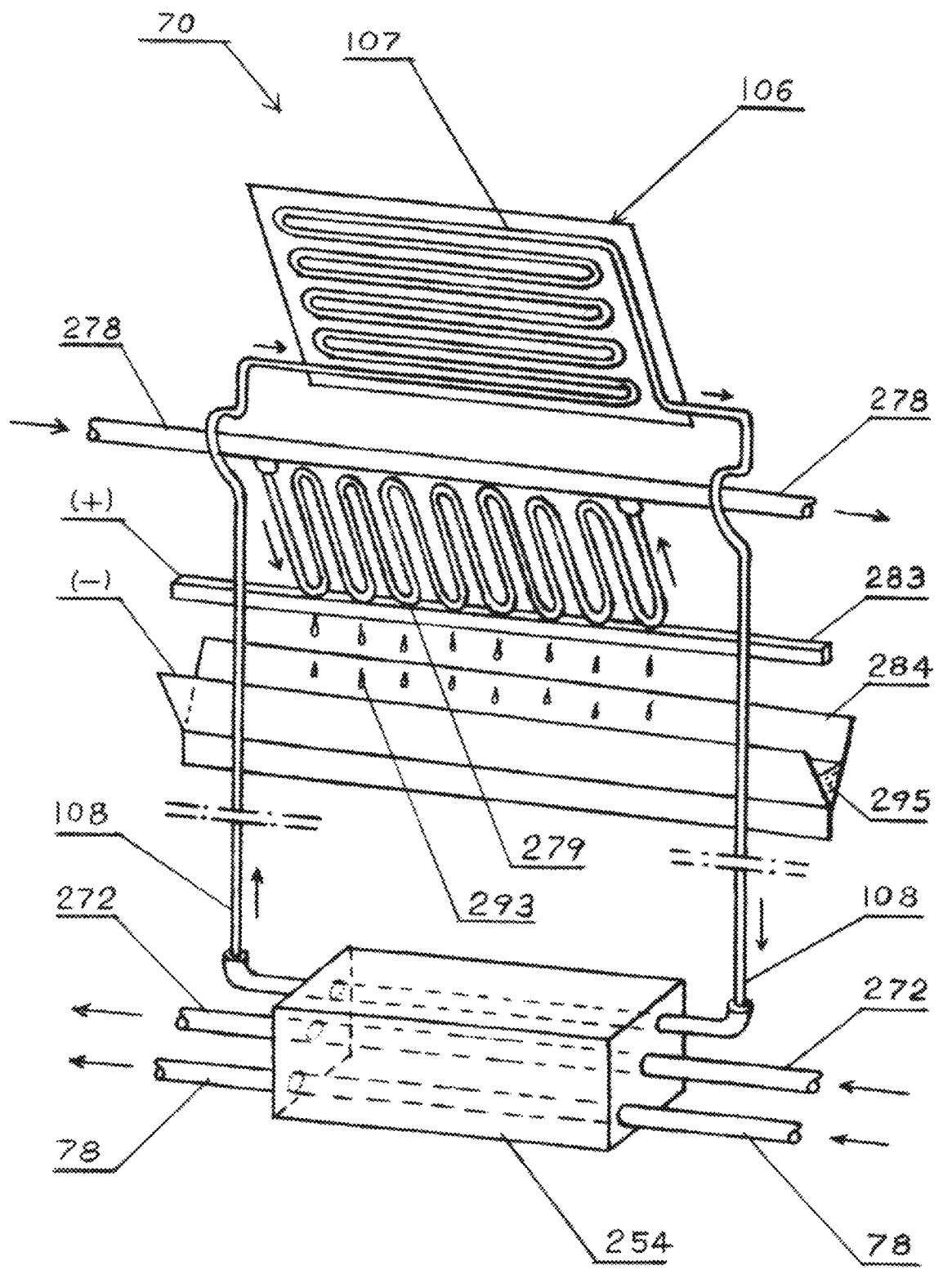
FIG. 32 illustrates a perspective cross-sectional diagram of an alternative heat exchange system to be used in desalinization plan shown in FIGS. 29-31.

FIG. 32 illustrates a perspective cross sectional diagram of an alternative thermo-solar heat exchange system 70 to be used in desalinization plant shown in FIGS. 29-31. Here is illustrated, an optional solution, thermo-solar panel 106 positioned on the roof of the desalinization processing building 290 to be used for heating heat exchange fluid in the containers 254 and indirectly heating salty water in pans 252 to induce evaporation. Here is also illustrated a plate 283 at the bottom of condenser 279 which function as a frame for the condenser 279 and also as an electrode positively (+) charged. The condenser 279 is coated with super hydrophobic material to induce release of tiny water droplets from condenser and subsequently to improve condensation process. Here is also illustrated a pan 284 positioned underneath condenser 279. The pan 284 has "Y" shape profile and collects condensed droplets 293 from the condenser 279 and delivers fresh water 295 into containers 271 (shown in FIG. 29). The fresh water 295 is then bottled as it has commercial value or optionally pumped into the Salton Sea to reduce its salinity. The pan 284 is negatively charged to improve condensation process. Recent study done by MIT researchers have discovered that tiny water droplets that form on a super-hydrophobic surface and then "jump" away from that surface, carry positive (+) electric charge. By adding negative (−) charges to nearby surface can prevent returning of the tiny water droplets back to the condenser surface and improve condensation process.

Alternatively, if needed, thermo-solar panel 106 positioned on the roof of the desalinization processing building 290 used for heating heat exchange fluid in the containers 254 and indirectly heating salty water in pans 252 to induce evaporation, could function independently without geothermal support to induce evaporation in the desalinization processing building 290.

The thermo-solar heat exchange system 70 consisting of thermo-solar panel 106; heat exchanger 107; and closed loop pipeline 108 can be coupled to power unit 490 (see FIG. 80) for generation of electricity.

The condenser 279 on the upper portion of the processing building 290 can be cooled by cold water from nearby canal using pipelines 312 and 314 as explained in FIGS. 38, 44-46 for cooling condensers 360.

Also, high salinity water "brine" from boiler 280 can be used in processing building 290 for extraction of lithium, other alkaline metals and minerals. The SRI International company is tasked with two-year mission by the Energy Department's Geothermal Technologies Office-focusing on advances in lithium recovery from geothermal brines using ion-imprinted polymers. The presented system provide inexpensive and renewable source of the saturated brine for whatever process for extraction of lithium and other alkaline metals and minerals is going to be used.

FIGS. 33-36 illustrate a cross sectional views of the load carrying system 60 and the cable and tube connector assembly 175 also illustrated in FIG. 13. By lowering the SCI-GGG and/or SCI-GHE apparatus by adding repetitive segments of tubes and cables, the length of the apparatus increases and subsequently its weight. Therefore load carrying structure such as cables or pipe, in these illustrations cables, is designed so that additional cables can be added to accommodate increased weight when additional segments of the apparatus are added. The length of segments of the apparatus depends of the size of derrick.

Figure 33:
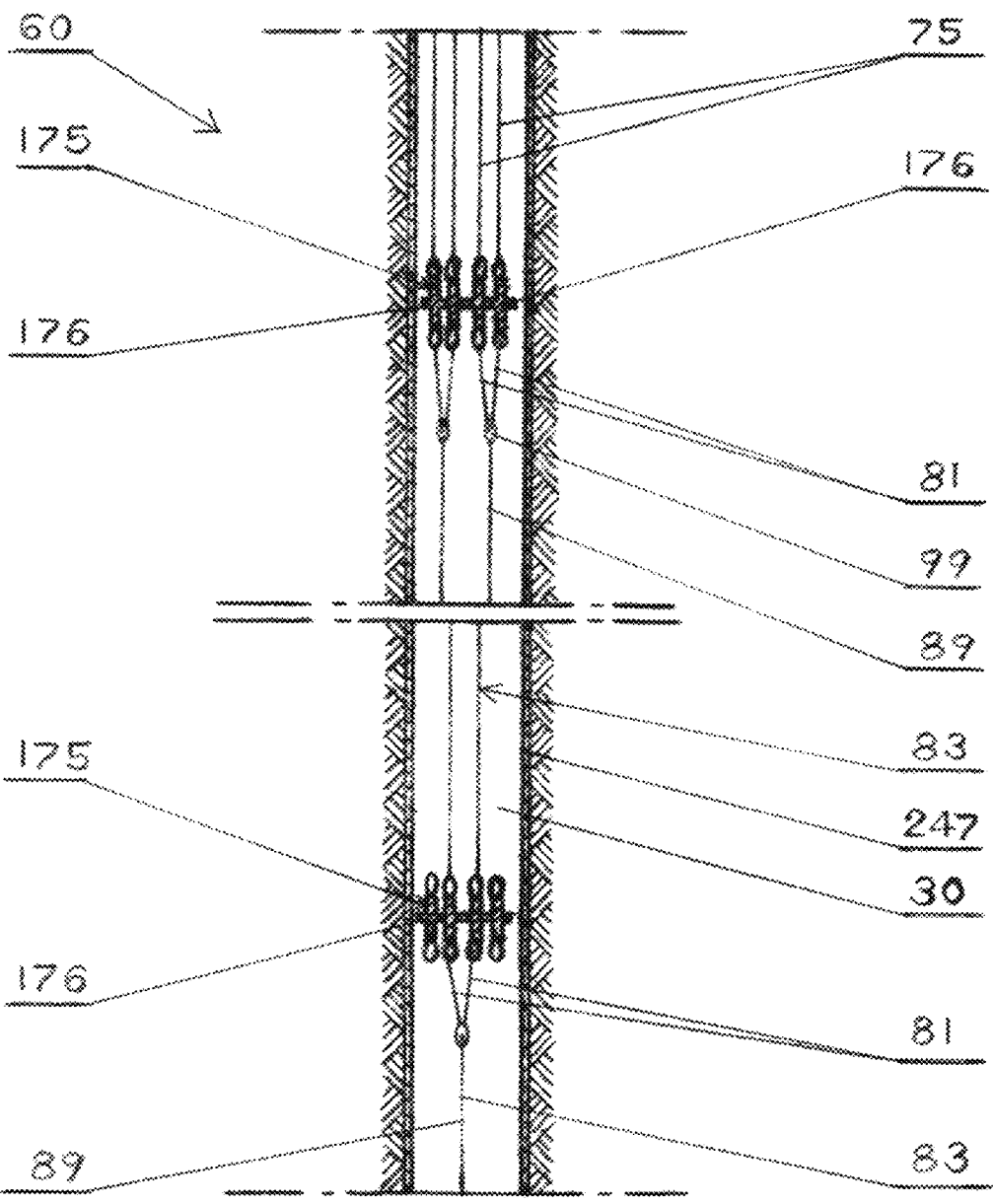
FIG. 33 is a schematic diagram of a cross-sectional view of the cable and tube connector assembly in accordance with the invention.

FIG. 33 is a schematic diagram of cross sectional view of the load carrying cable system 60. The load carrying system 60 consist of derrick with pulley system on the surface (not shown in this illustration), repetitive cable segments 75 which are connected through the cable and tube connector platforms 176. Here are also illustrated transferring cables 83 which are inserted as periodic segments when load from one cable needs to be transferred on two cables of the subsequent segment. The transferring cables 83 consist of a sling cable 89, an oblong master link 99, which connects two legs 81 ending with standard latched sling hooks 55 (not shown in this illustration). This load carrying system 60 provides overall weight reduction and efficient load distribution of the apparatus and subsequently extends the operating depth of the apparatus and increases load capacity of the derrick.

Figure 34:
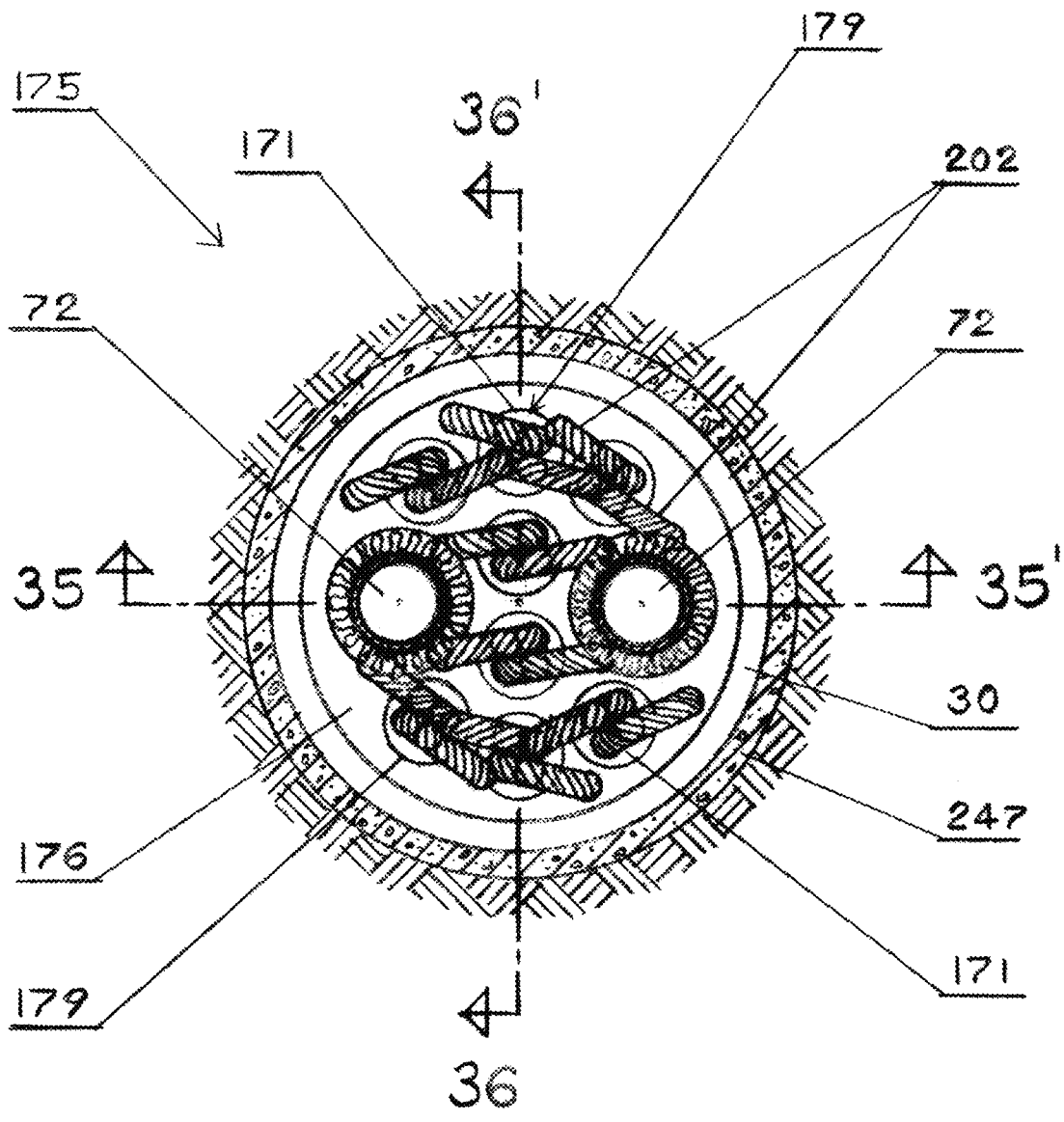
FIG. 34 is a cross-sectional view taken along line 33-33' of FIG. 34, of the cable and tube connector assembly in accordance with the invention.
Figure 35:
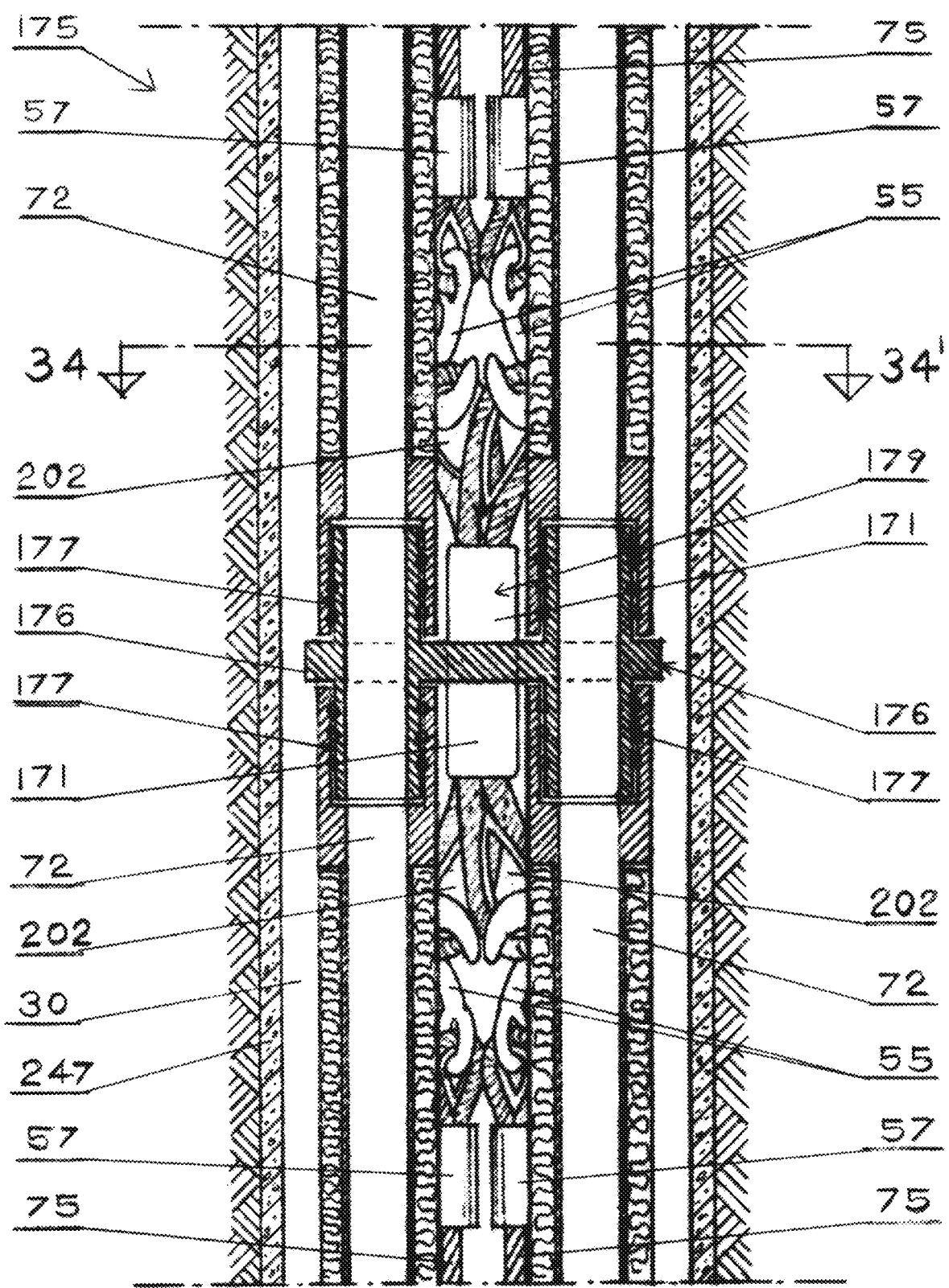
FIG. 35 is a cross-sectional view taken along line 34-34' of FIG. 33, in accordance with the invention.

FIG. 34 lustrate a cross sectional views of the cable and tube connector assembly 175 taken along line 34-34' of FIG. 35. The cable and tube connector assembly 175 consist of the cable and tube connector platform 176, on which are permanently fastened two hose and socket assembly 177 (illustrated on FIG. 35) and multiple steel cable loop assembles 179. The hose and socket assembly 177 is device permanently fastened on connector platform 176 to accommodate respective connecting element permanently fastened on each end of repetitive segments of the thermally insulated flexible tubes 72 of closed loop system of the apparatus. The tube and socket assembly 177 can operate as pull-back sleeve (quick connect and disconnect system) and can be additionally secured with safety pin to prevent accidental disconnect. The steel cable loop assembly 179 consists of two sets of eyelets 202 with thimbles formed at each end of the fastening block 171. The two sets of eyelets 202 of the fastening block 171 protrude on upper and lower portion of the connector platform 176. Each leg of each segment of the main steel cable 75 has standard latched sling hooks 55 (not shown in this illustration) on each end and is hooked to the eyelets 202 of the cable and tube connector platform 176. All parts including steel cable 75 can be thermally insulated and coated with anti-corrosion material.

This design of cable and tube connector assembly 175 provides flexibility for repetitive segments of tubes and cables to be added as needed, preferably in pairs for balance and proper distribution of load. This load carrying system 60 provides efficient weight distribution and increases load capacity as length and weight of the apparatus increases.

FIG. 35 is a cross sectional view taken along line 35-35' of FIG. 34. Here are illustrated all elements described in FIG. 34 including the cable and tube connector platform 176, thermally insulated tubes 72 of closed loop system of the apparatus, steel cable loop assembly 179 with fastening blocks 171 and two set of eyelets 202 protruding on upper and lower portion of the connector platform 176. Also, here is illustrated a pair of latched sling hooks 55 which are permanent ending parts on each segment of the main steel cable 75. Here are also illustrated fasteners 57 used also for support of the structure during assembly and disassembly process of the segments.

Figure 36:
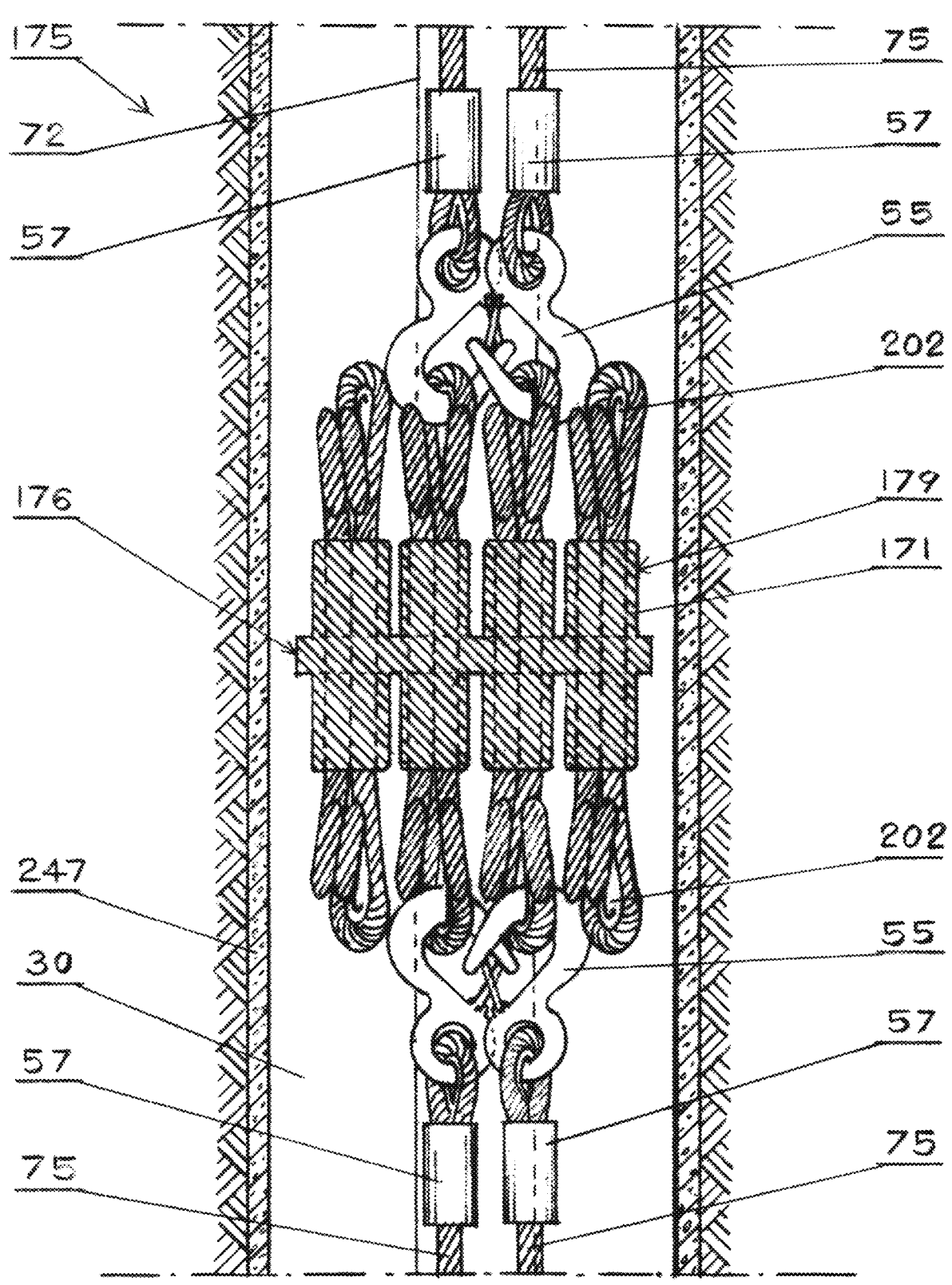
FIG. 36 is a cross-sectional view taken along line 35-35' of FIG. 33, in accordance with the invention.

FIG. 36 is a cross sectional view taken along line 36-36' of FIG. 34, with all elements already explained in FIGS. 33 and 35. This illustration of the cable and tube connector assembly 175 with diameter about 15 inches contains 8 steel cable loop assembly 179 which accommodate 16 steel cables 75 with diameter about 1 inch. Larger diameter of the connector assembly 175 for larger wellbores can contain and rearrange more steel cable loop assembly 179 which would increase load potential and subsequently length of the apparatus.

Figure 113:
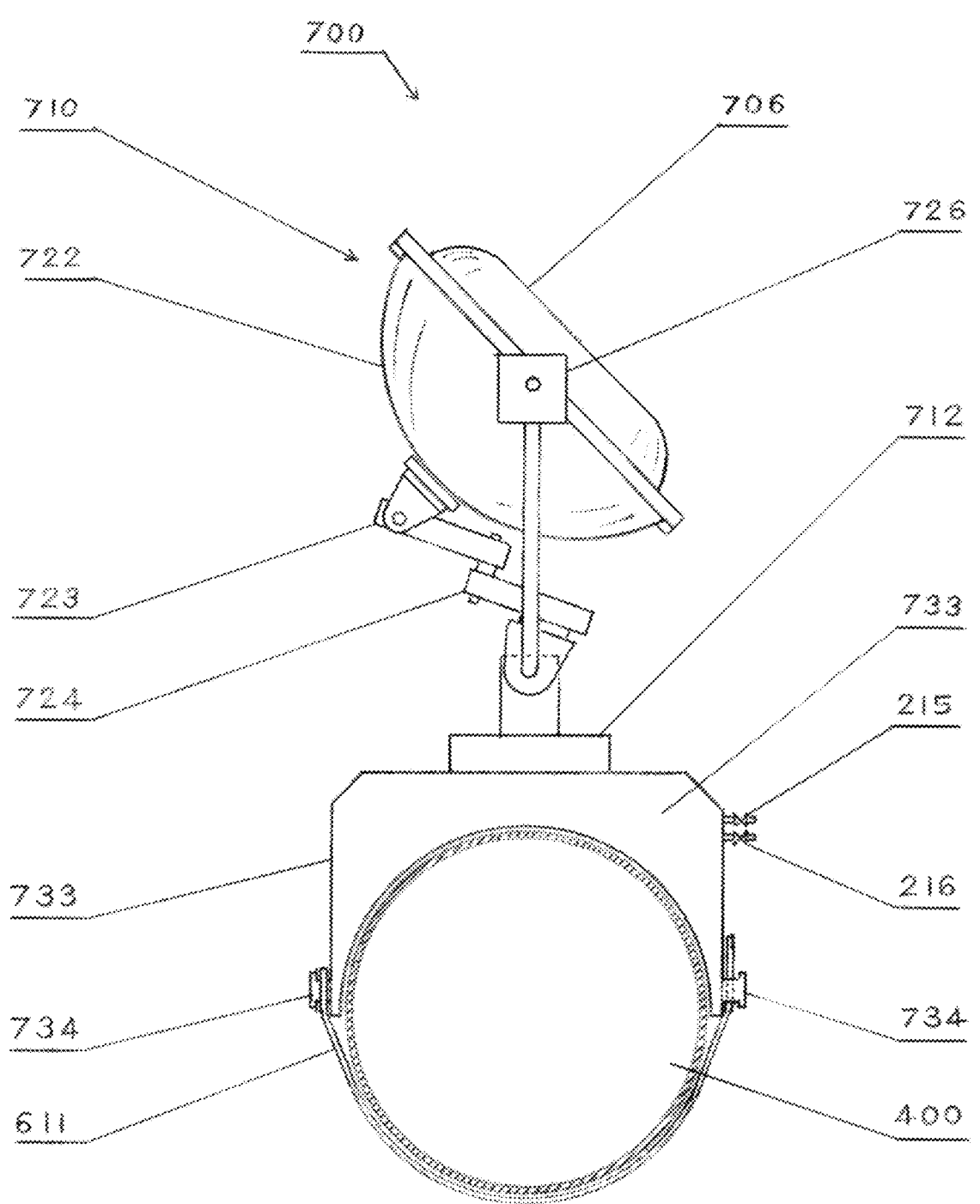
FIG. 113 illustrates a cross-sectional view of the "thermo-optical solar system" assembled on the pipeline.

FIGS. 37-113 illustrate and explain a solution for restoration of the Salton Sea using SCI-GGG and/or SCI-GHE system. As mentioned earlier the Salton Sea is California's largest lake and is presently 25 percent saltier than the ocean. The Salton Sea is a "terminal lake," meaning that it has no outlets. Water flows into it from several limited sources but the only way water leaves the sea is by evaporation. The Salton Sea Geothermal Field (SSGF) is a high salinity and high-temperature resource. The earth crust at south end of the Salton Sea is relatively thin. Temperatures in the Salton Sea Geothermal Field can reach 680 F degrees less than a mile below the surface. There are already several conventional geothermal power plants in the area. The lake is shrinking exposing lake bed and salinity level is increasing which is pending environmental disaster and a serious threat to multi-billion-dollar tourism. FIGS. 37-49 illustrate and explain one of several concepts for restoration of the Salton Sea in accordance with surrounding conditions. This concept is not limited to the Salton Sea in California, and therefore can be used in similar locations with prevalent geothermal sources, proximity to the Ocean and/or fresh water.

FIGS. 37-49 illustrate and explain a solution for restoration of the Salton Sea in accordance with surrounding conditions. This concept is not limited to, the Salton Sea in California, therefore can be used in locations with similar conditions with prevalent geothermal sources, proximity to the Ocean and/or fresh water.

FIG. 37 is a plain view of a large salty body of water and schematic diagram of pipeline systems associated with proposal for restoration of the Salton Sea. Here is illustrated: a plain view of a large salty body of water 156 with dikes 157 and 158 on northern and southern part of the lake 156. Here are also shown array of Power Plants 300 on several sectors. Also shown here is diagram of pipeline system for exchanging waters from the lake and the ocean using outflow line 330 and inflow line 350. Here is also are shown feeding pipelines 264 for injecting water from the Salton Sea (lake) 156 into geothermal power plants 300 for production of electricity. Also, here are shown pipelines 265 for transport of high salinity water from power plants 300. Here are also shown freshwater lines 256. The Power plants 300 using Self Contained In-Ground Heat Exchanger (SCI-GHE) system is modified to use salty water from the lake 156 to produce electricity and fresh water and is explain in more details in FIGS. 41-49.

Two dikes 157 and 158 are positioned on northern and southern side of the lake 156 to form reservoirs 204 and 206 for separating and collecting runoffs waters contaminated with fertilizers and pesticides from nearby farmland and to prevent further pollution of the lake. Reservoirs 204 and 206 are divided with internal dikes 197 and 198 into smaller sections designed for treatment and purification of polluted runoff water.

Figure 38:
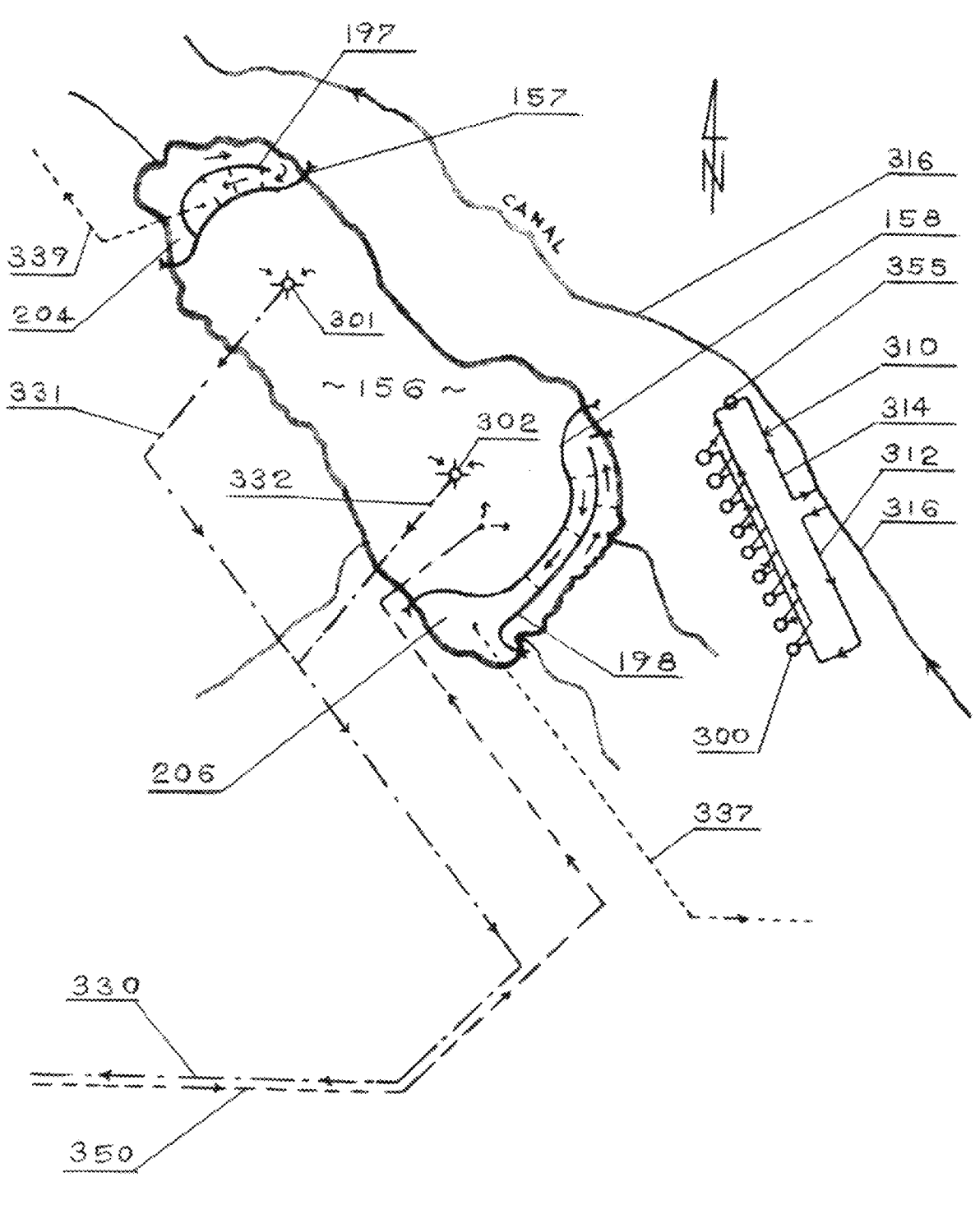
FIG. 38 is a plain view of a large salty body of water and schematic diagram of pipeline systems for exchanging that water with oceanic water and one section of geothermal power plants with an alternative cooling system, in accordance with the invention.

Polluted water is temporally contained, and if necessary treated, in reservoirs 204 and 206 before pumped back and reused at nearby farmland trough pipeline 337 and/or 339 (FIG. 38). Two reservoirs 204 and 206 are connected with additional pipeline branches 333 and 334 to the "outflow" pipeline 330. Alternatively, water from reservoirs 204 and 206 can be pumped into "outflow" pipeline 330 and dispersed into vast Pacific Ocean.

The "outflow" pipe-line 330 has two collecting branches 331 and 332 connected with pump-stations 301 and 302 positioned over two lowest point of the salty body of water 156. Presented salty body of water contain several layers of different salinity. Higher salinity water is denser and has tendency to accumulate at the lowest point at the bottom of a salty body of water. The pump-stations 301 and 302 pumps higher salinity water from bottom of a salty body of water 156 and transfers it to the Pacific Ocean through "outflow" pipe-line 330. The pump-stations 301 and 302, and inflows pipelines 350 and outflows pipeline 330 can use the "In-Line Pump" 172 illustrated and described in FIG. 22. The IN-LINE PUMP 172 is an electromotor cylindrical shape and can be inserted as a repetitive segment in pipeline and has no length limitation therefore increasing power to the electromotor imparts added pumping to circulate fluid at desired speed. The "In-Line Pump" 172 is an efficient pumping device and would reduce final cost of the project. It functions as a generator at downhill flow routes—it produces electricity which can be added as a supplement to energy needed for uphill and horizontal flow routes.

The "inflow" pipe-line 350 pumps oceanic water and transfers it into the salty body of water (lake) 156. Having at least three pipelines we can exchange high salinity water from the bottom of the lake 156 with one pipeline and use other two pipelines for bringing oceanic water into the lake 156. By controlling water exchange from the lake and the Ocean we can reduce salinity and increase water level of the lake and eventually equalize salinity of the lake with oceanic water. Pacific coast has strong current and dispersed high salinity water will have no negative effect on marine life.

Series of Power Plants such as 300 uses geothermal sources and oceanic water to generate steam and electricity and as a byproduct fresh water and salt. This particular production process is explained in more details in FIGS. 29-32. Alternatively, if production of salt is not needed anymore for whatever reason (enough produced or over-saturated market or disposal problem, etc.) then power plants 300 can easily switch to alternative design to bypass production of salt and produce only electricity and fresh water. This particular production process is explained in more details in FIGS. 37-49. Here is also illustrated an optional pipeline 258 for transporting fresh water from power plants 300 on eastern sector directly to canal 316. Here are also illustrated a set of power plants 300 at southern sector taking oceanic water directly from inflows pipelines 350 through pipeline branch 351 and returning high salinity water into outflow pipeline 330 through pipeline branch 265. Here in southern sector is also shown pipeline 256 for distributing fresh water produced in power plant 300. Amount of produced fresh water from power plants 300 is approximately half of amount of used oceanic water.

FIG. 38 Illustrate a plain view diagram of array of geothermal power plants 300 at a location east of the Salton Sea with alternative cooling system using cold water from nearby canal 316. For clarity and simplicity, here are shown only power plants 300 at only one sector. Here is illustrated an alternative option for cooling condensers of the power units of the power plants 300 with closed loop system 310 having inflow line 312 and outflow line 314 by using relatively cold water from nearby canal 316. Water used for cooling condensers is returned back without any lost into canal 316 by outflow line 314 for its original intended purpose. This cooling system is explained in more details in FIG. 44. Here is also illustrated a secondary binary power unit 355 for additional extraction of heat from outflow cooling line 314, if necessary. The power unit 355 is explained in more details in FIG. 47.

Figure 39:
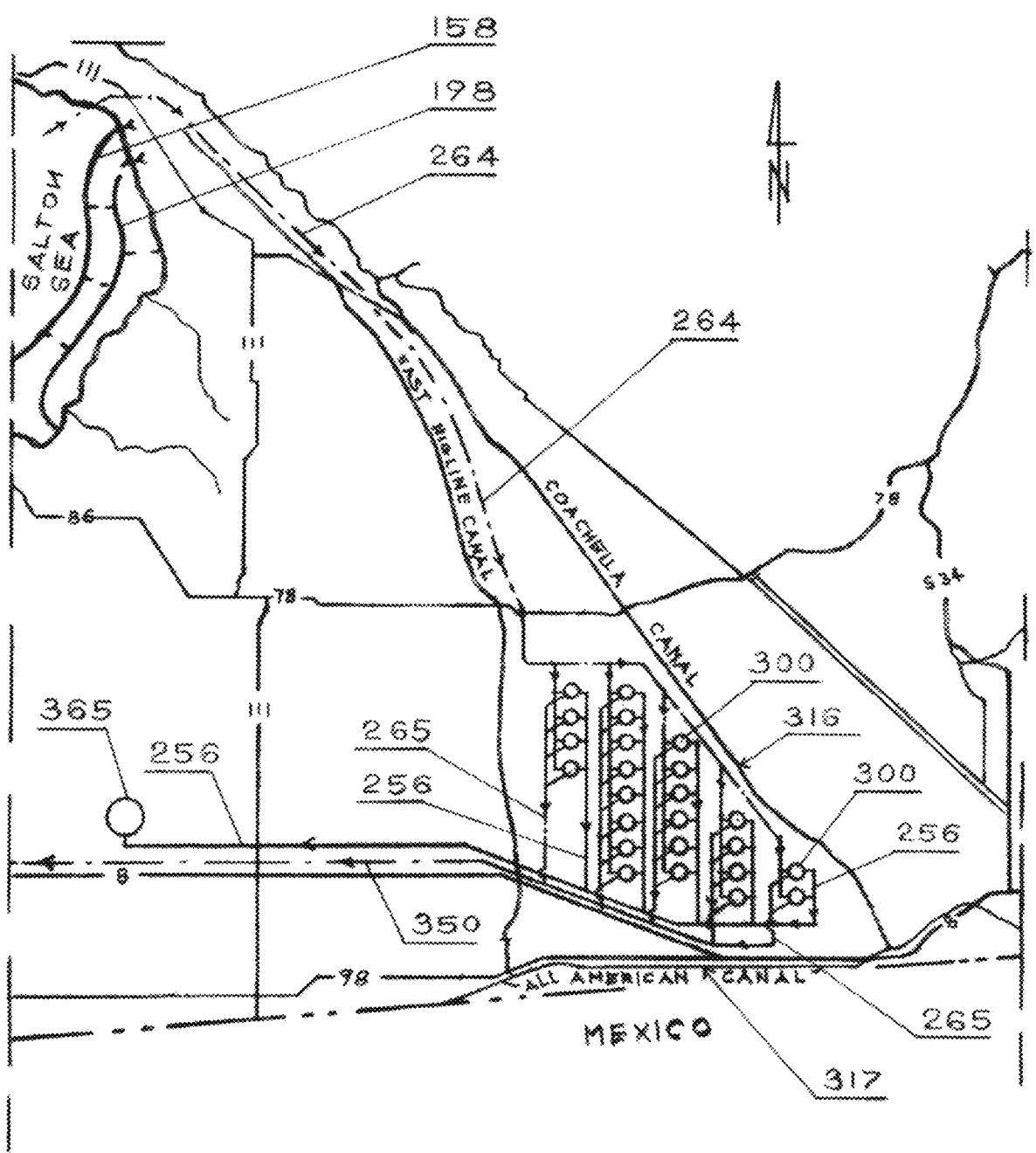
FIG. 39 is a plain view of a large salty body of water and schematic diagram of pipeline systems associated with an alternative section of geothermal power plants, in accordance with the invention.

FIG. 39 Illustrate a plain view diagram of array of geothermal power plants 300 at an alternative sector southeast of the Salton Sea at location with great geothermal potential. The functioning concept of power plants 300 in each sector around the Salton Sea is similar and will be explained in following FIGS. 41-47.

Figure 40:
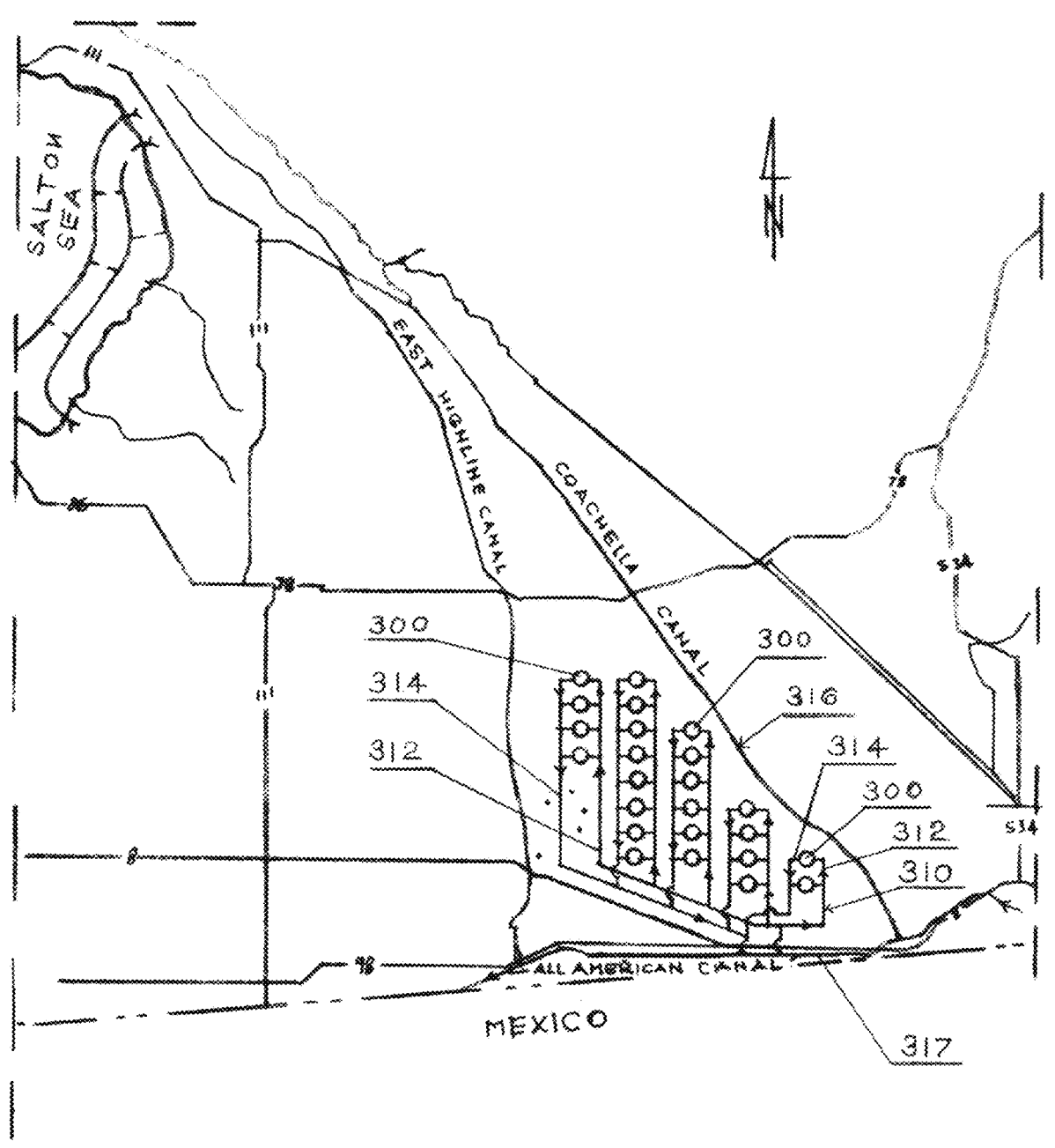
FIG. 40 is a plain view of a large salty body of water and schematic diagram of pipeline systems with an alternative section of geothermal power plants shown in FIG. 39 with an alternative cooling system, in accordance with the invention.

FIG. 40 is a plain view diagram of array of geothermal power plants 300 at same location as explained in previous FIG. 39 with schematic diagram of an alternative cooling system 310 as explained in FIG. 38. Here is illustrated an alternative option for cooling condensers of the power units of the power plants 300 with closed loop system 310 having inflow line 312 and outflow line 314 by using relatively cold water from nearby canal 317. Water used for cooling condensers is returned back without any lost into nearby canal 317 by outflow line 314 for its original intended purpose. This cooling system is explained in more details in FIG. 44.

Figure 41:
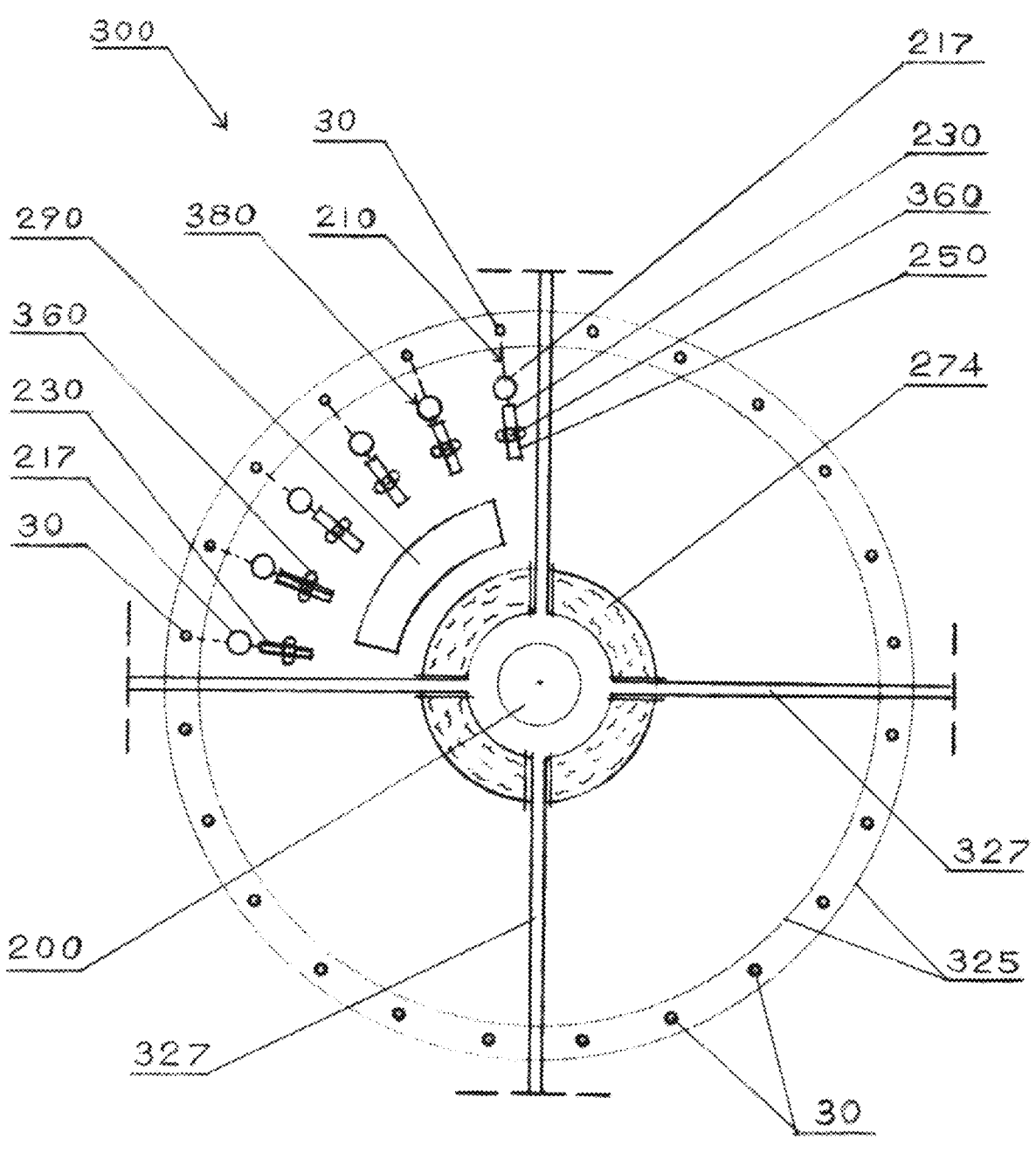
FIG. 41 is a plain view of a schematic diagram of the geothermal power plant with array of 24 wells. For clarity and simplicity, is shown only one quarter of the plant with 6 wells and corresponding 6 power units, in accordance with the invention.

FIG. 41 is a plain view of a schematic diagram of the geothermal power plant 300 with array of 24 wells 30. For clarity and simplicity, here is shown only one quarter of the power plant 300 with 6 wells and corresponding 6 power units 280. Also, shown here is heat exchange systems 210 connecting first heat exchanger 168 inside well 30 and second heat exchanger 182 inside boiler 217 (illustrated in more details in FIG. 45). Here are also illustrated control center 200; fresh water pond 274; desalinization processing building 290; rail road tracks 325; and access roads 327; The power units 280 having boiler/evaporator 217; turbines 230; condenser 360; and generator 250 is explained in more details in following illustrations. The other three quarters of the power plant are identical. Desalinization building 290 is shown here as an optional facility that can be utilized, if needed, for production of salt and other minerals. Further embodiment of this invention is that power plants 300 consisting of power unites 280 is a modular system capable of easy adjustments and reproduction.

It is also an embodiment of this invention that power plant 300 is based on array of multi wells with relevant power units 380 of medium or smaller sizes which can extract heat from underground heat source more efficiently and with fewer limitations than in conventional systems where a single power unit is used and supplied with fluids from natural or manmade hydrothermal reservoir. By having more wellbores 30 which length (depth) can periodically be extended and having more corresponding portable multi heat exchangers 168 inside them increases heat exchanging surface of the wellbores 30 and heat exchanging surface of the heat exchangers 168 altogether. Here presented power units 380 can be portable, easy managed, and replaced if needed with deferent capacity power units. Alternatively, several wells with corresponding heat exchange systems 210 of one section of the power plant 300 can be arranged to supply heat to one or more power units 380 as illustrated in FIGS. 16-19, 45 and 47.

Figure 42:
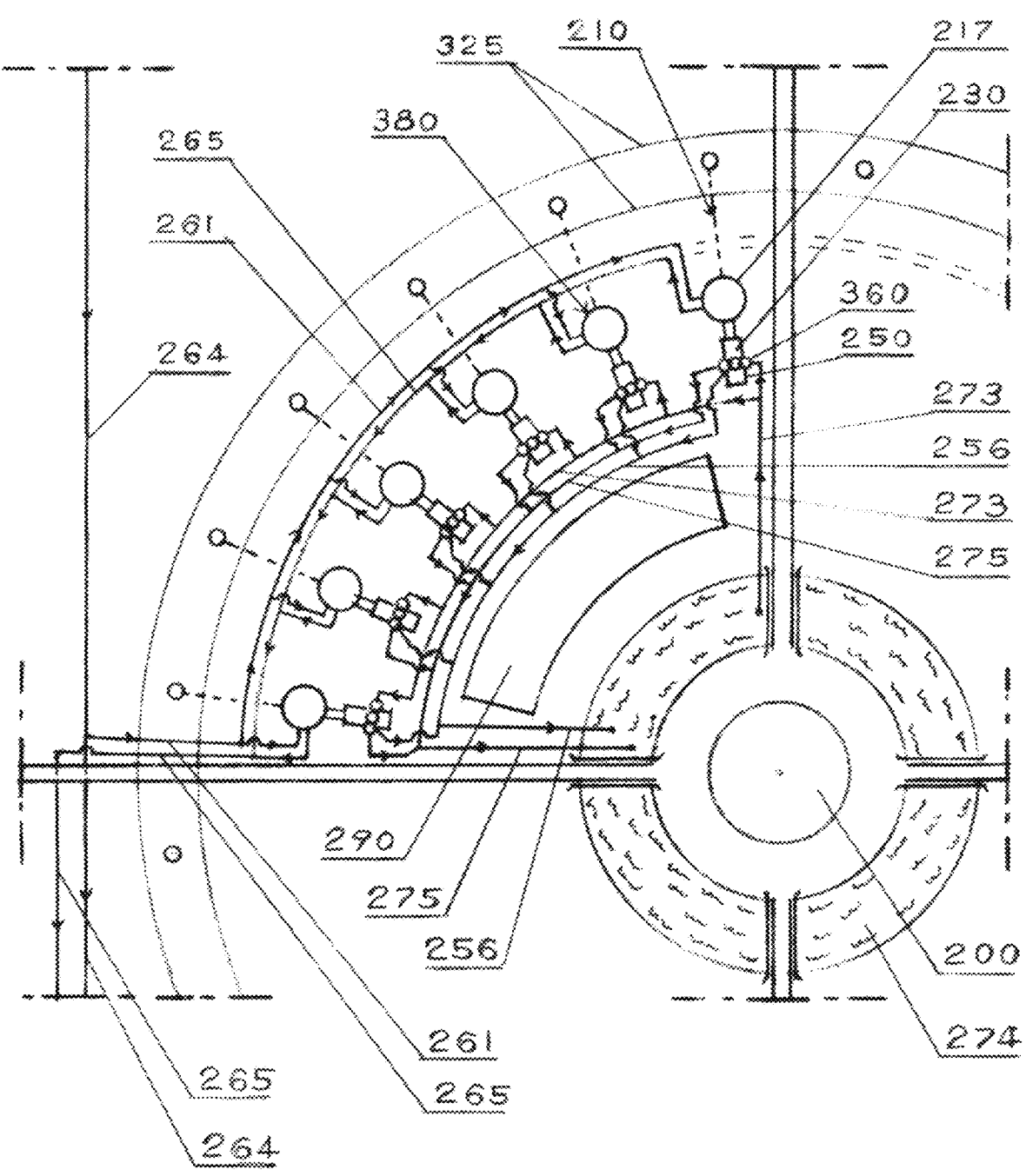
FIG. 42 is enlarged schematic diagram of the one section of the geothermal power plant shown in FIG. 41 with a cooling system, in accordance with the invention.

FIG. 42 illustrates an enlarged schematic diagram of the one section of the geothermal power plant 300 shown in FIG. 41. Here are illustrated power units 280 having boiler/evaporator 217, turbines 230, condenser 360, and generator 250 with schematic diagram of fluid flow systems associated with power plant. Also, shown here is heat exchange systems 210 connecting first heat exchanger 168 inside well 30 and second heat exchanger 182 inside boiler 217 (illustrated in more details in FIG. 45). Here is illustrated pipeline 264 with extended branch 261 that supply the boiler/evaporator 217 with water from salty body of water 156 and pipeline 265 for disposal of high salinity water from boiler/evaporator 217. The pipelines 264 with extended branch 261 and pipeline 265 are aligned together at certain length for purpose of exchanging heat from hot pipeline 265 to pipelines 264 and 261 to warm up water entering the boiler 217. Those pipes passes through heat exchange container 253 similar to the heat exchange container 254 illustrated and explained in FIG. 32. Also, here is shown inflow cooling pipeline 273 that takes water from fresh water pond 274, passes through condenser 360, cools it, and returns through outflow cooling line 275 back into fresh water pond 274. Here is also shown pipeline 256 that delivers condensed fresh water from condenser 360 into fresh water pond 274.

Figure 43:
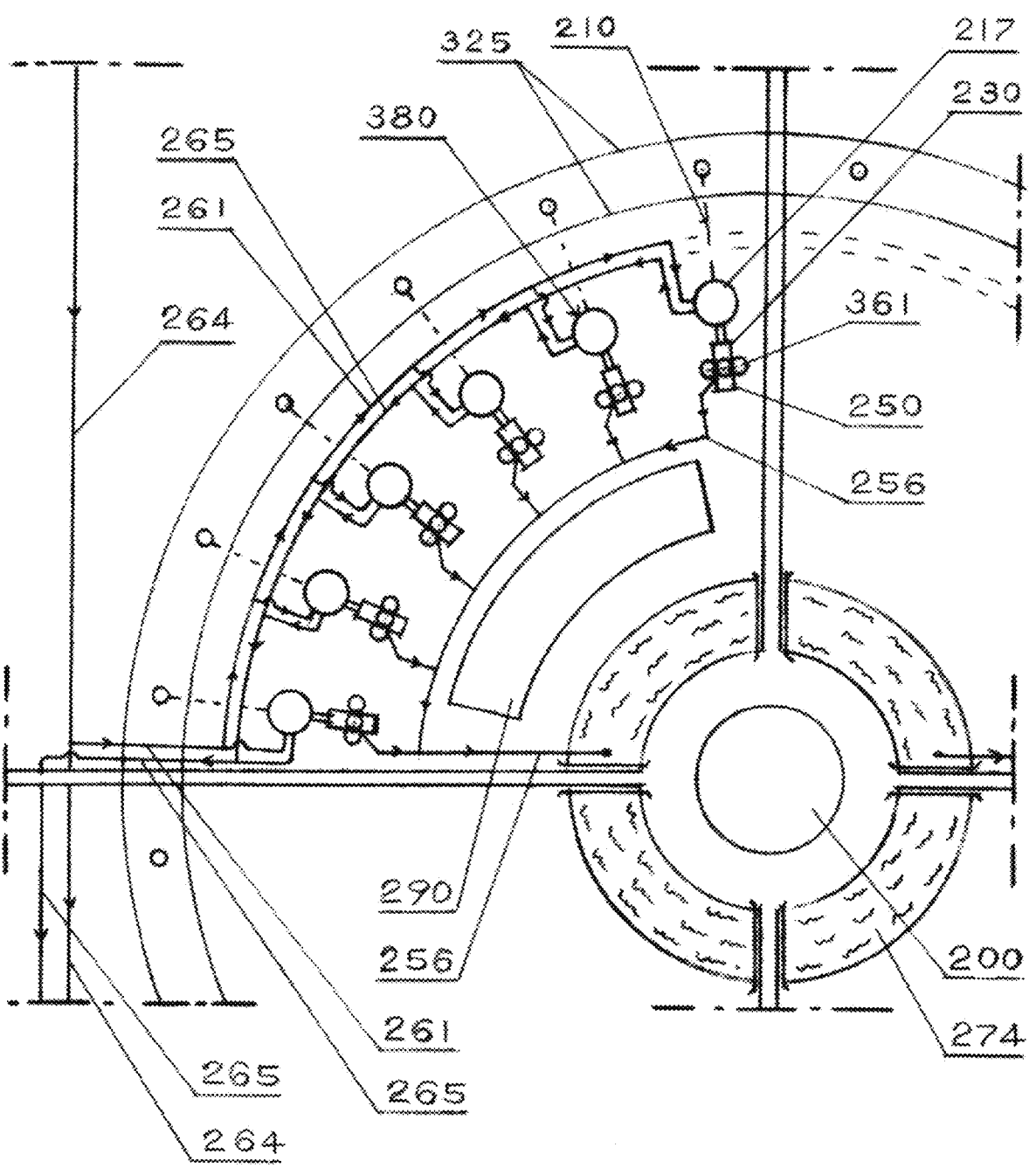
FIG. 43 is enlarged schematic diagram of the one section of the geothermal power plant shown in FIG. 41 with an alternative cooling system, in accordance with the invention.

FIG. 43 illustrates an enlarged schematic diagram of the one section of the geothermal power plant 300 shown in FIGS. 41 and 42 with an alternative cooling system. Here is shown condenser 361 which optionally can be cooled with fan and air circulation instead with water. Alternatively, the boiler 217 can be modified so that fresh water or other working fluids can be used and recycled.

Figure 44:
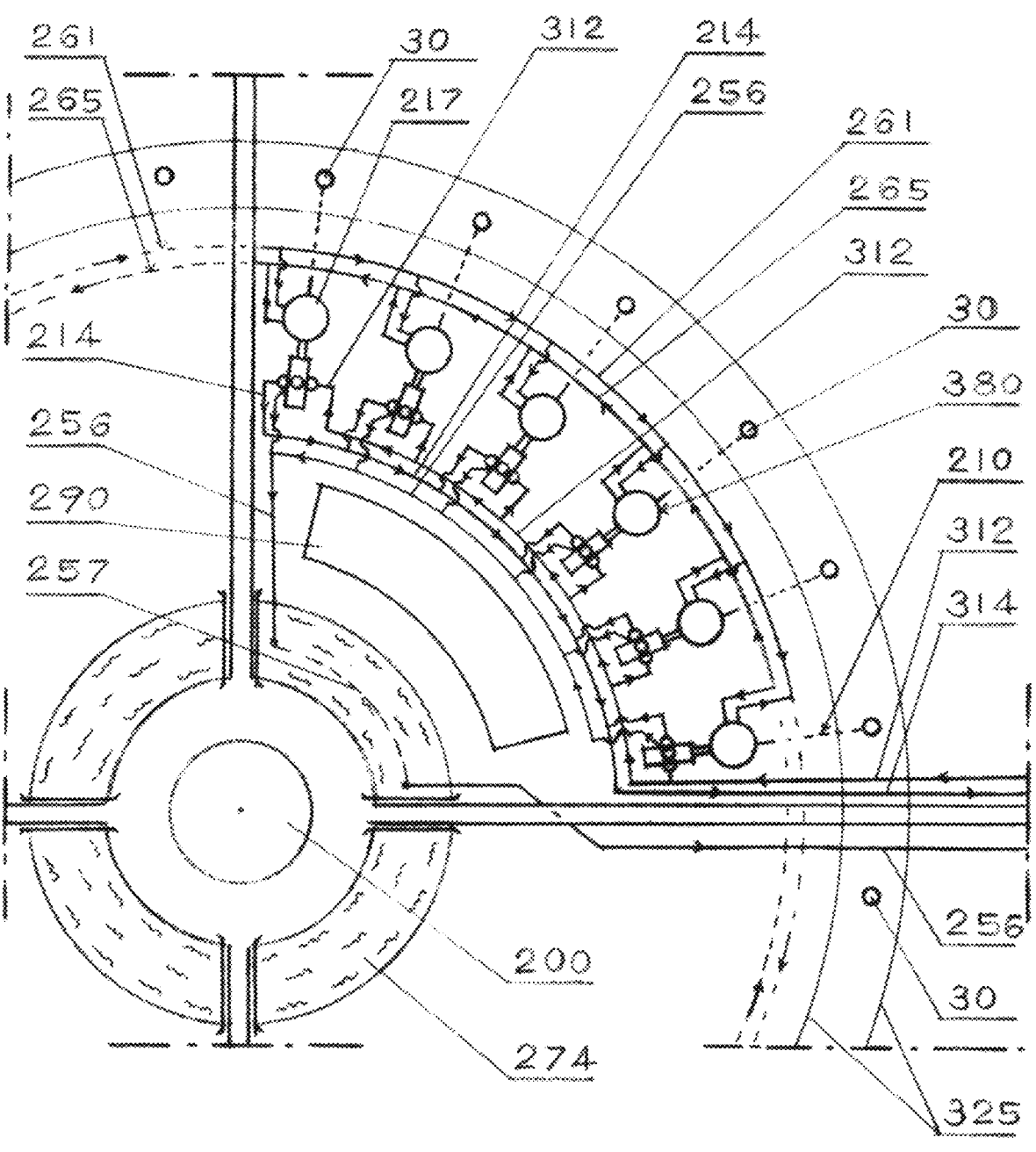
FIG. 44 is an enlarged schematic diagram the one section of the geothermal power plant shown in FIG. 41 with an alternative cooling system, in accordance with the invention.

FIG. 44 illustrates an enlarged schematic diagram of the one section of the geothermal power plant 300 shown in FIG. 41 with an alternative cooling system. Here are shown all elements as in FIG. 42 with difference that condenser 360 is cooled with relatively cold water from nearby canal 316. Here is also shown pipeline 261 that supply the boiler 217 with water from salty body of water 156 and pipeline 265 for disposal of high salinity water from boiler/evaporator 217. Further embodiment of this invention is that additional existing available sources at location, such is relatively cold water from nearby canal 316, is integrated in function of the power plant 300. Here are shown inflow line 312 and outflow line 314 of the closed loop cooling system 310 used for cooling condenser 360. (Sec FIG. 38). Water used for cooling condensers 360 is returned into canal 316 without any lost. Here is also shown desalinization building 290 as an optional facility that can be utilized, if needed, for production of salt and other minerals. Also, here is shown water pond 274 for collecting fresh water from condensers 360 which can be used for agriculture and other applications. Here also is shown an optional pipeline 257 bypassing water pond 274 and connecting freshwater pipeline 256 from condensers 360 directly to canal 316.

Figure 45:
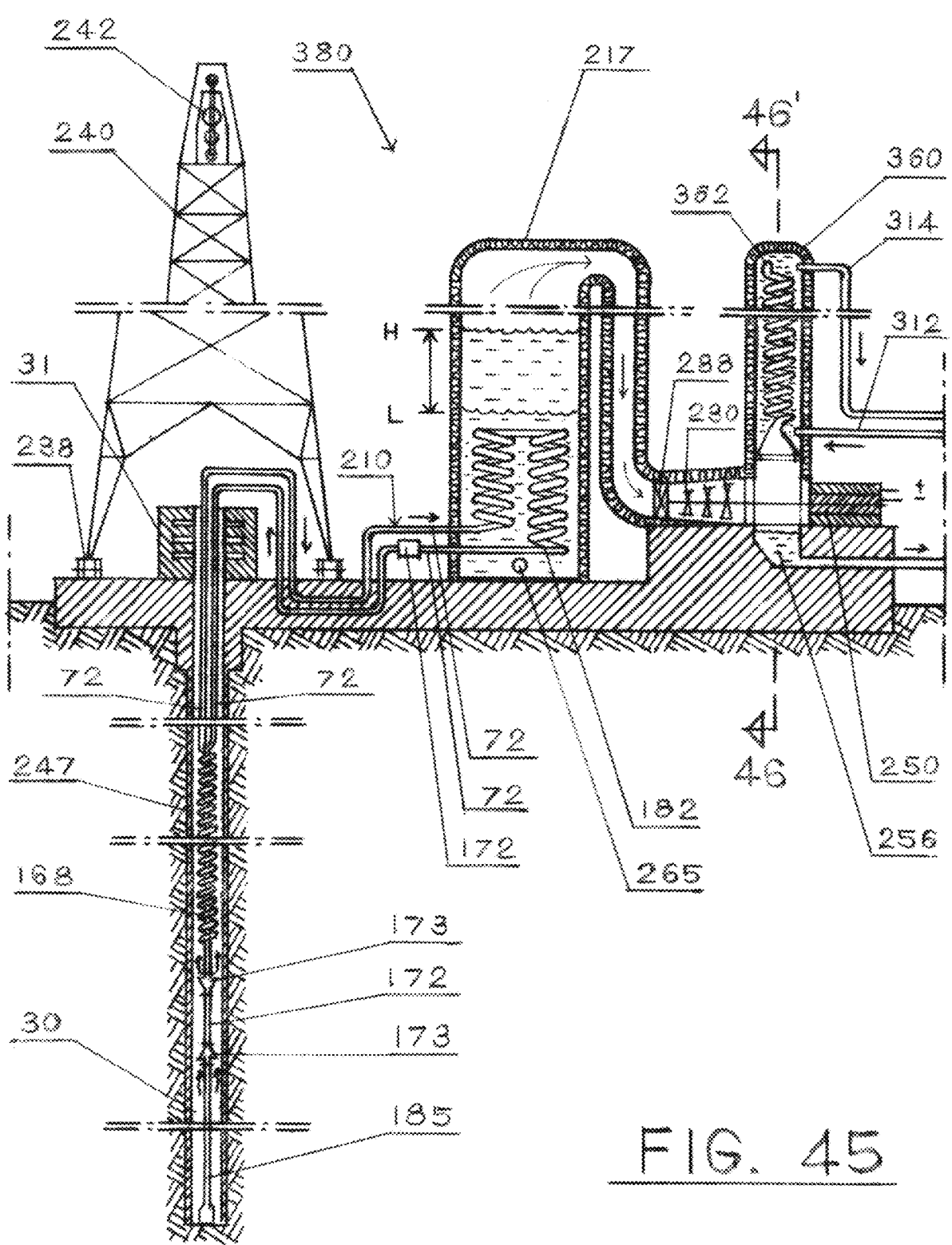
FIG. 45 is a cross-sectional view of one power unit taken along line 45-45' of FIG. 47, in accordance with the invention.
Figure 47:
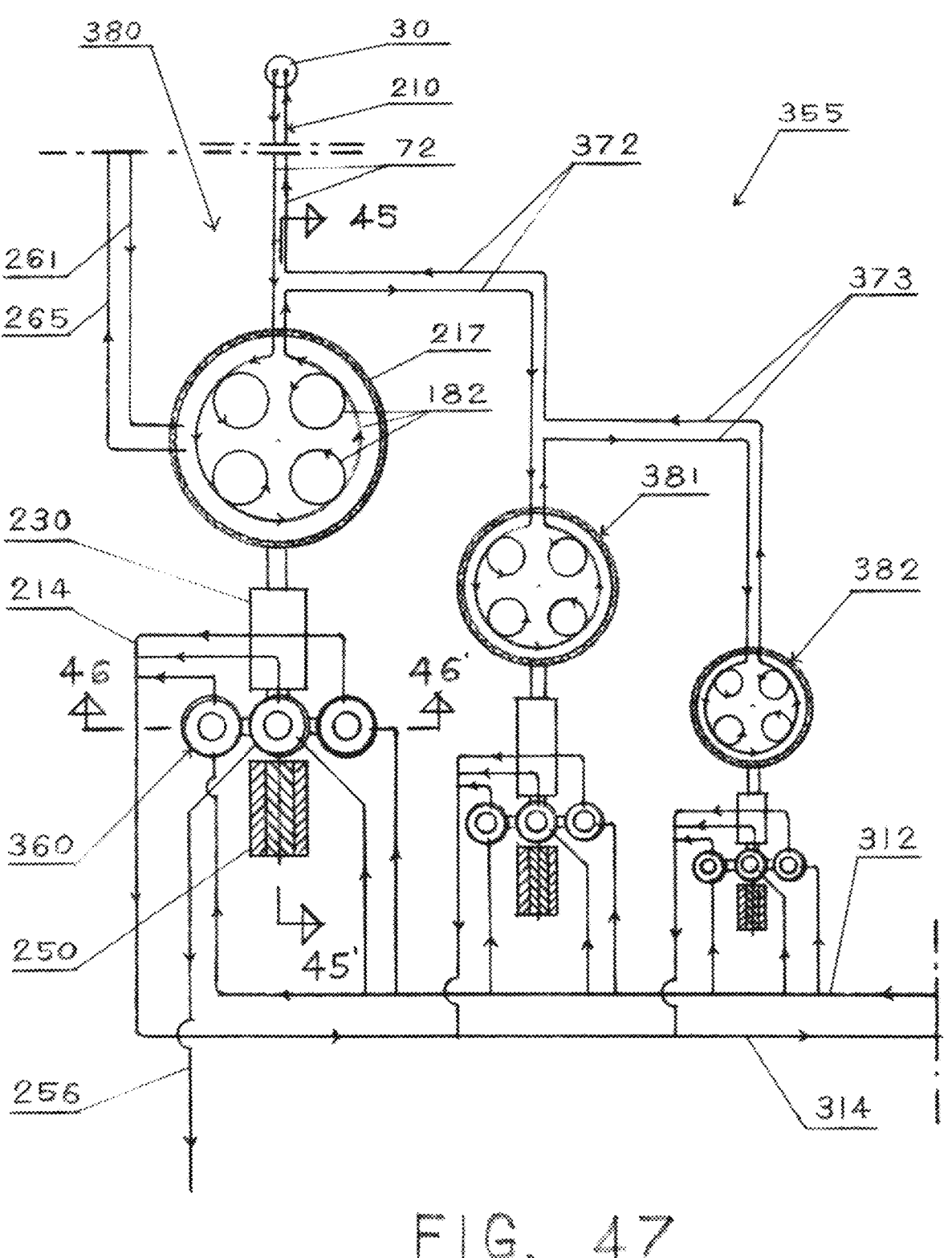
FIG. 47 is a schematic diagram of a geothermal power unit of the power plant illustrated in FIG. 45 with an alternative secondary power unit aside, in accordance with the invention.

FIG. 45 is a cross sectional view of one power unit 380 of the power plants 300 taken along line 45-45' of FIG. 47. This illustration is similar to the illustration explained earlier in FIG. 30, with minor modifications made to accommodate additional illustrations. In this illustration also are shown well-bore 30 with casing 247. Also, here is shown the first heat exchanger 168 inside well and second heat exchanger 182 inside boiler/evaporator/distiller 217 with other elements of the power plant 380—turbines 230, condenser 360, and generator 250. Here is also shown at the bottom of well 30, an in-line pump 172 which can be attached, if needed, to the first heat exchanger 168 to circulate geothermal fluids upward and around first heat exchanger 168 for more efficient heat exchange. Here is illustrated an in-line pump 172 having two fluid stirring elements 173 on each end. The fluid stirring elements 173 are simple structural pipe sections with openings extending slightly off the center line of the pipeline. The purpose of the fluid stirring elements 173 on the lower end of the in-line pump 172 is to direct surrounding geothermal fluid into in-line pump 172 and purpose of the fluid stirring elements 173 on the upper end of the in-line pump 172 is to direct geothermal fluid from the in-line pump 172 up and around first heat exchanger 168. The first heat exchanger 168 can cool its surroundings relatively fast therefore circulating geothermal fluid up and down well and around heat exchanger 168 imparts heat exchange process. Here is also illustrated the base of structural pipe 185 which extends to the bottom of the well. The extended length of the well-bore 30 and structural pipe 185 provides an increased surface of the walls providing more heat to be extracted. A further embodiment of this invention is that in wells without natural geothermal fluid (dry wells), we can inject our wastewater, for example high salinity water from boiler 217, to provide heat exchange medium.

Here is also shown at least one an inline pump 172 which circulates heat exchange fluid through closed loop system 210 connecting heat exchangers 168 and 182. As explained in previous illustrations water from the salty body of water (lake) 156 is injected through pipelines 264 and 263 into boiler 217 at level "H". Water in boiler 217 is heated through heat exchanger 182. Produced steam from boiler 217 is controlled with valve 288 and turns turbines 230 which is connected to and spins generator 250 which produces electricity which is then transmitted though electric grid. Exhausted steam after passing through turbines enters the inner piping system 362 of the condenser 360. The inner piping system 362 inside condenser 360 is surrounded with circulating water which enters through pipeline 312 and exits through pipeline 314. The inner piping system 362 is spiral coiled pipe with closed end on top. Several condensers 360 can be assembled as better illustrated in FIG. 46. "Back Pressure" is a term defining pressure that usually exists after steam passes though turbine and decreases efficiency of the turbines. Further embodiment of this invention is that exhausted steam passing through inner piping system 362 reduces and preferably eliminates the "Back Pressure". The Back Pressure is substantially reduced or eliminated by increasing length of the inner piping system 362 or adding more condensers. Here is also shown collected fresh water under condenser 360 which is transported through pipe 256. Here is also shown "Blow Out Preventer" 31 and derrick 240 on dollies 238 which will be explained in more details in subsequent application relevant to drilling.

Figure 46:
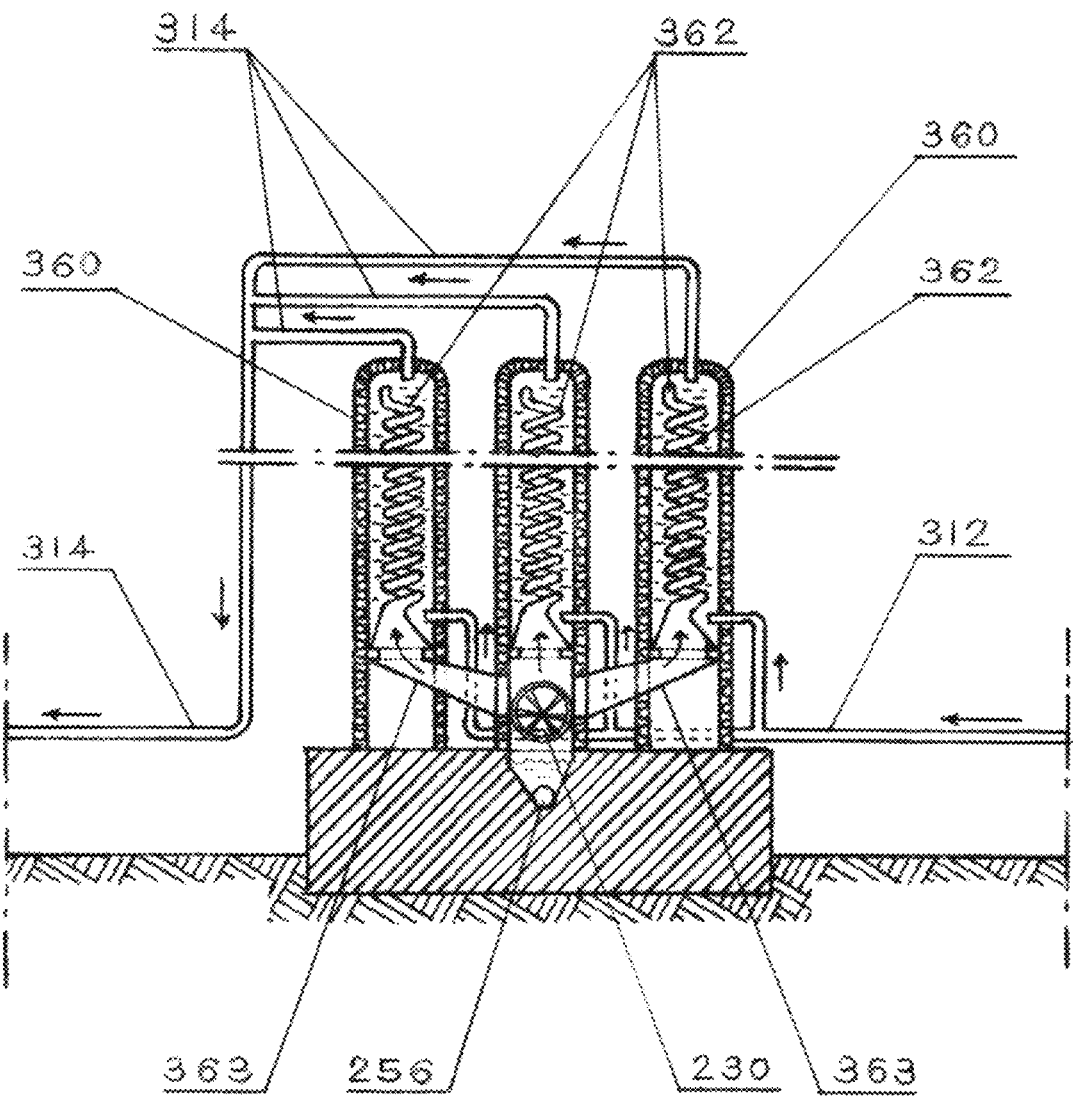
FIG. 46 is a cross-sectional view taken along line 46-46' of FIGS. 45, 47, and 48, in accordance with the invention.
Figure 48:
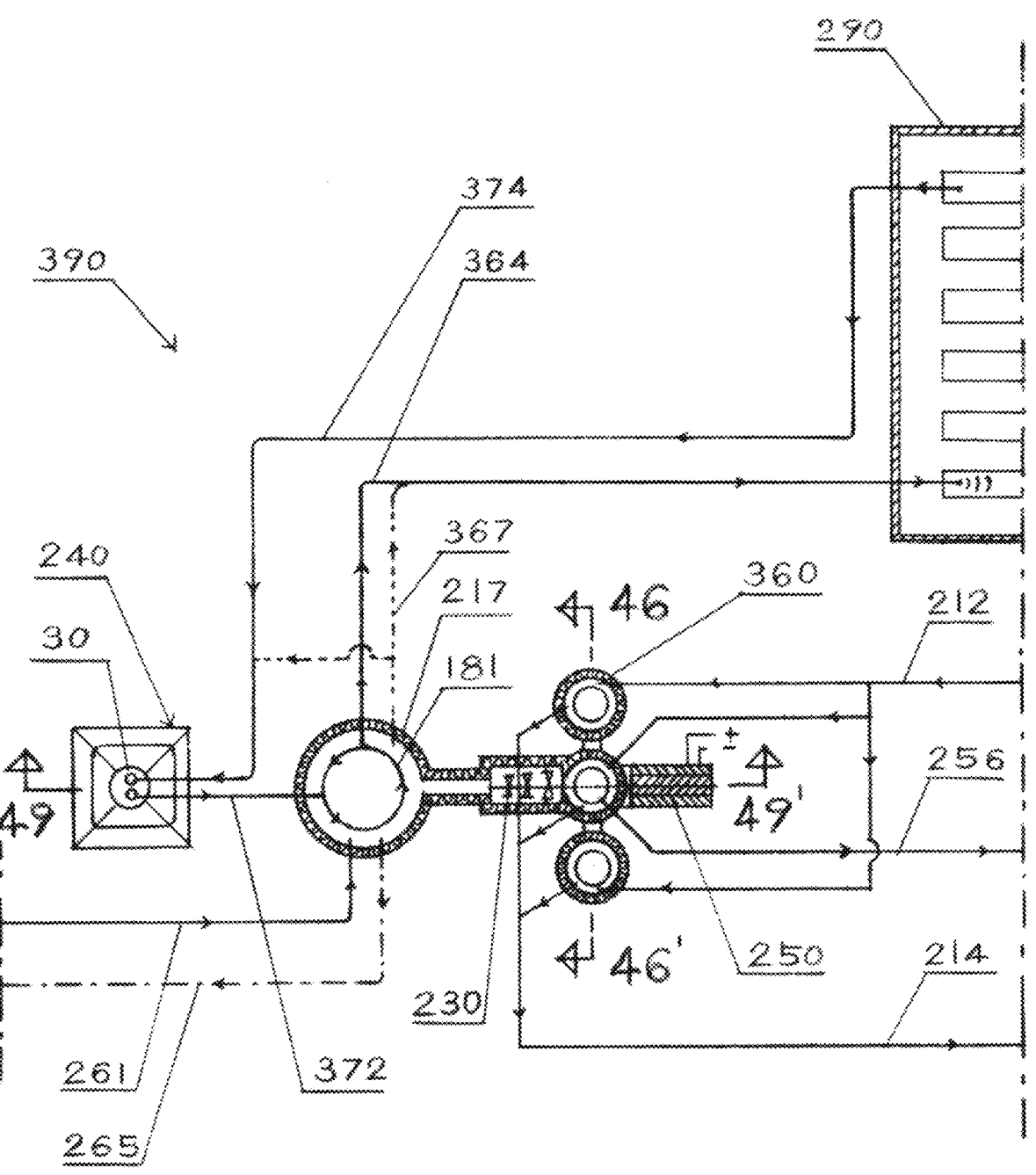
FIG. 48 is a schematic diagram of an alternative power unit of a geothermal power plant modified for the production of electricity, fresh water and extraction of minerals, in accordance with the invention.

FIG. 46 is a cross sectional view taken along line 46-46' of FIGS. 45, 47, and 48. Here are shown a set of three condensers 360 with inner piping system 362 connected through distributor chamber 363. The distributor chamber 363 can be equip with automatic control valves to control opening and closing of each condenser as needed. Here is also shown inner piping system 362 inside condenser 360 with surrounded circulating water which enters condensers 360 through pipeline 312 and exits through pipeline 314.

FIG. 47 is schematic diagrams of a geothermal power unite 380 of the power plant 300 illustrated in FIG. 45 with an alternative secondary power unit aside 355. Here are shown main elements of the power units 380—wellbore 30, closed loop system 210, boiler 217, turbines 230, condenser 360, and generator 250. The boiler 217 is heated trough heat exchanger 182 which is part of closed loop system 210. Here is also shown condenser 360 with cooling water pipeline inflow 312 and outflow 314. Further embodiment of this invention is that secondary binary power unit 355 is connected to the pipeline 72 of the closed loop system 210 on the way out of boiler 217 for additional extraction of heat and additional production of electricity. The secondary power unit 355 consists of two interconnecting binary power units 381 and 382. Binary power units 381 and 382 have same elements as power unit 380 with exception boilers are not filled with salty water from the lake 156 instead, they are filled with working fluid that has lower boiling point than water. There are different kinds of working fluids with different boiling points.

The power unit 382 has lesser capacity than power unit 381 and uses working fluid that has lower boiling point than is used in power unit 381. The secondary power unit 355 uses same cooling water pipeline inflow 312 and outflow 314 as power units 380. The secondary power unit 355 doesn't produce fresh water. The power unit 355 is also illustrated in FIG. 38 as a part of the cooling closed loop system 310. The power unit 355 is illustrated here as a secondary binary power unit, although it can be used as a primary system (also illustrated in FIGS. 16 & 17). The binary power unit 355 can be used as a primary system especially if Phase I & II of the proposal for restoration of the Salton Sea (connecting Salton Sea with Ocean), are for whatever reason, rejected and Oceanic water cannot be used.

FIG. 48 is a schematic diagram of an alternative power unit 390 of the geothermal power plant 300 modified for the production of electricity, fresh water, and extraction of minerals. This plan view illustrates an alternative geothermal power unit 390 designed for locations where the subsurface and the geothermal resources therein are rich with minerals. Here is shown a power unit 390 with main elements-derrick 240, well 30, boiler 217, turbines 230, condenser 360, and processing building 290. The power unit 390 functions similarly as power unit 380 which is previously explained. The difference in the function of the power unit 390 is that geothermal brine, which is rich in minerals, is excavated through thermally insulated excavation line 372 to the surface and injected into heat exchange coil 181 which is coupled inside boiler 217. Hot geothermal brine travels downhill through heat exchange coil 181 and heats boiler 217 which is filled with salty water from lake 156 through pipeline 261. Produced steam from boiler 217 is controlled with valve 288 and turns turbine 230 which is connected to and spins generator 250 which produces electricity which is then transmitted through the electric grid. A further embodiment of this invention is that geothermal brine is transported from boiler 217 through brine line 364 to processing building 290 for extraction of different minerals.

The function of the processing building 290 is explained in FIGS. 29, 31, and 32 which is to induce evaporation by heating removable pans 252 and to induce condensation for production of the salt and fresh water. Similarly, the same function of the processing building 290 can be used for extraction of the different minerals such as lithium, magnesium, etc., from geothermal brine. Processing buildings 290 are strategically positioned in the mid-section of the power plant 300 to accommodate an array of 6 wells in each section of the power plant 300. Additional sections in processing building 290 can be added, if needed, for the synthesis and electrolysis process. Alternatively, waste material brine, after extraction of minerals in processing building 290, is returned trough pipeline 374 back into well 30. Here is also shown an alternative pipeline 367 for high salinity water from boiler 217 level "L", if needed, to be added to geothermal brine in pipeline 364 on the way to processing building 290. Here is also shown an alternative pipeline 368 for high salinity water from boiler 217 level "L" to be injected into well 30 for replenishing underground geothermal reservoir and sustaining the well 30. Here are also shown inflow line 312 and outflow line 314 of the closed loop cooling system 310 used for cooling condenser 360. (See FIG. 38). Here is also shown freshwater line 256. The surfaces of the boiler and pipeline system can be painted with epoxy bland that resist corrosion in salty water.

Mining on top of volcano or caldera is not wise selection for location for excavation of minerals because at such locations the Earth's crust is thin and there is mantle plume below. Therefore, if mining is conducted it should be at minimal capacity and well should be replenished. Concept for power unit 390 is introduced here as alternative to main concept for power unit 380 to be used periodically. There is a movable derrick 240 on railroad track 325 for maintaining array of 24 wells at each power plant. The Power unit 390 can be deployed periodically at each well.

Figure 49:
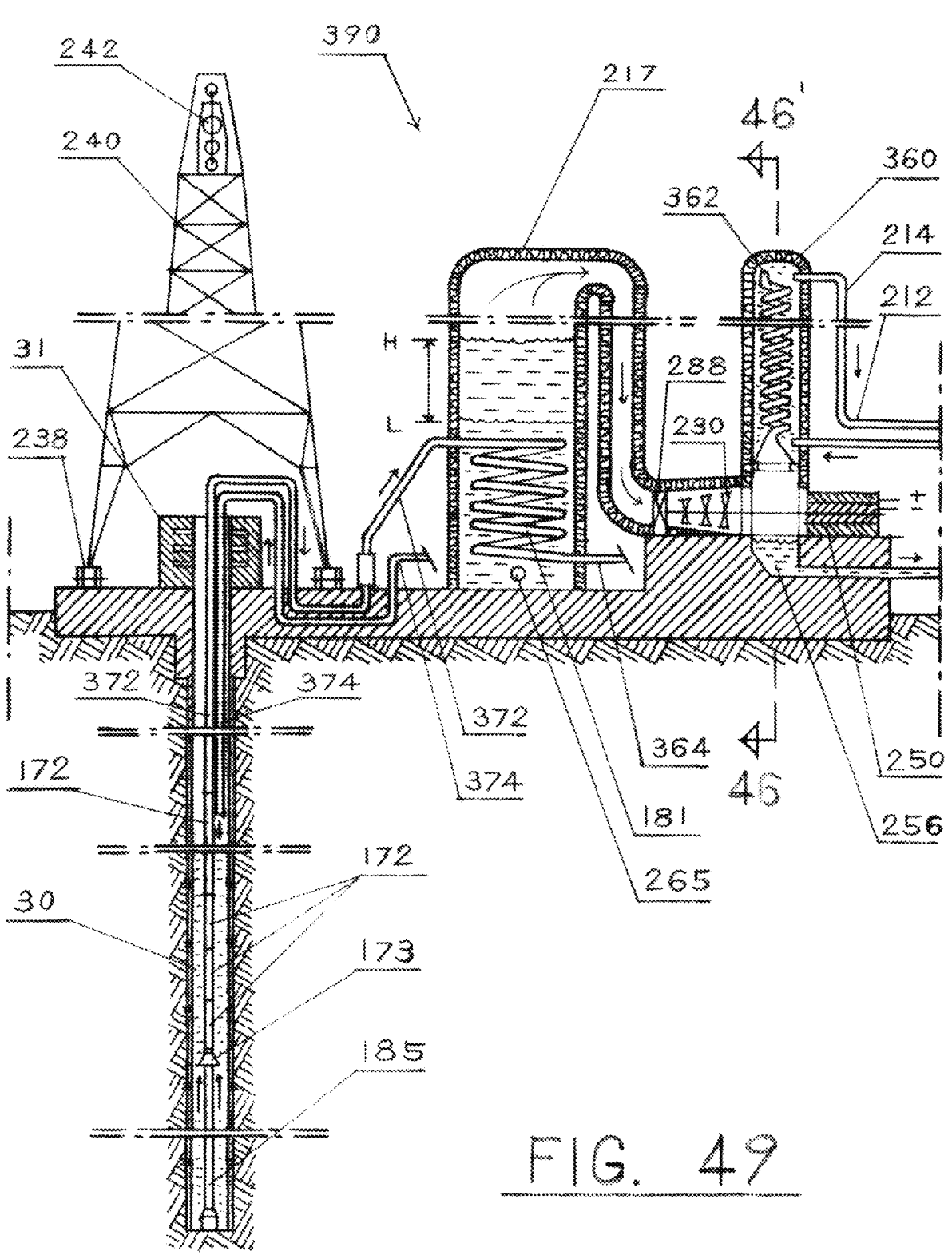
FIG. 49 is a cross-sectional view of an alternative power unit taken along line 49'-49' of FIG. 48, in accordance with the invention.

FIG. 49 is a cross sectional view of an alternative power unit 390 taken along line 49'-49' of FIG. 48. All elements and functions of power unit 390 is explained in previous FIG. 48. A further embodiment of this invention is that brine excavation pipeline 372 can be assembled with repetitive segment of inline pumps 172. This way will eliminate excavation problems which are present in conventional drilling, geothermal and oil industries especially in cases where geothermal fluids are deep and geo-pressure is low or doesn't exist.

Figure 50:
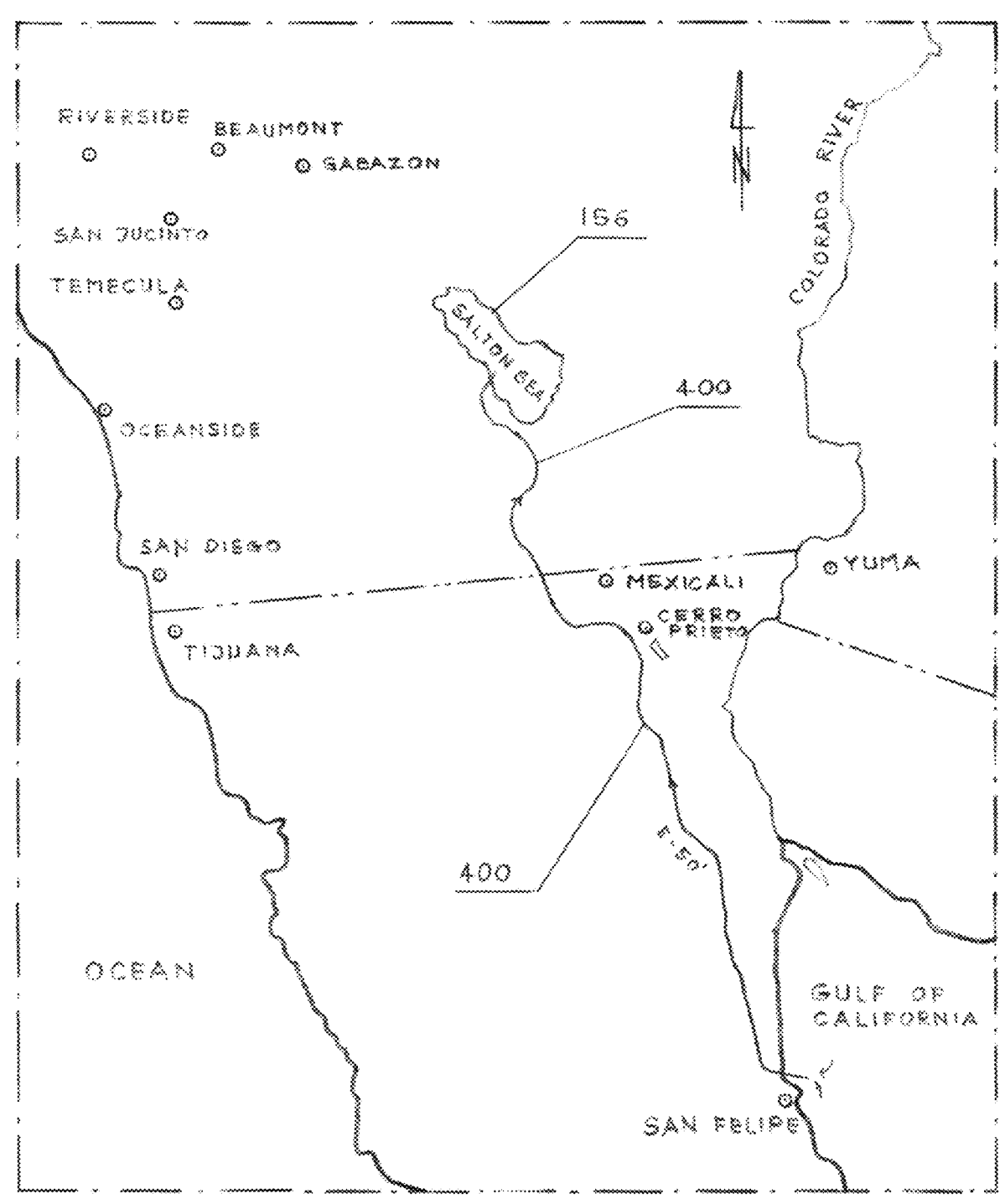
FIG. 50 is a plain view of a schematic diagram of an alternative pipeline route connecting Salton Sea with Gulf of California, Mexico, associated with restoration of the Salton Sea.

FIG. 50 is a plain view of a schematic diagram of an alternative pipeline 400—corridor Route #1, connecting Salton Sea with Gulf of California, Mexico, associated with restoration of the Salton Sea 156; This route requires our government to negotiation with Mexico officials' treaty for access for importing seawater. Calculations of the size of the pipeline, amount of water and cost estimate for its operation and revenue is included after the description of drawings.

Figure 51:
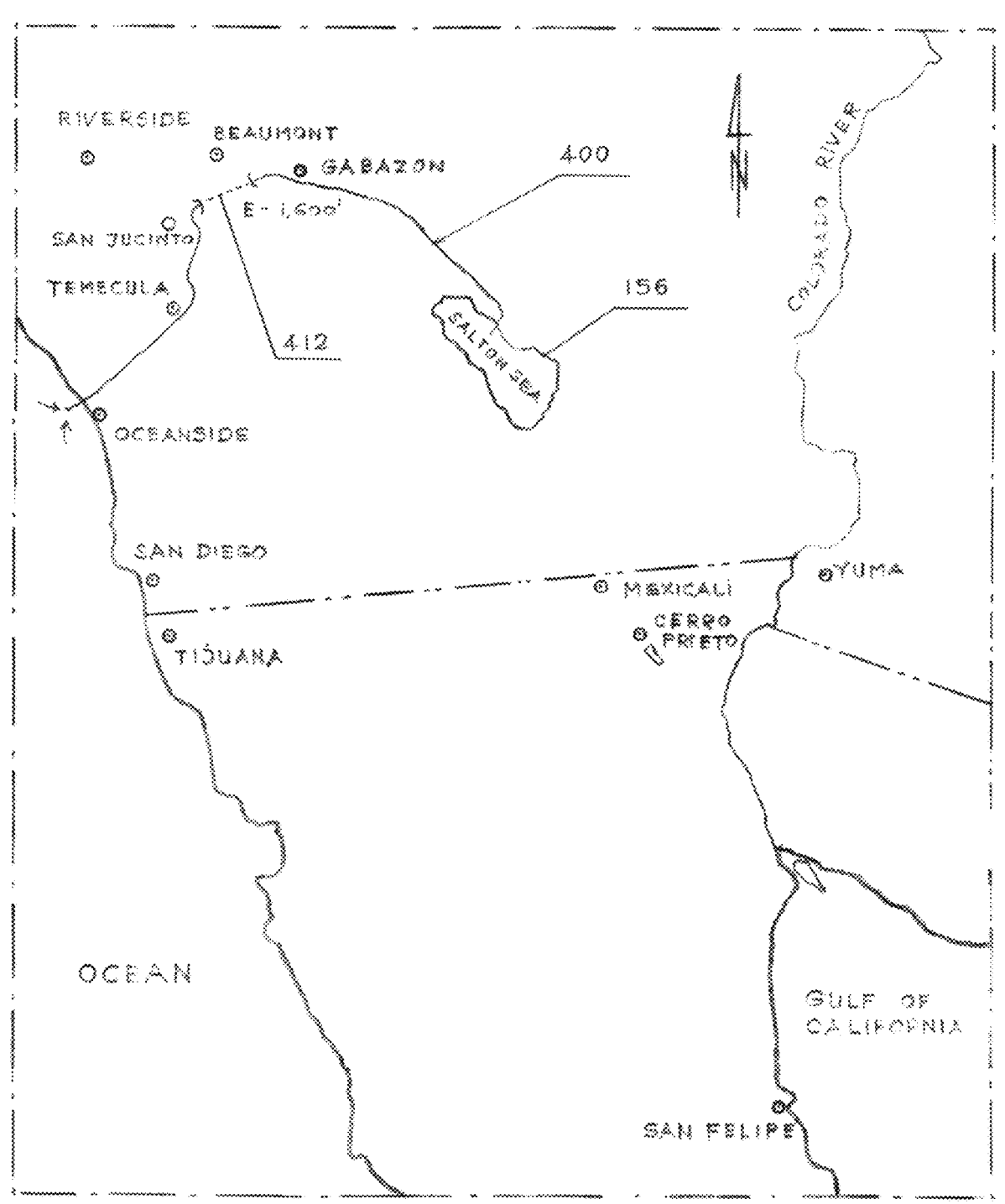
FIG. 51 is a plain view of a schematic diagram of an alternative pipeline route connecting Salton Sea with the Oceanside, through an existing tunnel associated with restoration of the Salton Sea

FIG. 51 is a plain view of a schematic diagram of an alternative pipeline 410—corridor Route #2, connecting Salton Sea with the Oceanside, through an existing tunnel associated with restoration of the Salton Sea 156. Calculations of the size of the pipeline, amount of water and cost estimate for its operation and revenue is included after the description of drawings.

Figure 52:
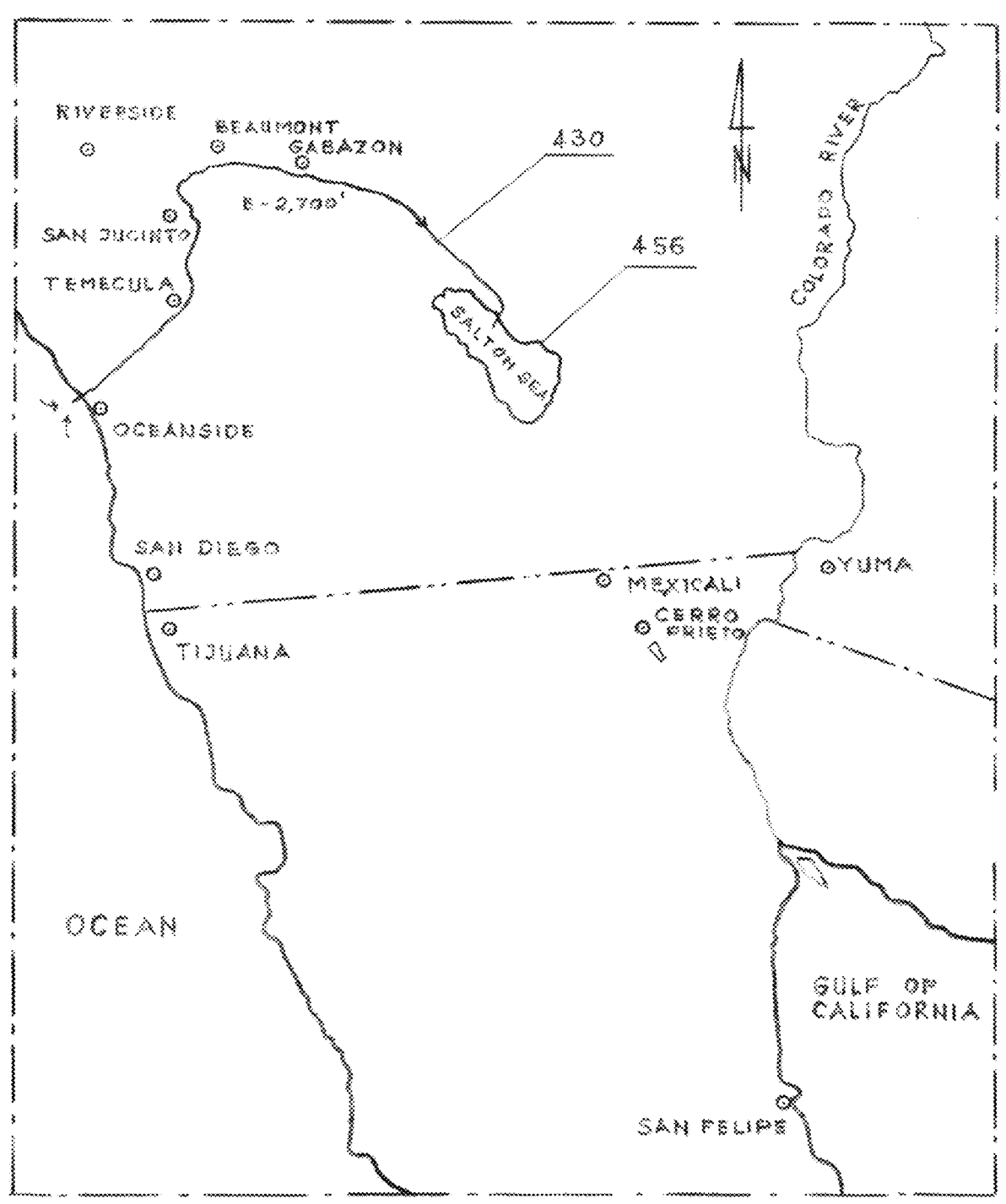
FIG. 52 is a plain view of a schematic diagram of an alternative pipeline route connecting Salton Sea with the Oceanside, through Beaumont associated with restoration of the Salton Sea.

FIG. 52 is a plain view of a schematic diagram of an alternative pipeline route 430—corridor Route #3, connecting the Salton Sea with the Oceanside, through Beaumont associated with restoration of the Salton Sea 156. Calculations of the size of the pipeline, amount of water and cost estimate for its operation and revenue is included after the description of drawings.

Figure 53:
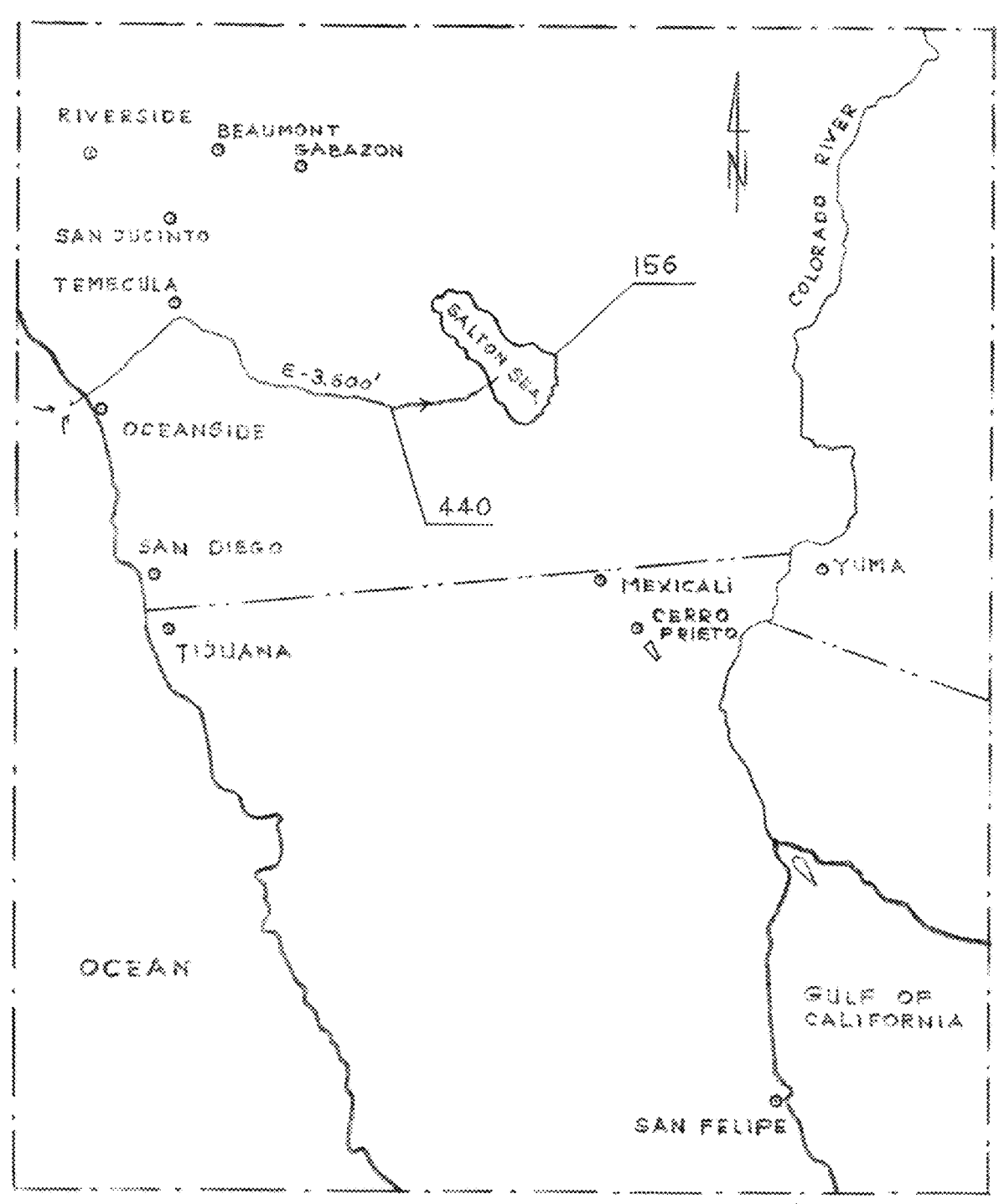
FIG. 53 is a plain view of a schematic diagram of an alternative pipeline route connecting Salton Sea with the Oceanside, through Borrego Springs associated with restoration of the Salton Sea.

FIG. 53 is a plain view of a schematic diagram of an alternative pipeline 440, corridor Route #4, connecting the Salton Sea with the Oceanside, through Borrego Springs associated with restoration of the Salton Sea 156. Calculations of the size of the pipeline, amount of water and cost estimate for its operation and revenue is included after the description of drawings.

Figure 54:
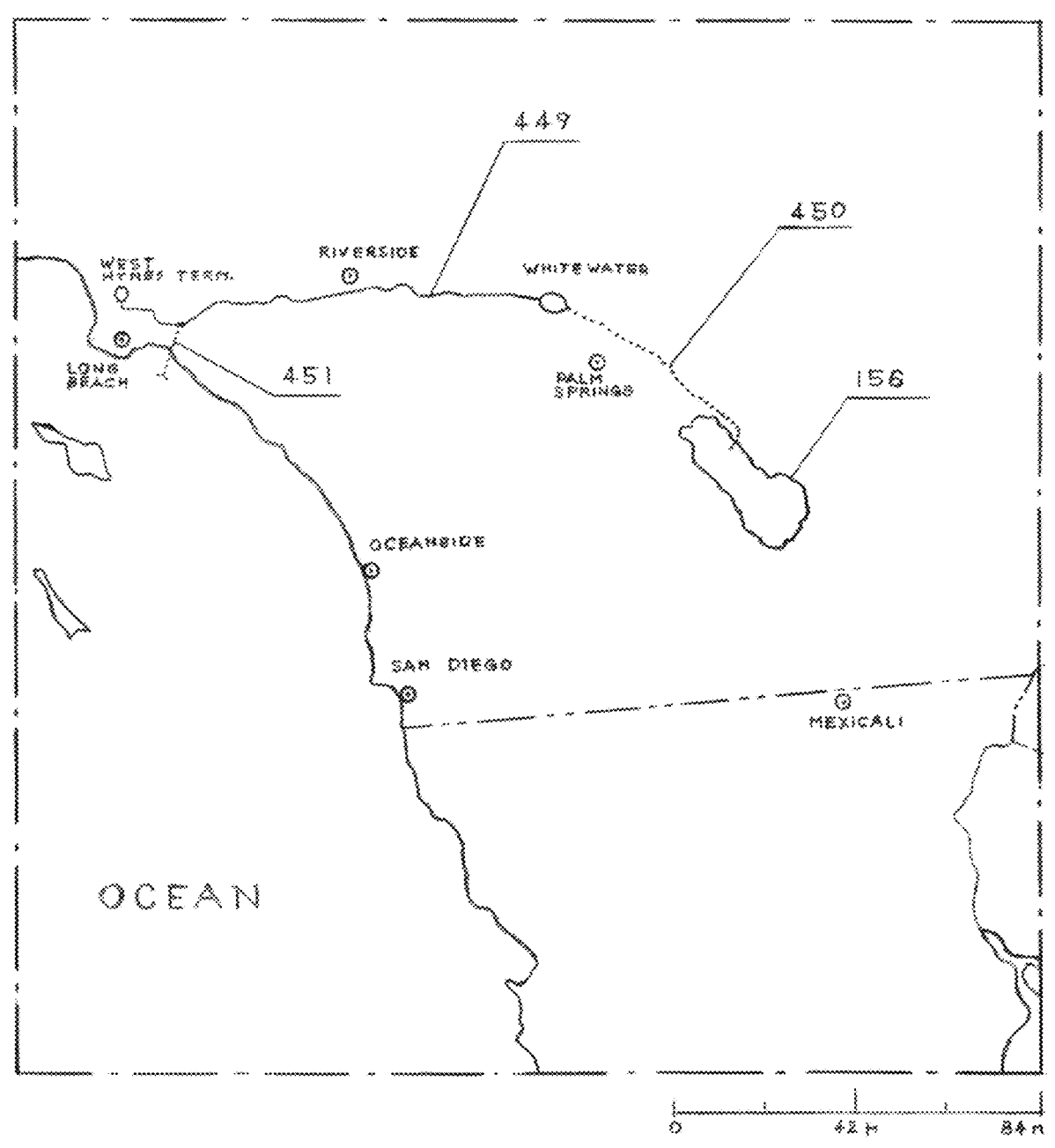
FIG. 54 is a plain view of a schematic diagram of an alternative pipeline route connecting Salton Sea with Long Beach, associated with restoration of the Salton Sea.

FIG. 54 is a plain view of a schematic diagram of an alternative pipeline 450 corridor Route #5, connecting Salton Sea with Long Beach, associated with restoration of the Salton Sea. Here is illustrated an existing 96 mile long. 16 inches diameter crude oil pipeline 449 owned by the Questar Pipeline Company. The existing pipeline 449 connects Whitewater and West Hynes Terminal in Long Beach. This pipeline is not operational at this time, but the Questar Pipeline Company own the "Right of Way" and is on sale. Here are also shown segments (in dash-line) 450 connecting the Salton Sea with Whitewater and last segment 451 redirecting existing pipeline to the Ocean. Calculations of the size of the pipeline, amount of water and cost estimate for its operation and revenue is included after the description of drawings.

Figure 55:
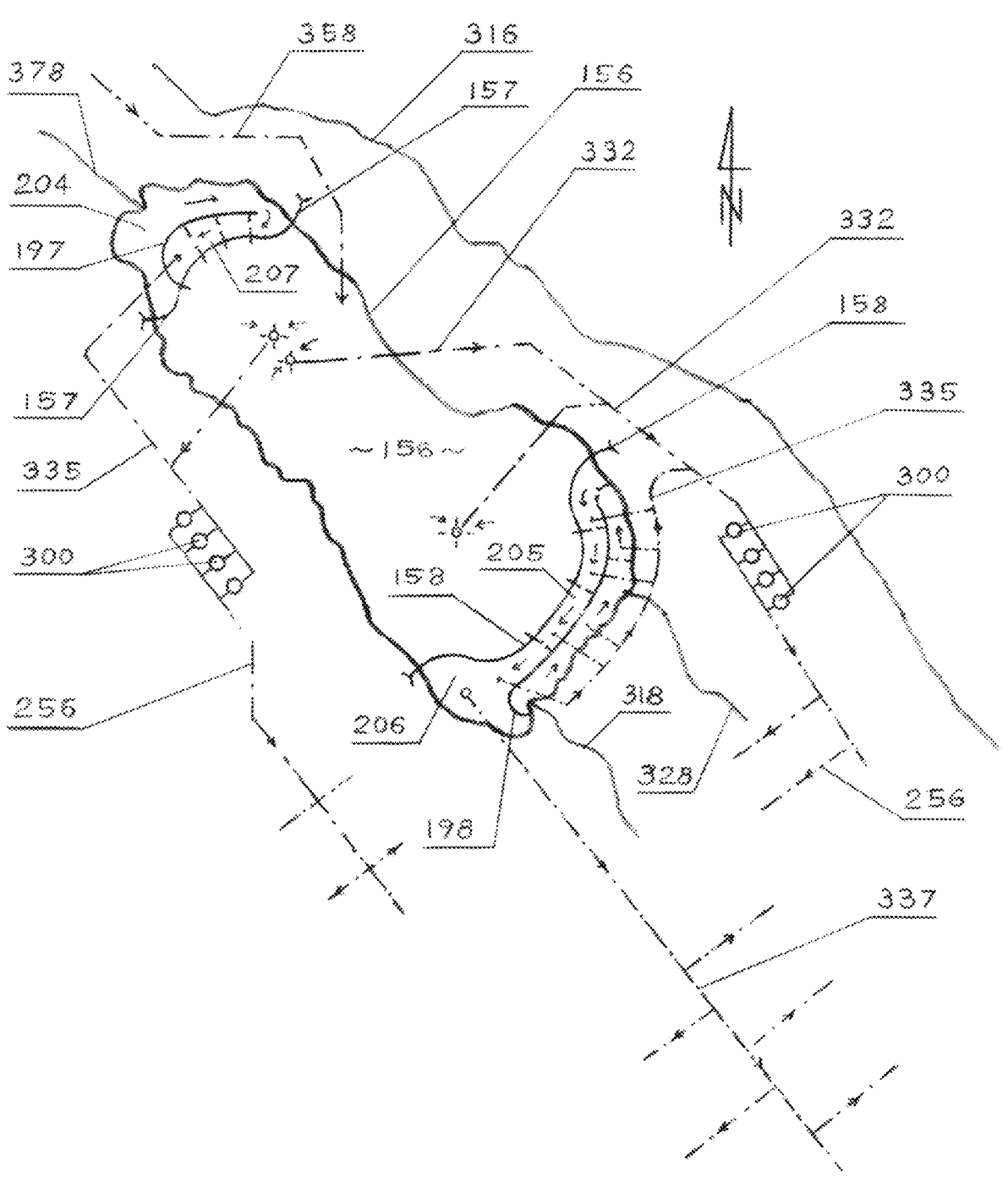
FIG. 55 is a plain view of a large salty body of water and schematic diagram of dikes and pipeline systems associated with restoration of the Salton Sea.

FIG. 55 is a plain view of an alternative schematic diagram of dikes and pipeline systems associated with restoration of the Salton Sea; Here the presented plan is similar to the plan already explained in FIG. 37 with several additions. Here are illustrated two main dikes 158 and 157 (two lane roads) divides lake in three sections-large central section 156 and two smaller sections northern 204 and southern 206. Here are illustrated secondary dikes 198 and 197 which form ponds 205 and 207. Dividing the lake into three sections, it prevents pollution of the central section of the lake and provides conditions for tourism (hotels, motels, beaches, resorts, etc.). Secondary dikes forms ponds 205 and 207 for collecting and treating farmland's runoff water and providing wildlife sanctuary-wetland;

Inflow pipeline 358 bringing seawater from the Pacific Ocean (there are several options for importing seawater) to the Salton Sea 156. The high salinity water tends to accumulate at the bottom of the lake and can be used for operation of a new design of the geothermal power plants 300. During the production process distilled water is produced as a byproduct. The high salinity water from the bottom of the lake 156 is collected through the collection pipeline 332 and from bottom of the ponds 205 and 207 through the collection pipeline 335 to the boiler/distiller 217 of the power plan 300 to generate electricity from prevalent geothermal sources and produces potable water and lithium as byproducts. As an alternative, ponds 205 in the Southern and 207 in the Northern sections of the Salton Sea or some of them can be used for cultivation of the algae for industrial use.

Figure 56:
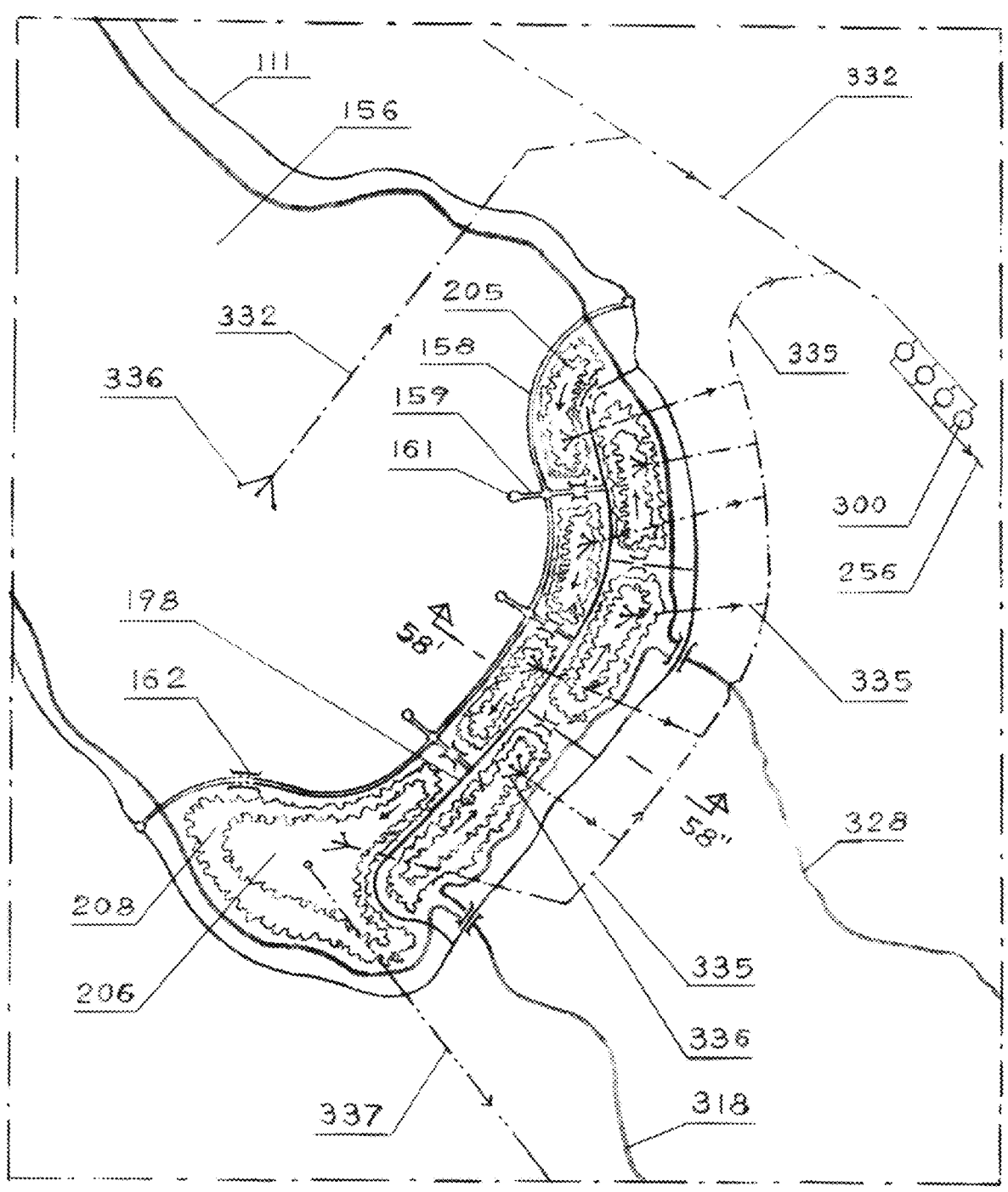
FIG. 56 illustrates an enlarged plain view of southern section of the Salton Sea and schematic diagram of dikes and pipeline systems associated with restoration of the Salton Sea.

FIG. 56 is illustrated enlarged plain view of southern section of the Salton Sea and schematic diagram of dikes and pipeline systems also explained in FIG. 55. Here are illustrated portion of the central section 156 and southern section 206. Here are also illustrated secondary dike 158 and ponds 205. Here are also illustrated piers 159 and restaurant 161. Here are also illustrated suction branches 336 of the collection pipes 332 at the bottom of the lake. Here is also shown the overflow 162. As an option mangrove tree 208 can be planted at periphery of the ponds 205 for natural filtration of the water and to provide wildlife sanctuary for birds and other wildlife.

Figure 57:
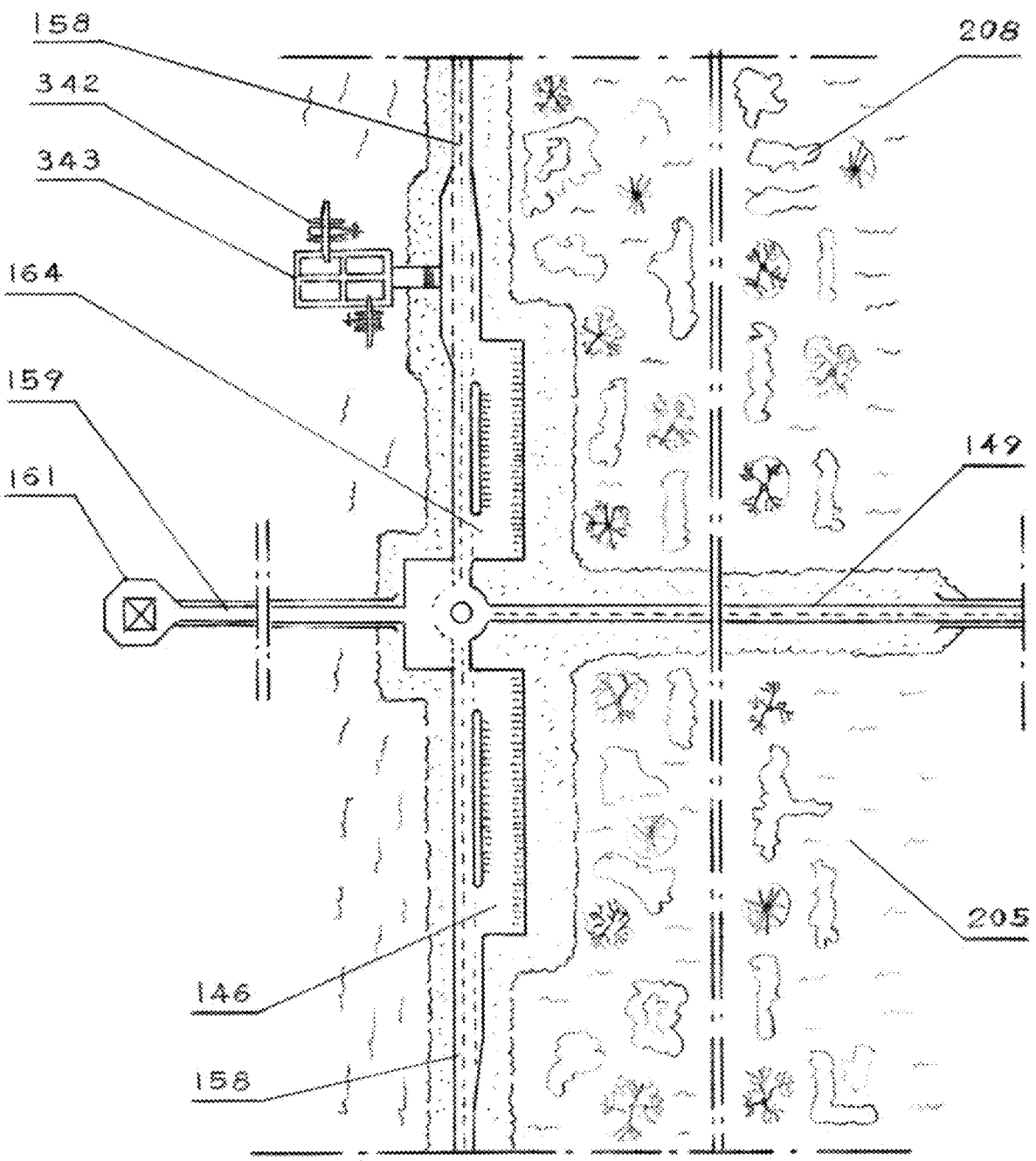
FIG. 57 illustrates a plan view of an intersection of a pier and main dike in the southern section of the Salton Sea associated with restoration of the Salton Sea.

FIG. 57 illustrates a plan view of an intersection of a pier 159 and main dike (two lane road) 158 in the southern section of the Salton Sea also illustrated in FIG. 56. Here is also illustrated cross-road 149. Here are also illustrated piers 159 and restaurant 161 with parking lots 146. Here are also illustrated amphibian airport (dock) 343 and amphibian airplane 342.

Figure 58:
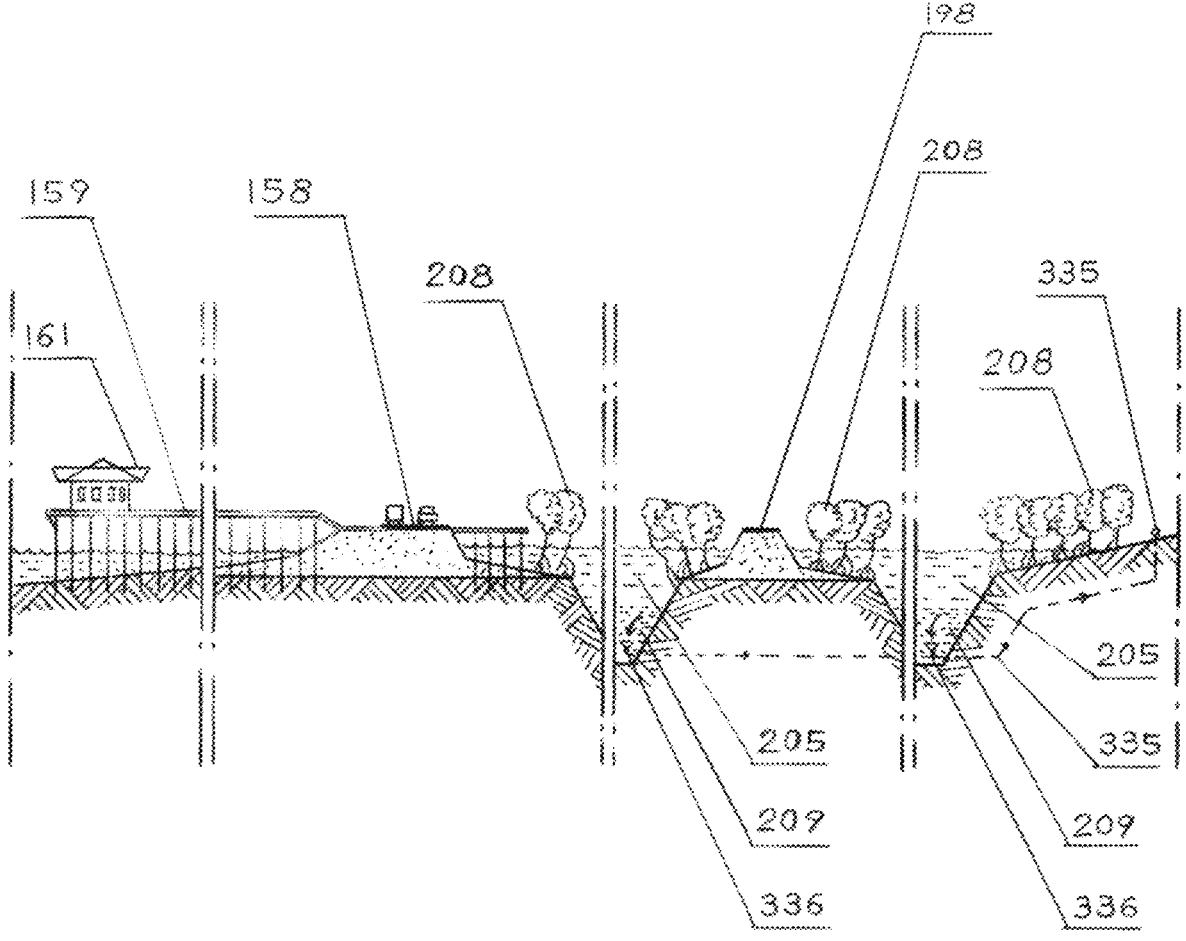
FIG. 58 illustrates a cross-sectional view taken along line 58-58' of FIG. 56, of the southern section of the Salton Sea, associated with restoration of the Salton Sea.

FIG. 58 illustrates a cross-sectional view taken along line 58-58' of FIG. 56. Here are illustrated restaurant 161, pier 159, dike 158, ponds 205, secondary dike 198, and mangrove tree 208. The ponds 205 are dig (formed) in "V" shape profile to provide necessary dept for separation by gravity of higher salinity water, and to provide material for dikes. Here are illustrated suctions 336 and collection pipeline 335.

Figure 59:
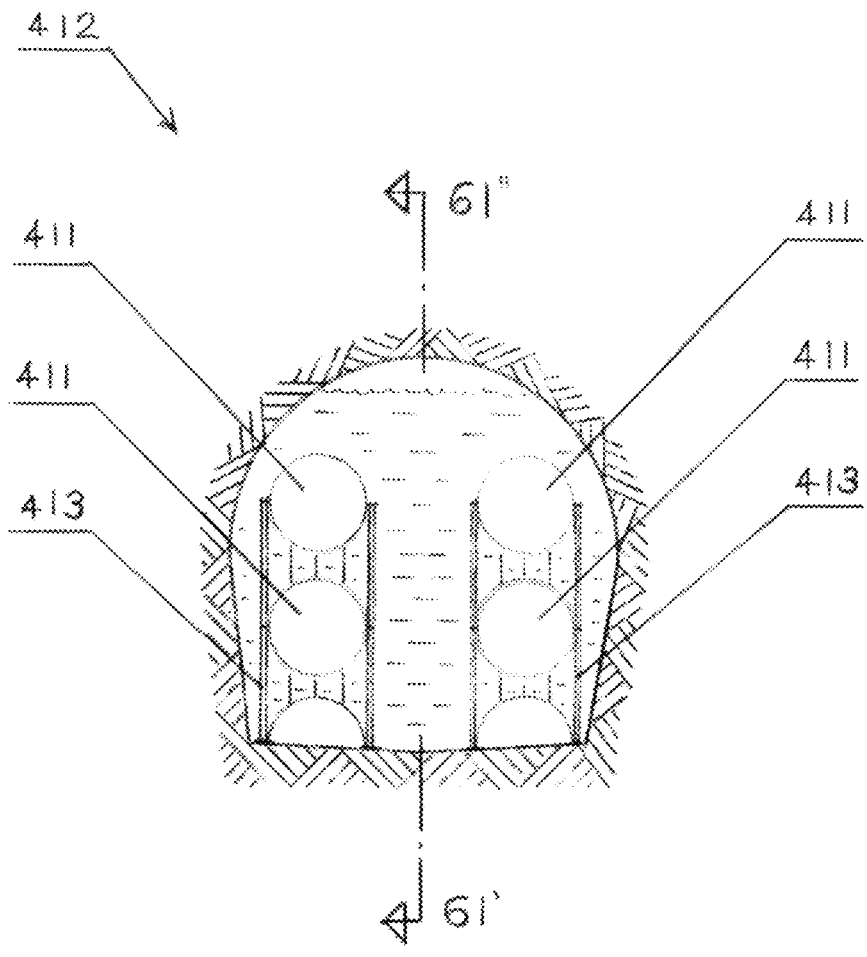
FIG. 59 illustrates a cross-sectional view taken along line 59-59' of FIG. 61, of the tunnel, associated with the restoration of the Salton Sea.
Figure 61:
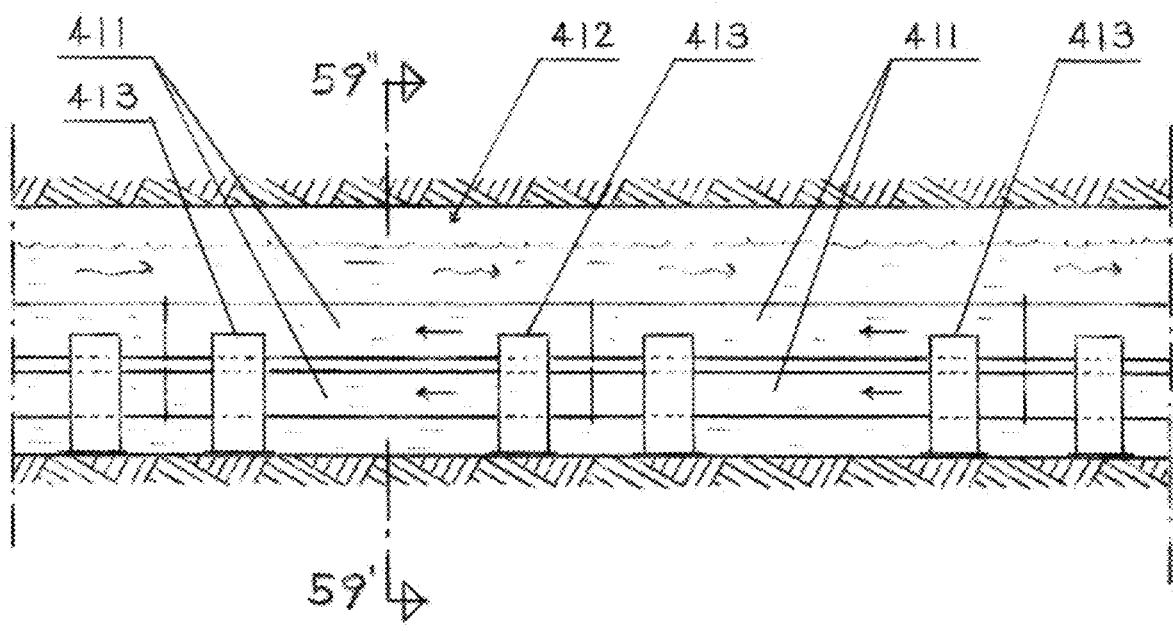
FIG. 61 illustrates a cross-sectional view taken along line 61-61' of FIG. 59, of the tunnel associated with the restoration of the Salton Sea.

FIG. 59 illustrates a cross-sectional view of the existing tunnel 412 taken along line 59-59' of FIG. 61, associated with rout #3 also illustrated in FIG. 51 of importing seawater for the restoration of the Salton Sea. Here are illustrated four pipelines 411 of the pipeline 410 installed on supporting element 413 through tunnel. The tunnel 412 was built in 1930$s$ to bring water from Colorado River to coastal cities. The tunnel is 12 miles long at elevation about 1,600 feet. The tunnel is 16 feet high and 16 feet wide. Water level is shown as 414. The tunnel 412 can be used for pipe line 410 transporting seawater from the Ocean to the Salton Sea. This alternative solution reduces elevation to overcome for about 1,100 feet.

Figure 60:
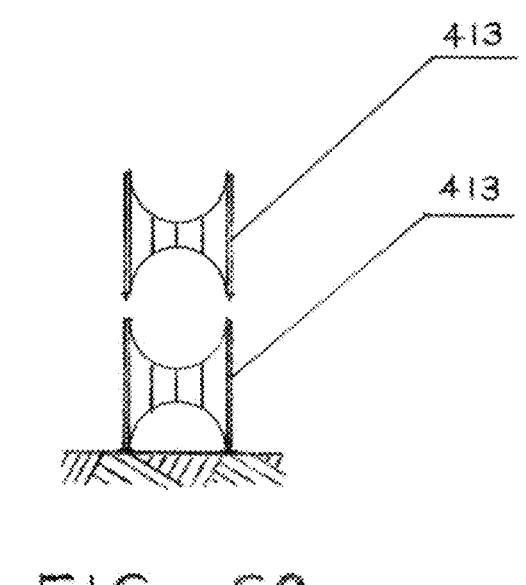
FIG. 60 illustrates a detail of a supporting element used in pipelines through the tunnel, associated with the restoration of the Salton Sea.

FIG. 60 illustrates a detail of a supporting element 413 used in pipelines through the tunnel 412, associated with restoration of the Salton Sea. The element 413 is design to supports pipelines 411 on each end and to provide minimum resistance to flow of water through tunnel.

FIG. 61 illustrates a cross-sectional view taken along line 61-61' of FIG. 59, of the tunnel 412 explained in FIGS. 59 and 60. Here are also illustrated pipelines 411 and supporting elements 413.

Figure 62:
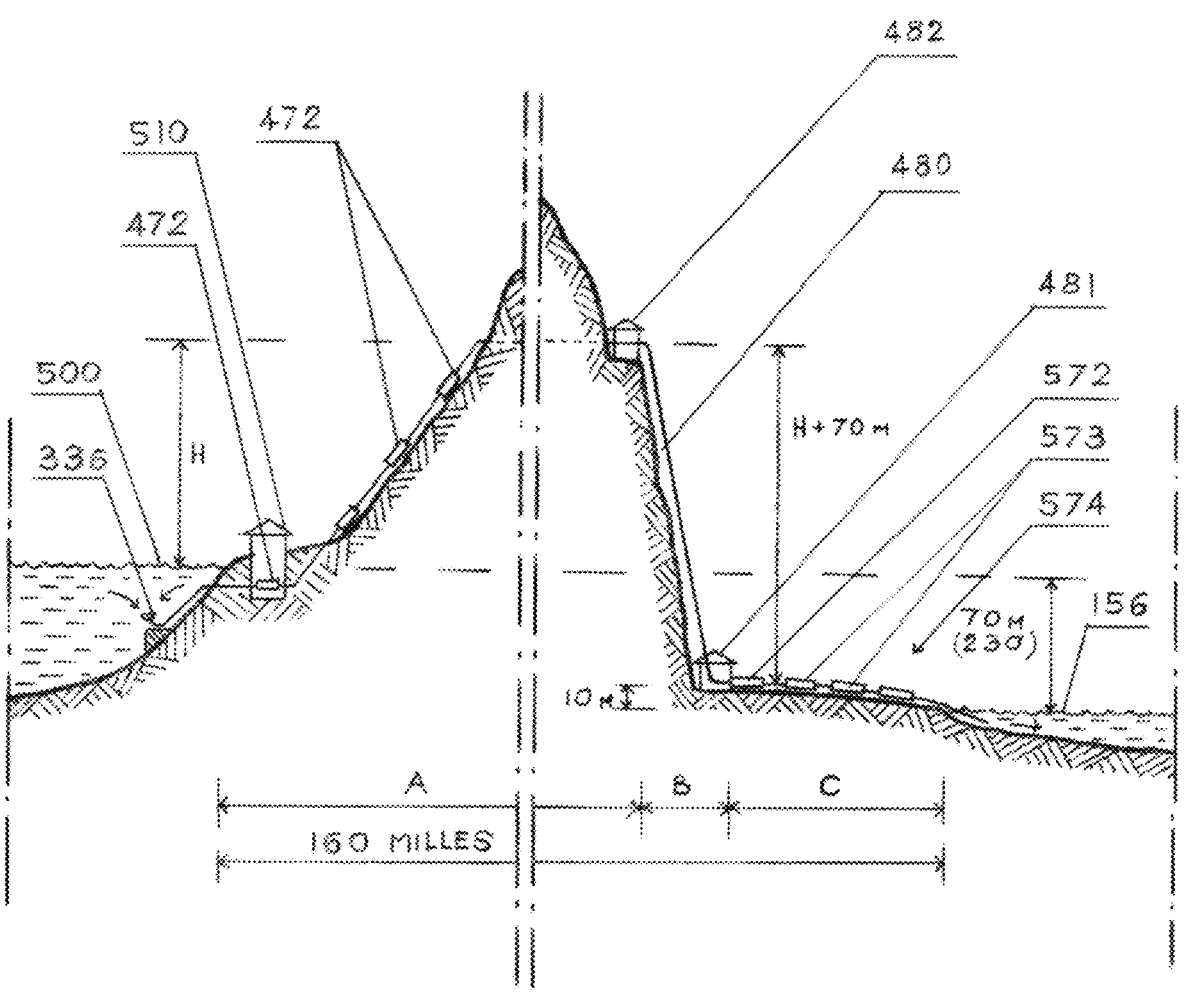
FIG. 62 illustrates a typical cross-sectional view of a schematic diagram of a pipeline connecting the Ocean and the Salton Sea used for cost calculation at different routes and elevations, associated with the restoration of the Salton Sea.

FIG. 62 illustrates a typical cross-sectional view of a schematic diagram of a pipeline connecting the Ocean and the Salton Sea used for cost calculation at different routes and elevations, associated with restoration of the Salton Sea. Salton Sea's water surface is 230' (70 meters) below the surface of the Ocean. Here are illustrated the Ocean level 500 and the Salton Sea level 156 with mountain between;

suction branches 336 submerged in the Ocean preferably 60-90 feet; the first pump station 510 with in-line-pump 472 below sea level; several subsequent in-line-pump 472; downhill fall 480 with station on top 482 and station at bottom 481. Here also are illustrated primary In-Line-Generator 572 and subsequent secondary In-Line-Generators 573 of the Delta Power Plant 570.

Figure 63:
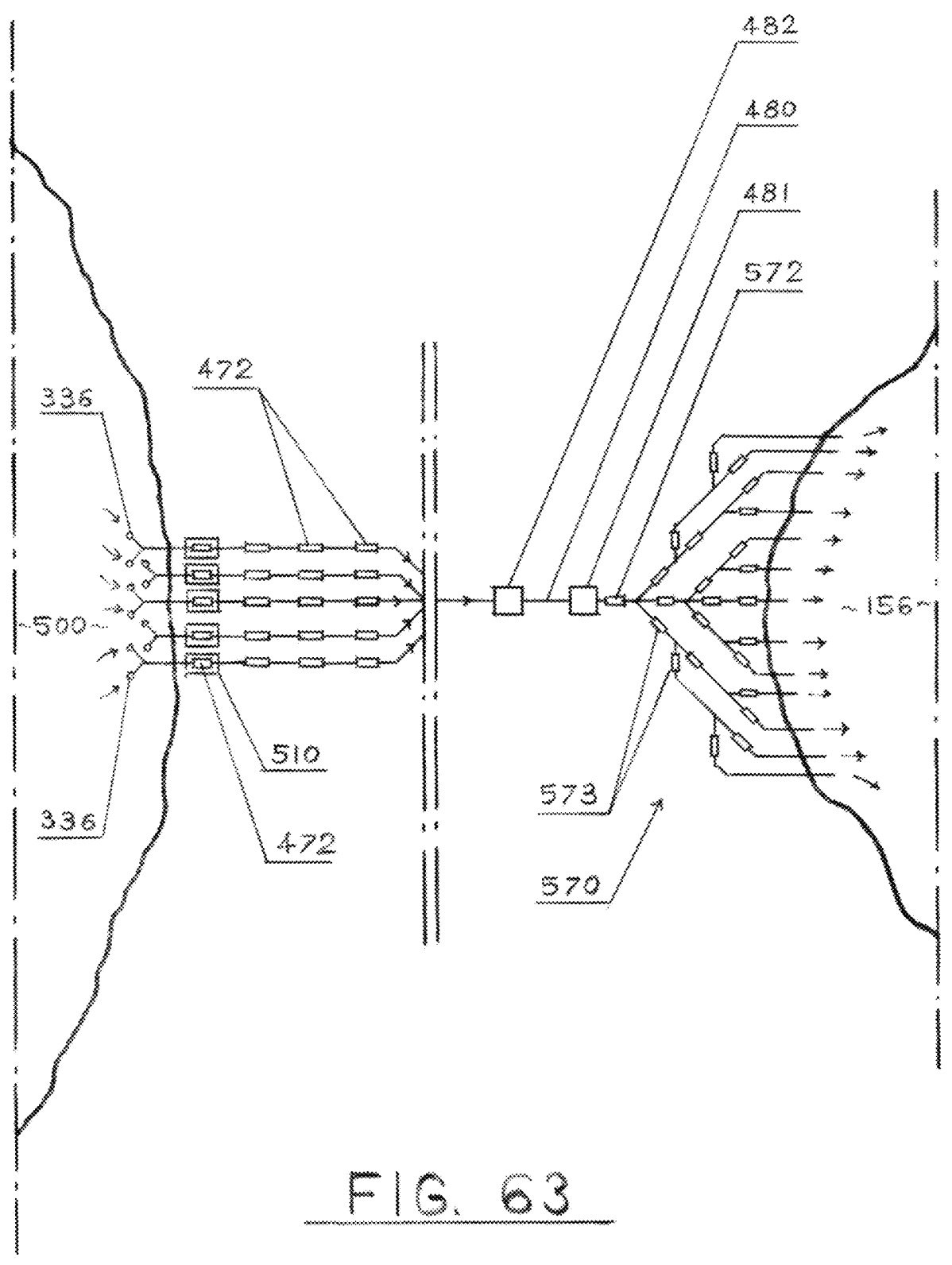
FIG. 63 illustrates a plain view of a schematic diagram of pipeline connecting the Ocean and the Salton Sea relevant to FIG. 62, in accordance with the invention.

FIG. 63 illustrates a plain view of a schematic diagram of pipeline connecting the Ocean and the Salton Sea relevant to FIG. 62. The first In-line Pump 472 needs to be submerged under surface of the Ocean. Numerous repetitive segments of the "In-line Pump" 472 are installed in the uphill section "A". A single pipeline is installed in downhill section "B". Here also are illustrated primary In-Line-Generator 572 and subsequent secondary In-Line-Generators 573 of the "Delta" Power Plant 570.

Figure 64:
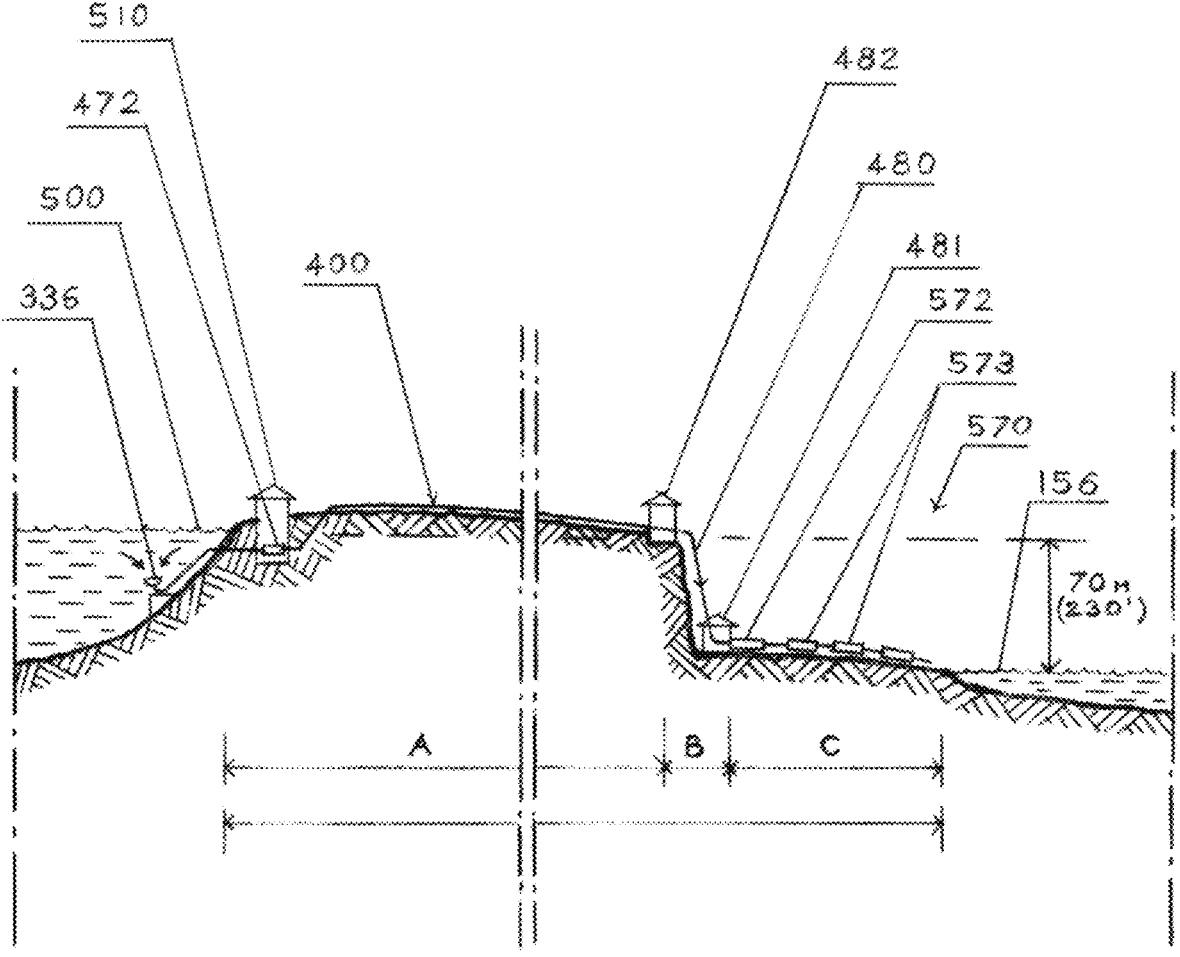
FIG. 64 illustrates a cross-sectional view of a schematic diagram of a pipeline connecting the Gulf of California (Sea of Cortez) and the Salton Sea shoving elevations, associated with restoration of the Salton Sea-Route #1.

FIG. 64 illustrates a cross-sectional view of a schematic diagram of a pipeline 400, connecting the Gulf of California (Sea of Cortez) and the Salton Sea shoving elevations, associated with restoration of the Salton Sea-Route #1. Here are shown all elements as in a typical cross-sectional view in FIG. 62. Difference in this route is that Elevation to overcome is only about 35' (10 m). Pipeline distance is about 150 miles. Siphon system is used when fluid flow is established. Pump station is activated temporary to establish fluid flow. After few weeks necessary speed of flow will be established and pump station turned off.

Figure 65:
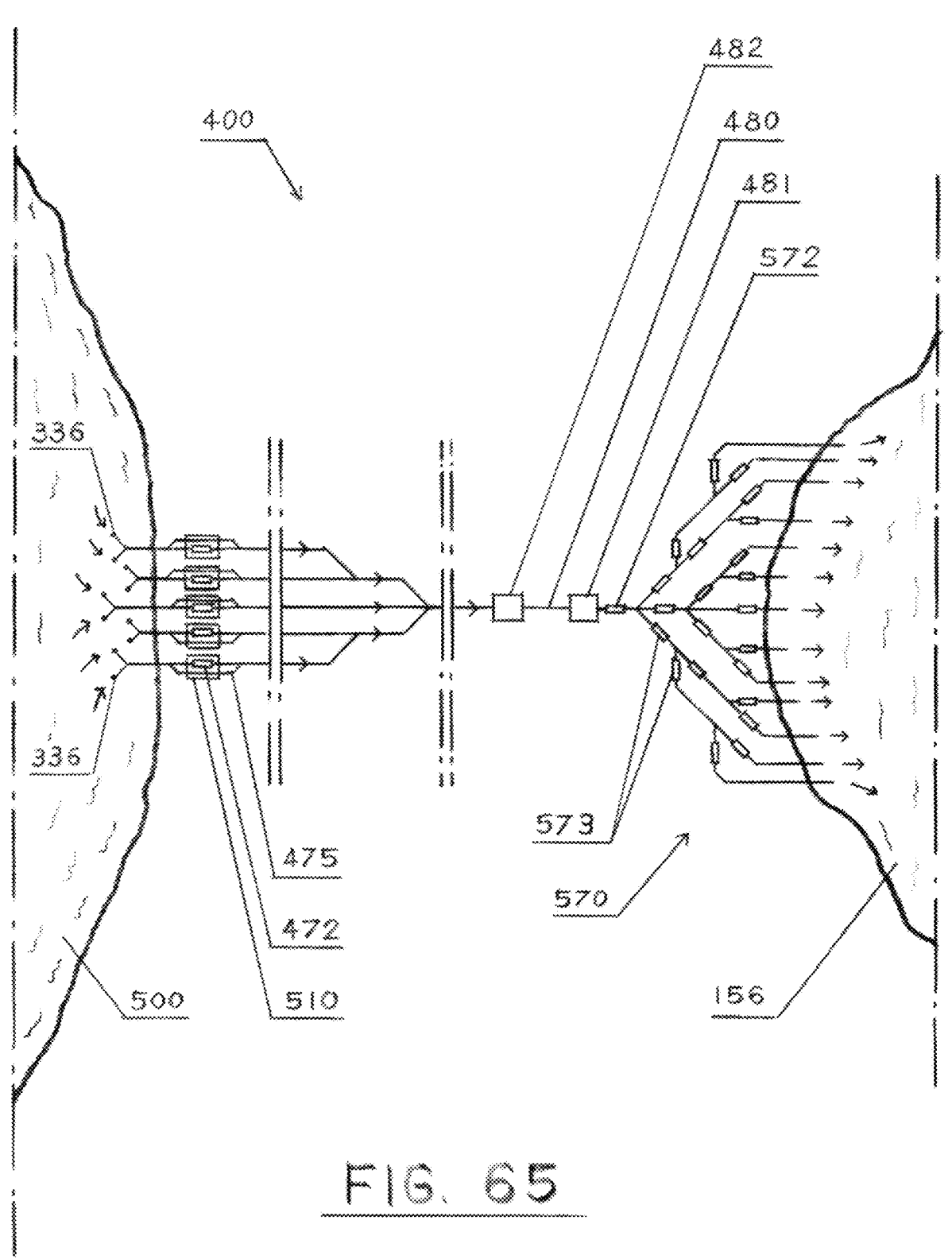
FIG. 65 illustrates a plain view of a schematic diagram of pipeline connecting the Ocean and the Salton Sea relevant to FIG. 64, in accordance with the invention.

FIG. 65 illustrates a plain view of a schematic diagram of pipeline 400, route #1, connecting the Ocean and the Salton Sea relevant to FIG. 64, in accordance with the invention. Here are shown five pipelines in first section of the pipeline 400; three pipeline in central part of the pipeline 400; single pipeline in third section of the pipeline 400; Fall 480; and delta power plant 570 at the end with primary in-line-generator 572 and secondary in-line-generators 573; The primary in-line-generator 572 harnesses kinetic energy of the fluid at the bottom of the fall 480. Secondary in-line-generators 573 are installed in the Delta Power Plan 570 which consist of several branches harnessing energy of the fluid flow with gradually lesser speed.

The same pumping system for importing seawater can be used with minor adjustments for exporting high salinity water (concentrated salty water at the bottom of the lake) from the Salton Sea into the Ocean by switching the direction of rotation of the In-Line-Pump/Generator 572 and 573. Reverse flow can be activated periodically, for example, two weeks per year twice a year. One of the minor adjustments for using the same pipeline system, for exporting water from the Salton Sea, is to have an alternative connection from pipeline branches 332 to the main pipeline 400 (see FIG. 87).

Figure 66:
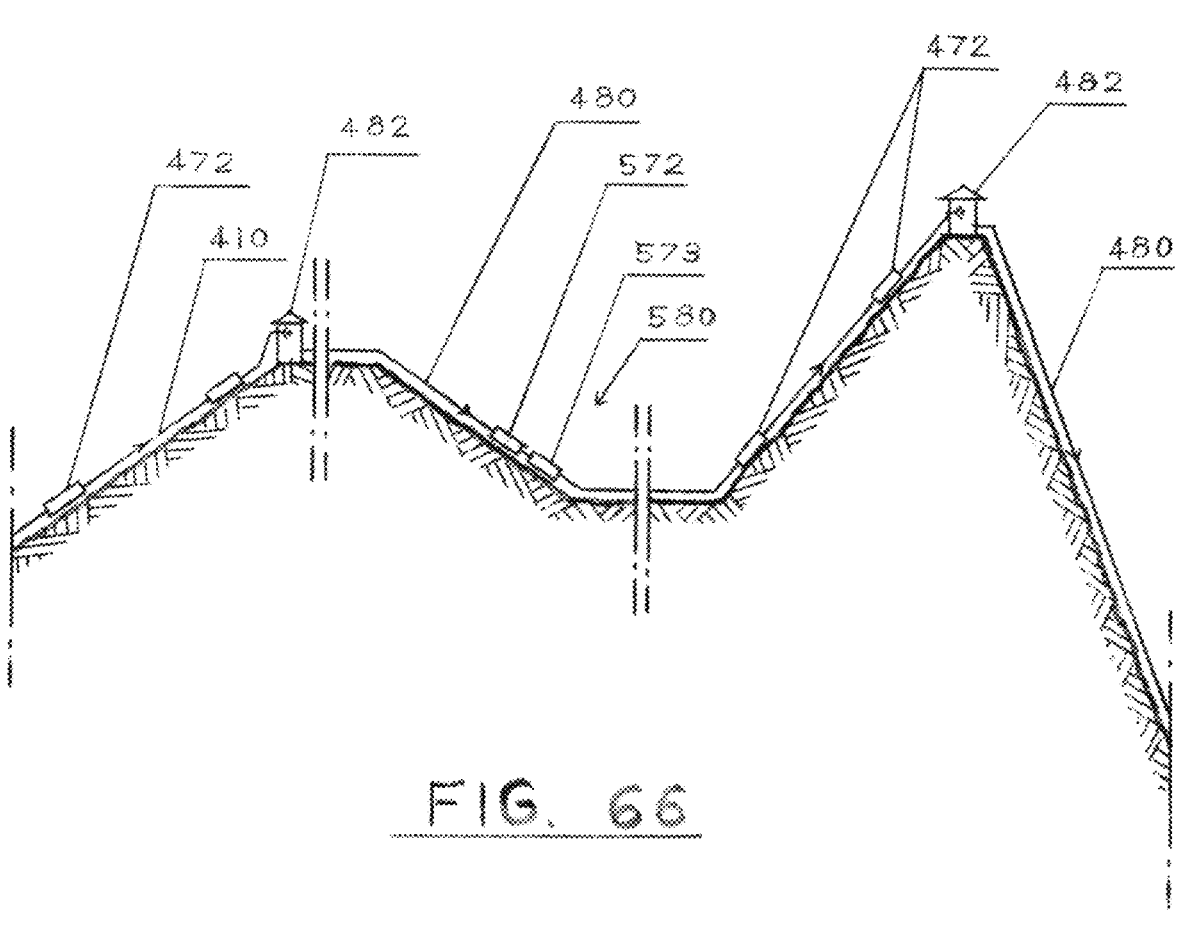
FIG. 66 illustrates a typical cross-sectional view of a mid-section of a pipeline connecting the Ocean with the Salton Sea.

FIG. 66 illustrates a typical cross-sectional view of a mid-section of a pipeline over mountain connecting the Ocean with the Salton Sea. There are five pipelines in uphill routes and single pipeline in downhill routes. Numerous repetitive segments of the "In-line Pump" 472 are installed in the uphill routes. Numerous segments of the "In-Line-Generators" (Split & Join-mini Power Plan) are installed in the downhill routes. The Split & Join-mini Hydro Power Plants 580 uses kinetic energy after fluid exit primary turbine. It provides necessary volume of fluid for multi-line uphill routes to accommodate necessary volume of fluid at the final exit section.

Here are also illustrated station/reservoirs 482 on top of hill and downhill fall 480. Here is also illustrated the primary in-line-generator 572 which is part of "Split and Join" miniature Power Plant 580 installed in downhill routes.

The purpose of the "Split and Join" miniature Power Plant 580 is to harness energy of the fluid exiting the in-line-generator 572 by splitting fluid in several lines and harnessing its kinetic energy of lesser speed and join the main pipeline providing the same amount of fluid to continue in main pipeline 410.

Figure 67:
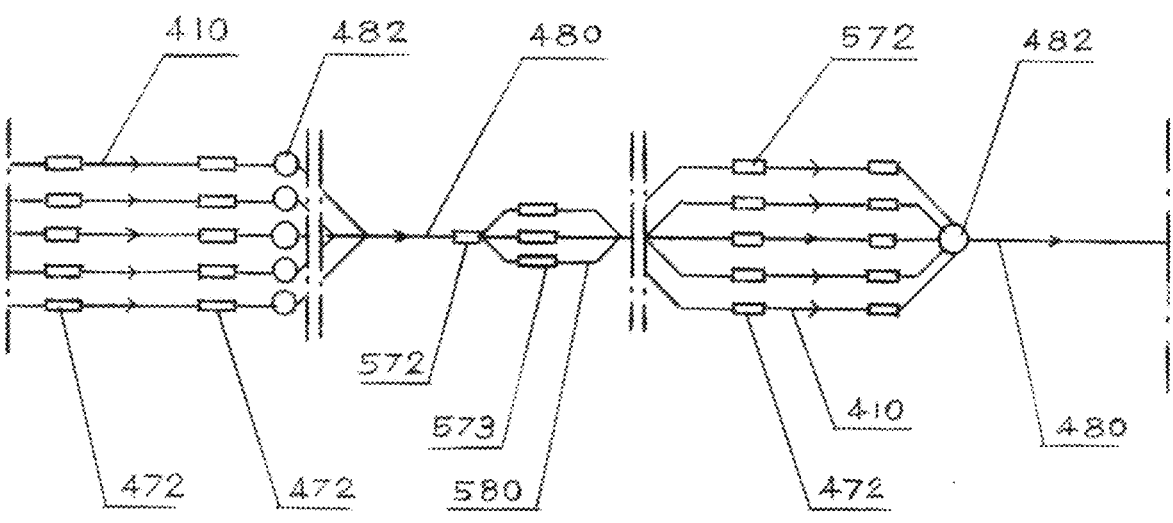
FIG. 67 illustrates a plain view of a mid-section of a pipeline connecting the Ocean with the Salton Sea, relevant to FIG. 66, in accordance with the invention.

FIG. 67 illustrates a plain view of a mid-section of a pipeline connecting the Ocean with the Salton Sea, relevant to FIG. 66, in accordance with the invention.

Figures 68, 69:
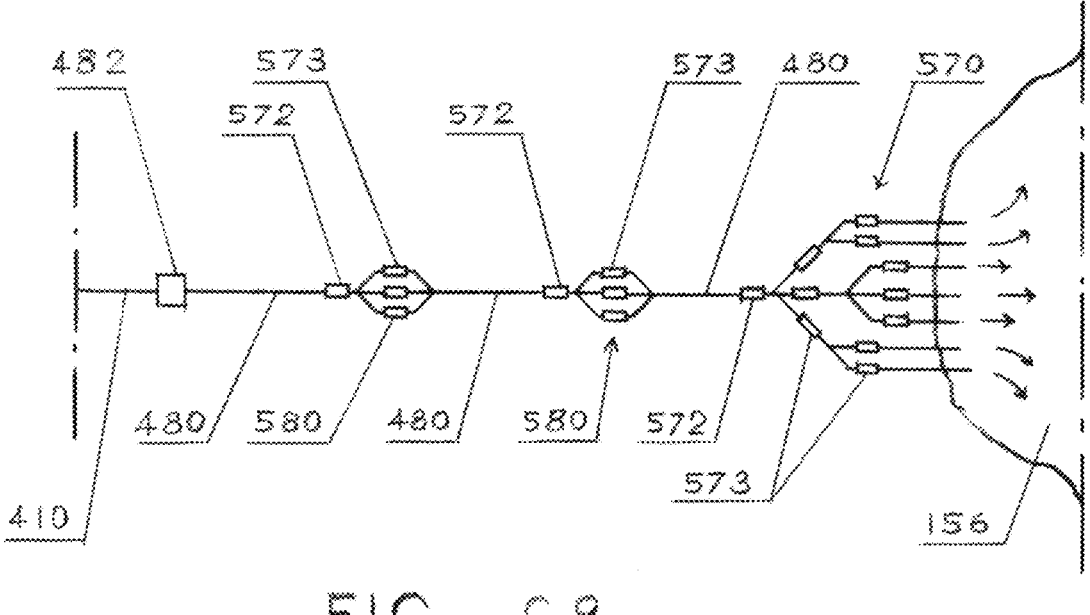
FIG. 68 illustrates a typical cross-sectional view of the final downhill route of a pipeline connecting the Ocean with the Salton Sea.
FIG. 69 illustrates a typical plain view of the final downhill route of a pipeline connecting the Ocean with the Salton Sea, relevant to FIG. 68, in accordance with the invention.

FIG. 68 illustrates a typical cross-sectional view of the final downhill route of the pipeline 410 connecting the Ocean with the Salton Sea. Downhill routes of pipeline can be built using several cascades with "split and join" mini hydropower plants 580 to avoid buildup of extreme pressure in the pipeline especially in the last section of the final downhill route and to harness more kinetic energy and minimize losses.

The "Delta" mini hydro power plant 570 splits fluid flow into smaller branches with gradually lesser fluid flow speed in each subsequent branch, hence, increasing efficiency of harnessing kinetic energy and at the same time providing the same volume of seawater leaving the pipeline and entering the lake as is the volume of seawater entering the pipeline from the Ocean.

Figure 70:
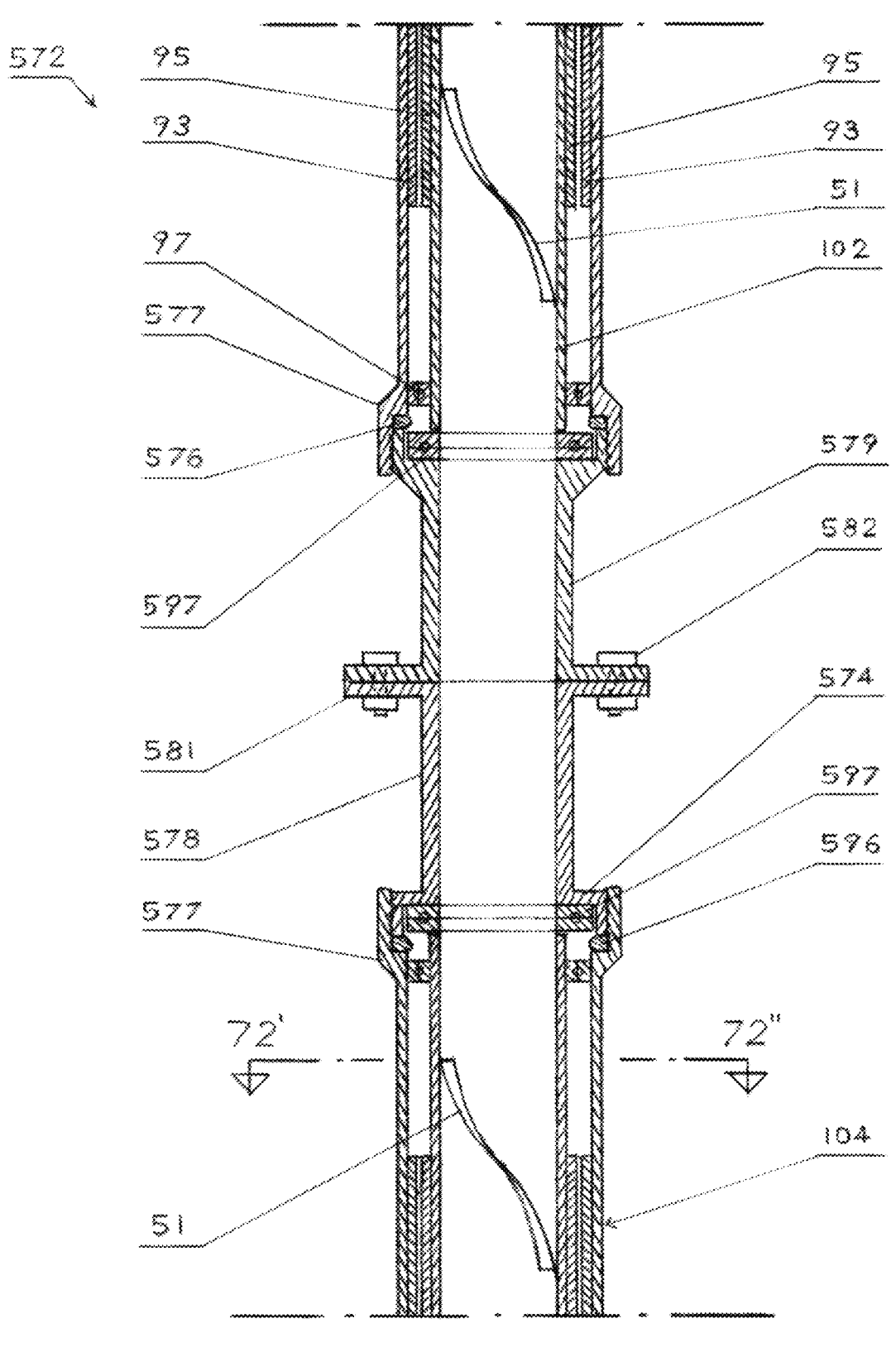
FIG. 70 illustrates a cross-sectional longitudinal view taken along line 70'-70" of FIG. 72, of the primary In-Line-Generator used in the pipelines for importing seawater in the Salton Sea.
Figure 72:
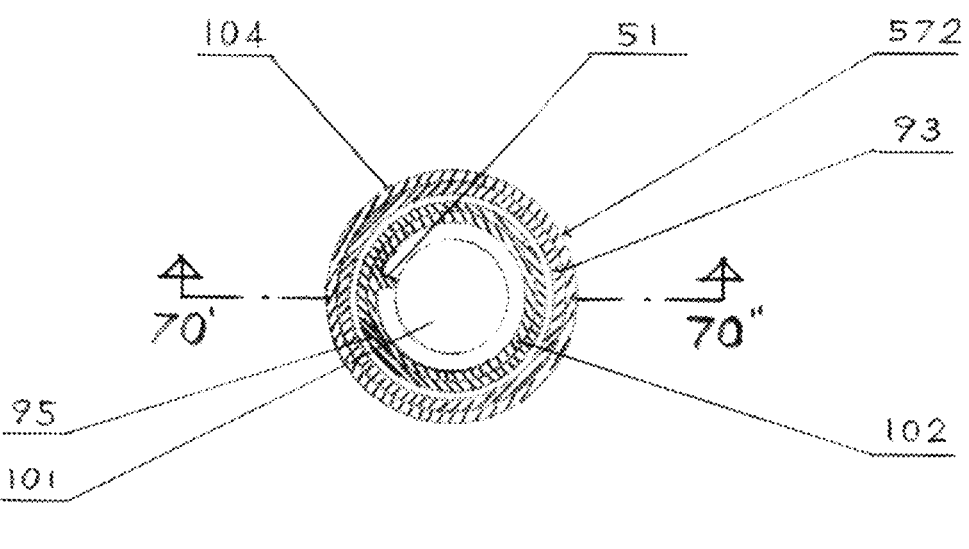
FIG. 72 illustrates a cross-sectional frontal view taken along line 72'-72" of FIG. 70 of the primary In-Line-Generator.

FIG. 69 illustrates a typical plain view of the final downhill route of a pipeline connecting the Ocean with the Salton Sea, relevant to FIG. 68, in accordance with the invention;

FIG. 70 illustrates a cross-sectional longitudinal view taken along line 70'-70" of FIG. 72, of the primary In-Line-Pump/Generator used in the pipelines for importing seawater in the Salton Sea. The In-Line-Pump/Generator 572 is an electromotor of cylindrical shape and is inserted as a repetitive segments in the pipeline. The shaft of the rotor is a hollow cylinder 102 with continuous spiral blades 51 inside hollow cylinder/shaft.

In order to harness maximum energy from the fall, the primary generator 572 at the bottom of the fall 480 have continuous spiral blades, inside the hollow cylinder 102, less exposed with bigger openings for the fluid to flow through the middle of the cylinder/shaft 102. The primary generator 572 consist of the hollow cylinder 102 with continuous spiral blades 51 inside and electromagnetic coils (armature) 95 outside; stationary part 104 with electromagnetic coils (armature) 93 inside; bearings 97 which engage rotor 102 and stator 104; Stationary part 578 and 578 on each end of the primary generator 572, The Stationary part 578 and 578 are engaged with rotor 102 through bearing 597. There is also flange 577 and seal 576. The Stationary part 578 and 578 has flange 581 and bolts 582 for connections with other segments of the pipeline. This design of the In-Line-Pump/Generator 572 yields a maximum fluid flow rate with limited diameter.

Figure 71:
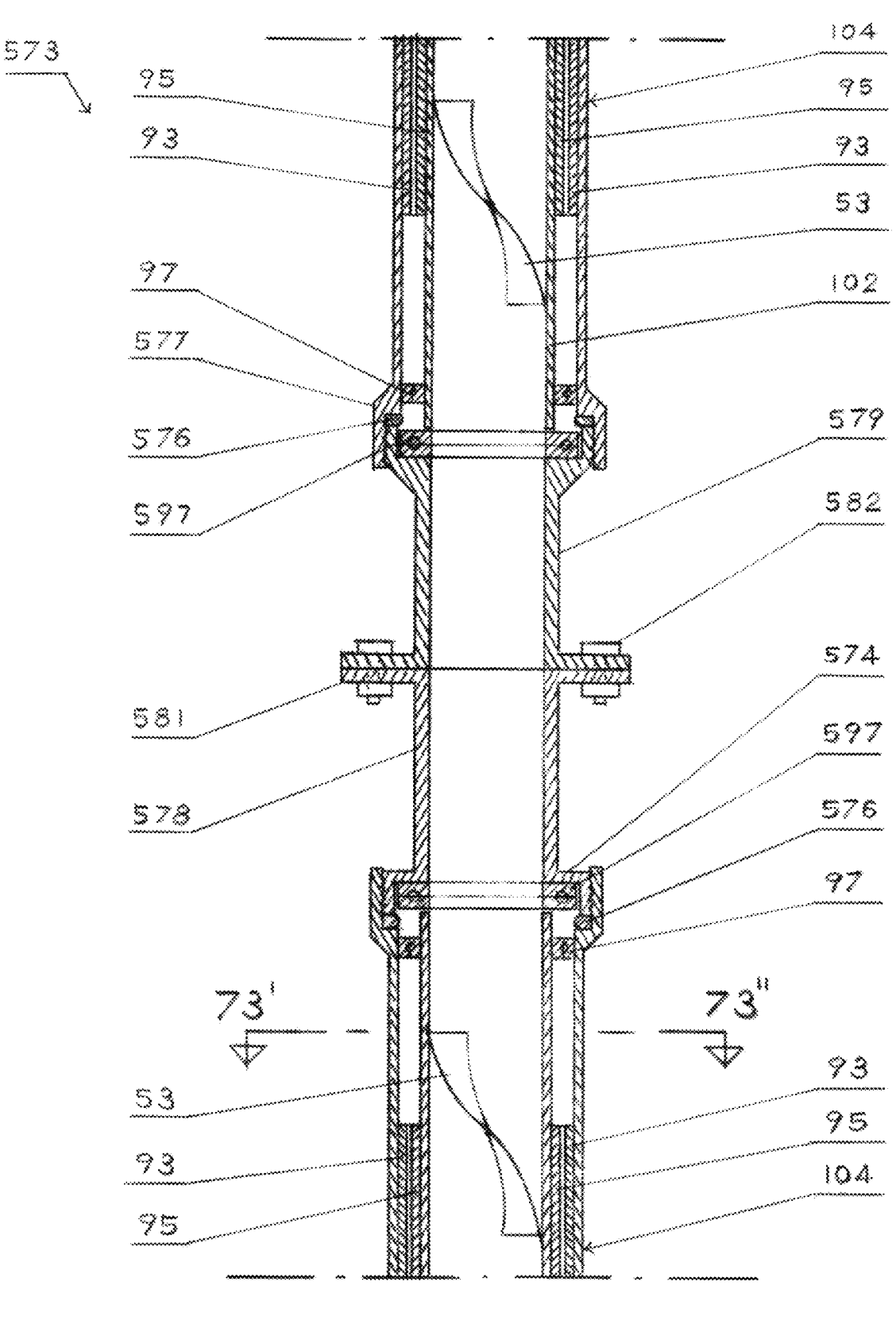
FIG. 71 illustrates a cross-sectional longitudinal view taken along line 71'-71" of FIG. 73 of the secondary In-Line-Generator used in pipeline for importing seawater in the Salton Sea.
Figure 73:
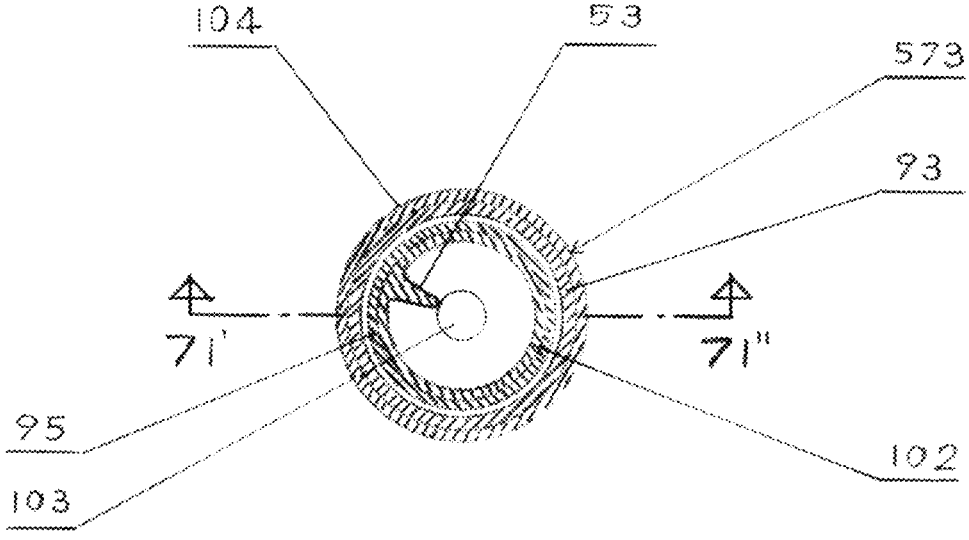
FIG. 73 illustrates a cross-sectional frontal view taken along line 73'-73" of FIG. 71 of the primary In-Line-Generator.

FIG. 71 illustrates a cross-sectional longitudinal view taken along line 71'-71" of FIG. 73 of the secondary In-Line-Generator 573 used in pipeline for importing seawater in the Salton Sea. The secondary In-Line-Generator 573 is almost identical to the primary In-Line-Generator 572. The only difference is that the hollow cylinder/shaft/rotor 102 have continuous spiral blades 51, more exposed with smaller openings in the middle of the cylinder/shaft 102. The Secondary In-Line-Generators 573 are subsequent segments in the "Split & Join" 580 and "Delta" mini hydro Power Plants 570 having gradually more exposed continuous spiral blades with smaller openings in the middle of the cylinder as speed of fluid gradually decreases.

FIG. 72 illustrates a cross-sectional frontal view taken along line 72'-72" of FIG. 70 of the primary In-Line-Generator 172. In order to harness maximum energy from the fall 480, the Primary Generator 572 at the bottom of the fall, have continuous spiral blades 51, inside the hollow shaft 102 less exposed with bigger openings 101 in the middle of the cylinder/shaft 102.

FIG. 73 illustrates a cross-sectional frontal view taken along line 73'-73" of FIG. 71 of the secondary In-Line-Generator 573. The subsequent segments after primary In-Line-Generator 572 are In-Line-Generators 573 forming Delta Hydro Power Plant 570. The In-Line-Generators 573 have gradually more exposed continuous spiral blades with smaller opening 103 in the middle of the cylinder/shaft 102 as speed of fluid gradually decreases.

The same pumping system for importing seawater can be used with minor adjustments for exporting high salinity water (concentrated salty water at the bottom of the lake) from the Salton Sea into the Ocean by switching direction of rotation of the In-Line-Pump/Generator 572 and 573. Reverse flow can be activated periodically for example: two weeks per year twice a year.

Figure 74:
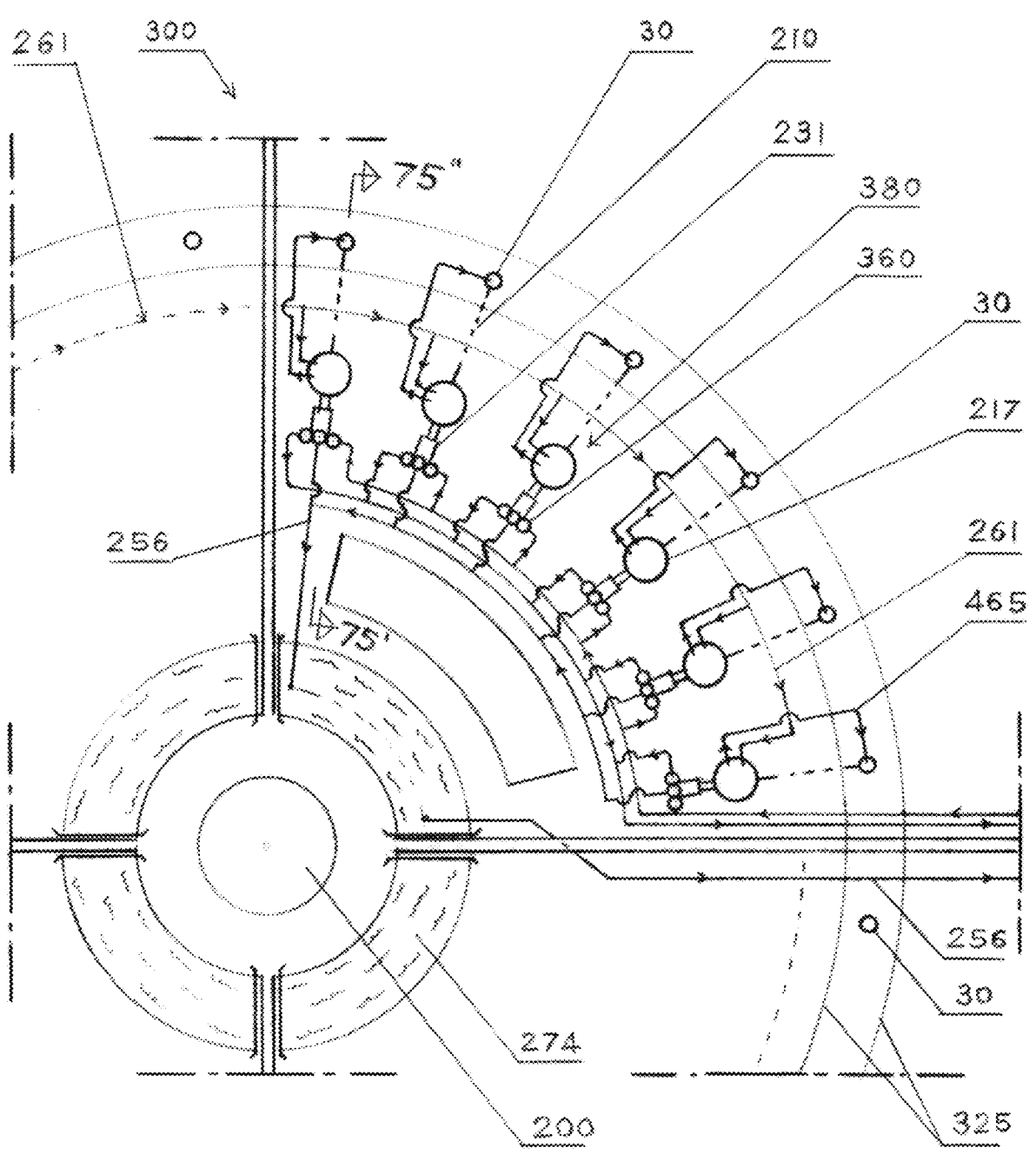
FIG. 74 illustrates a plain view of a quarter of the new design of a Power Plan 300 used in this invention and associated with the restoration of the Salton Sea.

FIG. 74 illustrates a plain view of a quarter of the new design of a Power Plan 300 used in this invention and associated with the restoration of the Salton Sea. A quarter of the new design of a Power Plan 300 is a modular unit. The Power Plant 300 uses completely closed loop system 210. Salty water from the bottom of the lake is distributed through pipeline 264 and 261 to the boilers 217 of the Power Unites 380 to the level "H" where is heated up with second heat exchanger 182 of the closed loop system 210. Steam passes through turbine/generator 231 which generate electricity and passes as exhausted steam through condenser 360 and condenses as potable water 256. Remaining water in the boiler, now level "L", is more salty and is injected through line 465 into wellbore 30 to form geothermal reservoir for better conduction of heat from hot rocks to the first heat exchanger 168. After wellbore 30 is filled up, the saturated brine is periodically excavated through excavation line 370 and 371 and distributed to the processing building 290 for desalination and/or extraction of lithium.

Figure 75:
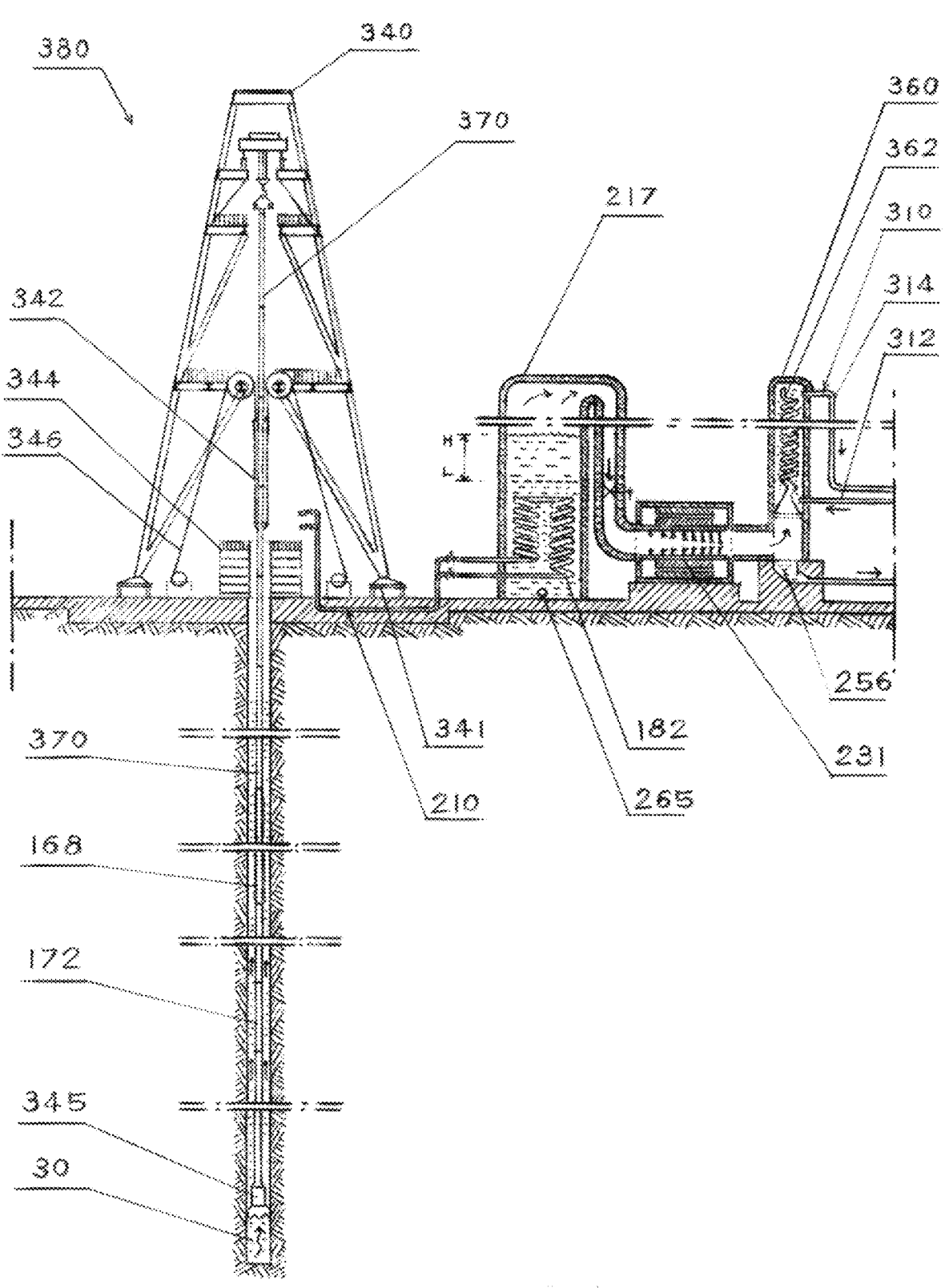
FIG. 75 illustrates a cross-sectional view taken along line 75'-75" of FIGS. 74 and 76—one typical power unit, in accordance with the invention.
Figure 76:
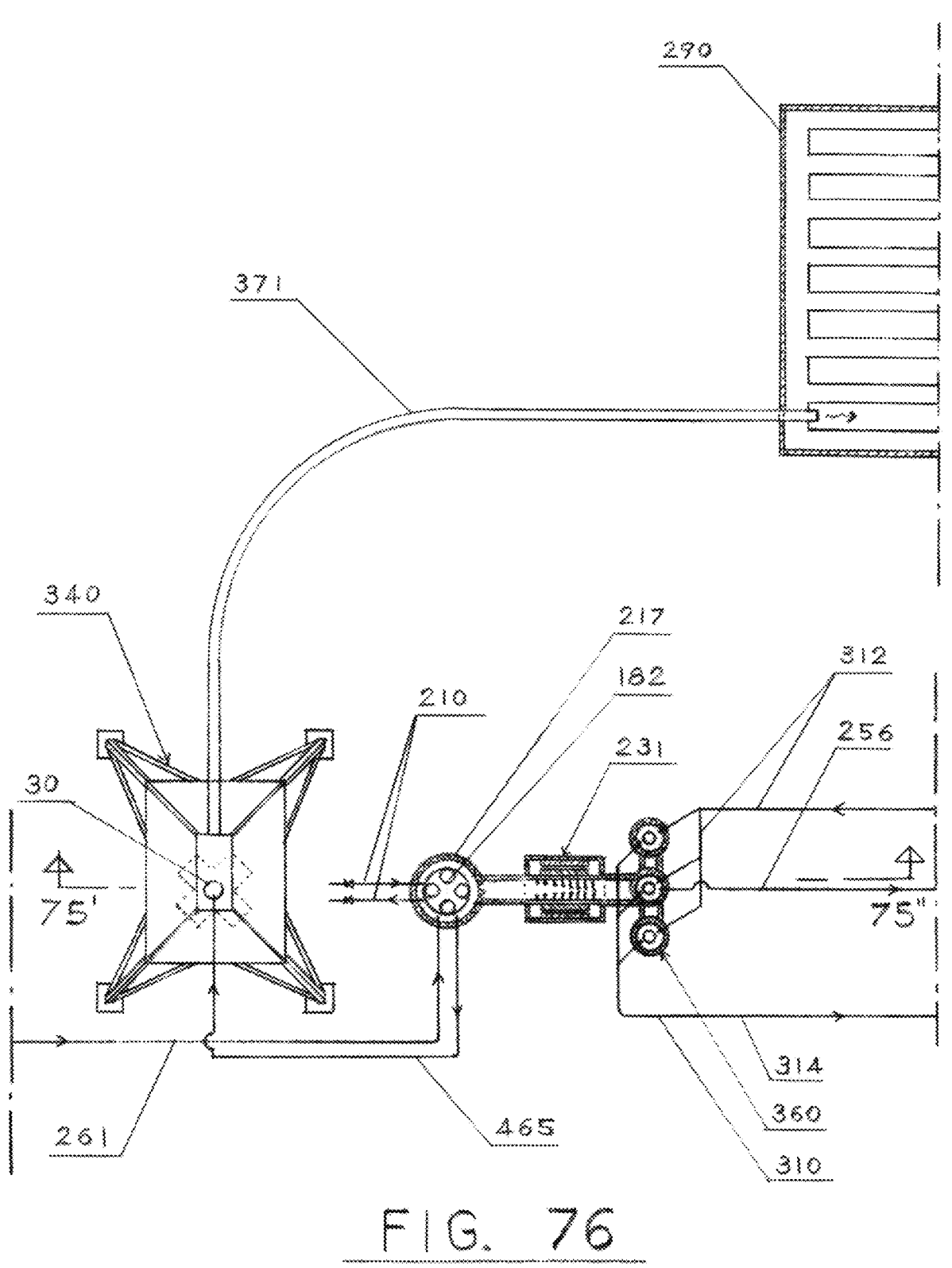
FIG. 76 illustrates a schematic plain view of the power unit illustrated in FIG. 75.

FIG. 75 illustrates a cross-sectional view taken along line 75'-75" of FIGS. 74 and 76—one typical power unit, 380 in accordance with the invention. Here is illustrated a method for harnessing geothermal energy for generation of electricity by using complete closed loop heat exchange systems 210 combined with on-board motorized drill head 345.

The presented heat exchange system combine with drilling system enable drilling deeper and wider wellbores with constant diameter. Presented heat exchange system 210 combined with for drilling system for faster, deeper and wider wellbore consist of motorized drill head 345; separate excavation line 370; separate fluid delivery line 465; separate closed loop cooling line 310 engaged with Power Unit on the ground surface; a system for building casing at the same time as drilling process progresses, having an elevator system (cage) 342 sliding over the drilling/excavation/heat exchange apparatus 168, delivering and installing casing sheets and concrete; and cable 346 for lowering and raising the cage 342.

The first heat exchanger 168 of the closed loop system 210 is lowered at heat source and second heat exchanger 182 is coupled into boiler/evaporator 217 of the Power Unite 380.

Salty water from bottom of the Salton Sea is injected into boiler/evaporator 217 to the level "H". Salty water is heated by heat exchanger 182 and steam is produced which spins turbine and generator 231, which generates electricity. The power unit 380 has a condenser 360 which is cooled with additional closed loop system 310 which has inflow line 312 and outflow line 314.

Geothermal fluid and/or saturated brine is circulated around first heat exchanger 168 with an on-board in-line-pump 172 to minimize heat flux effect by increasing heat exchange surface of the well by stirring geothermal fluid and/or saturated brine from deep down up to first heat exchanger 168.

If heat flux becomes an issue again then drilling of the wellbore can continue with lowering of whole apparatus deeper as needed in search for hot rocks. Eventually, a point will be reached where heat extraction from rocks and heat replenishment to the rocks from heat generated by radioactive decay and internal heat will be in balance/equilibrium.

FIG. 76 illustrates a schematic plain view of the power unit illustrated in FIG. 75. Remaining salty water, level "L", from distiller 217 is injected through pipeline 465 into wellbore 30 to form geothermal reservoir for better conduction of heat from hot rocks to the first heat exchanger 168.

After wellbore is filled with saturated brine it is periodically excavated through excavation line 370 and 371 and distributed to the processing building 290 for extraction of the lithium. The processing building 290, also explained in FIGS. 29-32, uses greenhouse effect and geothermal heat to provide evaporation which drastically reduces expenses usually associated with evaporation process. Also, the processing building 290 provide concentrated brine which can be used for extraction of lithium. By implementing different processes such as ion-imprinted polymers the extraction of lithium from brine in processing building 290 can be profitable business.

Figure 77:
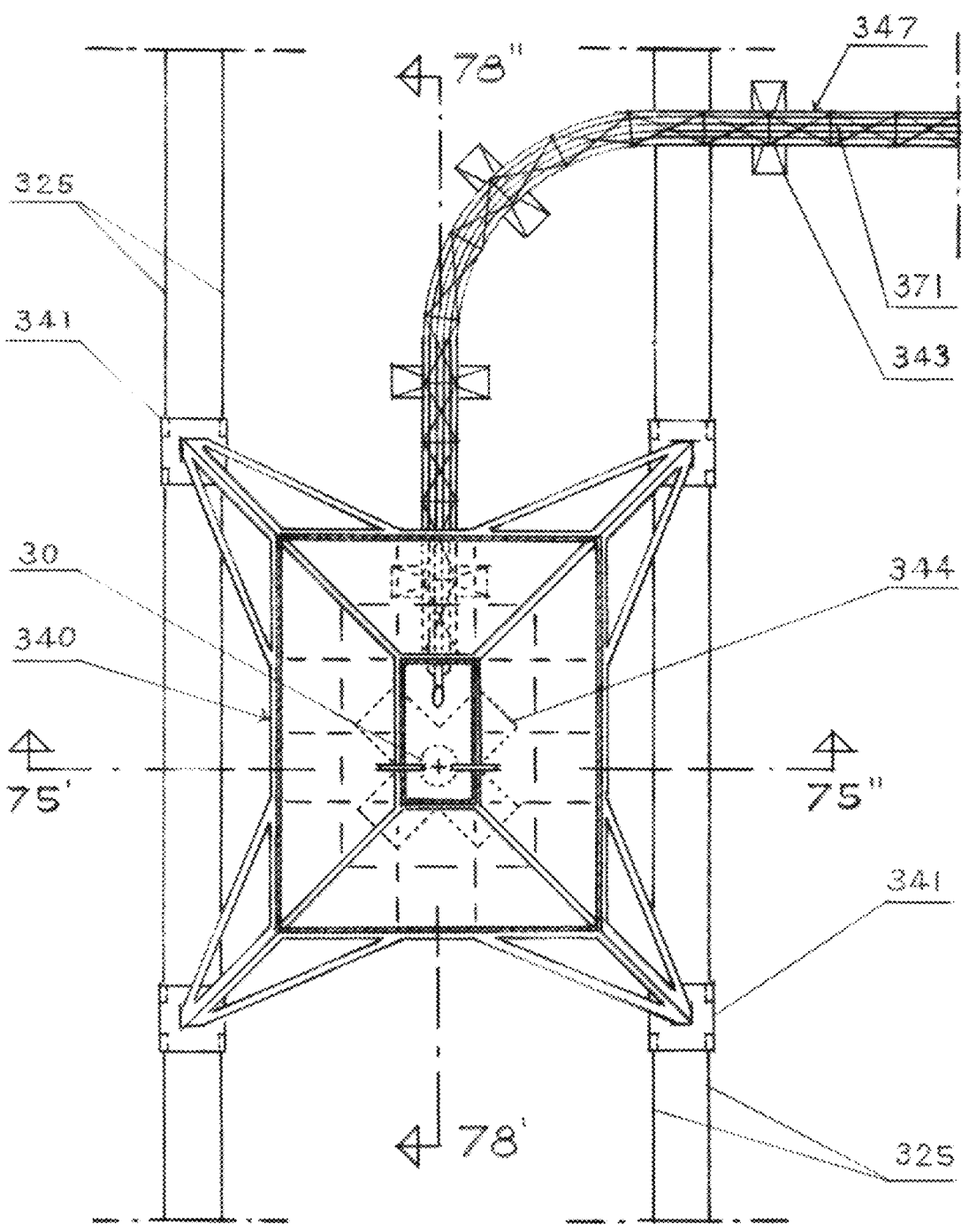
FIG. 77 illustrates a schematic cross-sectional plain view of a derrick illustrated in FIGS. 75 and 76.

FIG. 77 illustrates a schematic cross-sectional plain view of a derrick 340 illustrated in FIGS. 75-79. Here are shown bridge 374 with pillars 343 for supporting excavation line 371 through which the brine from wellbore 30 is transferred to the processing building 290; railroad 325; dollies 341; and the Blow-Out-preventer 344.

Figure 78:
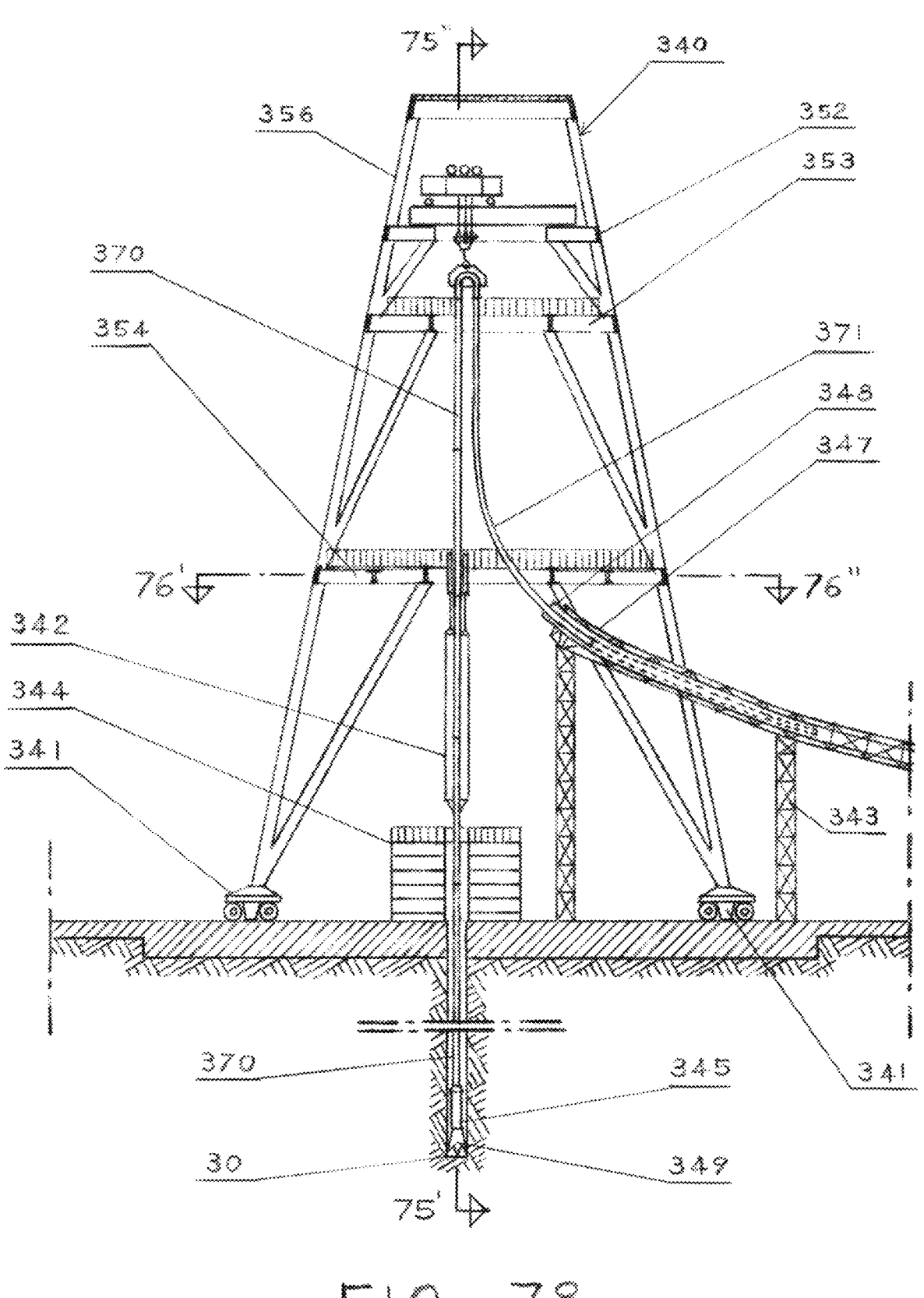
FIG. 78 illustrates a schematic cross-sectional view of a derrick illustrated in FIGS. 75, 76 and 77.

FIG. 78 illustrates a schematic cross-sectional view of a derrick 340 illustrated in FIGS. 75, 76 and 77. In this illustration are shown bridge 374 with supporting pillars 343 for supporting excavation line 371 through which the brine from wellbore 30 is transferred to the processing building 290. The excavation line 371, at this segment on the way down, is a flexible tube and slides into pipe 348 during drilling process. As drilling process progresses the drilling apparatus which includes vertical segments of the excavation line 371 slides down providing space for installation of the subsequent segment of the drilling apparatus. Here are also shown dollies 341 and the Blow-Out-preventer 344.

The apparatus also incorporates an elevator system (cage) 342 sliding over the drilling/excavation/heat exchange apparatus 370/168, delivering and installing casing sheets and concrete. The casing of the wellbore can be built during the drilling process.

Here is also shown a cable 346 for lowering and raising the cage 342. Here are also shown working and structural platforms 352, 353 and 354. Here are also shown a dolly 356 for hoisting and adjusting drilling and heat exchange apparatus.

A system for drilling faster, deeper and wider wellbore consist of motorized drill head 345; separate excavation line 371; separate fluid delivery line and separate closed loop cooling line engaged with Power Unit on the ground surface (not shown in this illustration).

Presented drilling apparatus has retractable bits 349 on the motorized drill head 345 so that whole apparatus can be pulled up on surface even after casing is installed.

The diameter of the excavation line and rate of flow of mud and cuttings through it and the diameter of the fluid delivery line and rate of fluid flow through it are in balance requiring only limited fluid column at the bottom of the well bore.

The excavation process continues regardless of the diameter of the drill head (wellbore); therefore this method eliminates well known drilling limitations relative to the depth and diameter of the wellbore.

Figure 79:
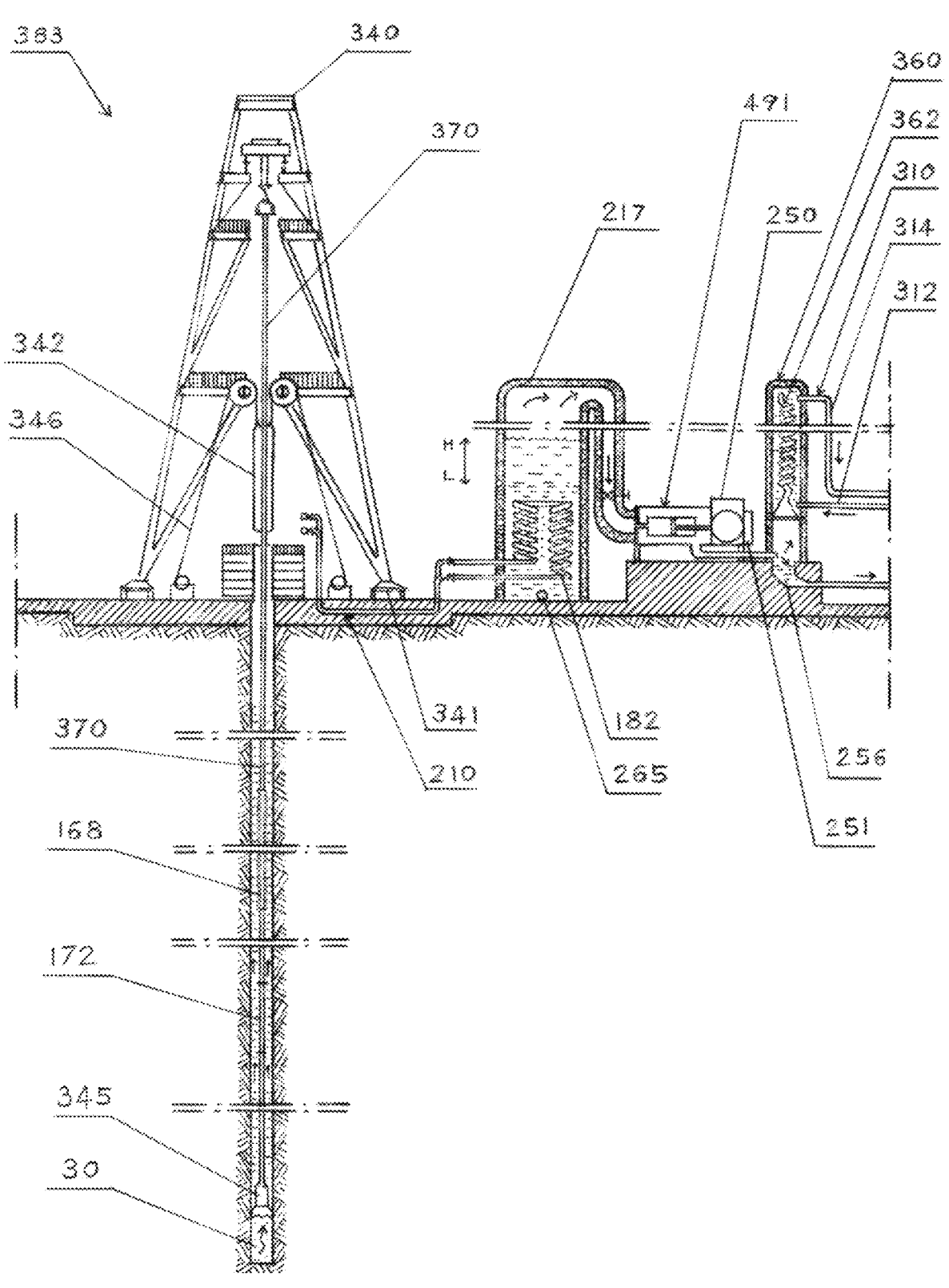
FIG. 79 illustrates a cross-sectional view taken along line 75'-75" of FIGS. 74 and 76—one typical power unit, using an alternative, piston system, for generating electricity in accordance with the invention.

FIG. 79 illustrates a cross-sectional view taken along line 75'-75" of FIGS. 74 and 76 of an alternative power unit 383 of the power plant 300. This embodiment is almost identical to power unit 380 illustrated in FIG. 75. The only difference is that instead turbines and generator assembly 231 here is used piston system 491 for generation of electricity in accordance with the invention. Here is also shown generator 250 and gear box 251. Diagram of the function of the presented piston system 491 is explained in FIGS. 81-85.

Figure 80:
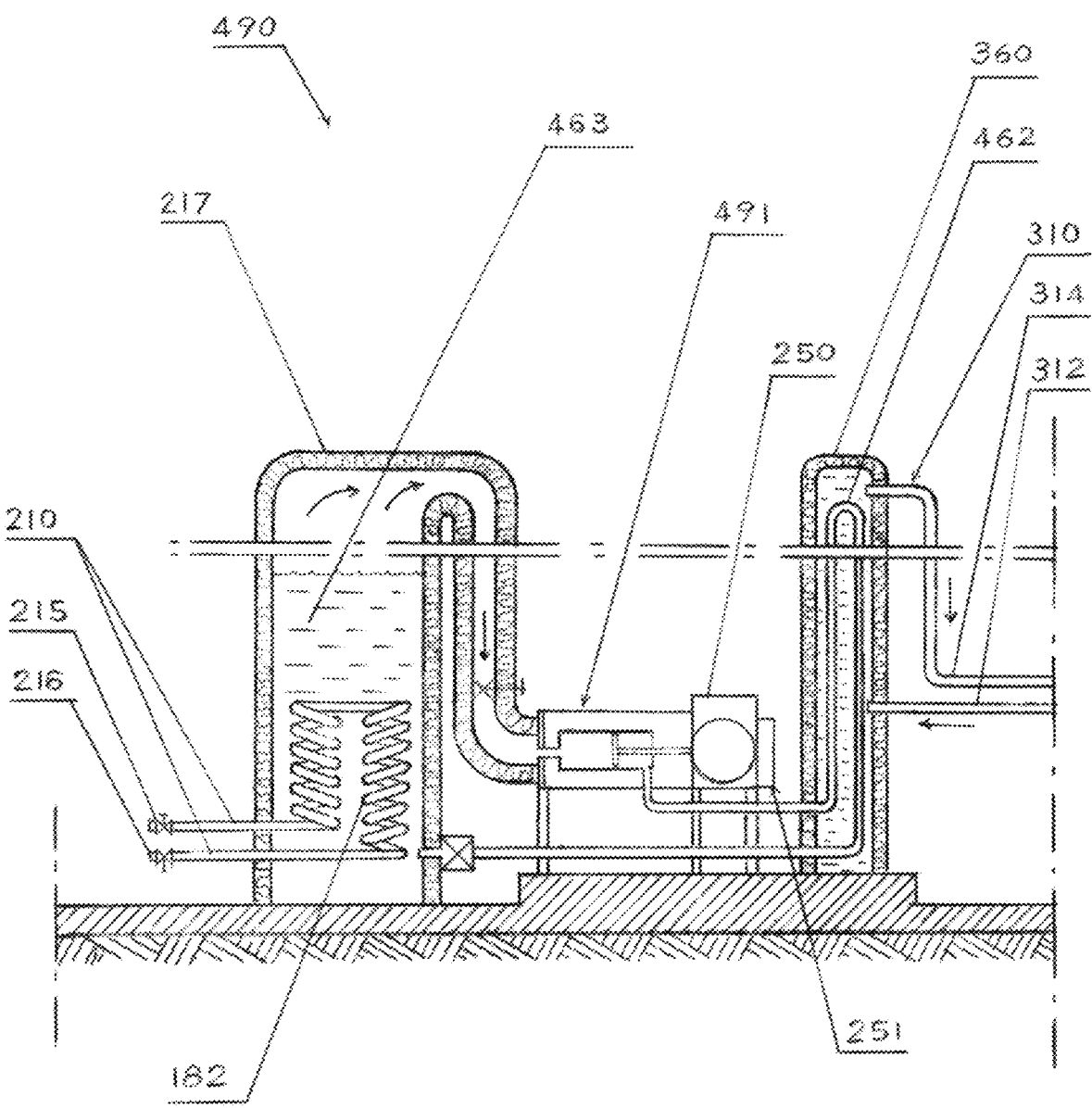
FIG. 80 illustrates a cross-sectional view of an enlarged power unit illustrated in FIG. 79 that can be used in different applications for generating electricity in accordance with the invention.

FIG. 80 illustrates a cross-sectional view of an independent power unit 490 illustrated in FIG. 79 that can be used in different applications for generation of electricity in accordance with the invention; This illustration show independent power unit 490 consisting of boiler/evaporator 217; a universal heat exchanger 210; piston unite 491 which is engaged with generator 250 and gearbox 251; and condenser 360. The universal heat exchange system 210 is a closed loop thermally insulated tube having first and second heat exchangers where the first heat exchanger 168 is positioned in heat source and second heat exchanger 182 is positioned into boiler/evaporator 217 of the power unit. Presented independent power unit 490 show only the second heat exchanger 182 inside evaporator 217 with attachments 215 and 216 to be attached to the rest of the heat exchanger system 210 with first heat exchanger 168 wherever heat source happens to be. Presented system can be modified to be used in many different applications. For example, the boiler 217 can be filled with seawater, if available nearby, to generate electricity and have byproduct potable water for consumers, and concentrated salty brine that can be returned into sea or preferably use for production of lithium.

Figure 81:
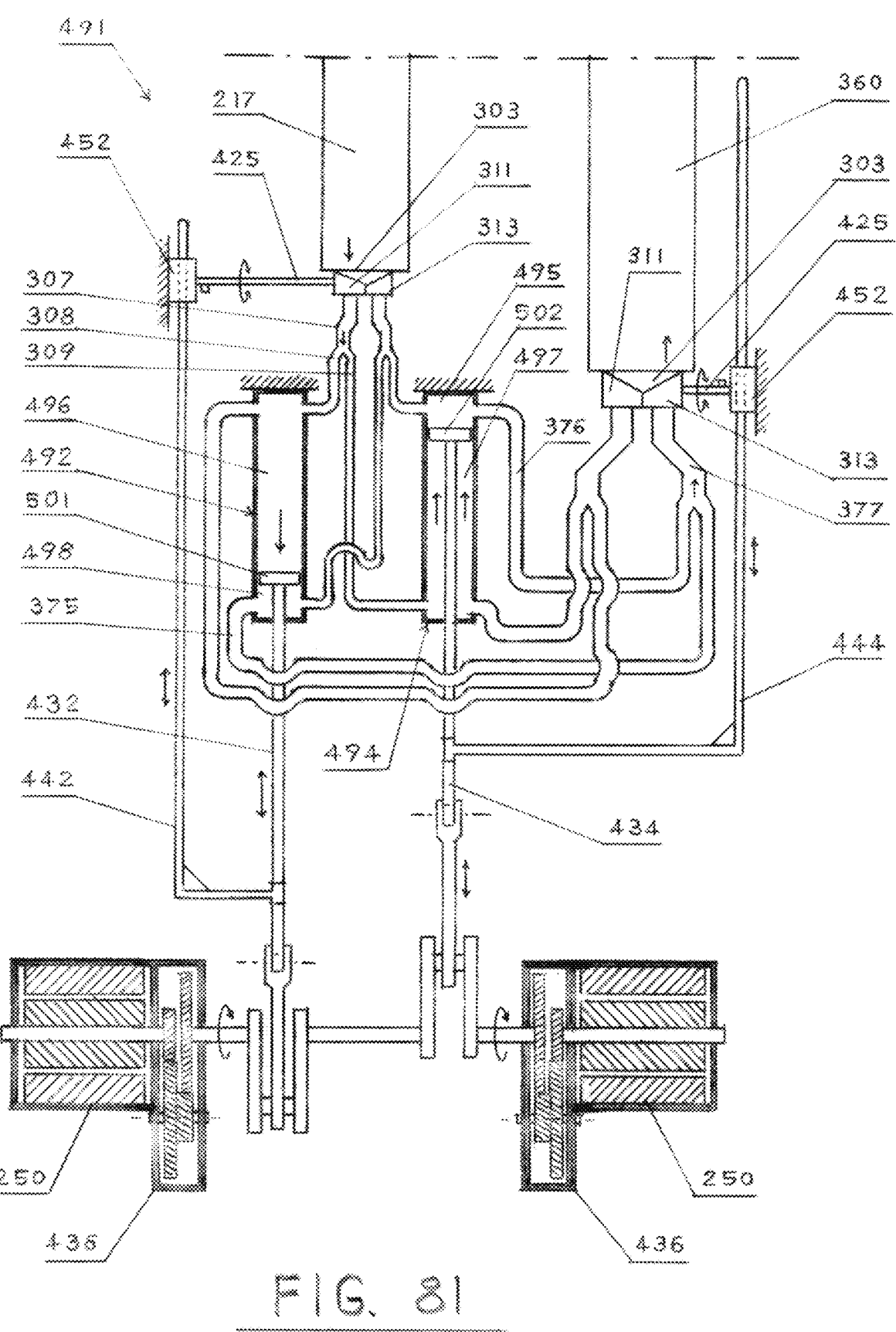
FIG. 81 illustrates a schematic diagram of the power unit illustrated in FIGS. 79 and 80 with piston system in position stroke one in accordance with the invention.

FIG. 81 illustrates a schematic diagram of the function of the piston unite 491 of the independent power unit 490 illustrated in FIGS. 79 and 80 with the piston in position stroke one. Presented piston unit 491 consists of two cylinders 492 and 494 which are engaged with pistons 432 and 434; Crankshaft 435 which is engaged to the gearboxes 436 and generators 250; The rods 442 and 444 are securely connected to corresponding pistons 432 and 434 and each engaged with activators 452 which control (open and close) the Two Port Switch Valves 303 through control bar 425 which are engaged with a pressurized source of steam 217 and exhausted outflow to the condenser 360.

Here is shown function of the first stroke. The pressurized steam enters upper chamber 496 of cylinder 492 through pressurized hose 308 and lower chamber 497 of cylinder 494 through pressurized hose 309. Here is also shown exhausted steam exiting lower chamber 498 of cylinder 492 through pressurized hoses 375 and upper chamber 495 of cylinder 494 through pressurized hoses 376 both joining exhaust line house 377 which is coupled to the Two Port Switch valves 303 which is coupled to the condenser 360.

The gearbox 436 is engaged with the crankshaft 435 and generator 250 and multiplies the rotation of the crankshaft 435 to the generator 250.

Figure 84:
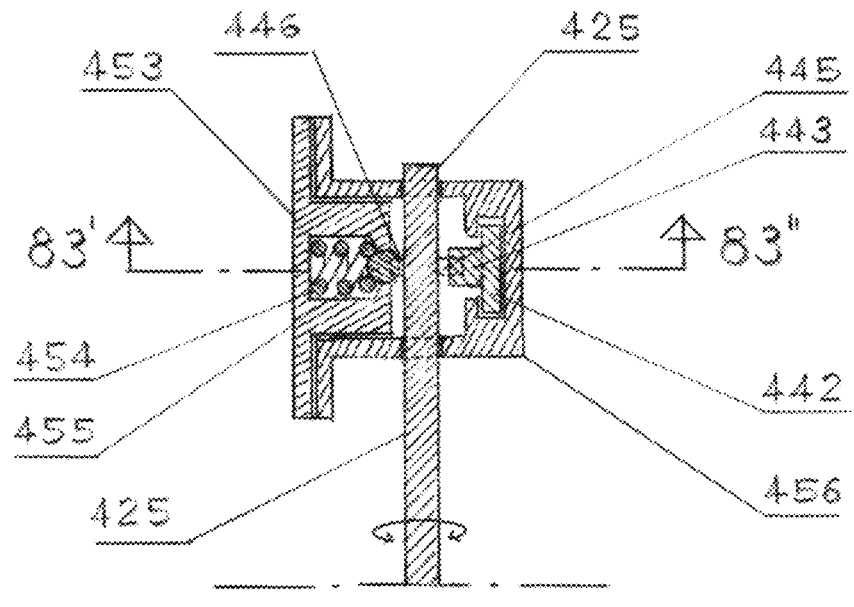
FIG. 84 illustrates a cross-sectional view of a Three Port Switch Valves 303 taken along line 84'-84" of FIG. 83 also illustrated in FIGS. 81 and 82 in accordance with the invention.
Figure 85:
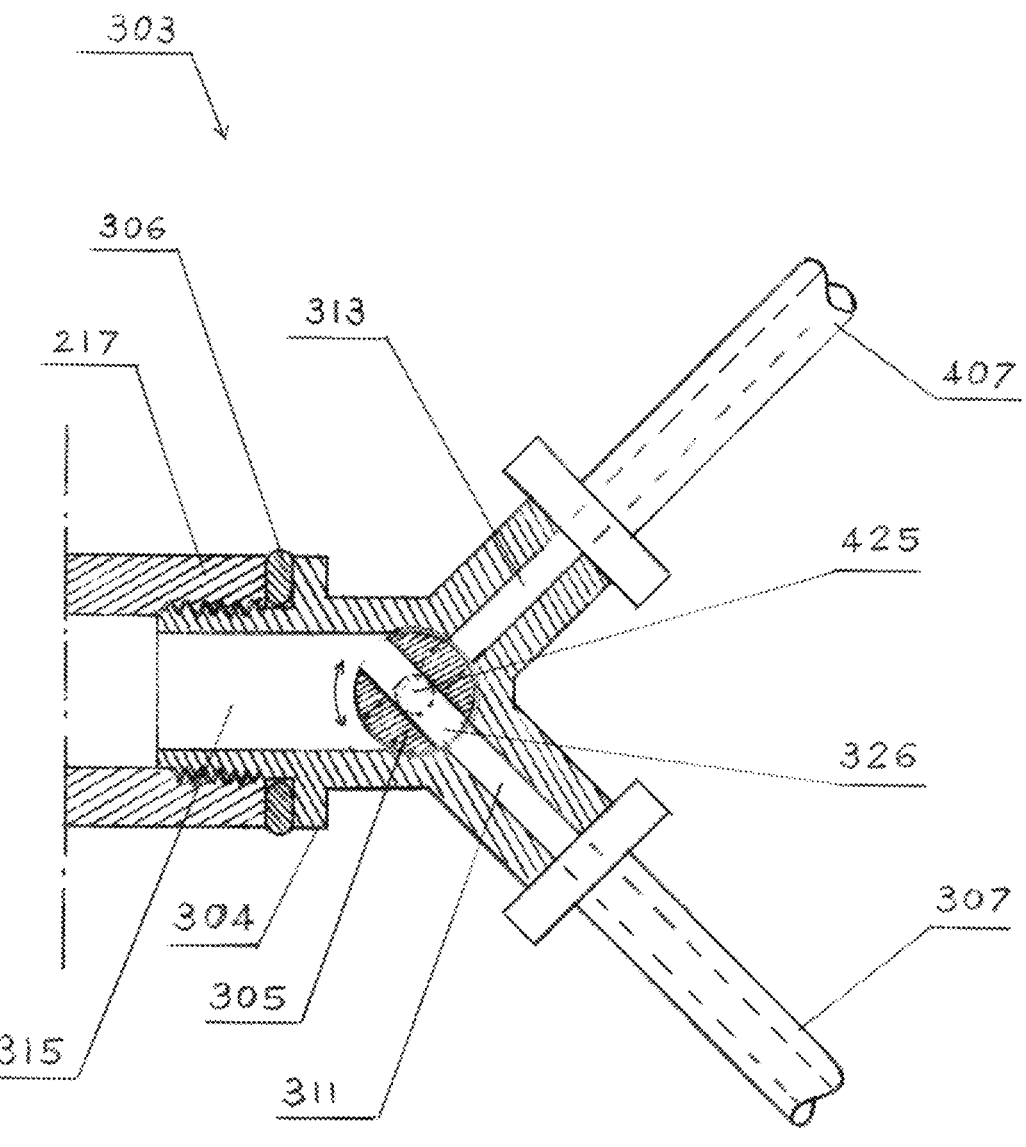
FIG. 85 illustrates a cross-sectional view of a three port valve switch illustrated in FIGS. 81 and 82 in accordance with the invention.

The rod 442 slides through activators 452 (see FIGS. 83 and 84) and at the end of the first stroke, it activates and rotates the control bar 425 which is connected to the rotating ball 305 which closes port 311 and opens port 313 of the Two Port Switch Valves 303 (see FIG. 85).

Figure 82:
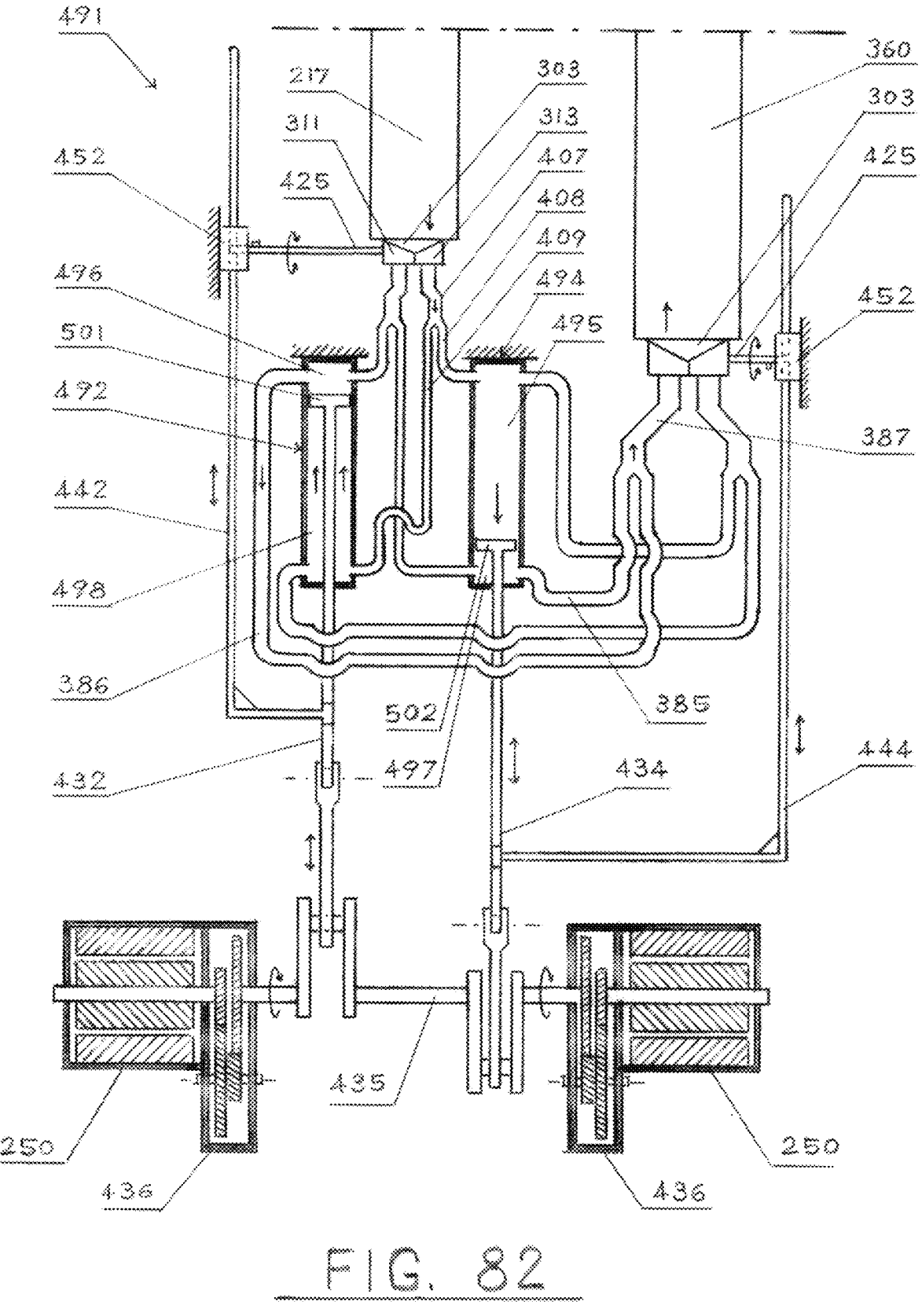
FIG. 82 illustrates a schematic diagram of the power unit illustrated in FIGS. 79 and 80 with piston system in position stroke two in accordance with the invention.

By closing port 311 and opening port 313 of the Two Port Switch Valves 303 it starts stroke two explained in FIG. 82.

FIG. 82 illustrates a schematic diagram of the power unit illustrated in FIGS. 79 and 80 with piston system 491 in position stroke two in accordance with the invention. This illustration is almost identical to the illustration in FIG. 81. The only difference is that the pistons are in the opposite position-stroke two. By closing port 311 and opening port 313 of the Two Port Switch Valves 303, the pressurized steam enters upper chamber 495 of cylinder 494 through pressurized hose 408 and lower chamber 498 of cylinder 492 through pressurized hose 409. Here is also shown exhausted steam exiting lower chamber 497 of cylinder 494 through pressurized hoses 385 and upper chamber 496 of cylinder 492 through pressurized hoses 386 both joining exhaust line house 387 which is coupled to the Two Port Switch valves 303 which is coupled to the condenser 360.

Figure 83:
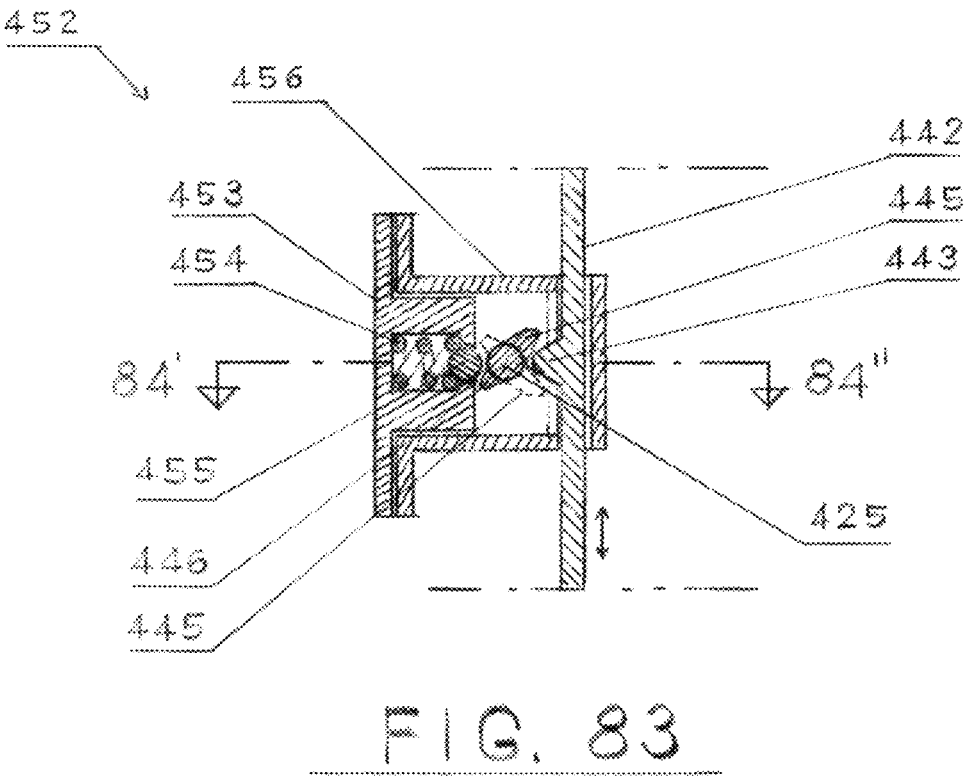
FIG. 83 illustrates a cross-sectional view of a activator device taken along line 83'-83" of FIG. 84 also illustrated in FIGS. 81 and 82 in accordance with the invention.

FIG. 83 illustrates a cross-sectional view of the activators 452 taken along line 83'-83" of FIG. 84 also illustrated in FIGS. 81 and 82 in accordance with the invention. The activators 452 consist of base 453 which contain spring 454 and ball 455; housing 456 which engage the control bar 425 and the rod 442. The rod 442 slides through activator 452 (see FIGS. 81 and 82) and at the end of first piston stroke it activate and rotate the control bar 425 which is connected to the rotating ball 305 which closes port 311 and opens port 313 of the Two-Port Switch Valves 303 (see FIG. 85). The rod 442 has protrusion 443. The control bar 425 has two protrusions opposite to each other 445 and 446. When the rod 442, which is connected to the piston, slides through the activator 452 the protrusion 443 of the rod 442 engages with protrusion 445 of the control bar 425 and rotates control bar 425 in one direction for about 45°. When the rod 442, which is connected to the piston, slides through the activator 452 in opposite direction it rotates control bar 425 in opposite direction for about 45°. During this cyclic process protrusion 446 of the control bar 425 engage and temporary presses ball 455 which locks the control bar 425 in position and that cycle is repeated as pistons changes positions in stroke one and two.

FIG. 84 illustrates a cross-sectional view of the activators 452 taken along line 84'-84" of FIG. 83 also illustrated in FIGS. 81 and 82 in accordance with the invention.

FIG. 85 illustrates a cross-sectional view of a Two-Port Switch Valve 303 illustrated in FIGS. 81 and 82 in accordance with the invention. Here, as a sample, is illustrated the Two-Port Switch Valves 303 coupled to the evaporator 217. The same valve is also coupled to condenser 360 (not illustrated here). Two-Port Switch Valves 303 consist of housing of the valve 304 which has three ports-basic port 315 and two ports 311 and 313 for connecting high pressure hoses 307 and 407; rotating ball 305 which has opening (tunnel) 326 which can align and provide flow from basic port 315 to either of two ports 311 and 313 as the control bar 425 which is firmly connected to the rotating ball 305 switches positions.

The presented illustrations are used to explain the function of the system. Alternatively, the two-port switch valve 303 can be activated electronically instead of mechanically by activator 452.

Figure 86:
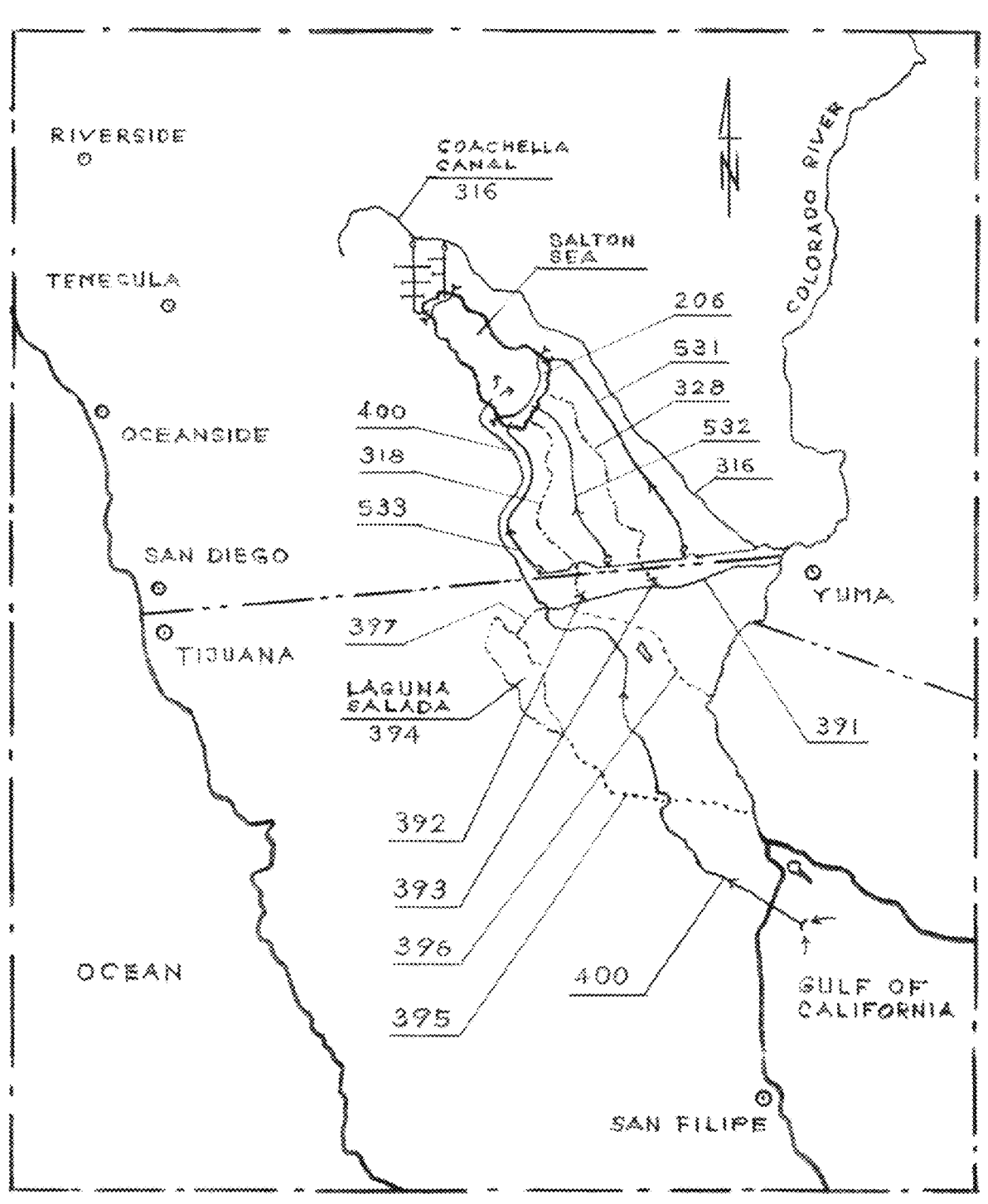
FIG. 86 illustrates a plain view of a schematic diagram of an alternative pipeline route connecting Salton Sea with Gulf of California, Mexico.

FIG. 86 illustrates a plain view of a schematic diagram of an alternative pipeline route connecting Salton Sea with Gulf of California, Mexico. Here is illustrated an alternative solution for the restoration of the Salton Sea. This option requires treaty with Mexico to secure long-term interest of both countries. USA interest is to have corridor for two pipeline and access to the Gulf of California. Mexico's interest is to have more water from Colorado River for their farmlands and possible inflow to the Gulf of California. Alternatively, this unexpected offer, but important water source, can be used for rejuvenating the Laguna Salada (now dry lake bed) and/or reaching the Gulf of California that way.

Here is illustrated redirection of the New River 318 and Alamo River 328 on Mexican side of the border with two gates 392 and 393 to flow towards Laguna Salada 394. This option requires relatively inexpensive earth work (a few miles cut) 397 west of Mexicali, Mexico. Here is also illustrated an optional route 396 bypassing Laguna Salada 394. On the way towards Gulf of California.

Here is also illustrated pipeline system which distributes water for farmland south of the lake. For the reason of preventing formation of runoffs water from nearby farmland entering the southern and northern sections of the lake and for reason of water conservation the amount of water for the farmland from All-American Canal can be controlled with valves to be used only as necessary with sprinkler system preventing formation of the runoffs water so that will not be runoff's water from farmlands entering the Salton Sea.

Figure 87:
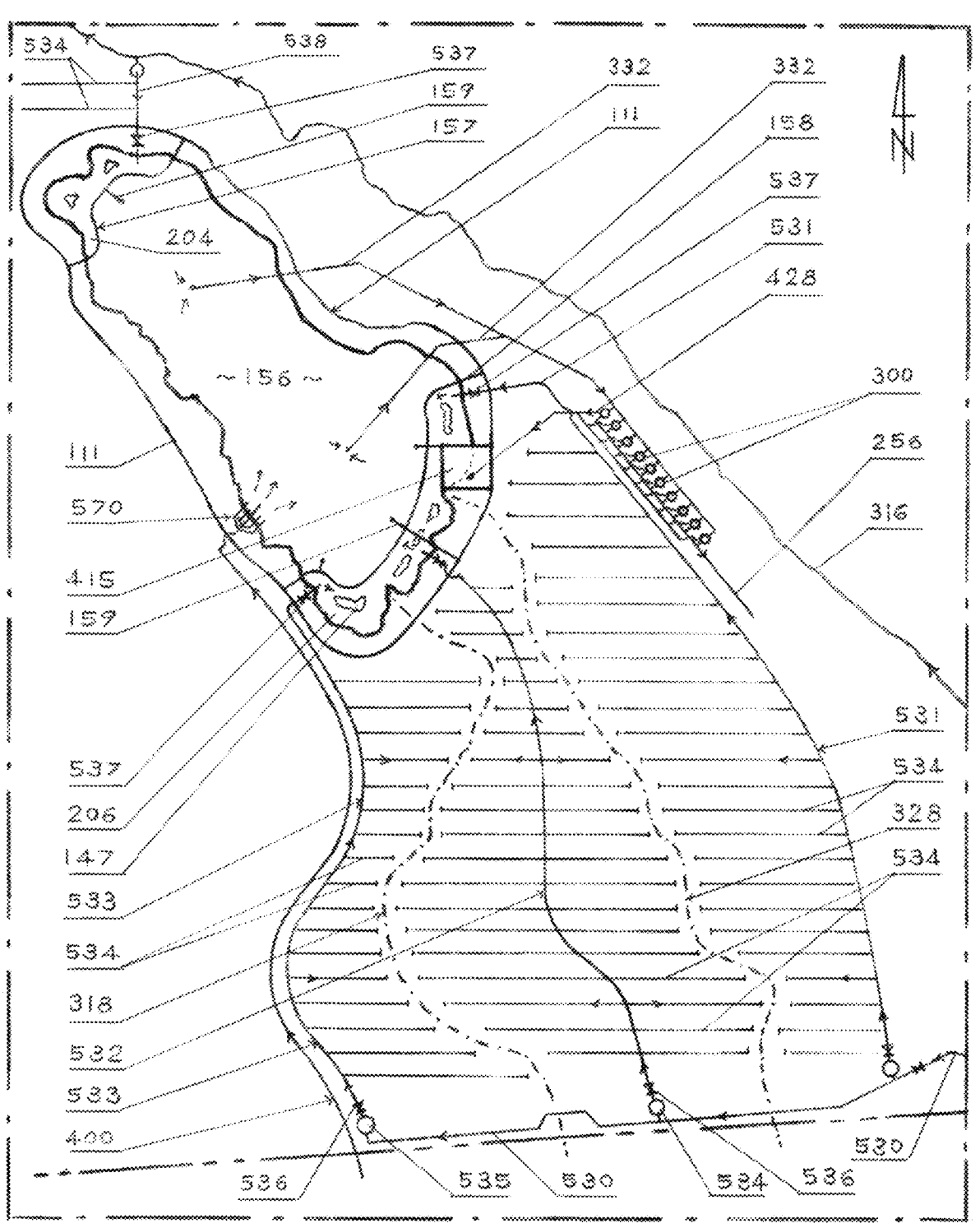
FIG. 87 illustrates a plain view of a schematic diagram of an enlarged section of alternative pipeline system associated with route connecting Salton Sea with Gulf of California, Mexico illustrated in FIG. 86.

FIG. 87 illustrates a plain view of a schematic diagram of an enlarged section of alternative pipeline system associated with route connecting Salton Sea with Gulf of California, Mexico illustrated in FIG. 86; Here is illustrate a system designed for more efficient water conservation to accommodate water restriction with enforcement of the result of Quantification Settlement Agreement (QSA).

This system consist of pipeline 530 transporting water from All-American Canal for distribution to the farmland and southern section of the lake; three reservoirs/tanks 535 with valves 536 controlling water flow to the three main pipelines; eastern branch 531; central branch 532; and western branch 533; and secondary pipelines 534 extending from each of three main branches.

The secondary pipelines 534 have caps on their ends. The main pipelines 531, 532, and 533 have control valves 536 on beginning and control valves 537 on their ends. By coordinating activation of the control valves 536 and 537 the conservation of the water can be maximized. For example— the check valves 537 on the end of the main three pipelines can be in closed position to provide necessary pressure in pipeline during use of water for farmland through sprinkler system. After cycle of watering of farmland is completed the check valves 537 can be opened to supply the necessary inflow for the southern section of the lake 206—wildlife sanctuary—as needed to compensate for loss of water by evaporation. Presented system prevents formation of runoff water from farmland and makes the New River and Alamo River unnecessary. The New River and Alamo River will still function in stormy days. In this illustration is shown function of the system in southern section of the lake 206. The same system is used in northern section of the lake (see FIG. 90).

Figure 88:
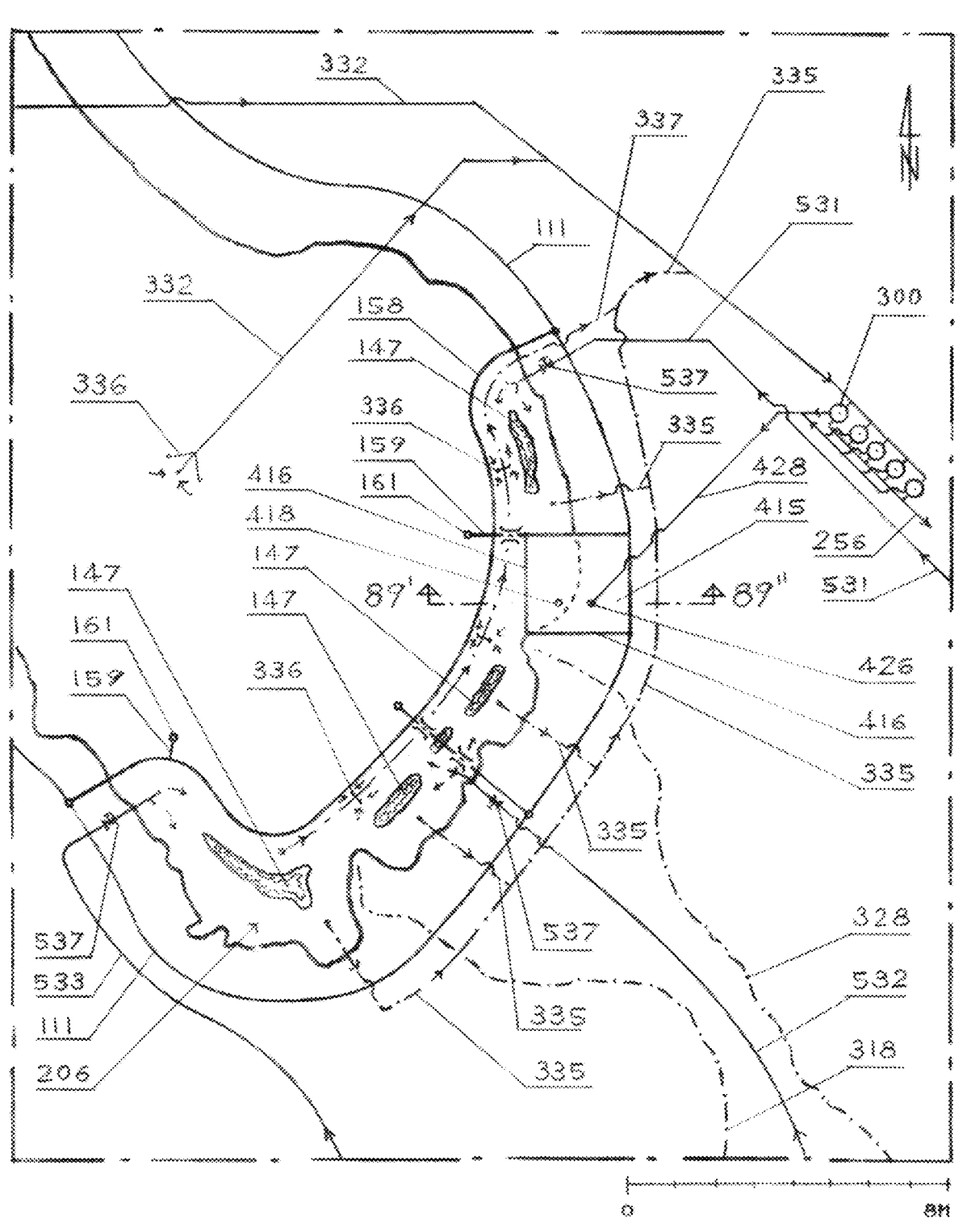
FIG. 88 illustrates enlarged plain view of southern section of the Salton Sea and schematic diagram of an alternative dikes and pipeline systems associated with restoration of the Salton Sea also illustrated in FIGS. 86 and 87.
Figure 89:
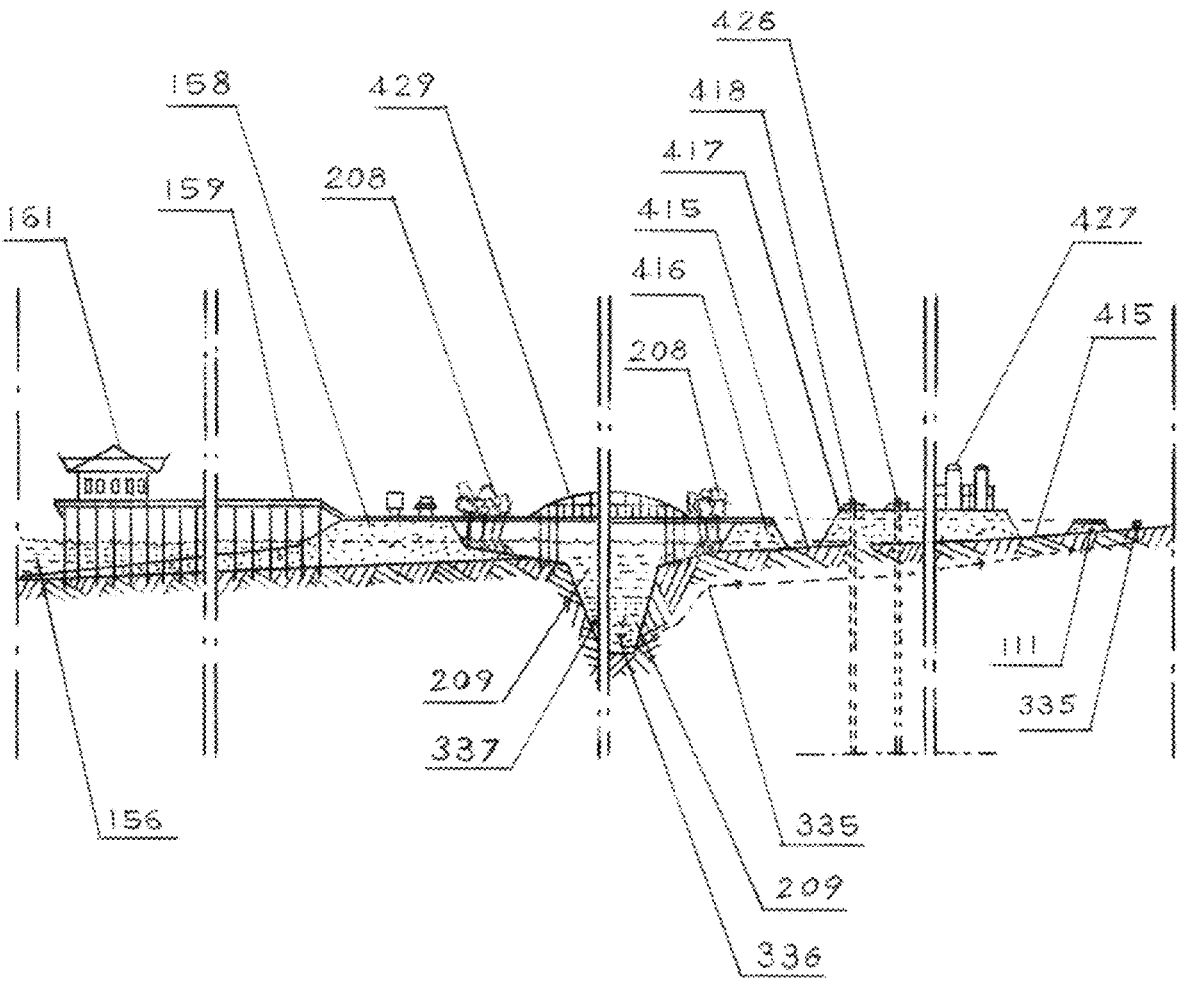
FIG. 89 illustrates a cross-sectional view taken along line 89-89' of FIG. 88, of the southern section of the Salton Sea, associated with restoration of the Salton Sea.

In this illustration is shown an area 415 surrounded with a levy (dike)—two lane road 416, (see FIGS. 88 and 89) which intrude into waterline of the southern section of the lake 206 (wild life sanctuary) to form dry land and secure development of the conventional geothermal power plant 427 at the area of known geothermal reservoir (see FIGS. 88 and 89). The existence of conventional geothermal power plants in this area can be a positive factor and coexistence of mutual interest of conventional geothermal power plant 427 and new (closed loop system) geothermal power plant 300 because natural geothermal reservoirs in this area (about dozen of them) that conventional geothermal power plant depend on are depleting and needs additional source of water for replenishing them. Replenishing depleting geothermal reservoirs can be accomplished by injecting waste water from boilers 217 of the new geothermal power plants 300 through pipeline 428 into depleting geothermal reservoirs.

The same pumping system for importing seawater, if needed, can be used with minor adjustments for exporting high salinity water (concentrated salty water at the bottom of the lake) from the Salton Sea into the Ocean by switching the direction of rotation of the In-Line-Pump/Generator 572 and 573 (see FIGS. 62-73). Reverse flow can be activated periodically, for example, two weeks per year twice a year. One of the minor adjustments for using the same pipeline system, for exporting water from the Salton Sea, is to have an alternative connection from pipeline branches 332 to the main pipeline 400 (see FIG. 87).

The essential point of the presented architectural plan (the solution) for the restoration of the Salton Sea is that the three reservoirs/tanks 535 with valves 536 controlling water flow to the three main pipelines; eastern branch 531; central branch 532; and western branch 533 can be used for formation of recreational parks and nearby fisheries (fish farms). See FIGS. 152-155.

FIG. 88 illustrates enlarged plain view of southern section of the Salton Sea and schematic diagram of an alternative dikes and pipeline systems associated with restoration of the Salton Sea also illustrated in FIGS. 86 and 87; Here is shown in more details the southern section of the lake 206 (wild life sanctuary) with an area 415 surrounded with a levy (dike)— two lain road 416, which intrude into waterline of the southern section of the lake 206 to form dry land 415 and secure development of the conventional geothermal power plant 427 at the area of known geothermal reservoir.

Here are also shown pipeline 332 with suction branches 336 for collecting and transporting high salinity water from the bottom of the lake into boilers of the geothermal power plant 300. High salinity water has higher density and have tendency to accumulate at the bottom of a large body of water. Here are also shown pipelines 335 and 337 with suction branches 336 which collect and transport high density water with heavy metals and salt, which have tendency to accumulate at lowest point of a large body of water, and transport it into boilers of the geothermal power plant 300.

Here are also shown production well 418 and injection well 426 in area 415 designated for building conventional geothermal power plant 427. The injection well 426 can be used for depositing waste material from power plant 300 through pipeline 428 into depleting geothermal reservoir. If needed, the waste material from power plant 300 can be diluted with water from pipelines 332, 335 or 337 before being injected into geothermal reservoirs.

Here are also shown three main pipelines 531, 532 and 533 with control valves 537 for providing and circulating water in the southern section of the lake 206 (the wild life sanctuary). Here are also shown dike 158 (two lane road) with several piers 159 and restaurants 161. Here are also shown islands 147 seeded with plants, preferably mangrove trees or alike, which would provide wildlife sanctuary. The islands 147 can be built by material from digging "V" shaped (depressions about 45 feet) ponds 209 and from occasional dredging and maintain this section of the lake.

A portion of the Southern and Northern sections of the Salton Sea can be used for cultivation of the algae for industrial use.

Water needed for balancing evaporation in the southern section 206 of the lake: Necessary inflow to balance evaporation of the whole lake is less than 1,200,000 acre feet. The surface of the southern section 206 of the lake is less than 10% of whole lake-let's say it is 10%. Water needed to balance evaporation of the southern section 206 is about 120,000 acre feet. Water needed for farmlands south of the lake is about 200,000 acre feet. Water needed for balancing evaporation in the southern section of the lake 206 and for nearby farmland is about 320,000 acre feet.

FIG. 89 illustrates a cross-sectional view taken along line 89-89' of FIG. 88, of the southern section of the Salton Sea, associated with restoration of the Salton Sea. In this illustration are shown "V" shaped ponds 209 which should be deep enough, about 60 feet, which would provide natural separation and filtration of water by gravity. Here are also shown pier 159 and restaurant 161. Here are also shown dikes 158 and 416 and dry area 415 surrounded with dike 416, which intrude into waterline of the southern section of the lake 206 (wild life sanctuary) to form dry land 415 and secure development of the conventional geothermal power plant 427 at the area of known geothermal reservoir. Here are also shown raised platform (landfill) 417 preferably being higher than water level of the lake for building conventional geothermal power plant and structures on it. Here are also shown production well 418 and injection well 426. Here are also shown a bridge 429 connecting main dike 158 and levy 416.

Figure 90:
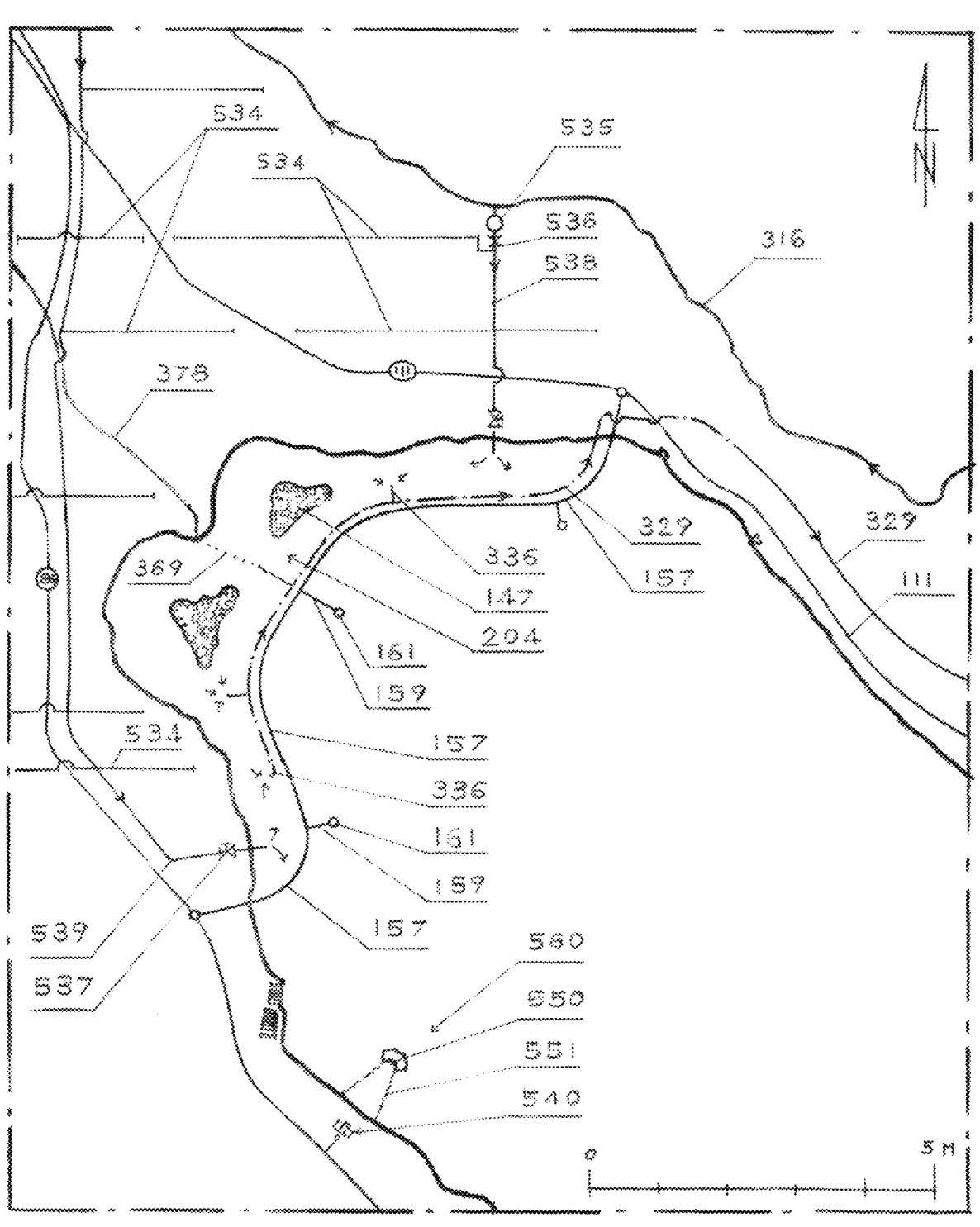
FIG. 90 illustrates enlarged plain view of northern section of the Salton Sea and schematic diagram of dikes and pipeline systems associated with route connecting Salton Sea with Gulf of California, Mexico illustrated in FIGS. 86 and 87.

FIG. 90 illustrates enlarged plain view of northern section of the Salton Sea 204 and schematic diagram of dike and pipeline systems associated with route connecting Salton Sea with Gulf of California, Mexico illustrated in FIGS. 86 and 87. Here is shown the same system of pipelines for conservation of water which distributes water from Coachella Canal 316 to the farmland and to the northern section of the lake 204 as is used in southern section of the lake 206 illustrated and explained in FIG. 87.

Here are illustrated main pipelines 538 and 539 distributing water to secondary pipelines 534 which have caps on end of the pipelines and use sprinkler system for final distribution of water to farmland. The amount of water for the farmland from Coachella Canal 316 can be controlled with valves 536 and 537 to be used only as necessary for farmland to prevent formation of the runoffs water from farmland.

Here are also shown control valves 537 at the end of pipelines 538 and 539 for providing and circulating water in the northern section of the lake 204 (wild life sanctuary). Here are also shown dike 157 (two lane road) with several piers 159 and restaurants 161. Here are also shown islands 147 seeded with plants, preferably mangrove trees or alike, which would provide wildlife sanctuary. The islands 147 can be built by material from digging "V" shaped depressions 209 and from occasional dredging and maintain this section of the lake.

Here are also shown Whitewater River 378 which is most of the year a dry wash. It functions as a river during storms which is short period of several days a year. In the Whitewater River is also deposited treated sewer water from cities of Coachella Valley. Here is also shown possible connection 369 to collect and transport runoff water, that might not been treated properly, to the pipeline 329 to prevent contamination of the northern section 204 and to be used in power plants 300 and subsequently to be used for replenishment of the depleting geothermal reservoirs.

Here are also shown a possible location for a Hotel Resort 540 with a section in the Salton Sea with the tower 550 to be built on manmade island 560 which contain a mechanism for generation of waves for surfing.

Water needed for balancing evaporation in the northern section 204 of the lake: Necessary inflow to balance evaporation of the whole lake is less than 1,200,000 acre feet. The surface of the northern section 204 of the lake is less than 5% of whole lake-let's say is 5%. Water needed to balance evaporation of the southern section 204 is about 60,000 acre feet. Water needed for farmlands north of the lake is about 100,000 acre feet.

Water needed for balancing evaporation in the northern section of the lake 204 and for nearby farmland is about 160,000 acre feet.

Water needed for balancing evaporation in the northern and southern sections of the lake and for nearby farmlands is about 480,000 acre feet per year.

It means that we can functional lake with less than 480,000 acre feet per year from Colorado River, which means that this proposal is in harmony with restrictions from Quantification Settlement Agreement (QSA).

Figure 91:
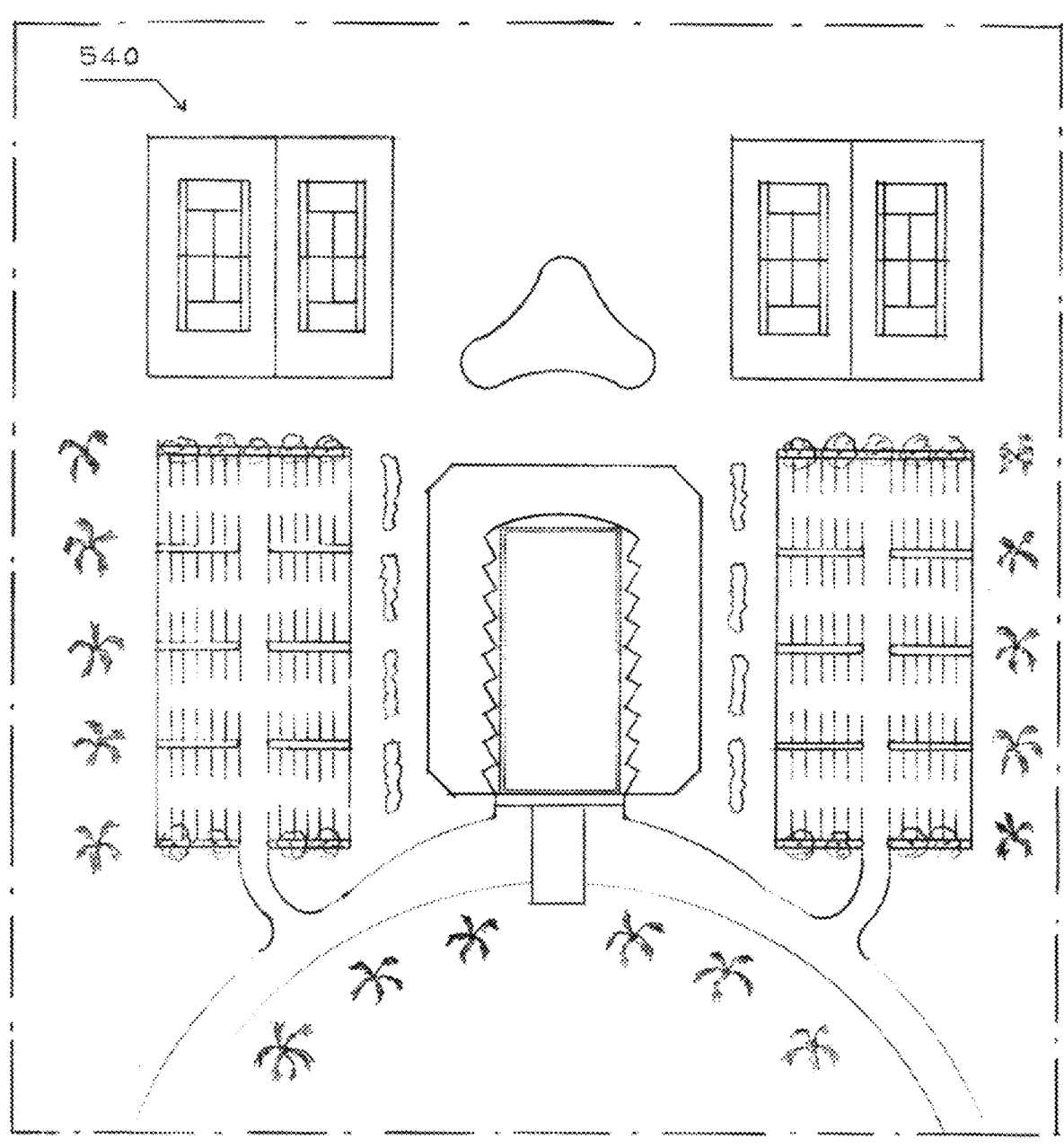
FIG. 91 illustrates enlarged plain view of a resort hotel illustrated in FIG. 90.

FIG. 91 illustrates enlarged plain view of a resort hotel 540 illustrated in FIG. 90. Here is shown preliminary design of the entrance to the hotel, parking spaces, swimming pool, and tennis courts.

Figure 92:
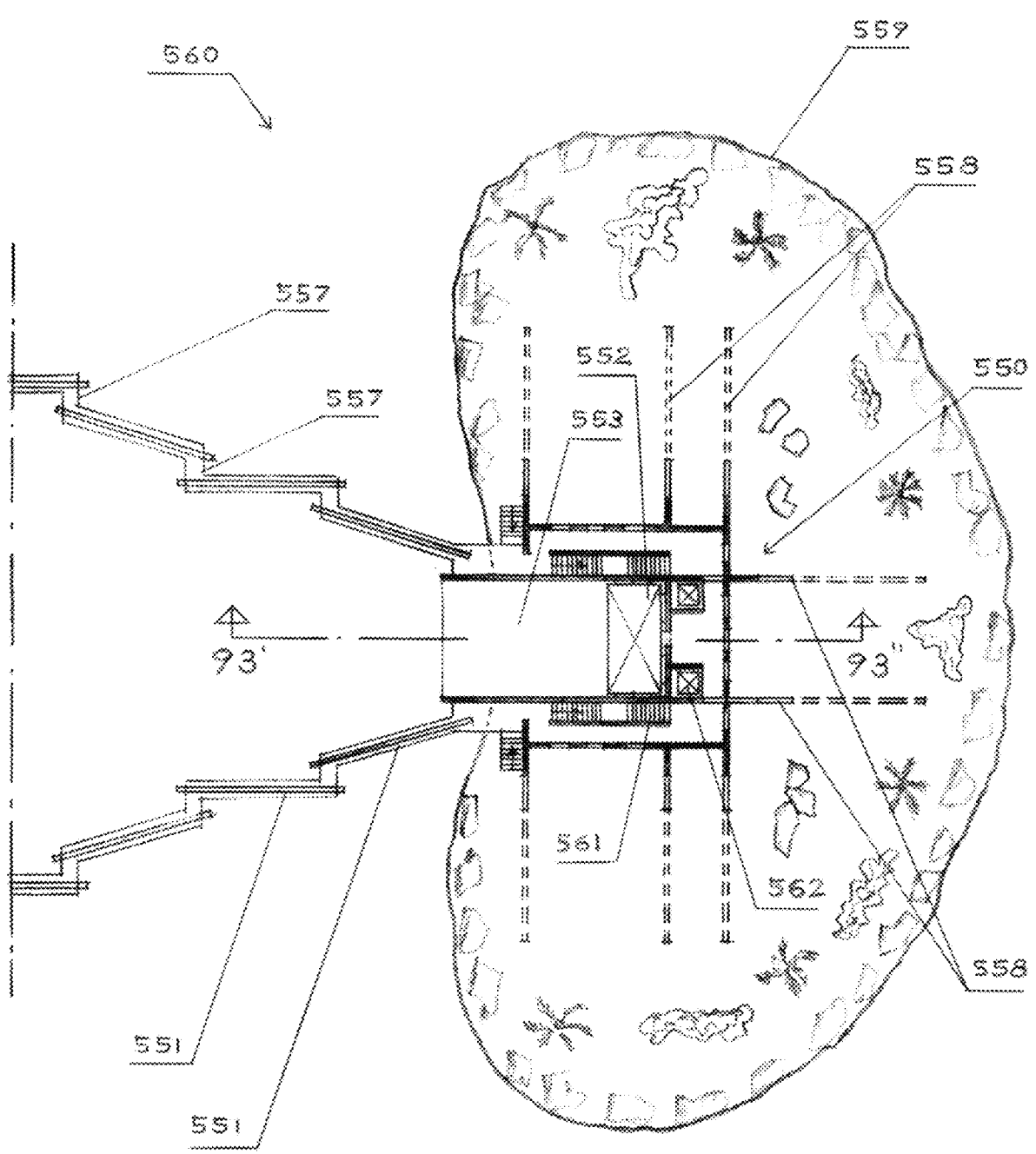
FIG. 92 illustrates a cross-sectional plain view taken along line 92'-92" of FIG. 93 of an island with waive generating tower also illustrated in FIG. 90.
Figure 93:
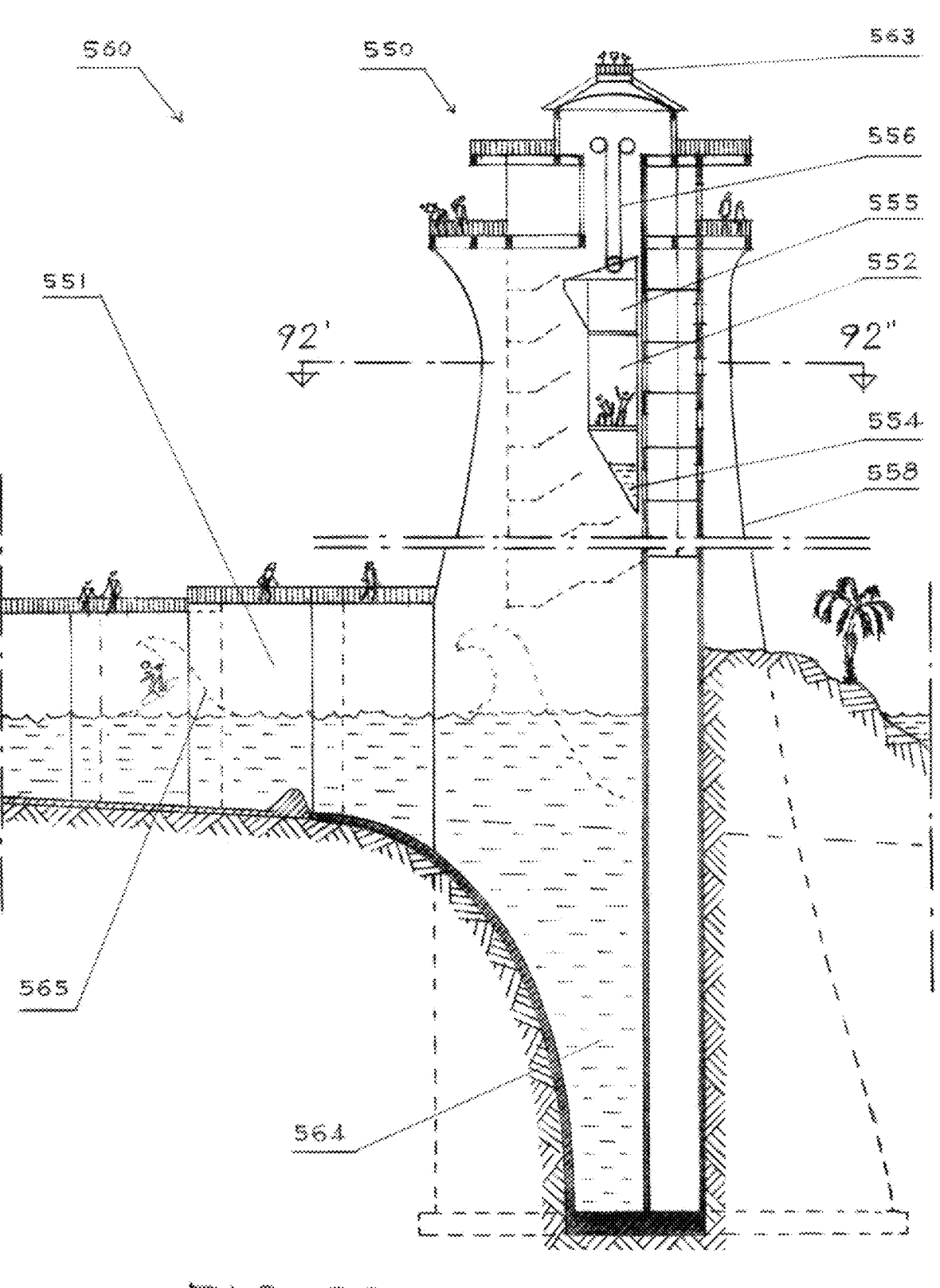
FIG. 93 illustrates a cross-sectional pain view of a waive generating tower taken along line 93'-93" of FIG. 92 also illustrated in FIG. 90.

FIG. 92 illustrates a cross-sectional plain view taken along line 92'-92" of FIG. 93 of a tower 550 which contain mechanism for generating surfing waves also illustrated in FIG. 90. In FIGS. 92 and 93 is illustrated a concept of a wave generating facility 560 which extend into Salton Sea. The wave generating facility 560 consist of a tower 550 which contain mechanism for generating surfing waves; and wall segments 551 which surround surfing area.

The mechanism for generating surfing waves consist of the ax room 552 which is mounted in a recess 553 which is formed between three sides of structural walls 558 of tower 550. The ax room 552 is waterproof space suspended on cables 556 and securely engaged with vertical rails which are fixed to the three inner structural walls 558. There is access to the top of tower and ax room 552 by stairs 561 and by elevators 562.

The back side of the ax room 552 is a vertical smooth surface. The ax room 552 consists of three waterproof segments: central segment 552; lower segment (reinforced container) 554; upper segment 555; and cables and winch 556 to hoist ax room 552. The central segment of the ax room 552 is furnished space for visitors having secured acrylic window in front wall. The lower segment (reinforced container) 554 can be filled with water to adjust weight of the ax 552 if needed.

The upper segment 555 of the ax room 552 has shape to smoothly increase volume and buoyancy as ax room penetrates water during fall. The ax room 552 provides space for visitors with secured acrylic windows so that visitors can view descent above and under water. The visitors are fastened and can experience weightless sensation for several seconds on the way down. As the ax room 552 plunges into water the sharp edge of the lower segment provide smooth entry. The angled surface transfer energy of the fall into waves. As the ax room 552 enters water it pushes (expel) water out and forward generating waves for surfers to ride on.

As the ax room 522 sink the buoyancy increase and push the ax room 552 upward. The momentum of buoyancy is used to push ax room 522 up above water surface so that additional power for raising ax room is minimized. The ax room 552 is raised with hoist (cable system) 556 to desired height and secured at that desired position with controlled fastener (locks). The frequency of generating surfing wave can be scheduled for periods of 10-15 minutes. Here is also shown island 559 on which tower 550 is build.

Important point of this concept is that two strong tourists' attractions "weightlessness" and "surfing" are achieved minimizing operating expenses. Because of nice weather in area, the presented concept would be attraction for surfers for 12 months a year with possibility of hosting surfing competition events.

The wall segments 551 have pathway on top with safety rails and are connected with bridges 557 for visitors to reach tower by foot. The wall segments 551 are positioned so to concentrate waves in surfing area and to provide water circulation.

FIG. 93 illustrates a cross-sectional pain view of a wave generating tower 550 taken along line 93'-93" of FIG. 92 also illustrated in FIG. 90. Here are shown all elements explained in FIG. 92. Here are also shown the light feature 563 on top of the tower 550 for light shows at night. Here are also shown deep reservoir 564 in which the "ax" room 552 plunges. Here is also shown, in dash-line, surfing waves 565 generated after the ax room 552 plunges into reservoir 564. It is realistic to expect that the tower 550, beside explained tourist attractions such as generating surf waves and weightlessness, might also be a symbolic "light house" and be featured as such for the area.

Figure 94:
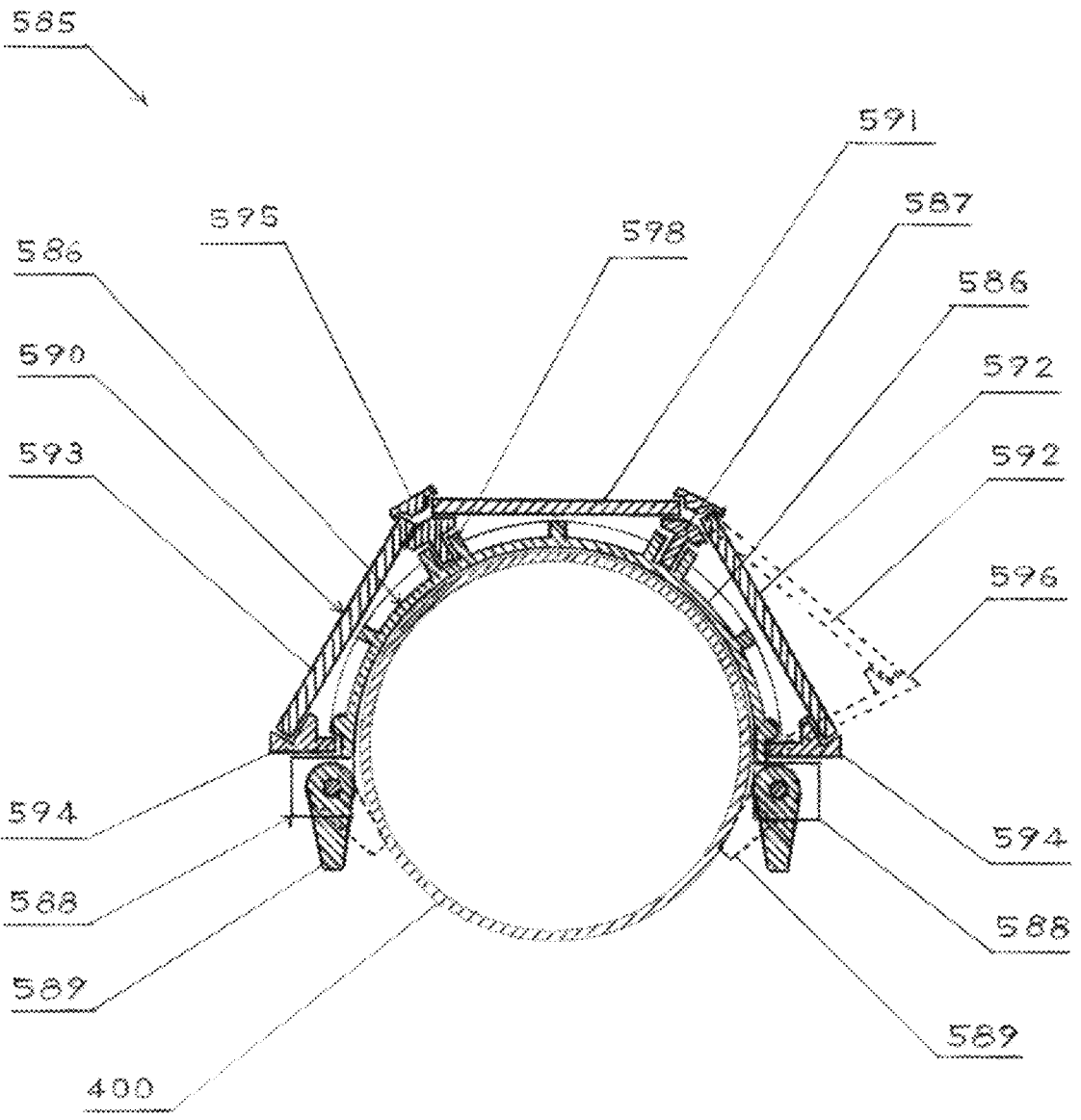
FIG. 94 illustrates a cross-sectional view of a solar panel assembly and its attachment system to the pipeline in accordance with the invention.

FIG. 94 illustrates a cross-sectional view of a solar panel assembly 585 and its attachment system to the pipeline in accordance with the invention. Here is illustrated a solar panels assembly 585 installed on upper portion of the pipeline 400 for harnessing solar energy and for generation of electricity. In this presentation the pipeline 400 is used as a sample for explaining the system but the concept can be used in combination with any pipeline system.

The solar panel assembly 585 consists of: two support structure 586 with fitting protrusions 598; supporting beams 587; fastener assembly 588 with a clamp 589; and solar panels 590 consisting of central panel 591 and two side panels 592 and 593. Here are also shown side panels supporting beams 594 and joining elements 595. Here is also illustrated as an alternative (in dash-line) the extended beams structure 596 to provide different angle for side panels and consequently catch more sunlight during the day. Here are also shown a fastener assembly 588 which are integral part of the radial support structure 586. The support structures 586 have radial corresponding shape and size to the diameter of a segment of the pipeline. When the support structures assembly 586 is fitted on top of a segment of a pipeline, the fastener clamp 589 is bended in locking position and tightened with bolt and nut.

Figure 95:
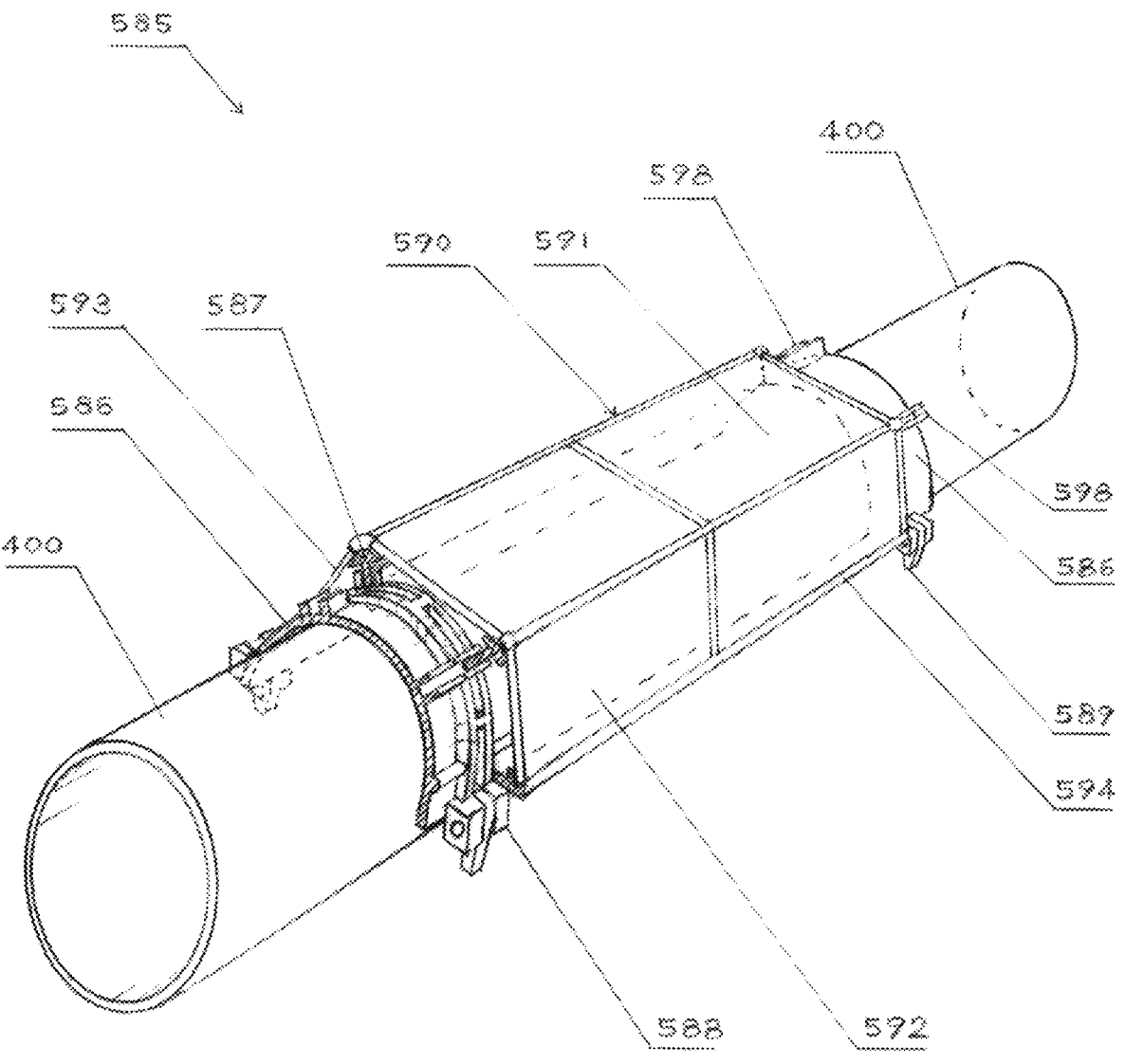
FIG. 95 illustrates a perspective cross-sectional view of a solar panels and its attachment system to the pipeline shown in FIG. 94 in accordance with the invention.

FIG. 95 illustrates a perspective cross-sectional view of the alternative solar panel assembly 585 shown in FIG. 94. Here are shown solar panels arranged so to cover upper surface of the pipeline consisting of upper central panel 591 and sides panels 593 and 592 to catch sunrays during the day. Side panels will be more effective in morning and in afternoon when the sun is lower and upper central panel will be most effective in the midday when the sun is high. Generated electricity can be used as supplement energy needed for pumping water on uphill routes or as a supplement to the electric grid.

Figure 96:
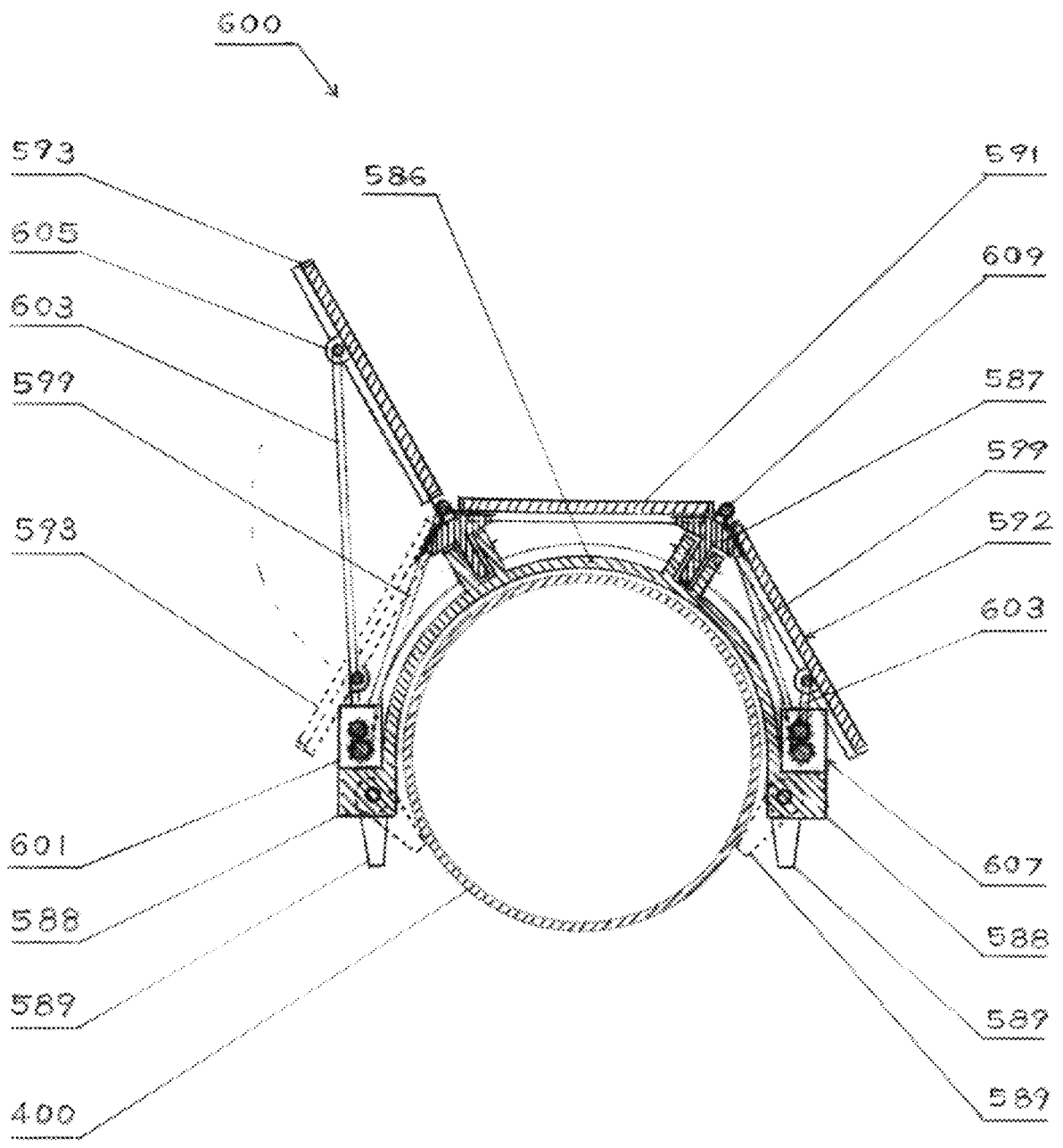
FIG. 96 illustrates a cross-sectional view of an alternative solar panel assembly and its lifting mechanism system in accordance with the invention.

FIG. 96 illustrates a cross-sectional view of an alternative solar panel assembly 600 and its attachment system to the pipeline and lifting mechanism 601. Similarly to solar panels assembly 585 presented in FIGS. 94 and 95 the assembly 600 also consist of the support structures 586; longitudinal beams 587, fastener assembly 588, and solar panels 590. In addition to solar panels assembly 590 in assembly 600 is added the lifting mechanism 601 to change position of the side panels 593 and 592 to follow the sun and maximize effectiveness of sunlight during the day (see side view in FIG. 97). The lifting mechanism 601 consist of: the main rod 602 attached to radial support structures 586; arms 603 attached to the frame of side panels 604 with ball joints 605 and to the main rod 602 with nut-ball join 606; and the gear box with motor and electronics 607. The main rod 602 is engage with gear box 607 through set of gears. The main rod 602 also has two sets of thread 608 on each side of the gear box 607 and each thread aligned in opposite directions. The threaded portions of the main rod 602 engage with corresponding nuts with ball-join 606. When motor rotates the main rod 602 in one direction the nuts with ball-join 606 slides in opposite directions and pushes side panel 593 and 592 through arms 603 up. The side panels 593 and 592 are engaged with upper central panel 591 through pivot 609. Here are also shown bars 599 for securing the gear box 607.

Figure 97:
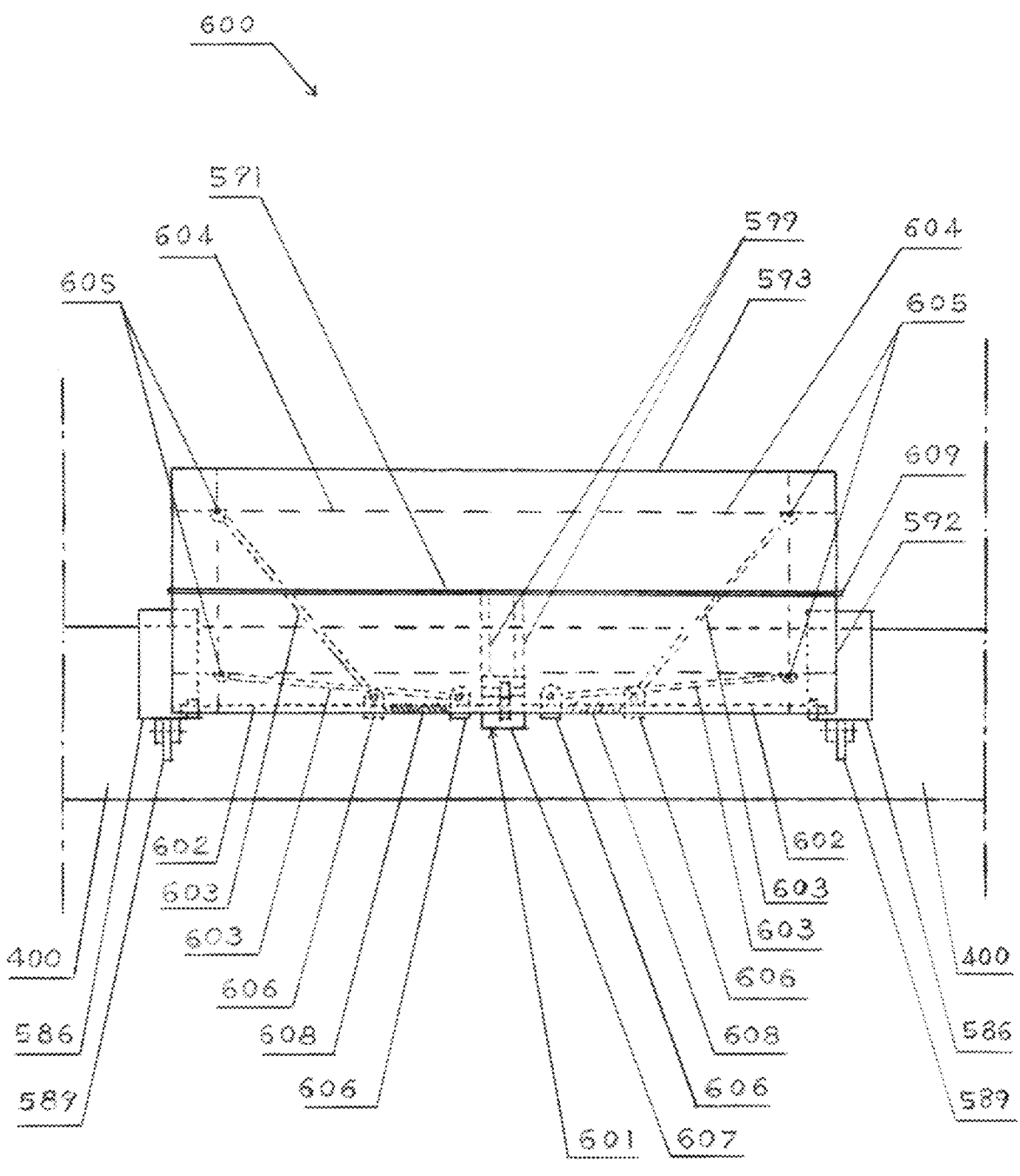
FIG. 97 illustrates a side view of a solar panel assembly and its lifting mechanism system shown in FIG. 96 with one side panel in extended position.

FIG. 97 illustrates a side view of a solar panel assembly 600 and its attachment system to the pipeline with lifting mechanism 601 with one side in upright position explained in FIG. 96. In this side view the lifting mechanism 601 is behind solar panels and is shown in dash-line. Here are also shown elements of solar tracking mechanism 601 such as nut-ball join 606 and arms 603 in different positions as one set is attached to the panel 593 which is in raised position and another set is attached to the panel 592 which is in lowered position.

Figure 98:
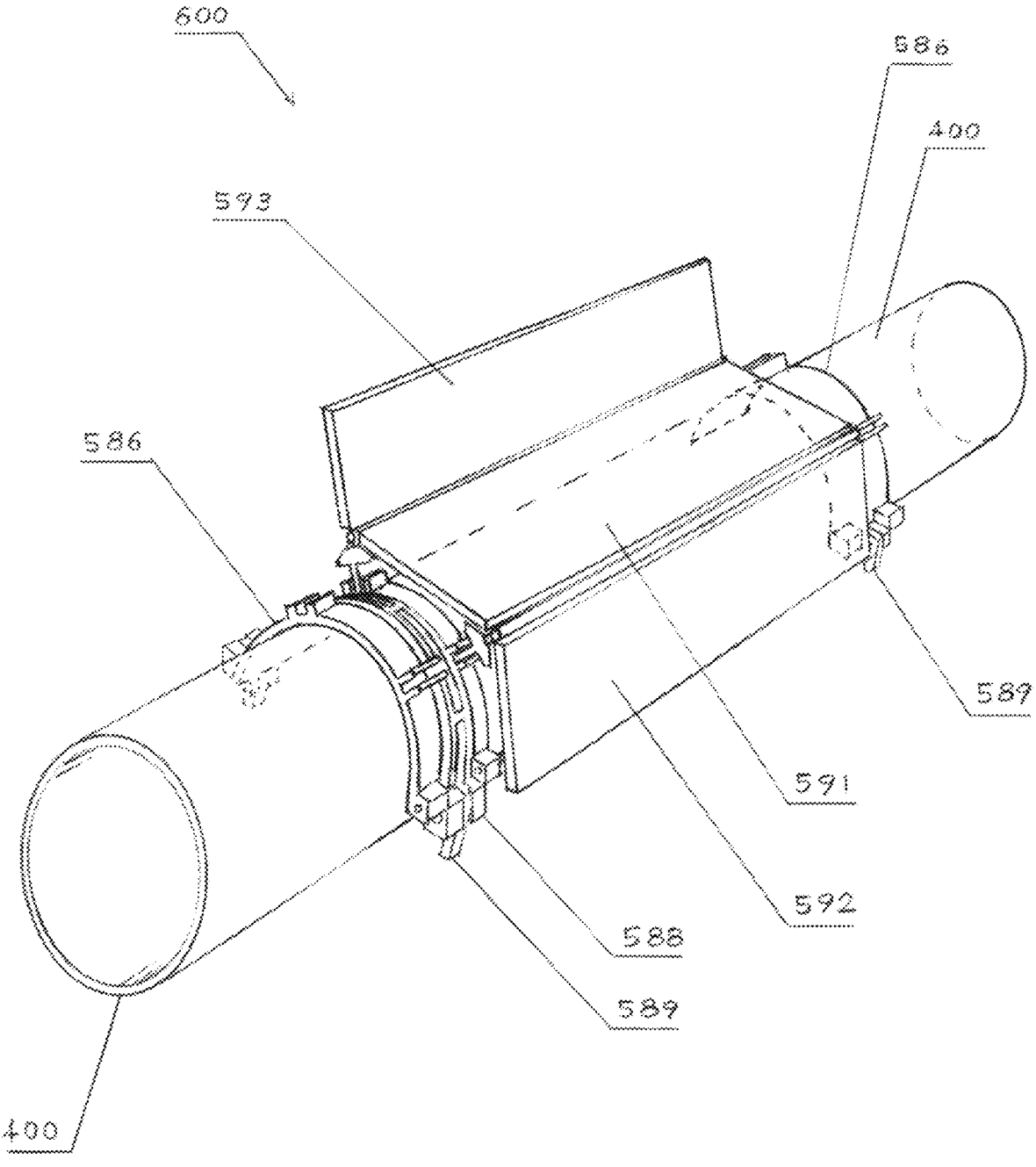
FIG. 98 illustrates a perspective cross-sectional view of a solar panel assembly and its attachment mechanism to the pipeline shown in FIGS. 96 and 97.

FIG. 98 illustrates a perspective cross-sectional view of a solar panel assembly 600 and its attachment mechanism to the pipeline shown in FIGS. 96 and 97.

Figure 99:
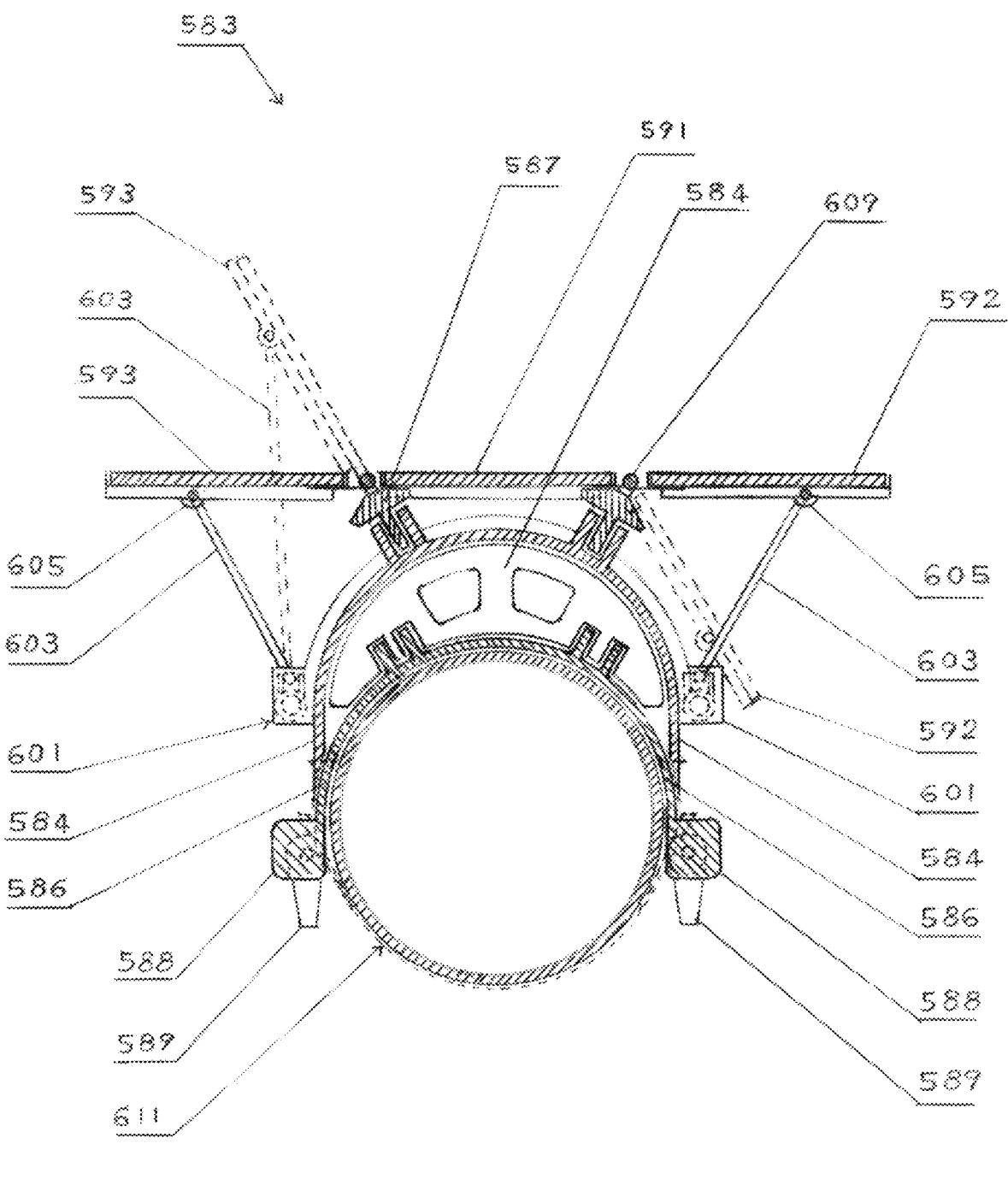
FIG. 99 illustrates a cross-sectional view of an alternative solar panel assembly and its attachment system to the pipeline and lifting mechanism with all three panel sides extended in horizontal position in accordance with the invention.

FIG. 99 illustrates a cross-sectional view of an alternative solar panel assembly 583 and its attachment system to the pipeline with solar tracking (lifting) mechanism 601 with all three panel sides in horizontal position. Similarly to solar panels assembly 600 presented in FIGS. 96 and 97 the assembly 583 also consist of the support structures 586; longitudinal beams 587, fastener assembly 588, and solar panels 590, and lifting mechanism 601 to change position of the side panels 593 and 592 to follow the sun and to maximize effectiveness of sunlight during the day. In addition to solar panels assembly 600 in assembly 583 is added the support structures 584 to raise one longitudinal side of the assembly to maximize effectiveness of sunlight during the day.

Here is also shown an alternative fastening belt, 611 (here shown in dash line) which extend under the pipe 400 and locks supporting assembly 586.

Figure 100:
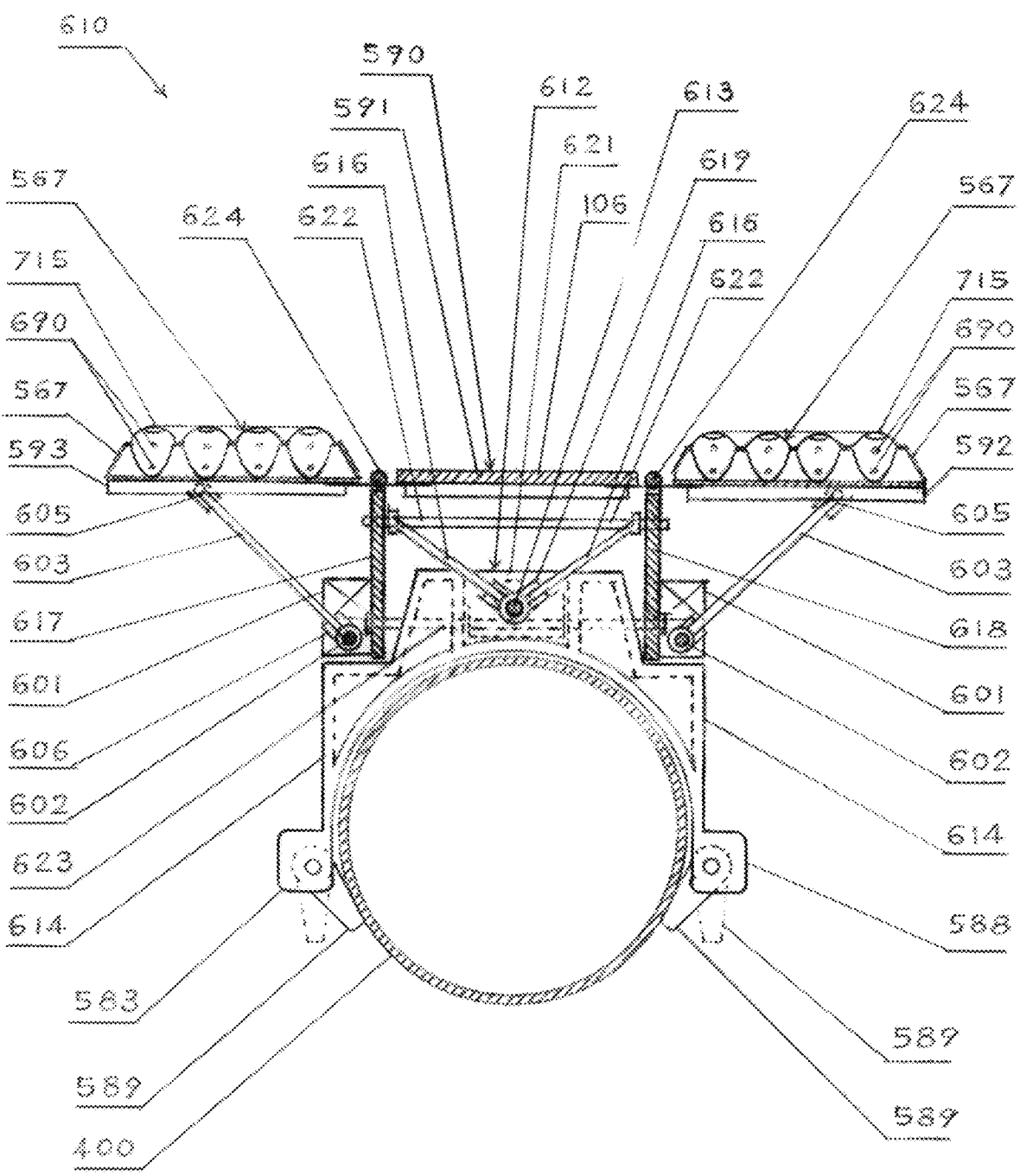
FIG. 100 illustrates a cross-sectional view of an alternative solar panel assembly and its attachment system to the pipeline and lifting mechanism taken along line 100'-100" of FIG. 102.
Figure 101:
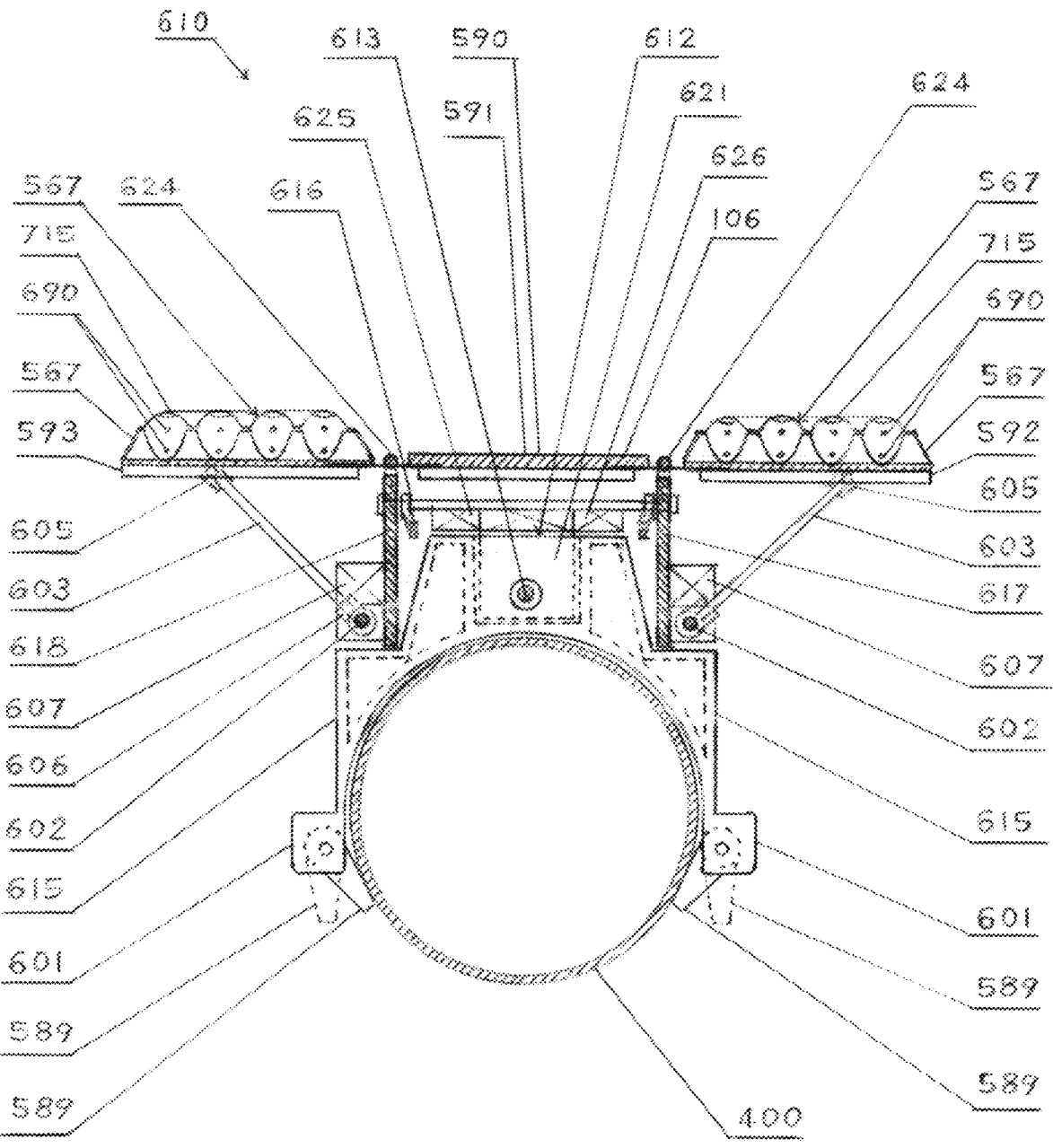
FIG. 101 illustrates a cross-sectional view of an alternative solar panels assembly and its attachment system to the pipeline and lifting mechanism taken along line 101'-101" of FIG. 102.
Figure 102:
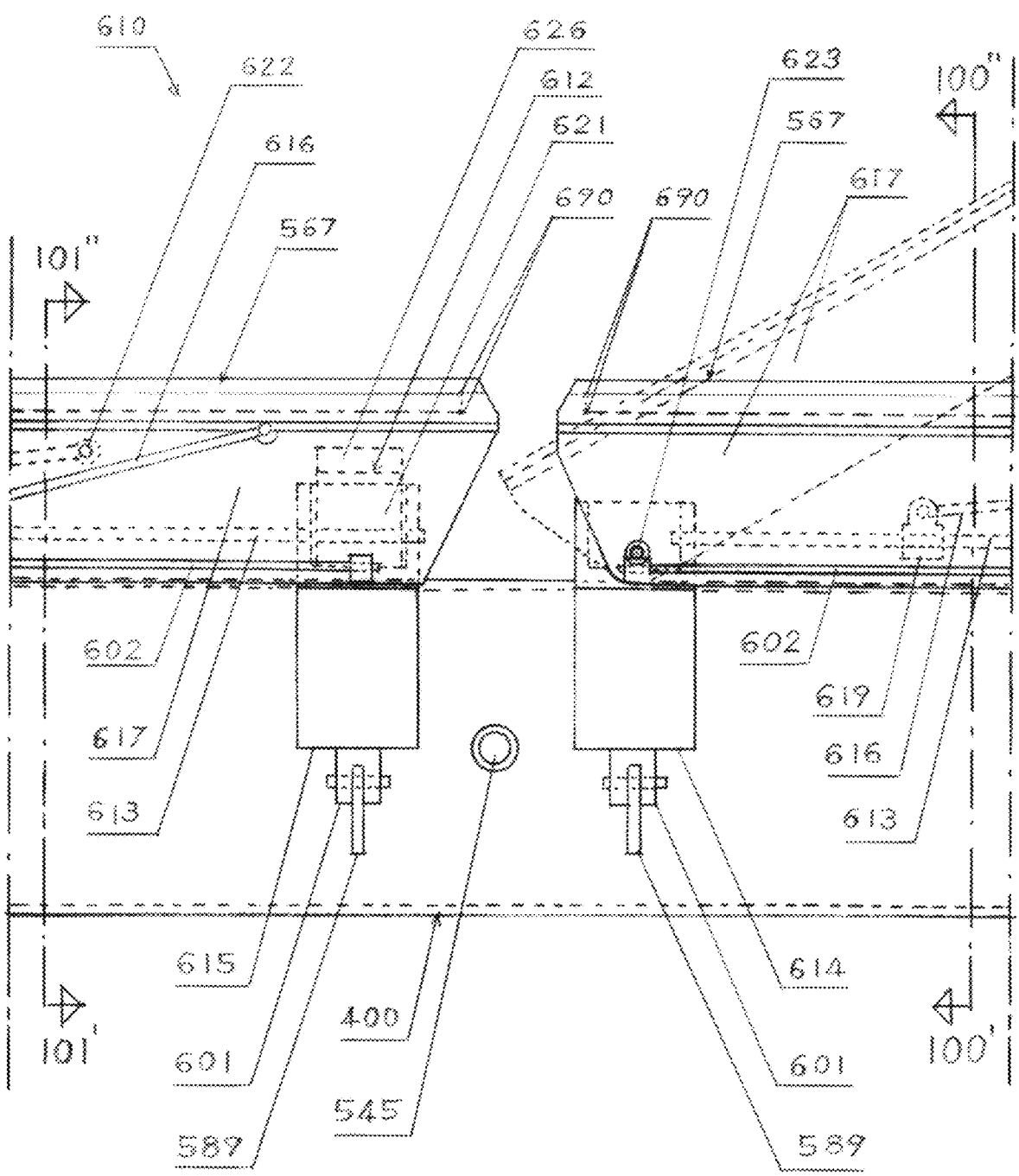
FIG. 102 illustrates a longitudinal partial cross-sectional view of two adjacent solar panel assemblies and its attachment system to the pipeline also illustrated in FIGS. 100 and 101.

FIG. 100 illustrates a cross-sectional view of a solar panel assembly 610 and its attachment system to the pipeline with lifting mechanism 612 taken along line 100'-100" of FIG. 102. FIGS. 100-104 illustrate a solar panels assembly 610 installed on upper portion of the pipeline 400 to generate electricity. Similarly to solar panels assembly 600 presented in FIGS. 96-98 the assembly 610 also consist of the support structures 614 slightly different to accommodate solar tracking (lifting) mechanism 612 and main beams 617 and 618; fastener assembly 588; solar panels 590; and solar tracking mechanism 601 to change position of the side panels to follow the sun and to maximize effectiveness of sunlight during the day.

Here are also shown the thermo-optical solar panel 567 assembled on the frame of the side panels 592 and 593. The thermo-optical solar panels 567 consist of several rows of parabolic depressions containing heat exchanger 690 (same profile as illustrated in more details in FIG. 107) and is covered with corresponding several rows of transparent cover with lenses 715. A sheet of parabolic depressions, having reflective surface, contain heat exchanger 690 which is closed loop metal pipeline passing zigzag through each parabolic row and is strategically positioned with first pipe 716 in focal points of parabola depression and with second pipe 717 in focal point of lenses 715. Synthetic oil or coolant (ethylene-glycol) circulates through heat exchanger 690. The heat exchanger 690 of several panels join and are connected to power unit 491 which generate electricity (see FIGS. 80-85).

About heat transfer: The thermo-optical solar panel 567 with several rows of parabolic depressions with reflective surface bounces sunlight off and direct it to a first (lower) pipe 716 of the heat exchanger 690 filled with synthetic oil, which heats to over 400° C. (750° F.). The reflected light focused at the first pipe 716 is 71 to 80 times more intense than the ordinary sunlight. The synthetic oil transfers its heat to water or working fluid, which boils and drives the power unit 490, thereby generating electricity. Synthetic oil (instead of water) is used to carry the heat to keep the pressure within manageable parameters.

The thermo-optical panels 567 have transparent cover incasing the assembly. The transparent cover can be tinted with special coat to attract sunlight and to prevent reflection. Flat transparent cover can be cleaned easier from birds dropping and dust. An automated washing mechanism can be installed.

The compact solar panel 567 which encapsulate the heat exchanger 690 provides a "greenhouse effect" which enhances heat exchange process.

Combination of solar thermal system and solar optical system encapsulated in a compact solar panel 567 provides an efficient and practical way for harnessing solar energy.

Here is also shown central panel 591 as thermo-solar panel 106 illustrated in more detail in FIG. 32. In this application the closed loop pipeline 108 of the heat exchanger 107 of the thermo-solar panel 106 is connected to power unit 491 which generates electricity. Also, the presented thermo-optical solar panels 567 and/or thermo-solar panels 106 can be installed on facades of the building's so-called "curtain facades" to generate electricity with multi power units arranged as needed according to their size and surface that panels cover.

In addition to solar panels assembly 600 in assembly 610 is added lifting mechanism 612 which include gear box with motor 621 to raise one longitudinal side of the solar panel assembly 610 to maximize effectiveness of sunlight during the day and seasons.

Similarly to the lifting mechanism 601 for controlling position of the side panels 593 and 592, explained in FIGS. 96-99, the solar tracking-lifting mechanism 612 of whole solar panels assembly 610 consist of: the main rod 613 attached to two supporting radial structure 614 and 615; two arms 616 which attached with one end to the main beams 617 and 618 which supports frame of all three panels 591, 592 and 593 and with other end to the main rod 613 through the double nut-ball join 619 which is engage trough treads to the main rod 613. The main beams 617 and 618 are connected at one end with bar 622 and with pivotal bar 623 at other end.

The main rod 613 is engaged with gear box with motor 621 through set of gears. The main rod 613 also has a threaded portion 628 which engages with corresponding double nut ball-join 619. When activated the motor with gear box 621 rotates main rod 613 in one direction causing the double nut ball-join 619 to slides in one direction and pushes the main beams 617 and 618 up through arms 616. The frame of the side solar panels 593 and 592 are connected to the main beams 618 and 617 through pivot 624. Both lifting mechanism 601 for controlling position of the side panels 593 and 592 are permanently attached to main beams 618 and 617 so that the solar tracking mechanism 601 can continue functioning regardless of the main beams 618 and 617 positions.

FIG. 101 illustrates a cross-sectional view of the solar panel assembly 610 and its attachment system to the pipeline with lifting mechanism 612, taken along line 101'-101" of FIG. 102. Here is also illustrated rechargeable battery pack 625 to store energy to be used if and when needed. For example, stored energy can also be used to close extended panels in basic (default) closed position in emergency situations before storm on cloudy days when there is no sufficient sunlight or at night when there is no sunlight. Here is also shown box 626 with electronic for receiving and transmitting data.

FIG. 102 illustrates a longitudinal partial cross-sectional view of two adjacent solar panel assemblies 610 and its attachment system to the pipeline also illustrated in FIGS. 100 and 101. Here is also shown (in dash line) the main beams 617 and 618 of one solar panel assembly 610 in raised position. Here is also shown a fire hydrant valve 545.

One of strong benefits of the presented pipeline, beside its main purpose to transport seawater to desert, is that periodic segments of the pipeline can have side valve as fire hydrant 545 to which a hose can be attached to supply water for protecting the pipeline, inhabited areas and forest in case of nearby wildfires. Such benefits can be presented as a strong factor in obtaining financial support (grant or long-term loan) from governments (state and federal) for implementation of the project.

Figure 103:
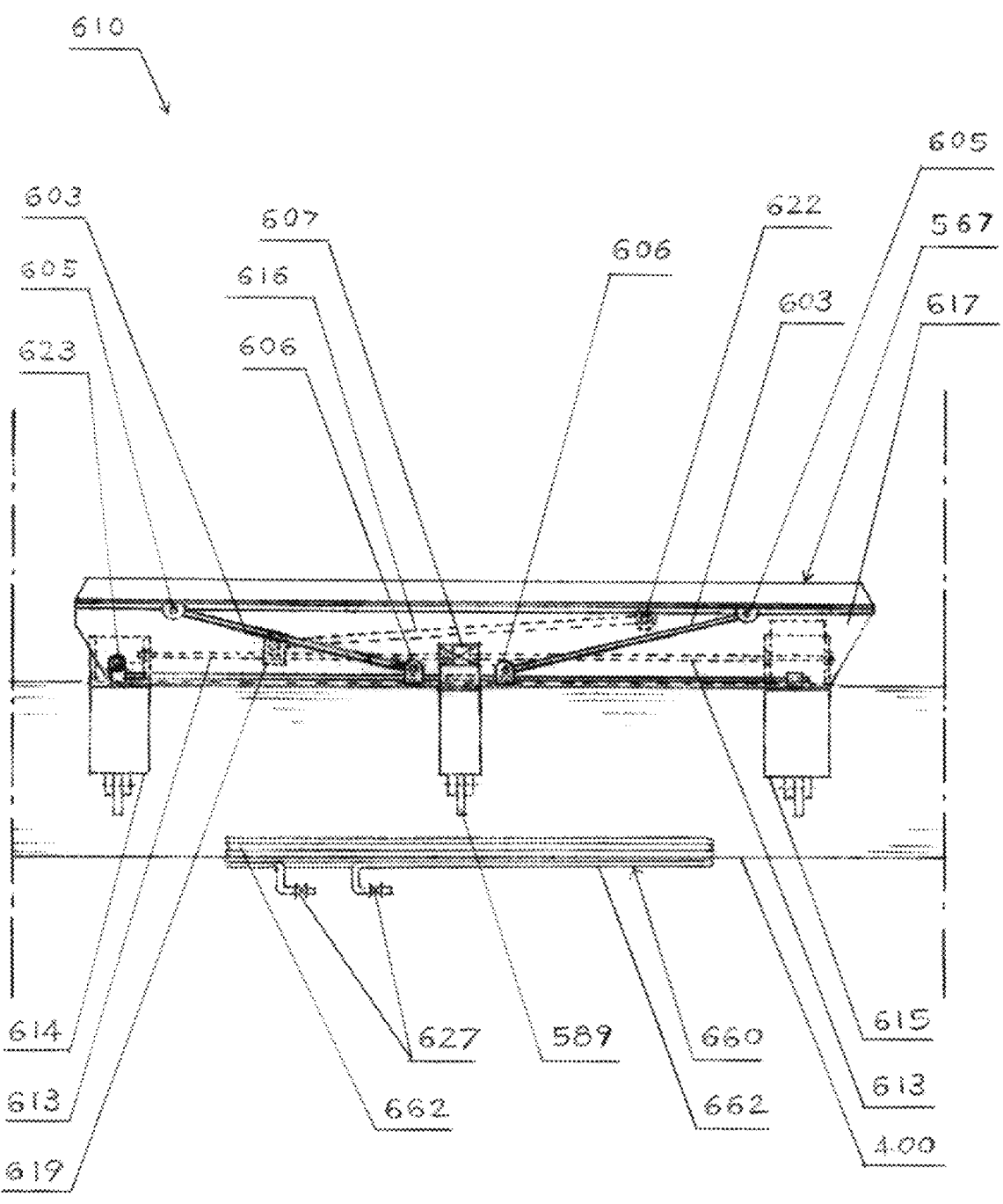
FIG. 103 illustrates a side view of an alternative solar panel assembly and its attachment system to the pipeline and its lifting mechanism.

FIG. 103 illustrates a side view of solar panel assembly 610 and its attachment system to the pipeline 400 and its lifting mechanism 612 in horizontal position. Most of the elements are illustrated and explained in more detail in FIGS. 100-102. Here is also illustrated a condenser 660 installed under pipeline 400 to use coolness of the pipeline for condensation. The condenser 660 consist of bended metal pipeline 662 and connectors 627 which connect closed loop line of the thermo-optical solar system 567 and 700 which is installed nearby and is explained in FIGS. 106-112.

Figure 104:
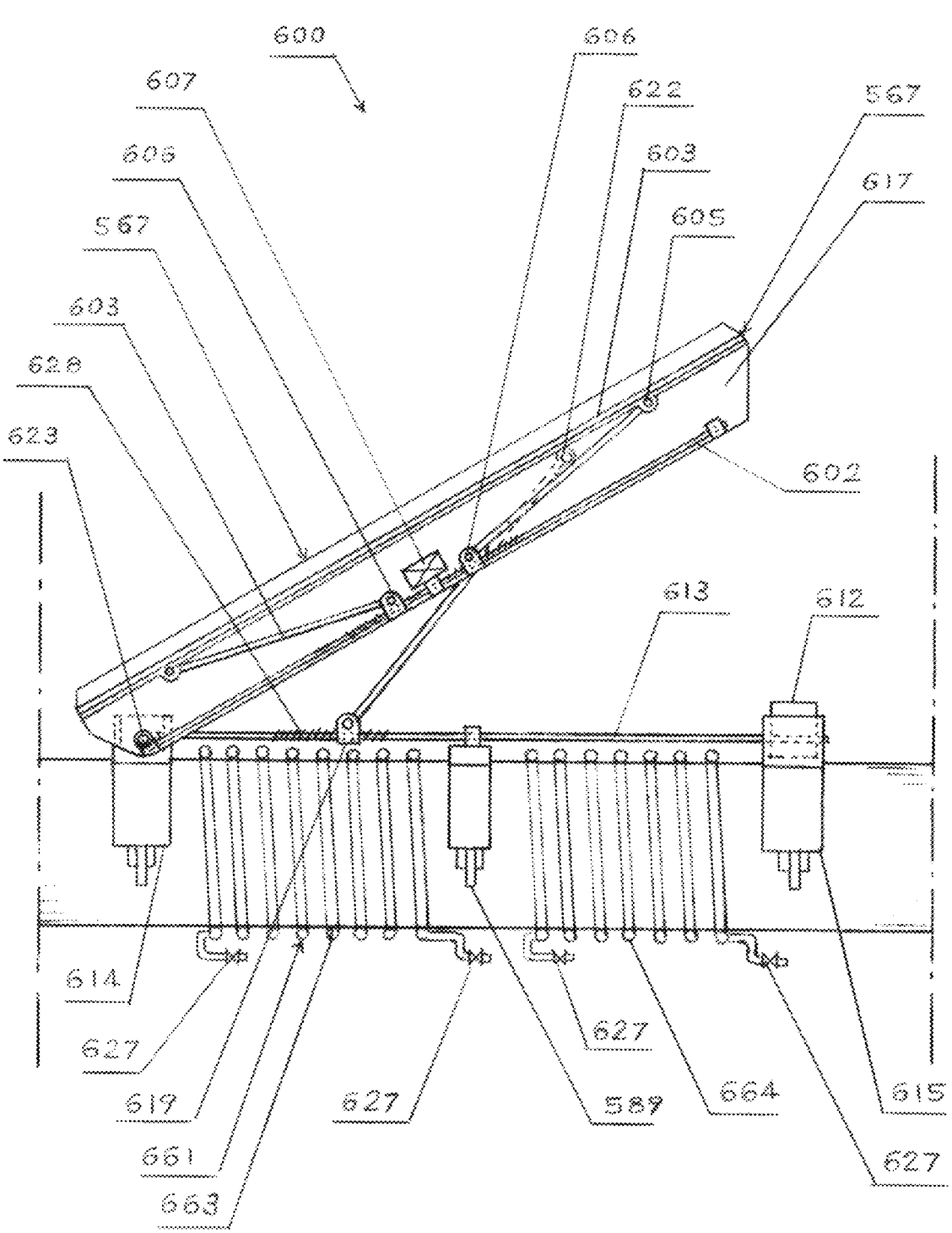
FIG. 104 illustrates a side view of a solar panel assembly and its attachment to the pipeline and its lifting mechanism in extended position in accordance with the invention.

FIG. 104 illustrates a side view of a solar panel assembly 610 and its attachment system 588 to the pipeline 400 with its lifting mechanism 612 in raised position. Most of the elements are illustrated and explained in more details in FIGS. 100-103. Here is also illustrated a condenser 661 installed around pipeline 400 to use coolness of the pipeline for condensation. Condenser 661 consist of bended metal pipeline 663 and connectors 627 which connect closed loop line of the thermo-optical solar system 567 and 700 which is installed nearby and will be explained in FIGS. 106-112.

Figure 106:
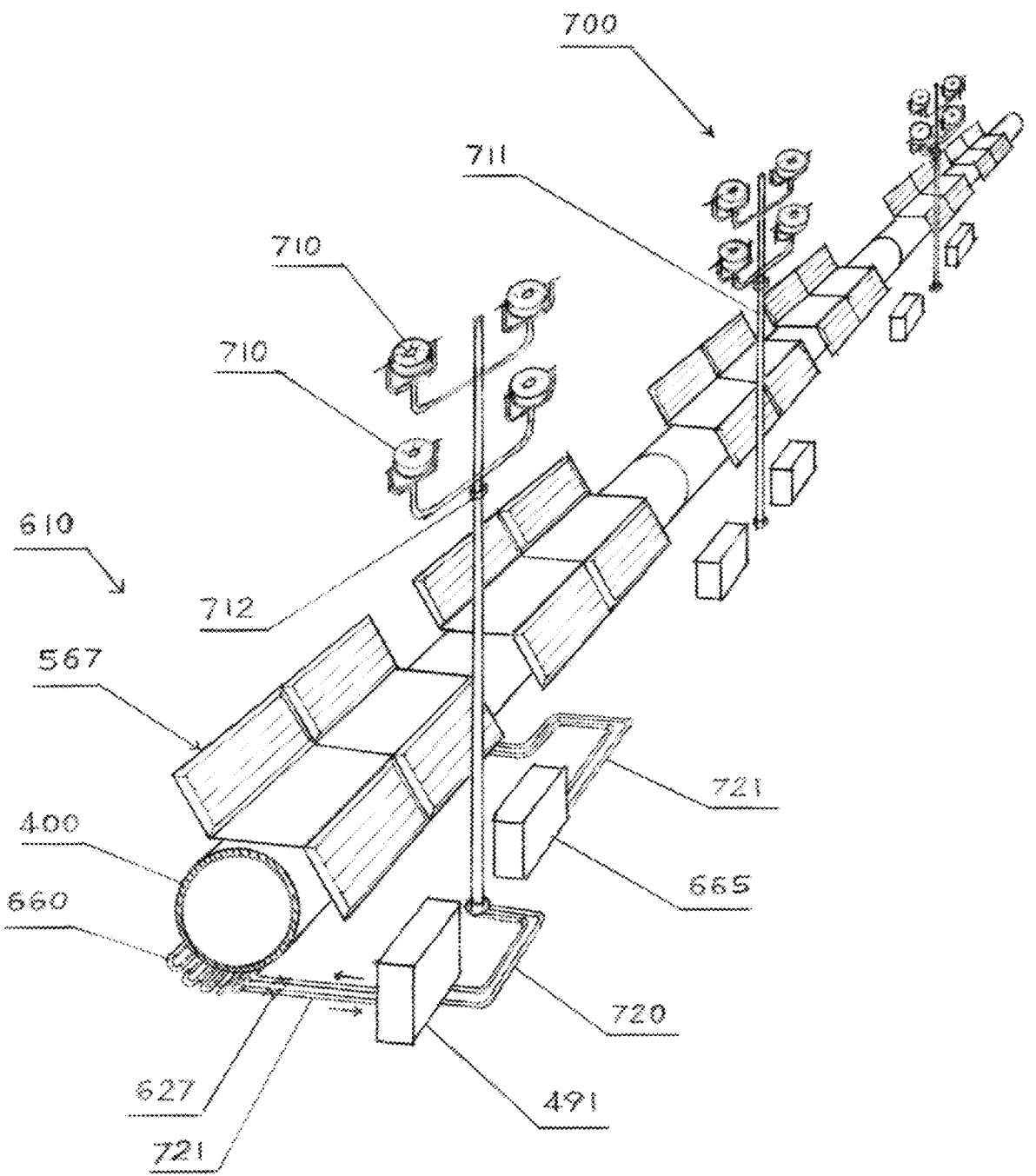
FIG. 106 illustrates a perspective view of a pipeline with solar panel assemblies attached to the pipeline in combination with a "thermo-optical solar system" aside.

Here is also shown an alternative condensed 664 for cooling battery pack 665 (illustrated in FIG. 106).

Figure 105:
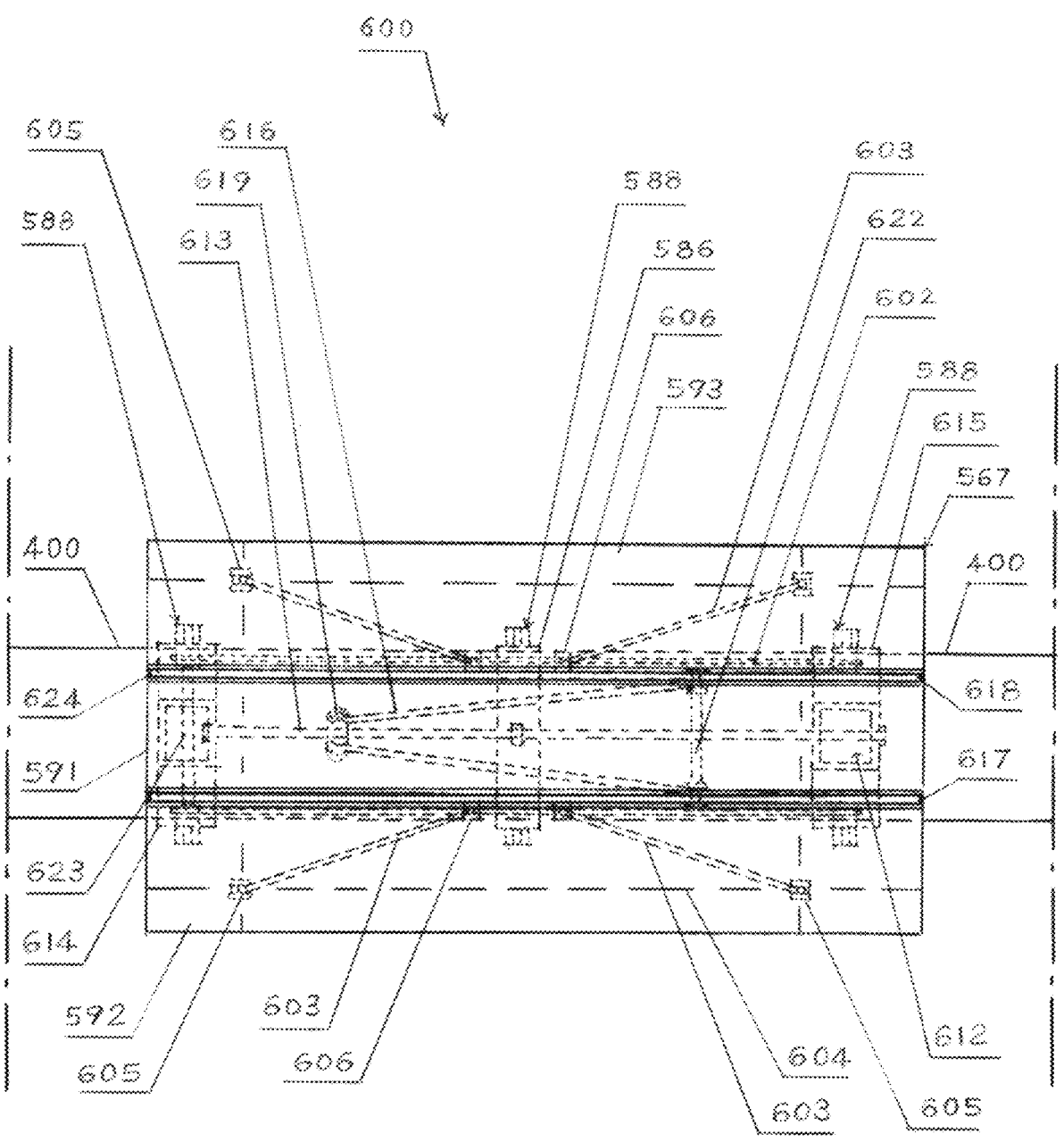
FIG. 105 illustrates a plain view of a solar panel assembly and its attachment system to the pipeline its lifting mechanism.

FIG. 105 illustrates a plain view of a solar panel assembly 610 and its attachment system 588 to the pipeline 400 with its lifting mechanism 612 with solar panels which include central panel 591 and side panels 567 in horizontal position. All elements are illustrated and explained in FIGS. 100-104.

The benefits of this concept to combine solar panels with pipeline are: a) pipeline provides foundation and support for the solar panel assembly; b) If the pipeline already exists, then the "right of way" and service road can be easily negotiated with the owner. c) If the pipeline is a planned project then the "right of way" and necessary expenses can be shared; d) Presented pipeline system needs electricity to function and can be supplemented by electricity generated by solar panel installed on the pipeline; c) The length of pipeline would provide substantial footprint for generating electricity; c) Solar panels will provide shade for pipeline extending life of the pipeline; and f) The presented solar panel assembly system provides an easy assembly of the system on the pipeline without altering pipeline segments.

FIG. 106 illustrates a perspective view of a pipeline with solar panel assemblies 610 attached to the pipeline in combination with a line of alternative "thermo-optical solar system" 700 aside pipeline. Here are illustrated two sets of solar panel assemblies 610 installed on each segment of pipeline 400. The solar panel assembly 610 is illustrated and explained in more detail in FIGS. 100-105. Here is also illustrated a line of "thermo-optical solar system" 700 aside the pipeline 400 using the same right of way. The "thermo-optical solar system" 700 consist of: a "thermo-optical solar dish" 710 which contain lenses, mirrors and evaporator (illustrated in FIG. 107); power generating unit 491 (illustrated in FIGS. 79-85); condenser 660 using coolness of the pipeline 400; battery pack 665 for storing electricity generated during the day for use at night; and post 711.

Here is also shown thermally insulated closed loop line 720 transporting synthetic oil from heat exchanger in the "thermo-optical solar dish" 710 to the power generating unit 491. Here is also shown thermally insulated closed loop line 721 transporting coolant fluid from the condenser 660 to the "thermo-optical solar dish 710. Here is also shown thermally insulated closed loop line 721 connecting condenser 664 (see FIG. 104) for cooling battery pack 665.

Here is illustrated the "thermo-optical solar system" 700 as an additional line to the solar panel assembly 610 to supplement needed energy for operation of the pipeline 400. Both systems—the "thermo-optical solar system" 700 and the solar panel assembly 610 combined with photo voltaic (PV) central panel 591 (see FIG. 101) and with thermo-optical solar side panels 567 can be used separately. For example, the "thermo-optical solar dish" 710 can be attached to the segments of the pipeline directly through a support structure 733 with fastener 734 and surrounding belt 611 (see FIG. 113). The "thermo-optical solar dish" 710 can be used for residential applications for generating electricity and worm water. In residential application the condenser 660 can be coupled into heater (boiler) for generating worm water. Alternatively, the condenser 660 can be placed underground or cooled conventional way with fan.

Figure 107:
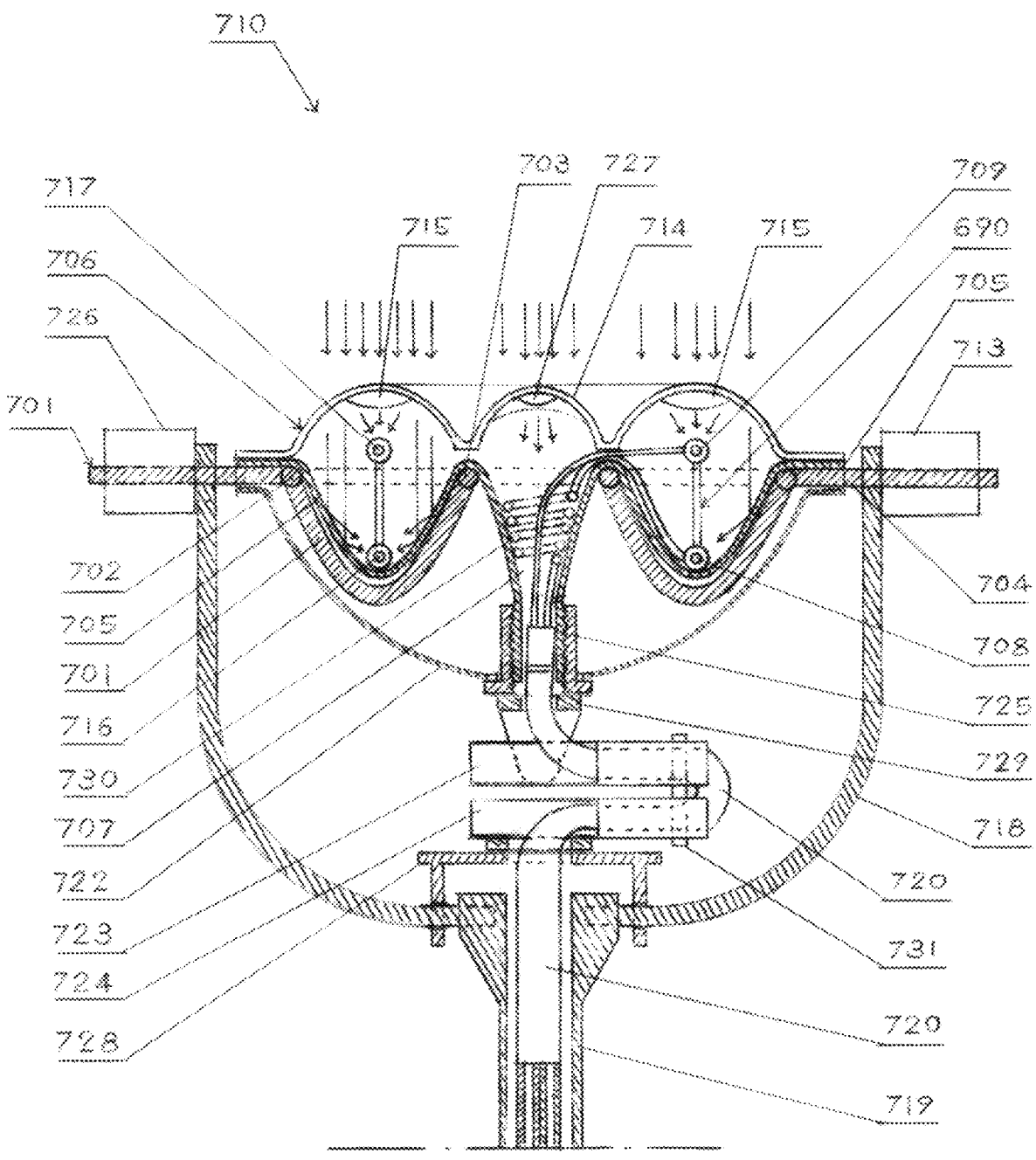
FIG. 107 illustrates a cross-sectional view of a "thermo-optical solar dish" taken along line 107'-107" of FIG. 108, also illustrated in FIG. 106.
Figure 108:
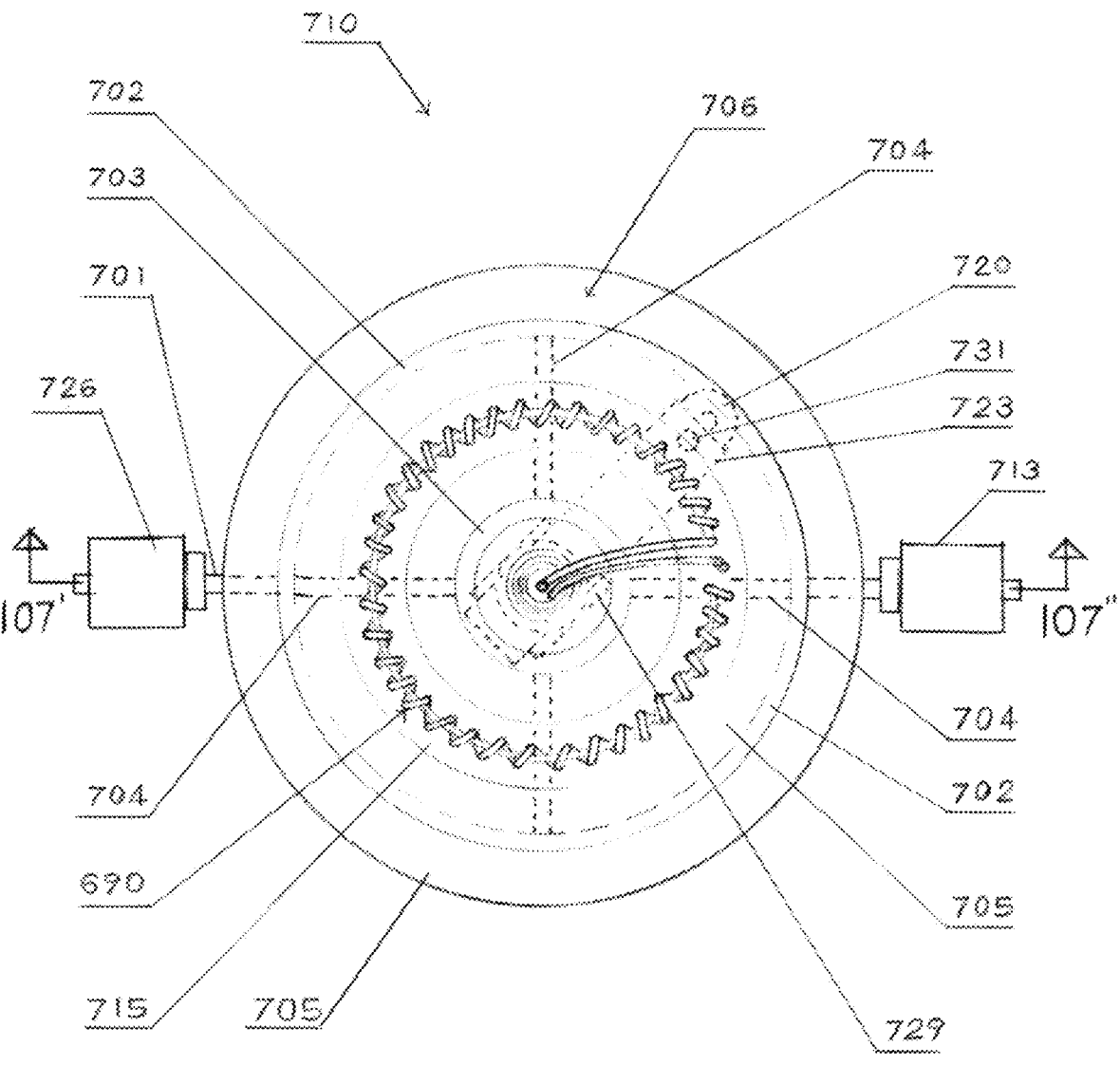
FIG. 108 illustrates a plain view of a "thermo-optical solar dish".

FIG. 107 illustrates a cross-sectional view of a "thermo-optical solar dish" 710 taken along line 107'-107'' of FIG. 108, also illustrated in FIG. 106. The "thermo-optical solar dish" 710 consists of: tubular frame 701 consisting of peripheral ring 702 and inner ring 703 which are connected with cross bars 704 formed in shape to support main dish 705 which has shape of lower half of doughnuts. The main dish 705 has circular peripheral indentation in profile shape of a parabola and opening 707 in the middle. The inside of main dish 705 is coated with reflective material (mirror). The main dish 705 accommodates heat exchanger 690 which has at least one pipe-ring (heat exchanger) positioned in the focus of the parabola 708. The main dish 705 is covered with corresponding cover dish 706 made of transparent material such as glass, acrylic, or plastic. The cover dish 706 has the shape of the upper half of doughnuts having circular peripheral concave indentation corresponding to the main dish 705. It also covers central opening 707 with separate concave indentation 714. The cover dish 706 inside peripheral concave indentation contains continues circular lens 715 for focusing sunrays on at least one (second/upper) pipe-ring 717 of the heat exchanger 690 positioned in the focus of the lens 709. The sunlight passes through lens 715 and focuses on focus point 709 where second (upper) piper-ring 717 of the heat exchanger 690 is located. The heat exchanger 690 is filled with synthetic oil, which heats to over 400° C. (750° F.). The focused light is more than 100 times more intense than the ordinary sunlight. The synthetic oil transfers its heat to water or working fluid, which boils and drives the power unit 490, thereby generating electricity. Synthetic oil (instead of water) is used to carry the heat to keep the pressure within manageable parameters.

The upper surface of the transparent cover dish 706 can be flat and coated with a special tint to attract sunlight and to prevent reflection of the sunlight. Flat transparent cover dish 706 can be cleaned easier from birds dropping and dust.

The heat exchanger 690 has at least two pipe-rings of which the first one 716 is positioned in the focus of parabola 708 of the main dish 705 and second one 717 is positioned in the focus point of the lens 709 of the cover dish 706.

Heat transfer: The main dish 705 with reflective surface bounces sunlight off and direct it to a first (lower) pipe-ring 716 of the heat exchanger 690 filled with synthetic oil, which heats to over 400° C. (750° F.). The reflected light focused at the first pipe-ring 716 is 71 to 80 times more intense than the ordinary sunlight. The synthetic oil transfers its heat to water or working fluid, which boils and drives the power unit 490, thereby generating electricity. Synthetic oil (instead of water) is used to carry the heat to keep the pressure within manageable parameters.

A thermo-Optical Solar system can be separated and function as a thermo-solar system with pipe-ring 716 (heat exchanger); and an Optical Solar system with pipe-ring 717 (heat exchanger).

Combination of solar thermal system and solar optical system encapsulated in a compact unit provides a "greenhouse effect," which contributes to a more efficient way for harnessing solar energy. Alternatively, in order to reduce the thickness of the "Thermo-optical Solar system" (panels and/or dish) both focuses (of lenses 709 and of parabola 708) can be in mutual location-having both pipe-rings 717 and 716 of the heat exchanger 690 as one pipe-ring in one mutual focal point.

Here is also illustrated cross bar 704 which is pivotally engaged with a fork 718 which is connected to branch 719 of the post 711 (see FIG. 106). There is also a back dish 722 which encapsulates main dish 705 and connects it to pivotal arms 723 and 724 through fastener 725. Here is also illustrated a solar tracking mechanism (servo motor) 713 for rotating dish 710 around axis of the cross bar 704 when tracking latitude of the sun. Here is also illustrated a box 726 with electronics for programming and transmitting data for tracking the sun. The fork 718 can have motor for rotating each dish 710 when tracking longitude of the sun. Post 711

(see FIG. 106) has solar tracking mechanism (servo motor) 712 for rotating several branches with "thermo-optical solar dish" 710 when tracking longitude of the sun.

When sunrays pass through transparent cover dish 706 reflects from the reflective surface of the main dish 705 into focus point of the parabola 708 where first pipe-ring 716 of the heat exchanger 690 is positioned. In the focus point 708 high temperature is generated and synthetic oil passing through pipe-rings 716 of the heat exchanger 690 transfers heat to the power unit 490 where electricity is generated.

When sunrays pass through lens 715 of transparent cover dish 706 focuses on its focus point 709 where second pipe-ring 717 of the heat exchanger 690 is positioned. In focus point 709 high temperature is generated and synthetic oil passing through pipe-rings 717 of the heat exchanger 690. The heat exchanger 690 can function as the evaporator if filled with working fluid and directly connected to pistons of the power unit 490 where electricity is generated.

The pipe-rings of the evaporator 690 passes through a coil 730 in the central opening 707 of the main dish 705 where the evaporator is still heated through lens 727 of central part of the transparent cover dish 714 on the way to and from the power unit 491 where electricity is generated (see FIG. 106). Here is also illustrated pivotal plate 728 which connect pivotal arm 724 with fork 718 and branch 719 of the post 711. Here is also illustrated pivotal plate 729 which connect pivotal arm 723 with fastener 725 and back dish 722. The pivotal arms 724 and 723 are engaged with pivot 731. Here is also shown thermally insulated line 720 of the closed loop system which connects evaporator 690 and power unit 491 which generate electricity.

Although the "thermo-optical solar system" 700 presented here has not been tested yet, it is realistic to expect that the "thermo-optical solar system" can generate more electricity per unit surface than photovoltaic system because power density is substantially higher.

The thermo-optical solar system is presented here for this particular application of the pipeline system, but it is not limited to pipeline system it can be use in residential applications. Presented thermo-optical solar system 700 can be minimized to size of diameter of solar dish 710 to be, for example, 3 inches and thickness 1.5 inches and assembled into solar panel 600 of size 3 feet by 5 feet and thickness 1.5 inches which would contain 240 minimized solar dishes 710. Six such panels can form solar panel assembled 610 and be connected to power unit 491.

Presented thermo-optical solar system can be also minimized to micro level and can be used in many applications covering many surfaces for example surface of electric airplane, electric car, roofs and walls of buildings, etc., to harness solar energy more efficiently from surfaces exposed to sunrays and to transfer necessary heat to binary power unit, using piston system, for generation of electricity. The power unit can be positioned in appropriate location relative to and in balance to the surfaces exposed to sunrays equipped with micro thermo-optical solar system. Several modular surfaces equipped with micro thermo-optical solar system can join one binary power unit. The micro thermo-optical solar system can be produced by 3D printing.

FIG. 108 illustrates a plain view of a "thermo-optical solar dish". Most of elements and its function are explained in FIG. 107.

Figure 109:
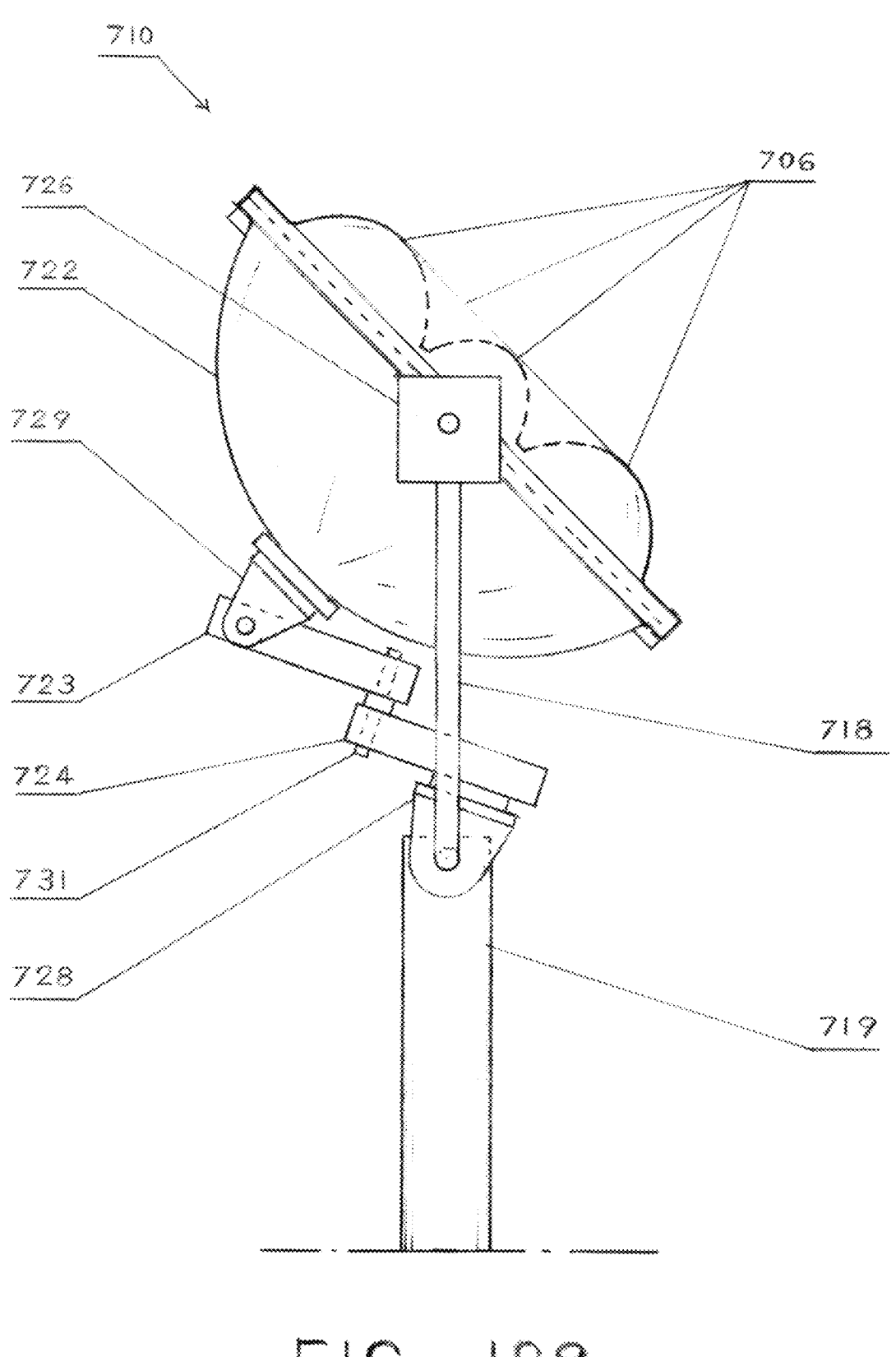
FIG. 109 illustrates a side view of a "thermo-optical solar dish".

FIG. 109 illustrates a side view of a "thermo-optical solar dish". Most of elements and its function are explained in FIG. 107.

Figure 110:
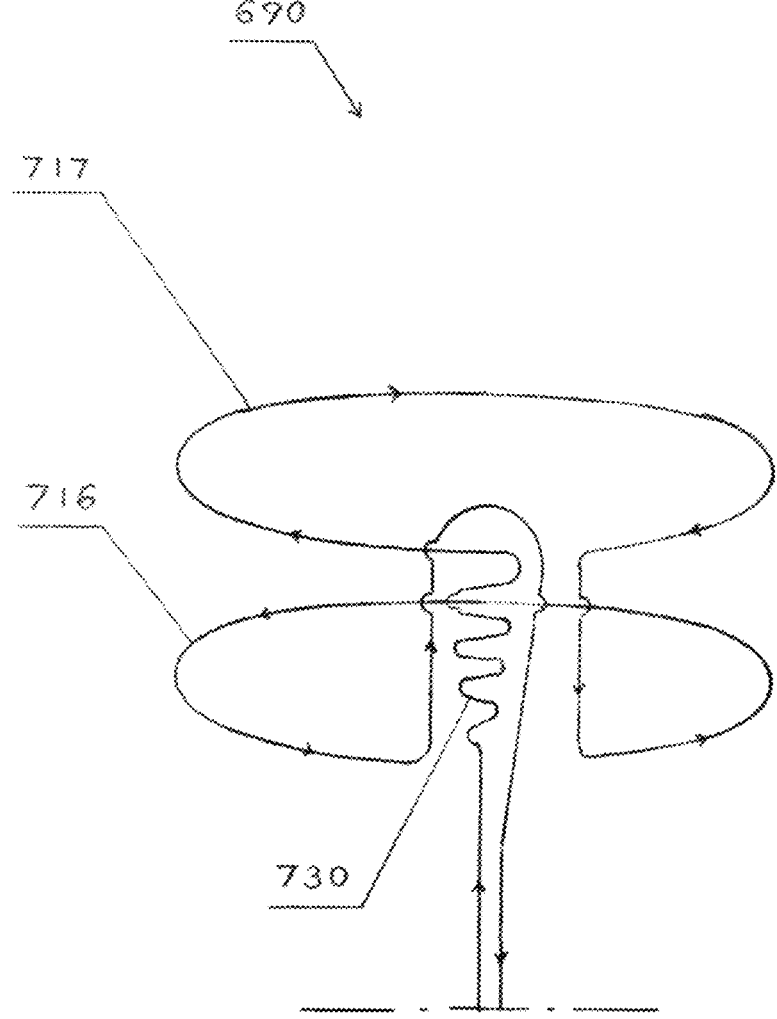
FIG. 110 illustrates a schematic diagram of the flow of the working fluid in the evaporator of "thermo-optical solar dish" illustrated in FIGS. 106-109.

FIG. 110 illustrates a schematic diagram of the flow of the working fluid in the evaporator 790 of "thermo-optical solar dish" 710 illustrated in FIGS. 106-109. Here are shown pipe-rings 717 which is positioned at focal point of the circular lens 715 and pipe-rings 716 which is positioned at focal point of the parabola of the main dish 705. Here is also shown coil 730 positioned at opening 707 of the main dish 705.

Figure 111:
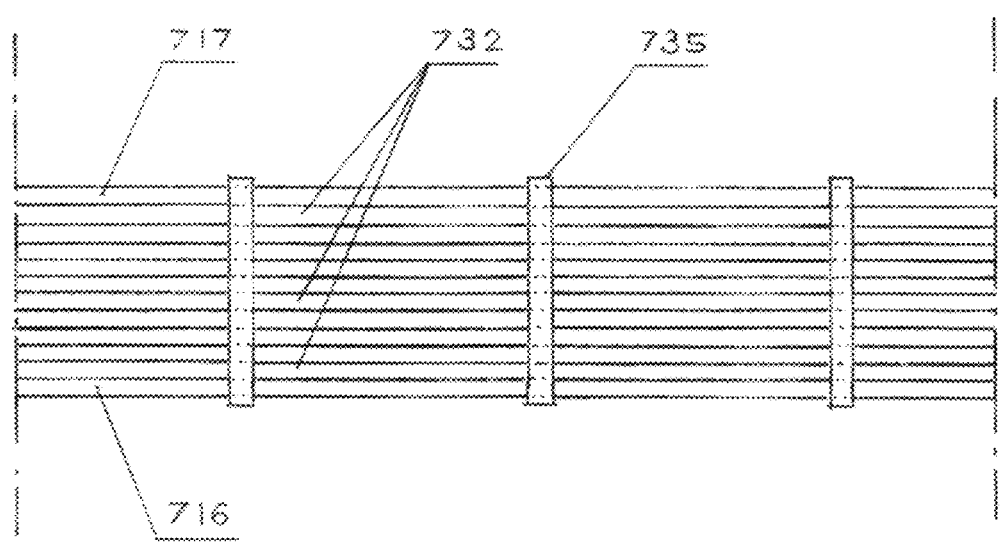
FIG. 111 illustrates an alternative pattern of the evaporator in the "thermo-optical solar dish".

FIG. 111 illustrates an alternative pattern of the heat exchanger 690 in the "thermo-optical solar dish" 710. Here are illustrated pipe-rings 717 which are positioned in focal point of the circular lens 715 and pipe-rings 716 which are positioned at focal point of the parabola of the main dish 705. Here are also shown multi pipe-rings 732 parts of closed loop system of the heat exchanger 690 positioned between pipe-rings 717 and 716. Here are also shown clamp/fasteners 735 which secure pipe-rings 717, 716 and 732.

Figure 112:
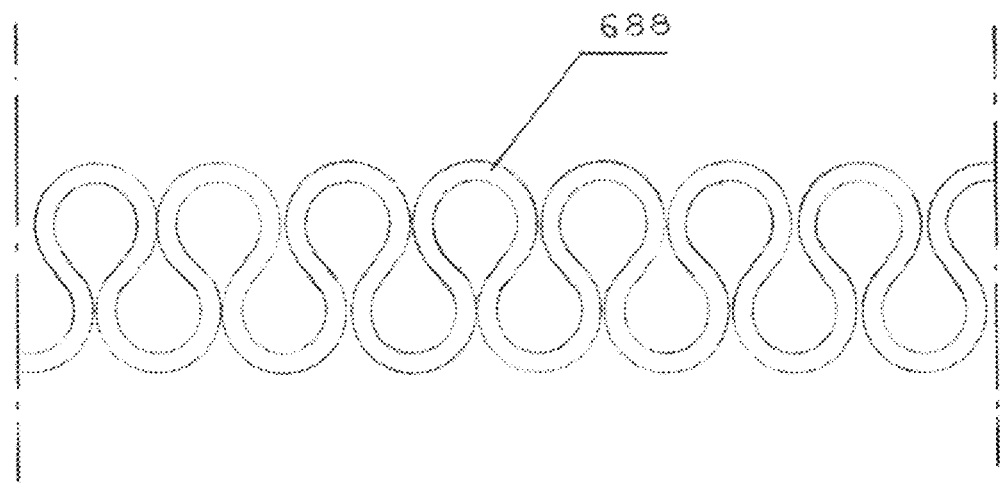
FIG. 112 illustrates an alternative pattern of the evaporator in the "thermo-optical solar dish"

FIG. 112 illustrates an alternative pattern of the heat exchanger 690 in the "thermo-optical solar dish" 710. Here is illustrated an alternative pattern 688 of the heat exchanger 690.

FIG. 113 illustrates cross-sectional view of the "thermo-optical solar dish" 710, which is alternative design of the thermo-optical solar system 700, assembled on the pipeline 400. Here are shown elements explained in FIGS. 106-112. In addition, here is shown a support structure 733 with fastener 734 and surrounding belt 611 for securing thermo-optical solar assembly 710 on the pipeline 400. Here are also shown attachments 215 and 216 which connect heat exchanger 690 inside main dish 705 to the power unit 490 nearby (see FIG. 80). Here is also shown an electro motor (servo) 712 for rotating assembly 710 for longitudinal traction of the sun during the day.

Figure 114:
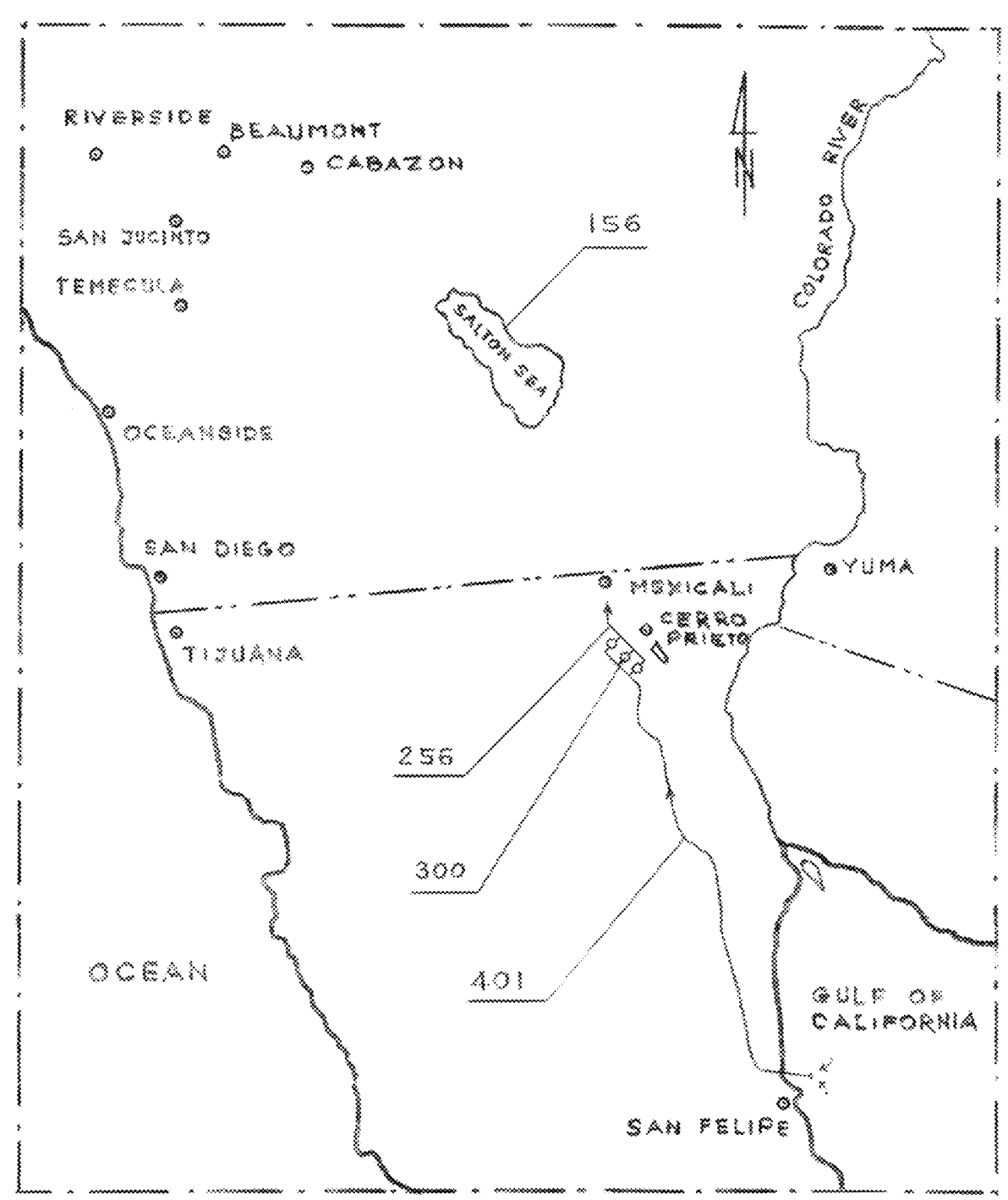
FIG. 114 illustrates a plain view of a schematic diagram of an alternative proposal for pipeline route connecting the Gulf of California with the Cerro Prieto, Mexico, with power plants for production of electricity, potable water and lithium, in accordance with the invention.

FIG. 114 illustrates a map for proposed location for power plants 300 near Cerro Prieto Mexico, which has prevalent geothermal sources. Here is illustrated pipeline 401, route connecting the Gulf of California with the Cerro Prieto, Mexico, with power plants 300 for production of electricity, potable water and lithium. By using a complete closed loop heat exchange systems combined with onboard drilling apparatus (see FIG. 79) at location with prevalent geothermal sources such as near Cerro Prieto Mexico, would be useful and profitable venture. It would generate needed electricity by harnessing geothermal sources and using seawater from nearby Gulf of California (Sea of Cortez). Distilled water produced as a byproduct 256 could be distributed to the nearby city Mexicali which desperately needs potable water. Production of lithium would be profitable venture too.

The system explained in FIG. 106, using thermo-solar system and synthetic oil for heating the boiler of power unit filled with working fluid can be modified with system explain in FIG. 80 where the boiler 217 of the power unit 490 can be filled with seawater, if available nearby, to generate electricity and have byproduct potable water for consumers.

The combination of these two systems can be used in area where pipeline with seawater is passing through especially if area is lacking potable water such as Mexicali, Mexico, or Calexico, CA, or Cabo San Lucas, Mexico, where there is enough sunlight and seawater (Cabo San Lucas case) but lacking potable water.

We, the USA, could use this proposal (solution) as leverage in negotiation with Mexico's officials in obtaining access to exchanging waters without paying for importing seawater.

As an option—To introduce the Scientific Geothermal Technology to Mexico's officials to be used in area of Cerro Prieto to harnesses prevalent geothermal sources and have byproduct potable water and a source for production of lithium—in return for sharing expenses for the pipeline from the Gulf of Mexico to the border of USA.

Figure 115:
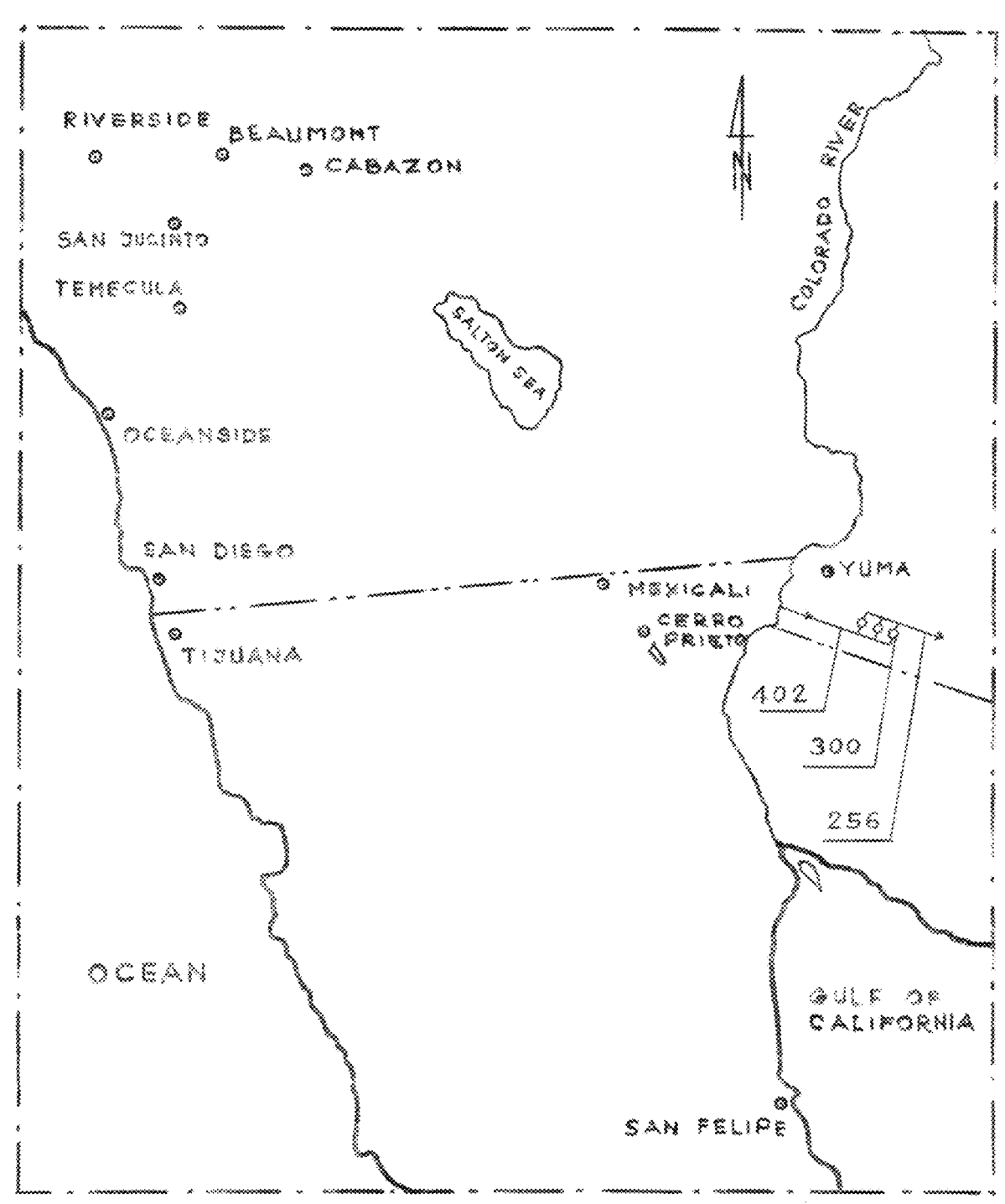
FIG. 115 illustrates a plain view of a schematic diagram of an alternative proposal for production of electricity and potable water for Yuma Arizona, in accordance with the invention.

FIG. 115 illustrates a map for a proposed location for power plants 300 near Yuma Arizona, which has prevalent geothermal sources. Here is illustrated pipeline 402 with power plants 300 for production of electricity and potable water. By using a complete closed-loop heat exchange systems combined with onboard drilling apparatus (see FIG. 79) at a location with prevalent geothermal sources such as near Yuma, AZ, where a geothermal reservoir is not necessary would be a useful and profitable venture. It would generate needed electricity by harnessing prevalent geothermal sources and using water from nearby Colorado River. Distilled water produced as a byproduct 256 could be bottled, as water is important commodity in the desert. Optionally, if water use from Colorado River at this location is limited or prohibited then the distilled water could be returned into the Colorado River since it is a free byproduct in process of generating electricity.

Figure 116:
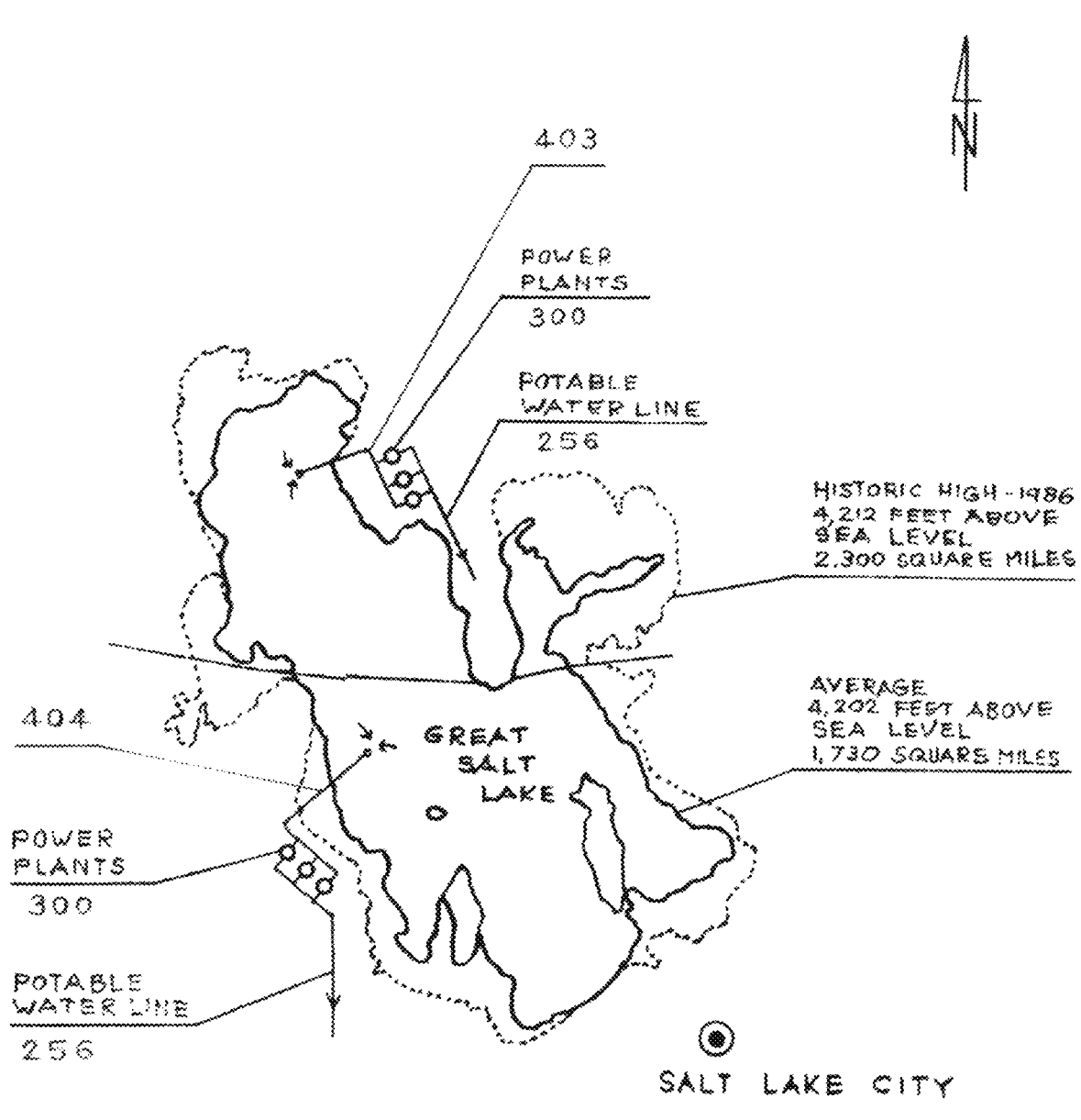
FIG. 116 illustrates a plain view of a schematic diagram of an alternative proposal for production of electricity, potable water and lithium for Salt Lake City, Utah, in accordance with the invention.

FIG. 116 illustrates a map for proposed two alternative locations for power plants 300 near Salt Lake City Utah, which has prevalent geothermal sources. Here are illustrated pipelines 403 and 404 with power plants 300 for production of electricity and potable water. By using a complete closed-loop heat exchange systems combined with onboard drilling apparatus (see FIG. 79) at a location with prevalent geothermal sources such as is the Great Salt Lake, UT where a geothermal reservoir is not necessary would be a useful and profitable venture. It would generate needed electricity by harnessing prevalent geothermal sources and using salty water from the Great Salt Lake for production of potable water. Distilled water produced as a byproduct 256 could be bottled, as water is an important commodity, or could be returned into the Great Salt Lake to reduce lakes salinity since it is a free byproduct in process of generating electricity.

Figure 117:
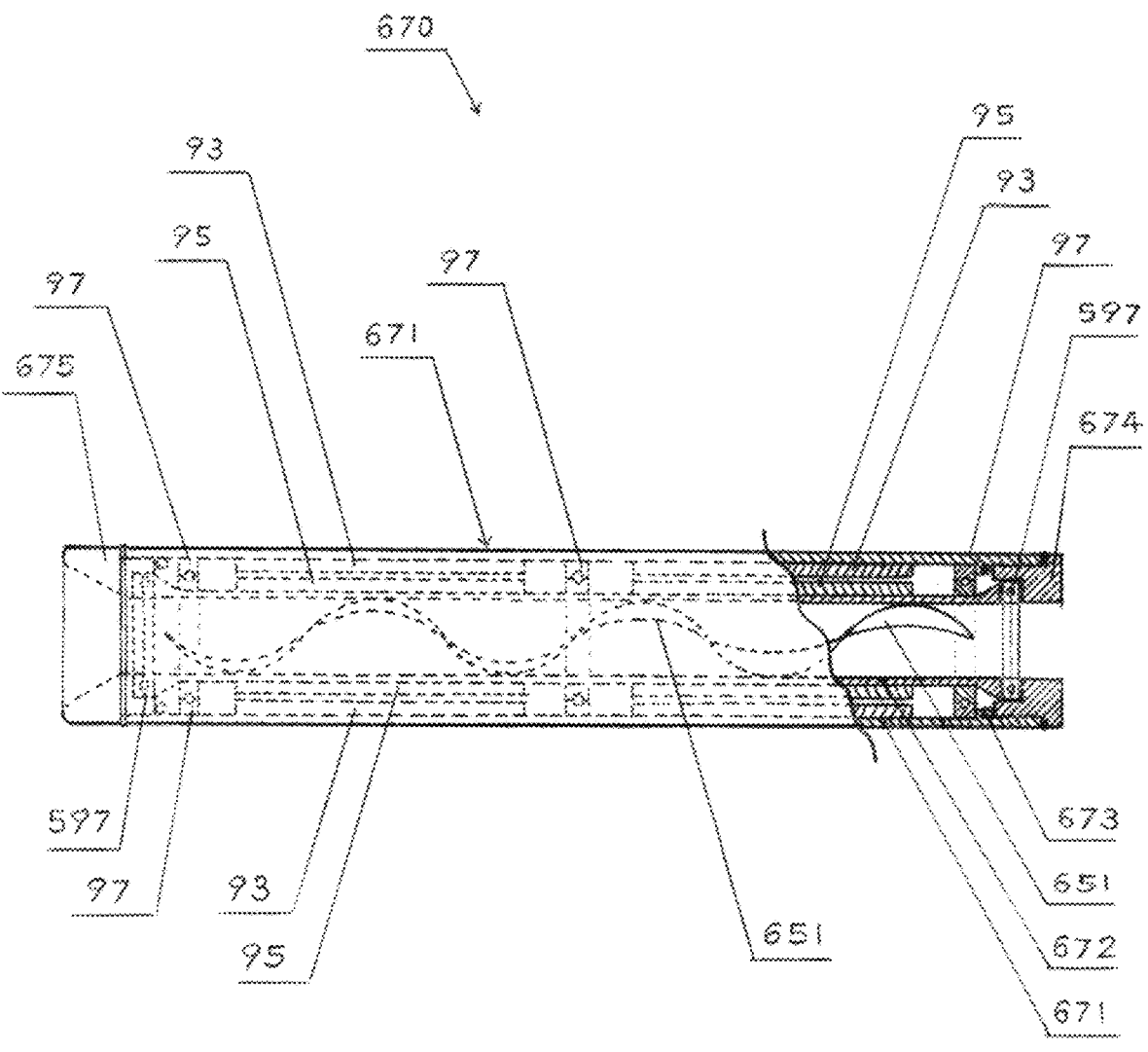
FIG. 117 illustrates a cross-sectional view of a "in-line-pump" that can be used in many different applications in accordance with the invention.

FIG. 117 illustrates a cross-sectional view of a "pump with continuous spiral blades" 670 which can be used in many different applications in accordance with the invention. The concept of pump 670 is explained in FIGS. 70-73. In this illustration, pump 670 is slightly modified to be used as a "hydro jet propulsion electric motor with continuous spiral blades" to be installed in floats of amphibian airplanes or underneath hall of ships and other watercraft. The "hydro jet propulsion electric motor with continuous spiral blades" shortly called the "pump" 670 consists of: outer cylinder the stator 671 which has armature and electromagnetic coils 93 permanently fix to the inner side of the outer cylinder 671; inner cylinder the rotor 672 which has armature and electromagnetic coils 95 permanently fixed to the outer side of the inner cylinder 672; bearings 97 and 597 which engage stator 671 and rotor 672; continues spiral blade 651 which is permanent element of the inside wall of the rotor 672; front piece 675; and back piece 674.

When pump 670 is activated the rotor 672 spins with continuous spiral blades which generates water jet in one direction with reaction propulsion in opposite direction. The bearings 97 are waterproof. The front piece 675 is tapered to suck more water.

Figure 118:
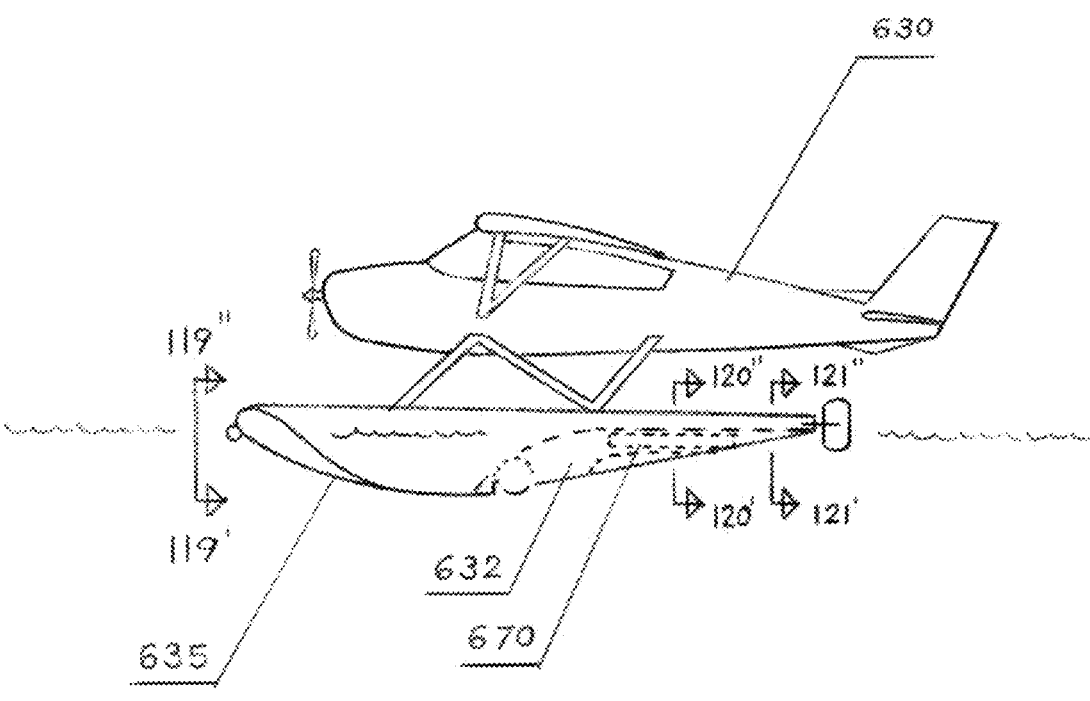
FIG. 118 illustrates a side view of an amphibian plane with floats which incorporate an in-line-pump, illustrated in FIG. 117 in accordance with the invention.

FIG. 118 illustrates a side view of an amphibian plane 630 with floats 635 which contains the "hydro jet propulsion electric motor with continuous spiral blades" shortly called the "pump" 670 "illustrated in FIG. 116 in accordance with the invention. Amphibian planes as regular airplane are propelled forward by an engine with a propeller or jet engine on the fuselage or on wings. An airplane need to reach certain speed so that air flows over and under wings can generate necessary lift force. Amphibian planes in water need more distance for takeoff than it would need on a dry runway because floats encounter water resistance and therefore requires more time for reaching necessary speed for liftoff and consequently longer distance for takeoff.

Here is illustrated amphibian planes 630 with floats 635 which have recess 632 for the pump 670.

When the pumps 670 inside floats 635 of the airplane 630 are activated the rotors 672 spins with continues spiral blade which generates water jet backward with opposite reaction and propulsion forward. Speed and mass of water ejected are proportional to generated thrust. Amphibian planes 630 with the "pump" 670 installed inside floats 635 when activated will reach necessary speed for liftoff faster and consequently would need shorter distance for takeoff. Electricity for the pump 670 is generated by alternator of the airplane's engine.

Figure 119:
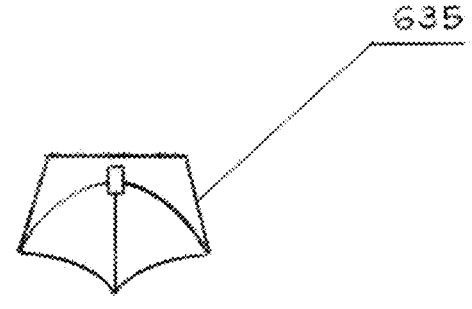
FIG. 119 illustrates a frontal view of one of two floats of the amphibian plane illustrated in FIG. 118.
Figure 120:
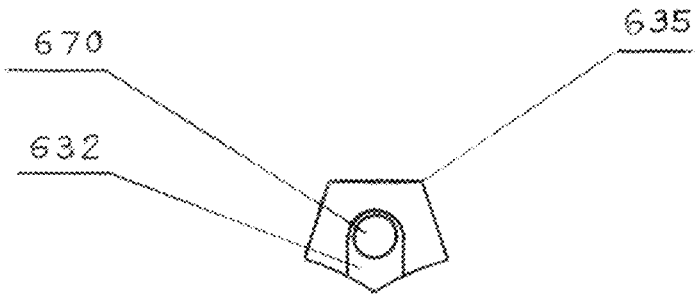

FIG. 119 illustrates a frontal view of one of two floats of the amphibian plane 630 illustrated in FIG. 118;

FIG. 120 illustrates a cross-sectional view of one float of the amphibian plane 630 taken along line 120'-120" of FIG. 118. Here are shown float 635, recess 632 for housing the pump 630.

Figure 121:
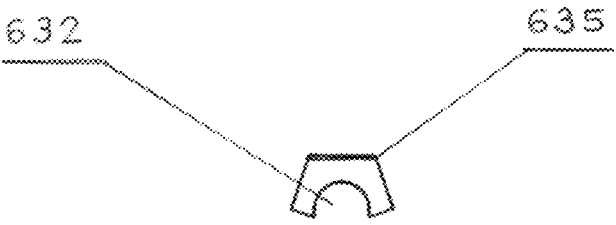

FIG. 121 illustrates a cross-sectional view of one float of the amphibian plane taken along line 121'-121" of FIG. 118. Here is shown back section of the float with recess 632 through which water jet exit the floats 635 and generates thrust pushing the amphibian plane 630 forward.

FIG. 122 illustrates a side view of a ship 640 using the "hydro jet propulsion electric motors with continuous spiral blades" shortly called the "pump" 670 for propulsion and stirring of the ship in accordance with the invention illustrated in more details in FIG. 117. Currently, ships are propelled forward by an engine with a propeller. A propeller has blades attached to a shaft which is rotated by piston engine or electric motor. There are ships with electric motor and propellers that can steer the ship by rotating electromotor assembly around a vertical axis.

Here is illustrated a ship 640 with cascaded recesses 641, 642, and 643 in which are installed multi pumps 670. The upper surface of pump 670 is fixed to the vertical plate 646 which functions as a shaft for rotating pump 670 around a vertical axis for steering 360°. By having a slim profile, the vertical plate 646 also functions as a small rudder.

Figure 123:
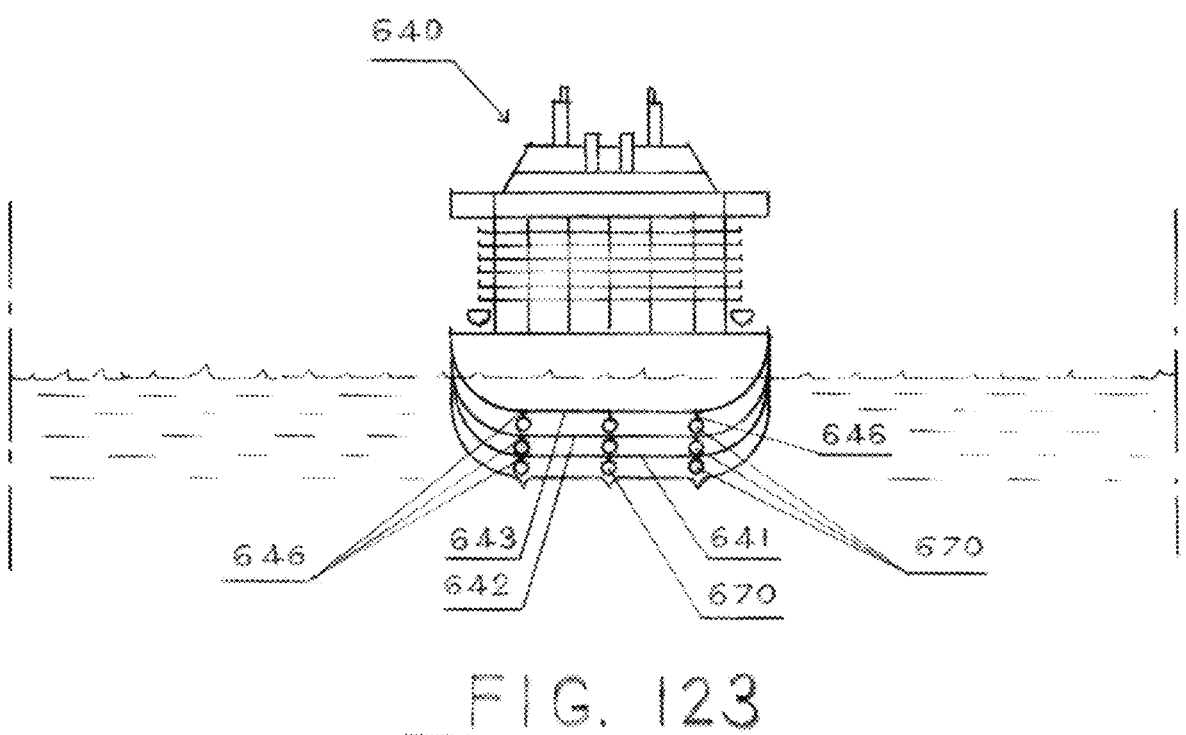

FIG. 123 illustrates a rear view of a ship illustrated in FIG. 122 using pumps 670 for propulsion and stirring in accordance with the invention.

FIG. 124 illustrates a plain view of an electric surfboard 680 consisting of upper portion 681 and a corresponding lower portion 682 coupled together with sealing mechanism (device) consisting of "U" shaped rail 693 with two inflatable tubes 695 permanently attached to the recess at the edge of the lower portion 682, and "T" shaped blade 694 permanently attached to the recess at the edge of the upper portion 681. Here is illustrated a solar panel 683, battery packs 684 coupled into provided recesses 692, and two electric hydro jet motors (in-line-pumps) 740. Here is also illustrated an intake port (suction chamber) 685 in the lower portion 682 of the surfboard 680 which funnels water towards the intake of the electric hydro jet motors (in-line-pumps) 740 which is shown in more details in FIG. 132. Here is also shown the secure rope attachment port 737 which also functions as a switch to stop the electric motor when surfer falls off the board. Other safety devices can be implemented such as sensors for disengaging the motor when board is not attended to by a surfer. The surfing board have a slim and compact design. The solar panel 683 is coupled on the upper portion of the surfboard in provided recess. The solar panel (foil) is permanently covered with transparent layer of fiberglass or similar material. Here is also shown opening 696 for channels for cooling solar panel and battery packs if needed. The advantages of the presented electric surfboard over conventional surfboard are that the surfer can use the board to search for waves and position itself faster for more enjoyable surfing. Also, battery pack 684 can be recharged on the beach by solar panel 683 or optionally at home by the grid. Alternatively, battery pack 684 can be positioned into provided recesses 692 into lower portion 682 of the surfing board 680.

Figure 125:
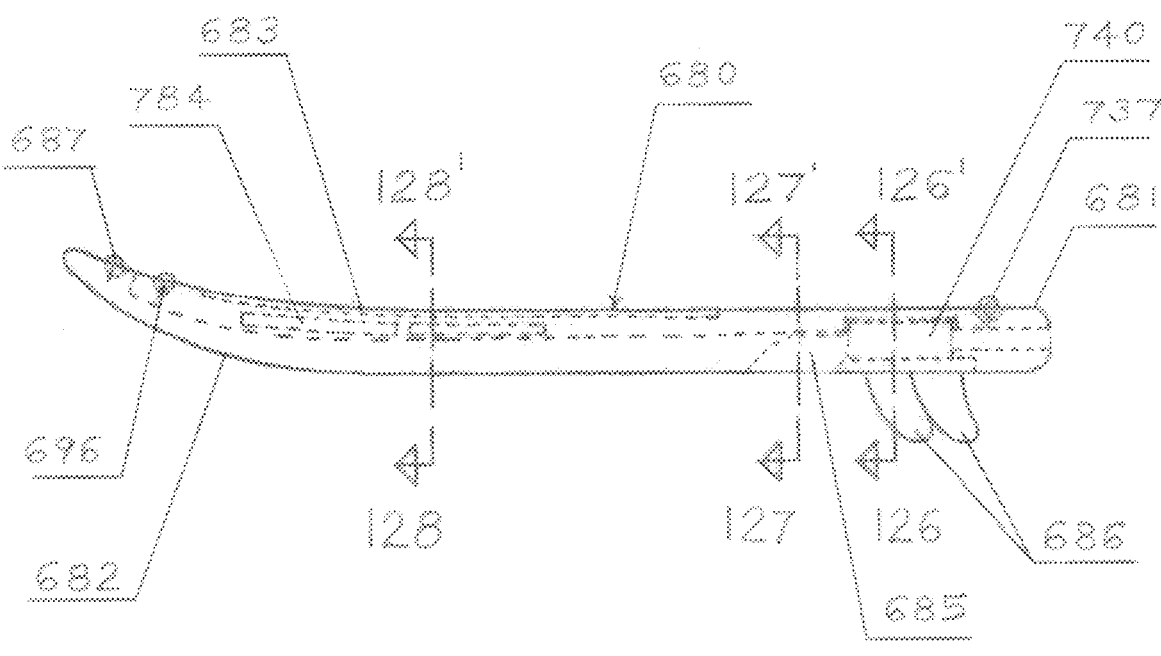

FIG. 125 illustrates a cross-sectional side view of the electric surfboard illustrated in FIG. 124 with elements explained in FIG. 124 with all elements.

Figures 126, 127, 128:
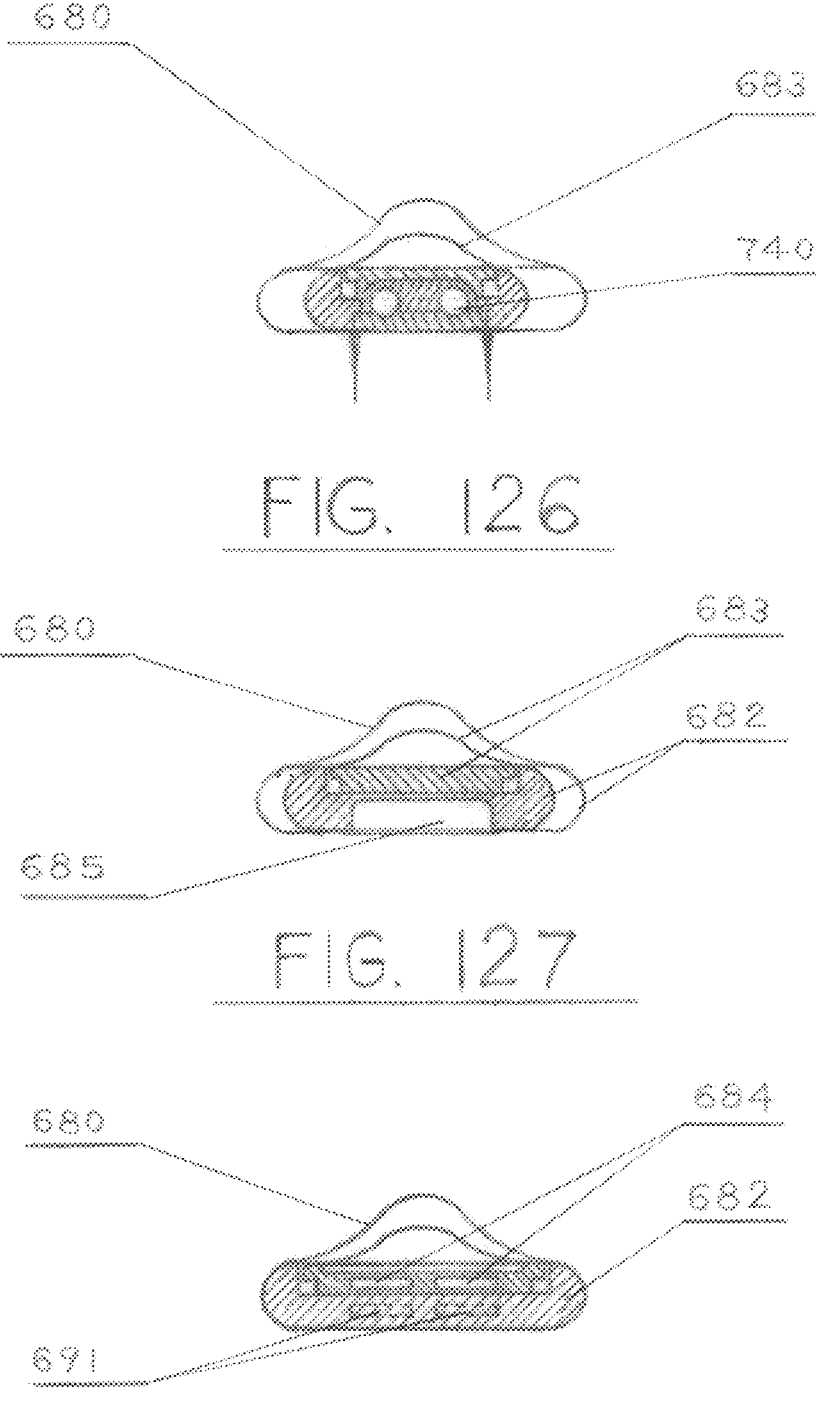

FIG. 126 illustrates a cross-sectional view of the electric surfboard taken along line 126-126' of FIG. 125, with all elements.

FIG. 127 illustrates a cross-sectional view of the electric surfboard taken along line 127-127' of FIG. 125, with all elements.

FIG. 128 illustrates a cross-sectional view of the electric surfboard taken along line 128-128' of FIG. 125, with all elements. Here is also shown alternative recesses 691 the battery pack 684.

Figure 129:
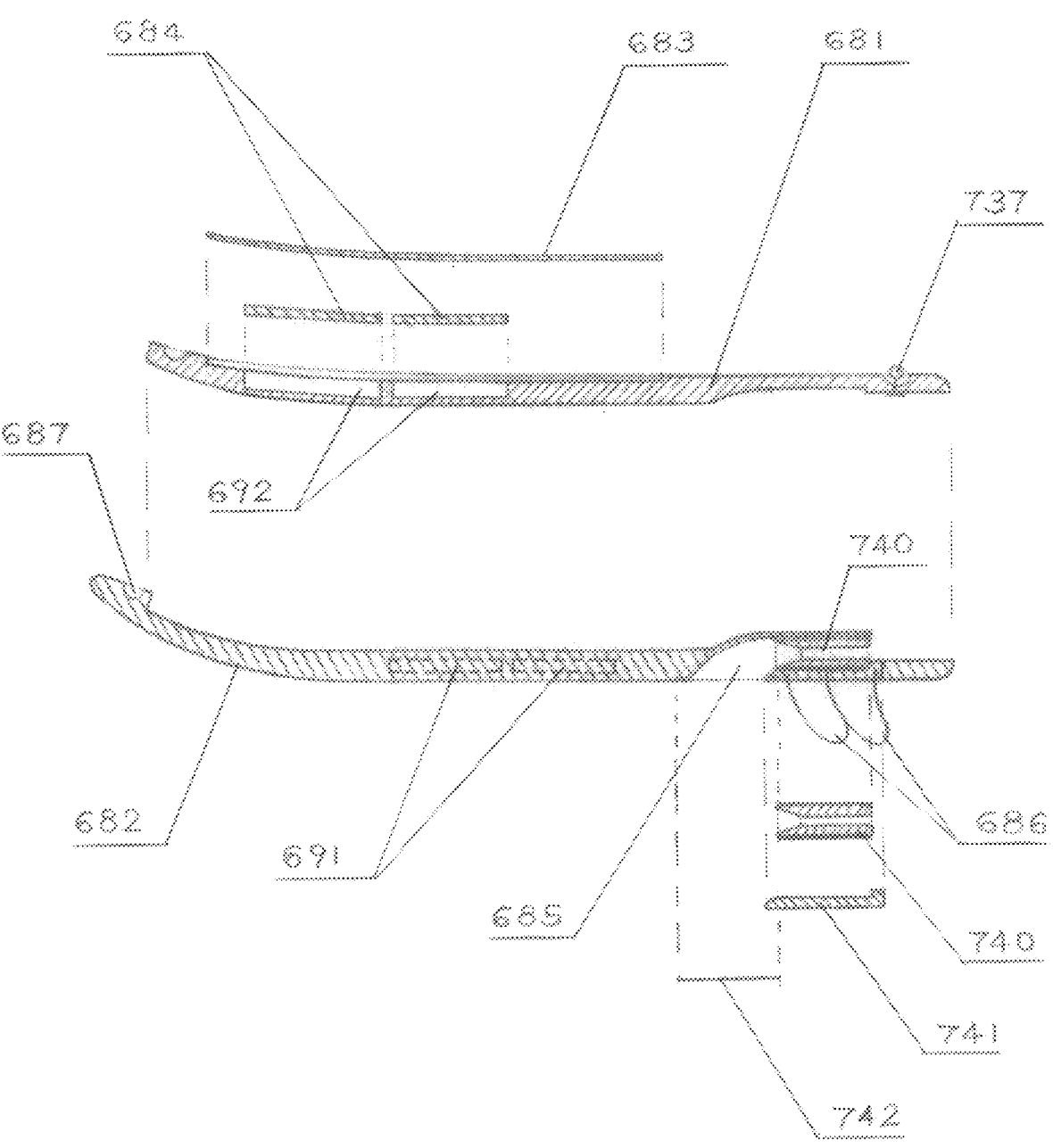

FIG. 129 illustrates a cross-sectional explosive (disassembled) view of the electric surfboard shown in FIGS. 124 and 125, with all elements explained FIGS. 124 and 125. Here is also shown plastic grid 742 as a filter for preventing elements bigger than opening on the grid entering the intake port (suction Chamber 685) and subsequently the motor 740. Here is also shown the cover piece 741 for jet motor 740.

Figure 130:
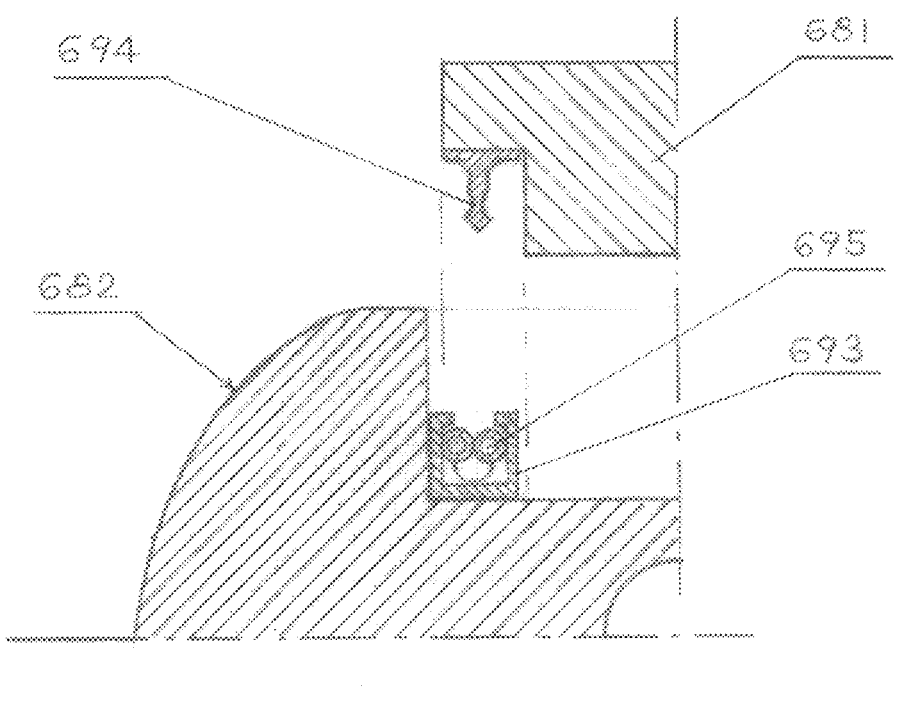

FIG. 130 illustrates a cross-sectional explosive (disassembled) view of a scaling detail between lower and upper part of the electric surfboard shown in FIGS. 124 and 125. Here is shown upper portion 681 and lower portion 682 of the surfboard 680 with sealing mechanism (device) consisting of: a "U"-shaped rail 693 which is permanently attached to the recess provided on the edge of the lower part of the surfboard 682 that housing two parallel "inflatable sealing tubes" 695 which engages with upper "T-shaped" blade 694 which is permanently attached to the recess provided on the edge of the upper portion 681 of the surfboard 680 having an extended blade (part) 694 engaging between two parallel "inflatable sealing tubes" 695 and securing upper position 681 and lower portion 682 of the surfboard 680 when two "inflatable sealing tubes" are inflated. Conventional plastic screws can be used too.

Figure 131:
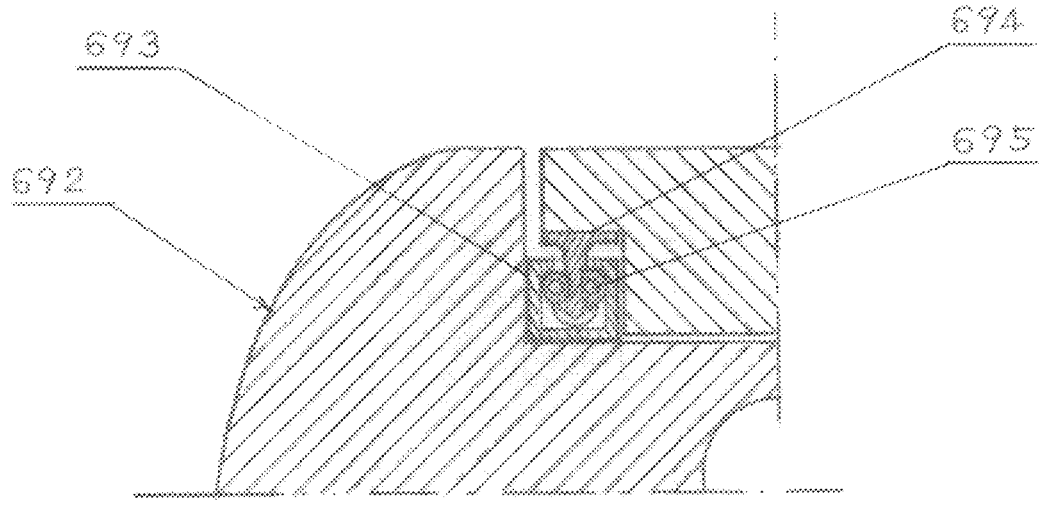

FIG. 131 illustrates a cross-sectional view of a sealing detail between the lower and upper part of the electric surfboard shown in FIGS. 124 and 125.

FIG. 132 illustrates a cross-sectional view of an electric in-line-pump (hydro jet motor) used in surfboard shown in FIG. 124 and can be used in many different applications in accordance with the invention.

FIG. 133 illustrates a cross-sectional view of an alternative electric in-line-pump (hydro jet motor) and a propeller used in ship illustrated in FIG. 122 using for propulsion and stirring.

FIG. 134 illustrates a plain view of a Modular Segment 750 of the System for harnessing Solar Energy in vicinity of Sea (Ocean) for production of electricity, distilled water, and salty concentrated brine that can be used for production of lithium. Here is shown the Sea (Ocean) 760 and a seawater line 761 through which the seawater is pumped uphill on the shore to the seawater tank (reservoir) 762 where seawater is stored. Here is also shown array of thermo-optical solar dishes 700, connected with closed-loop system 720 (illustrated in FIGS. 139 and 140) to the power units 765 explained in more details in FIGS. 139-148. Here is also shown distillers 780 explained in more details in FIG. 139. Here is also shown a tank 785 for collecting distilled water from distillers 780. Here is also shown a tank 790 for collecting concentrated salty brine from boilers of the power units 765.

Here is also shown a battery pack 767 for storing electricity generated by the power unites 765 Here is also shown water pumps 763 that pumps seawater through seawater line 761 into tank 762. Here is also shown seawater line 761 splitting in two branches 766 for cooling condensers 780 and battery pack 767. On the way out from distillers 780 and battery pack 767 the two branches 766 are join back to seawater line 761 now a bit warmer on the way to the seawater tank 762. From the seawater tank 762 the seawater is delivered into the boilers of the power units 765 through line 764. After exiting power units 765 the exhausted steam is cooled and condensed in distillers 780 and distributed through line 768 into distilled water tank 785. After steam extraction, the remaining seawater in boilers of the power unites 765 now saltier is distributed through line 769 into the tank 790 for storing concentrated salty brine. Tank 790 is covered for protection of rain but has an extended roof for allowing evaporation to continue and concentration of salinity of brine to increases. The collected distilled water has market value and can be used for many purposes. The collected concentrated brine also has market value and can be used for extraction of lithium. This a Modular Segment 750 of the System for harnessing Solar Energy can be used, beside the Salton Sea, in many coastal locations where there is enough of sunshine, seawater and needs for potable water such as San Diego, Cabo San Lucas, etc.

FIG. 135 illustrates a cross-sectional view of the Modular Segment of the System for harnessing Solar Energy shown in FIG. 134 with all elements described in FIG. 134.

FIG. 136 illustrates a perspective view of the Modular Segment of the System for harnessing Solar Energy shown in FIGS. 134 and 135 with all elements described in FIG. 134.

FIG. 137 illustrates a perspective view of the Modular Segment of the System 800 for harnessing Solar Energy assembled alongside a road. Here is shown road 801, the Thermo Optical Solar System (TOSS) 710 like system illustrated in FIG. 106 for harnessing solar energy alongside pipelines. Here are also shown the power units 491 and battery packs 665. Although in the FIG. 106 the power unit is shown using conveniently the coolness of the pipeline for condensing working fluid, here the power units can cool condenser with a fan as is standard practice in air-conditioning industry. The benefit of this concept is the use of the decentralized longitudinal system for harnessing solar energy on industrial scale is to use already established infrastructure such as roads and power line whenever power line is nearby and accessible with multi smaller (miniature) power units with battery packs as opposed to centralized systems that requires a location of several square miles of land for the solar panels, with a single central tower with a boiler and generator.

FIG. 138 illustrates a perspective view of the Modular Segment of the System 805 for Harnessing Solar Energy assembled alongside a railroad. Here is shown railroad 806, the Thermo Optical Solar System (TOSS) 710 with power unit 491 and battery pack 665 like system illustrated in FIGS. 106 and 137. The benefit of this concept is the use of the decentralized longitudinal system for harnessing solar energy on industrial scale is to use already established infrastructure such as roads and power line whenever power line is nearby and accessible with multi smaller (miniature) power units with battery packs as opposed to centralized systems that requires a location of several square miles of land for the solar panels, with a single central tower with a boiler and generator.

FIG. 139 illustrates a schematic cross-sectional side view of the Thermo-optical Solar System (TOSS) 700 of the modular segment 750 for harnessing solar energy illustrated in FIGS. 134-136. The thermo-optical solar system 700 consisting of a complete closed-loop heat exchange system 720 comprising the first heat exchanger 690 coupled in source of heat (solar panels) and second heat exchanger 770 coupled inside the boiler 772 of the power unit 765. Two heat exchangers 690 and 770 are connected through thermally insulated line 720. Through the closed-loop system 720 circulate fluid with high boiling point (coolant) transferring heat from heat sources (solar panel) to the boiler 772 of the power unit 765. The power unit 765 consisting of several boilers 772; a box containing two cylinders 492 with pistons; and distiller 780. Here are also shown several first heat exchangers 690 coupled inside the thermo-optical solar dish connected through a closed-loop system 720 with second heat exchangers 770 coupled inside boilers 772. Here is also shown seawater line 764 distributing seawater to boilers 772. Here is also shown pressurized line 307 distributing steam to the "two port switch" valve 810 (explained in more details in FIGS. 141-148) feeds steam in cycle to two cylinders 492 containing pistons inducing motion of the pistons, crankshaft, gear boxes 436, and two generators 250 which generate electricity. There is an identical "two port switch" valve 810 mounted to other side of central plate of the piston unite 795 for collecting exhausted steam from two cylinders and distributing it into exhausted steam line 377 and into distiller 780 where steam is condensed into distiller 780 passing through coiled pipe 362 and transported through line 768 into tank for distilled water 785.

The basic function of the piston unit 795 is explained in FIGS. 81 and 82. The diagram of the function of the piston unit 491 illustrated in FIGS. 79 and 80 is almost identical to the piston unit 795. Presented piston unit 491 consists of two cylinders 492 and 494 which are engaged with pistons 432 and 434; Crankshaft 435 which is engaged to the gearboxes 436 and generators 250; The activating rods 813 are securely connected to corresponding pistons and each engaged with activators 814 which control switch port element 816 (open and close) the Two Port Switch Valves 810.

The pressurized steam enters upper chamber 496 of cylinder 492 through pressurized hose 308 and lower chamber 497 of cylinder 494 through pressurized hose 309. Here is also shown exhausted steam exiting lower chamber 498 of cylinder 492 through pressurized hoses 375 and upper chamber 495 of cylinder 494 through pressurized hoses 376 both joining exhaust line 377 which is coupled to the Two Port Switch valves 303 which is coupled to the condenser 360.

The gearbox 436 is engaged with the crankshaft 435 and generator 250 and multiplies the rotation of the generator 250.

The activating rod 813 is engaged with piston arm and has an extrusion (bump) which activates the activator arm 814 during the slides. The activator arm 814 is secured to the switch port element 816 that has opening (canal) 815 aligning with appropriate ports (817 or 818) at appropriate timing.

By closing port 817 and opening port 818 of the Two Port Switch Valves 810 starts stroke two and continues two stroke cycling motion.

FIG. 140 illustrates a schematic cross-sectional plain view of the Thermo-optical Solar System (TOSS) 700 of the modular segment 750 for harnessing solar energy illustrated in FIGS. 134-136, and 139. The function and elements are explained in FIG. 139.

FIG. 141 illustrates a frontal view of a two-port switch valve 810 used in power unit of the Thermo-optical Solar System (TOSS) 700 shown in FIGS. 139 and 140. The "two port switch" valve 810 feeds steam in cycle motion to two cylinders 492 containing pistons, crankshaft, gear boxes 436, and two generators 250 which generate electricity. The two-port switch valve 810 consists of mounting plate 811, housing of the valve 812 containing a switch port element 816 that has opening (canal) 815, and two ports 817 and 818. There is an activator 814 pivotally engaged at one end with activating 813 and on the other end with a spring 819. There is an identical second two port switch mounted on the structural plate in the piston unit 795. The purpose of the first "two port switch valve" 810 is to distribute high pressure steam into the upper chamber of one cylinder with piston and into lower chamber of the second cylinder with piston. The purpose of the second "two port switch valve" 810 is to distribute exhausted steam from lower chamber of one cylinder with piston and from the upper chamber of the second cylinder with piston in cycling motion and transfer it through exhaust line to the distiller 780.

FIG. 142 illustrates a cross-sectional view of the two-port switch valve taken along line 142-142' of FIG. 139, used in power unit of the Thermo-optical Solar System (TOSS) in accordance with the invention. The elements and function are explained in FIGS. 139-141.

FIG. 143 illustrates a frontal view of an alternative design of the two-port switch valve used in power unit of the Thermo-optical Solar System (TOSS) shown in FIG. 139. Here is shown a servo motor 826 to be programed to activate switch port element 816 automatically without using activating road 813 and activator 814.

FIG. 144 illustrates a cross-sectional view of the alternative design (solution) of the two-port switch valve taken along line 144-144 of FIG. 143.

FIG. 145 illustrates frontal view of the two-port switch valve in neutral position. The elements and function are explained in FIGS. 141-142.

FIG. 146 illustrates frontal view of the two-port switch valve in first port opening position. The elements and function are explained in FIGS. 141-142.

FIG. 147 illustrates frontal view of the two-port switch valve in neutral position starting cycle two. The elements and function are explained in FIGS. 141-142.

FIG. 148 illustrates frontal view of the two-port switch valve in second port opening position. The elements and function are explained in FIGS. 141-142.

FIG. 149 is a map of the pipeline Route #1—from San Felipe to the Salton Sea and Route #2—from Long Beach to the Salton Sea. The Salton Sea 35 miles long and 15 miles wide, in the desert depression about-270 feet below sea level after an accidental flood of the Colorado River in 1905-1907 and settling water level on-220 feet. It is located about 170 miles south-east from Long Beach and about 170 miles north from San Felipe in Gulf of California (Sea of Cortez). Such configuration and location are unique in the World and of great importance for the desert cities and future development. The presented proposal is an architectural plan dealing with stopping pollution from nearby farmland and providing condition for tourism, importing seawater, providing condition for wildlife, harnessing geothermal and solar energy which are prevalent in the area, production of potable water and concentrated brine that can be used for extraction of lithium. Here is shown a restricted biosphere zone in northern part of Sea of Cortez.

FIG. 150 illustrates a cross-sectional view if the pipeline Route #1—from San Felipe to the Salton Sea. Here is shown configuration of the terrain. The Ocean 500, the pipeline 400, an in-line pumps 472, the fall, primary generator 572, delta power plant 570, and Salton Sea 156. In addition to illustration in FIGS. 64 and 65, here is shown a solution for bypassing the restricted biosphere zone. Here is shown pipeline 400 laid at the bottom of the Sea of Cortez. Here is also shown cut off and trench area. Since there is no big obstacle (mountain) on the route #1 as is the case with the route #2 from Long Beach, and because the elevation that exceeds 10 miters (33 feet), that is needed for the syphon system to function, is only several feet on relatively short distances, and to use siphon system the best and less expensive solution is to trim (cutoff) and to dig a trench for the pipeline at certain area for the pipeline. Theoretically the siphon system can overcome elevation of 10 meters (33 feet) and function transferring seawater at lower locations such is the Salton Sea. The tidal range in Gulf of California is 32 feet (−6'+16').

Since distance from intake to the fall is about 130 miles the resistance in pipeline would decrease necessary flaw. Therefore, to solve the problem of resistance in the pipeline and have necessary flaw and volume of the seawater, trimming terrain and making tranches for laying pipeline to about 20 feet elevation or preferably less and adding several in-line pumps is the least expensive solution to build the pipeline and most profitable solution in the long run. That is a much cheaper way than making a tunnel or having expenses for pumping seawater over 35 feet elevation.

FIG. 151 illustrates Plain View of the first segment of the pipeline Route #1. Here are shown pump station 510 with five in-line pumps 472 and bypass lines 475. The bypass lines 475 is an option for use after several weeks of pumping when fluid flaw is established, and pumps turn off. Here is shown restricted biosphere zone 830 in the Gulf of California (Sea of Cortez) 500, pump station 510, and several zones of the pipeline 400 having five pipelines, three pipelines and a single pipeline. Here is also shown the segment of the pipeline under sea, each of five pipelines having additional three pipelines 833. Those pipes are not pressurized and the main reason for additional three pipelines 833 is to provide enough seawater to the pump station 510 which is 40 miles away from the intake, and to bypass the restricted biosphere zone 830.

FIG. 152 illustrates schematic Plain View of a Recreational Park with a small Lake and nearby Fishery. The essential point of the presented architectural plan (the solution) for the restoration of the Salton Sea, besides providing clean environment, generation of electricity from solar and geothermal sources is that the three reservoirs/tanks 535 with valves 536 controlling water flow to the three main pipelines; eastern branch 531; central branch 532; and western branch 533 can be used for formation of recreational parks and nearby fisheries (fish farms). The water for supplying irrigation line 533 from All American Canal can be used for the formation of Recreational Park 835 with a small Lake 836 and nearby Fishery 837 before entering irrigation line 533. Here is shown a control valve 840, inflow line 841 into Lake 836, the outflow line 842 from [the] Lake 836, which is also inflow line into pools for farming fish 838.

FIG. 153 illustrates schematic Plain View of an additional design of Recreational Park with a Lake and nearby Fishery. Here are shown the function and all elements as in FIG. 152. The only difference is the shape of [the] Lake 844.

FIG. 154 illustrates schematic Plain View of an additional design of Recreational Park with a Lake and nearby Fishery. Here are shown the function and all elements as in FIG. 152. The only difference is the shape of [the] Lake 845.

FIG. 155 illustrates schematic Plain View of an additional design of Recreational Park with a Lake and nearby Fishery. Here are shown the function and all elements as in FIG. 152. The only difference is the shape of [the] Lake 846.

FIG. 156 illustrates a map-a schematic Plain View of a closed-loop system transferring the coolness of the nearby source of running water into the condenser of the geothermal power plant. Here is shown a closed-loop system 310 consisting of thermally insulated line connecting the first heat exchanger submerged into a relatively cold source of water-a nearby canal 316, and the second heat exchanger coupled into the condenser of the power plant 300. Here is shown inflow line 312 and outflow line 314. The water used for cooling condensers is returned without any loss into canal 316 by outflow line 314 to be used for its original intended purpose. The cooling system of the condenser which is part of the power unit 380 that generates electricity and condenses distilled water as a free byproduct is explained in more detail in FIGS. 157-161. Here is shown an alternative pipeline inflow 871 and outflow 872 to supply cooling water to condenser 860 of the power plant 300 from east branch pipeline 531 of the irrigation system. Here is also illustrated a secondary binary power unit 355 that uses working fluid for additional extraction of heat from outflow cooling line 314 and in process of extraction of heat generate additional electricity. The binary power unit 355 is explained in more detail in FIG. 159.

FIG. 157 illustrates a schematic plan view of the first heat exchanger 868 on the bottom 853 of the Coachella Canal 316 with inflow line 312 and outflow line 314. Here are shown sides 851, 852, and the bottom of the of the canal 316.

FIG. 158 illustrates a cross-sectional view of the Coachella Canal 316. Here is shown the first heat exchanger 868 on the bottom of the Coachella Canal.

FIG. 159 illustrates a schematic diagram of a Power Unit 380 consisting of a closed-loop system 210 consisting of the first heat exchanger 168 and second heat exchanger 182 (see cross-section in FIGS. 45, 75, and 79), transferring heat from the source of heat, dip in a wellbore 30 into boiler 217. Boiler 217 is filled with salty water from a salty body of water. Inside the boiler, there is a second heat exchanger 182 to heat salty water. The steam from the boiler through conduit 874 enters the pistons of the power unit 795 which spins generator 250 which generates electricity. After leaving the pistons of power unit 795, the exhausted steam enters the condenser 860, through conduit 876, where the exhausted steam is condensed and collected as distilled water (see FIG. 160). The condenser 860 is cooled with water from the inflow line 312 of the closed-loop system 310. Here is also shown outflow line 314, now a bit warmer, returning water into heat exchanger 868 of the closed-loop system 310 for more cooling. Here is also shown a supplementary binary power unit 355 consisting of a set of two power units 490 and power unit 499 that uses working fluids to extract more heat and generate more electricity. The binary power unit 490 consists of a boiler 217, a power unit with pistons 795, two generators 250, and a condenser 360. The working fluid in binary power unit 490 has a lower boiling point than water. Here is also shown additional binary power unit 499 almost identical as binary power unit 490 consisting of the boiler 217, power unit with pistons 795 and generators 250, and condenser 360. The only difference is that the working fluid in power unit 499 has a lower boiling point than the working fluid in power unit 490. Here is also shown line 878 returning cooled working fluid from condensers 360 into boilers 217. Here is also shown feed pump 879. The power unit 380 can alternatively be assembled with turbines. The power unit with pistons 795 is a more efficient way of harnessing lower-pressure steam and is explained in more detail in FIGS. 139-148. The condenser 860 condenses exhausted steam from the power unit 795 into distilled water which is collected. See FIG. 160.

FIG. 160 illustrates a schematic cross-sectional view of the condenser 860 taken along line 160-160' of FIG. 161. The condenser 860 has a slim shape consisting of several watertight departments (cylinders) containing circulating relatively cold water from closed loop system 310, and inner piping system 862 in which exhausted steam enter and condenses. Here is shown conduit 859 transferring exhausted steam from the power unit 795 into the lower section of the condenser 860. Here are also shown three sets of inner piping system 862 in which exhausted steam is condensed and distilled water collected into pan 855 and transported through conduit 856. Here is also shown a tube 312 transporting colder water of closed-loop system 310 into condenser 860 and tube 314 exiting condenser 860 now with wormer water and transferring it back into closed loop system 310 for cooling.

FIG. 161 illustrates a schematic cross-sectional plan view of condenser 860. Here are shown several watertight departments (cylinders) containing circulating relatively cold water from closed-loop system 310, and three sets of the inner piping system 862 in which exhausted steam enters and condenses. Here is also shown tube 312 transporting colder water of closed-loop system 310 into each department (chamber) of the condenser 860 and tube 314 exiting each department (chamber) of the condenser 860, now with warmer water, and transferring it back into closed-loop system 310 for cooling. Here is also shown a tube 856 transporting collected distilled water from the condenser 860 to be use in other applications.

FIG. 162 illustrates a plan view of an array of condensers 860. Such an arrangement can be used for utilizing the condenser system 860 to modified existing cooling towers of the conventional geothermal power plants.

FIG. 163 illustrates a map (1-1) from the Bureau of Reclamation report—SEIS—Oct. 12, 2023, showing the 'Upper and Lower Division States of the Colorado River' that completely excluded (not illustrated) the Salton Sea from the Colorado River Basin. That is utterly wrong because, since its existence, water in the Salton Sea has been flowing in from the Colorado River.

FIG. 164 illustrates a map (8.1.1—modified) showing the distribution of water from the Colorado River through the All-American Canal and Coachella Canal to the South Lake and North Lake of the Salton Sea with lesser water supply from Colorado River in accordance with the presented concept.

FIG. 165 illustrates a map (8.1.2—modified) showing the importation of seawater through pipeline Route #1 from the San Felipe area of the Gulf of California (Sea of Cortez) to the Central Section) of the Salton Sea, and another pipeline Route #2 from the Long Beach area to the Central Section of the Salton Sea.

Additional Considerations

It is important to have two corridors-one from San Felipe on the South and one from Long Beach on the North—for several reasons.
A) We need to get rid of the New River and Alamo River because the new architectural plan provides a functional Lake without them. In return negotiate a corridor for importing seawater through the "International Boundary and Water Commission" and their counterpart's team in Mexico. That way we could save about 100,000,000 dollars per year. That is how much Mexico charges for importing 1,000,000 are-feet seawater per year.
B) We need a second corridor from Long Beach to reduce the risk of having only one corridor from the Sea of Cortez. Having only one corridor increases the potential risk of blackmailing. For example, if Coup D'etat in Mexico happens or a Cartel takes over and asks $200,000,000 instead of $100,000,000, for importing seawater, etc. With one corridor we (USA) would be vulnerable, especially if we invest into infrastructure billions of dollars.
C) The Salton Sea is 35 miles long—it is much better to have inflows of seawater from both ends of the Central section of the Lake. If there is only one inflow at one side of the Central Lake, the quality of water would gradually decrease as the distance from the inflow entrance increases and on the opposite side would be stagnated.
D) By having two corridors the Salton Sea would have more water than just for balancing evaporation, which is about 1,000,000 acre-feet per year. We would have plenty of water for different usage such as refiling depleting known geothermal reservoirs, increasing the production of potable water that could be used for the production of hydrogen by using prevalent geothermal sources. The extraction of Lithium from imported seawater (about 1,000 tons per year) is in addition to the extraction of Lithium from geothermal brine.

With the presented proposal we would be able to equalize the salinity of the Salton Sea with the salinity of the Ocean in 5-6 years of use of the system by extracting higher salinity water (brine) from the bottom of the Salton Sea and importing less salty water from the Ocean.

For those that argue that the second corridor would increase the cost of the project by several billions of dollars, the reply is that by implementing the presented proposal the revenue would be in billions of dollars (including tourism) and the project would be paid off in relatively short period. Therefore, an additional investment of several billion dollars for a better final product would be a good investment.

In closing—the essence of the presented proposal is the architectural plan—the solution for the restoration of the Salton Sea—that incorporates several breakthrough technologies and local conditions of the Salton Sea area providing a clean environment, refilling the Lake to its original level of the 1950s and 1960s (which was about −220) providing condition for tourism, providing a substantial wildlife sanctuary, providing recreational parks with smaller Lakes (no ponds) and nearby fisheries, harnessing prevalent geothermal energy for the generation of electricity, potable water, hydrogen, lithium, and other elements if needed.

Costing about $15,000,000,000 to build and generating revenue of at least $500,000,000 per year from renewable clean energy out of blue-literally.

Summary of the Preliminary Cost and Benefits Estimate: Importing Seawater and Harnessing Hydropower Phase II-Dividing the Lake into three sections by building two main dikes (4-lane roads) strategically positioned-One in the northern and one in the southern part of the Salton Sea. The rough cost estimate is around $3.0 Billion. (22 miles+13 miles)×$82 Million=$2.87 Billion). Cost estimate for 6 piers is about $130 million (6 piers×$20 Million=$120 Millions).

Route #1

Pipeline cost estimate: $1,425,600,000.

Added about 20% for a new Product Development; Permits, Preliminary and

Final design; Several Pumping stations; Several freeway Underpasses; Right-Of-Way permits; DELTA hydroelectric power plant.

$1,425,600,000+ (20%=$285,120,000)=$1,700,000,000.

Pipeline cost is estimated at $1.7 Billion.

The volume of water imported: 1,114,261 acre-feet per year.

Kinetic Energy generated: 27.3 MWh.

Revenue generated: $14,348,880 per year.

Maintenance Expenses: -$2,000,000.

Revenue generated: $12,348,880.

Route #2

Pipeline Cost Estimate:

$2,138,400,000+ (20%=$427,680,000)=$2,566,080,000.

Purchase of Right-of-Way: $500,000,000.

Pipeline Cost Estimate: $3,066,5080,000.

The volume of water imported: 2,267,464 acre-feet per year.

Maintenance Expenses: -$2,000,000.

The Hydro energy generated: 710.5 MWh

Efficiency factor is used 20%=>710.5 MWh×1.2=852.6 MWh.

Energy Net for Route #2:719.0 MWh-852.6 MWh=-142.1 MWh.

142.1 MWh will be transferred from the solar-generated energy (See Segment (III)).

The Hydro energy generated: Deficit -142.1 MWh.

The Cost Estimate for Pipeline System for the Irrigation of the Farmland Southern Area of the Salton Sea:

Length of pipeline system: 870 Miles.

The cost estimate to build it: $2.7 Billion.

Energy Generated: 2.73 MWh.

Revenue generated: $1,434,888 per year.

Maintenance: $2,000,000.

Revenue generated: $1,434,888 per year.

The Cost Estimate for Pipeline System for the Irrigation of the Farmland Northern Area of the Salton Sea:

The farmland in the Northern area of the Salton Sea is approximately 50% of the farmland Southern Area of the Salton Sea. Here values are divided by 2. This area does not have enough drop to generate hydropower.

Length of pipeline system: 435 Miles.

The cost estimate to build the pipeline system: $1,378,080,000.

Maintenance: $1,000,000.

Harnessing Solar Energy

The Cost of TOS system for Route #1 (160 miles): ~$200,000,000.

Maintenance of the TOS on Route #1: -$2,500,000.

The Cost of TOS system for Route #2 (200 miles): ~$250,000,000.

Maintenance of the TOS on Route #2: -$3,500,000.

The Cost of the TOS system South of Salton Sea (870 miles): ~$1,200,000,000.

Maintenance of the TOS system South of Salton Sea (870 miles): $12,400,000.

The Cost of the TOS system for the Northern of Salton Sea (430 miles): is ~ $580,000,000.

Maintenance of the TOS system of the Northern of Salton Sea (430 miles): $6,200,000.

$2,254,600,000

Energy Generated with TOS on Route #1:423,52 MWh.

Energy Generated with TOS on Route #2:529.4 MWh.

Energy Generated with TOS on Southern of Salton Sea (870 miles): 2,302.29 MWh.

Energy Generated with TOS on Northern of Salton Sea (430 miles): 1,151.14 MWh.

4,406.35 MWh.

Revenue Generated TOS system for Route #1 (160 miles): $45,740,160 per year.

Revenue Generated TOS system for Route #2 (200 miles): $57,175,200

Revenue from the TOS in area Southern of Salton Sea (870 miles): $248,647,320 per year.

Revenue from the TOS in area Northern of Salton Sea (430 miles): $124,323,660 per year.

$475,886,340

NOTE: Here are not calculated solar panels and dishes that can be set up on service roads near the pipelines and electric power lines, but that would double or triple the revenue of the area.

Harnessing Geothermal Energy

The Cost of One Geothermal Power Plant: $418,000,000.

The Cost of 3 Power Plant: $1,254,000,000.

(Estimate of the Production Capacity of one (1) Geothermal Power Plant is about: 100 MW).

The estimate of the Production Capacity of three (3) Geothermal Power plants is about: 300 MW.

(Preliminary Estimate for Revenue of one (1) Geothermal Power Plant is about: $50,457,600 per year).

The preliminary estimate for the Revenue of three (3) Geothermal Power Plants is about: $151,372,800 per year.

Harnessing Lithium

Salton Sea Facts:

Surface: 350 square miles (910 km$^2$).

Inflow: <1,200,000 acre-feet (1.5 km$^3$).

Depth: 43 feet (13 m).

Volume: 6,000,000 acre-feet (74 km$^3$).

Salinity: 56 grams per liter.

[Pacific Ocean is: 35 gm/L].

Salt concentration has been increasing per year by 3%.

About 4,000,000 Tons of salt are deposited in the Valley (Salton Sea) each year with irrigation water.

1,000,000 acre-feet=1,233,481,837.54 Kiloliters (Kl).

1,233,481,837.54 Kiloliters (Kl)=1,213,746,128 Tons.

1,213,746,128 Tons=5,000,000=242.75 Tons of Lithium.

Import of 1,000,000 acre-feet of seawater from Route #1 (Gulf of California-San Felipe) brings about 242.75 Tons of Lithium per year.

Import of 2,000,000 acre-feet of seawater from Route #2 (Pacific Ocean-Long Beach) brings about 485 Tons of Lithium per year.

Import of 242.75 Tons of Lithium from Route #1 (+) 485 Tons of Lithium from Route #2—it sums up to 727.75 Tons of Lithium per year.

Since the water of the Salton Sea is about 50% saltier than the water from the Ocean it is realistic to expect that about 1000 Tons of Lithium per year can be extracted from the Salton Sea.

Estimate for Extraction of Lithium from the water of the Salton Sea: $13,000,000 per year as of 2021.

Recreational Parks

Using water from the "All-American Canal" and "Coachella Canal" and sprinkler system for irrigation of nearby farmland it would provide conditions for establishing several recreational parks with small circulating Lakes and fish farms with substantial financial benefits. The rough Cost Estimate for 6 Recreational Parks and 6 fish farms is about $12 million. (6 parks×$1 million=$6 million)+(6 fish farms×$1 million=$6 million). The Recreational Parks should be funded by the State. The fish farms should be for the private sector (investors) to participate in.

Surfing Waves Facility

This proposal provides conditions for tourism-exclusive real estate, beaches, resorts, hotels, etc. The surfing waves facility will be a tourist attraction the whole year round. The rough Cost Estimate for the Surfing Waves Facility is about $15 million. (See FIG. 8, 10-11). It should be part of the hotel system nearby. Importing seawater provides the conditions for tourism and the private sector (investors) to participate.

SUMMARY OF THE SUMMARY

Cost estimate for building is about $15,395,040,000

Revenue is about $542,255,148

The revenue of about $542,255,148 per year in the preliminary cost estimate is a very conservative number—the real revenue will be around $1 billion per year. That does not include revenue from other activities such as tourism that will bloom.

The presented preliminary Cost Estimate is based on standard available information. The final production design, based on the presented preliminary design, and final cost estimate will be available after cooperation with selected capable contractors-preferably selected by the State.

Those who make policies, including all stakeholders, need to understand that the Salton Sea situation is unique in the whole World. The depression of over −265 feet below sea level is in a desert about 200 miles from both—the Gulf of California (San Felipe) and the Pacific Ocean (Long Beach). In the area, there is a prevalent geothermal source and many sunny days throughout the year.

Even if there is no Salton Sea at the current location, because of natural conditions—a depression of 265 feet below sea level in the desert, 200 miles from the Ocean—the Salton Sea should be made. Importing seawater and using those natural sources (geothermal and solar), as explained in the proposal, the Salton Sea can and should become a hub to produce potable water that can be used in many applications.

The embodiments and examples set forth herein were presented to best explain the present invention and its practical application and to thereby enable those of ordinary skill in the art to make and use the invention. However, those of ordinary skill in the art will recognize that the foregoing description and examples have been presented for illustration and example only. The description as set forth is not intended to be exhaustive or to limit the invention to the precise form disclosed. Modifications and combinations are possible in light of the teachings above without departing from the spirit and scope of the forthcoming claims.

What is claimed is:

1. A system for restoration of a salty terminal lake utilizing several technologies to form a self-sustaining functional lake, the system comprising:

a) two dikes positioned on opposing ends of the salty terminal lake thereby dividing the lake into three sections including a first section, a second section, and a central section located between the first section and the second section to prevent contamination of the central section with pesticides and fertilizers, and the first and second sections are configured to form vast wildlife sanctuaries, and to accommodate lesser amounts of water from nearby reduced source of running water because of drought and to combat climate change;

b) the central section of salty terminal lake requiring more water than the first and second sections is filled with seawater from a nearby ocean wherein several technologies are used to desalinate the central section of the salty terminal lake;

c) a pipeline system bypassing restricted biosphere in the nearby ocean with a system of pipelines laid on the bottom of the nearby ocean and to avoid difficulties caused by oscillating tides, wherein seawater from the nearby ocean is transported by the pipeline system;

d) additional dikes built around a desired area to provide dry land for desired uses comprising cultivation of farmland and extraction of lithium from prevalent geothermal sources, and providing conditions for refiling the salty terminal lake to a predetermined level with seawater to prevent intended destruction and/or shrinkage of the whole salty terminal lake;

e) an injection well used for depositing diluted waste material from geothermal power plants, into depleting geothermal reservoir thus providing the solution for handling waste material and depletion of the geothermal reservoir;

f) a first desalination closed-loop system comprising a first heat exchanger positioned in a source of heat in a wellbore and a second heat exchanger positioned in a boiler of a power unit, wherein the boiler is frequently filled up with salty water from the salty terminal lake, and generated steam moves pistons or spins turbines of the power unit to generate electricity and exhausts steam condensate into a condenser to produce distilled water and concentrated salty brine from the boiler to be used for the extraction of lithium;

g) an array of removable pans in a nearby mineral extraction facility, wherein concentrated brine is received in the array of removable pans and where evaporation is induced with a hot pipe system underneath the removable pans, and evaporation from the brine in the removable pans is condensed in a condenser system positioned in the upper portion of a building insulated and divided with a plastic curtain, where distilled water is collected, and transferred for use in different applications, and the highly concentrated brine from the removable pans is collected and transported to a nearby facility for extraction of lithium and other minerals;

h) a second desalination closed-loop system comprising a first heat exchanger positioned in a source of heat which is a thermo-optical solar panel or dish and a second heat exchanger positioned into a boiler of the power unit in which the boiler is frequently filled up with salty water from a salty body of water and generated steam moves pistons or spins turbines of the power unit to generate electricity and exhausted steam condensate into a condenser producing distilled water and concentrated salty brine from the boiler to be used for the extraction of lithium; and i) a cooling condenser closed-loop system comprising a first heat exchanger positioned in a condenser and a second heat exchanger positioned in a nearby source of running water to transfer heat between the running water and the condenser to cool the condenser.

2. The system of claim 1, further comprising a reservoir located at a beginning of irrigation pipelines to form recreational parks with relatively smaller lakes and nearby fish farming facility using water from nearby canals before entering main irrigation pipelines providing recreational and economic benefits before water is used in an irrigation system.

3. The system of claim 1, further comprising a wave generating facility comprising a tower which includes a mechanism for generating surfing waves; and an array of wall segments surrounding a surfing area with openings for water circulation.

4. The system of claim 3, wherein the mechanism for generating surfing waves comprises a waterproof ax room having a sharp edge configuration at a bottom of the ax room with a reinforced container for adjusting a desired weight, which is coupled in a recess formed between three sides of structural walls of the tower and suspended on a cable; and a deep reservoir in which the ax room controllably plunges transferring the energy of a free fall of the ax room into surfing waves, wherein the ax room is configured for people to be within the ax room to provide attraction, excitement and experience of weightlessness to visitors during the free fall.

5. The system of claim 1, further comprising a periodic segment of the pipeline comprising a valve to which a hose can be attached to supply water for protecting the pipeline, inhabited area, and forest in case of nearby wildfires.

6. The system of claim 1, wherein the pipeline for importing seawater comprises in-line pumps as segments of the pipeline for uphill routes and in-line generators as segments of the pipeline for downhill routes with a delta power plant located at a last section of the pipeline to gradually harness speed and mass of hydropower after exiting a primary generator and before entering a destination.

7. The system of claim 6, wherein a rotor of the primary generator comprises a continuous spiral blade inside a hollow shaft of the rotor to generate spin of the rotor during fluid flow for generating electricity and allowing fluid with slightly less speed to continue flowing toward a next segment.

8. The system of claim 6, wherein a rotor of each in-line pump comprises a continuous spiral blade inside a hollow shaft of the rotor to generate spin of the rotor when electricity is turned on for generating fluid flow toward the next segment.

9. The system of claim 1, wherein a power plant closed-loop system transfers coolness of a nearby source of running water into a condenser of a geothermal power plant.

10. The system of claim 9, wherein the power plant closed-loop system comprises a thermally insulated line connecting a first heat exchanger submerged into a relatively cold source of water and a second heat exchanger coupled into the condenser of the geothermal power plant.

11. The system of claim 9, wherein the geothermal power plant comprises a power plant closed-loop system comprising the thermally insulated line connecting a first heat exchanger positioned in a source of heat; a second heat exchanger positioned inside a boiler of the geothermal power unit to transfer heat from the source of heat into the boiler, the boiler filled with salty water from a salty body of water; a power unit comprising pistons or turbines; a generator for generating electricity; and a condenser for condensing exhausted steam into distilled water and having a byproduct of concentrated salty brine from the boiler to be used for the extraction of lithium.

12. The system of claim 11, wherein the geothermal power plant contains a set of additional power units using a working fluid for additional extraction of heat and production of electricity.

13. The system of claim 11, wherein the condenser of the geothermal power plant consists of several watertight departments containing circulating relatively cold water from the power plant closed loop system, and an inner piping system in which exhausted steam enters and condenses.

14. The system of claim 11, wherein the geothermal power plant contains an array of condensers arranged for utilizing the condenser system and for modifying existing cooling towers of other geothermal power plants.

15. The system of claim 1, wherein the thermo-optical solar system with a piston power unit, wherein the thermo-optical solar system is configured to be sent and used in locations in space, to harness a weak solar energy concentrated through lenses, and solar energy to generate electricity for equipment and transmission of signals.

16. The system of claim 15, further comprising thermo-optical solar panels with multiple power units arranged as needed according to a size and surface that the thermo-optical solar panels are intended to cover, wherein the thermo-optical solar panels are installed on facades of a building to generate electricity.

17. A system for desalination of a salty terminal lake comprising: an array of removable pans in a nearby mineral extraction facility, wherein concentrated brine is received in the array of removable pans and where evaporation is induced with a hot pipe system underneath the removable pans and evaporation from the brine in the removable pans is condensed in a condenser system positioned in an upper portion of a building insulated and divided with a plastic curtain, where distilled water is collected, and transferred for use in different applications, and the highly concentrated brine from the trays removable pans is collected and transported to a nearby facility for extraction of lithium and other minerals.

* * * * *